United States Patent [19]

Amado

[11] Patent Number: 5,701,400

[45] Date of Patent: Dec. 23, 1997

[54] METHOD AND APPARATUS FOR APPLYING IF-THEN-ELSE RULES TO DATA SETS IN A RELATIONAL DATA BASE AND GENERATING FROM THE RESULTS OF APPLICATION OF SAID RULES A DATABASE OF DIAGNOSTICS LINKED TO SAID DATA SETS TO AID EXECUTIVE ANALYSIS OF FINANCIAL DATA

[76] Inventor: Carlos Armando Amado, 444 Brickell Avenue #51-111, Miami, Fla. 33131-2400

[21] Appl. No.: 400,355

[22] Filed: Mar. 8, 1995

[51] Int. Cl.$^6$ .................................................. G06F 15/18
[52] U.S. Cl. ........................... 395/76; 395/52; 395/54; 395/68
[58] Field of Search ..................... 395/52, 54, 68, 395/76

[56] References Cited

U.S. PATENT DOCUMENTS

| 4,658,370 | 4/1987 | Erman et al. | 364/513 |
|---|---|---|---|
| 4,754,409 | 6/1988 | Ashford et al. | 364/513 |
| 4,847,784 | 7/1989 | Clancey | 364/513 |
| 4,866,634 | 9/1989 | Reboh e tal. | 364/513 |
| 4,866,635 | 9/1989 | Kahn et al. | 364/513 |
| 4,884,218 | 11/1989 | Agnew et al. | 364/513 |
| 4,891,766 | 1/1990 | Derr et al. | 364/513 |
| 4,920,499 | 4/1990 | Skeirik | 364/513 |
| 4,928,236 | 5/1990 | Tanaka et al. | 364/513 |
| 4,930,071 | 5/1990 | Tou | 364/300 |
| 4,949,278 | 8/1990 | Davies et al. | 364/513 |
| 4,970,657 | 11/1990 | Wolf | 395/54 |
| 5,006,992 | 4/1991 | Skeirik | 364/513 |
| 5,025,392 | 6/1991 | Singh | 364/513 |
| 5,034,898 | 7/1991 | Lu et al. | 364/513 |
| 5,043,915 | 8/1991 | Suwa et al. | 384/513 |
| 5,103,498 | 4/1992 | Lanier et al. | 395/68 |
| 5,121,496 | 6/1992 | Harper | 395/600 |
| 5,131,087 | 7/1992 | Warr | 395/425 |
| 5,159,669 | 10/1992 | Trigg et al. | 395/159 |
| 5,164,912 | 11/1992 | Osborne et al. | 364/580 |
| 5,167,012 | 11/1992 | Hayes et al. | 395/76 |
| 5,179,632 | 1/1993 | Masui | 395/52 |
| 5,191,638 | 3/1993 | Wakami | 95/51 |
| 5,193,143 | 3/1993 | Kaemmer et al. | 393/51 |
| 5,228,116 | 7/1993 | Harris et al. | 395/54 |
| 5,257,185 | 10/1993 | Farley et al. | 364/419 |
| 5,284,947 | 2/1994 | Bernstein et al. | 395/157 |
| 5,481,647 | 1/1996 | Brody | 395/76 |

OTHER PUBLICATIONS

Timeworks, "Swift Calc St User's Manual," 1982, pp. 93–97, 108–109.

Primary Examiner—Tariq R. Hafiz
Assistant Examiner—Jeffrey S. Smith
Attorney, Agent, or Firm—Ron Fish; Falk & Fish LLP

[57] ABSTRACT

A system for applying artificial intelligence technology to data stored in databases and generates diagnostics that are user definable interpretations of information in the database. The diagnostics are stored in a database which can be queried with downdrilling to the associated data which generated the diagnostic. A set of bidirectional links is maintained between selected data items in the first database and the corresponding diagnostics in the second database. The system acts as an information compiler in developing a map of the raw data dimension into the structured dimension of intelligent interpretation of the data in the diagnostic database.

12 Claims, 59 Drawing Sheets

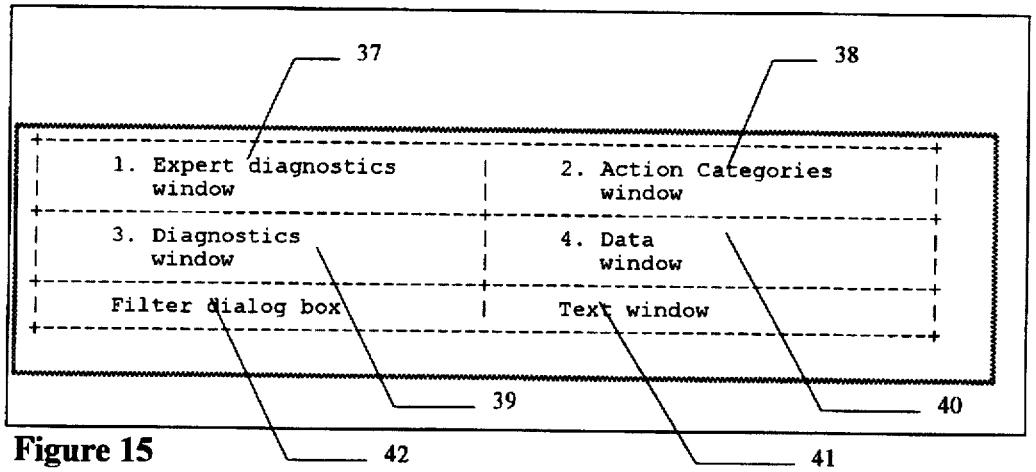

| | | DATA TABLE | | |
|---|---|---|---|---|
| Data | Name | C1=Aug 93 | C2=Sep'93 | C3=Oct' |
| 1.BALANCE.00 | BALANCE SHEET ($) | | | |
| 1.BALANCE.01 | ASSETS ($) | | | |
| 1.BALANCE.02 | Current Assets ($) | 803.28 | 906.60 | |
| 1.BALANCE.03 | Long-Term Investments ($) | 50.00 | 50.00 | |
| 1.BALANCE.04 | Property, Plant&Equip.(Net $ | 598.40 | 586.50 | |
| 1.BALANCE.05 | Other Assets ($) | 35.00 | 35.00 | |
| 1.BALANCE.06 | TOTAL ASSETS ($) | 1,486.68 | 1,578.10 | |
| 1.BALANCE.07 | LIABILITIES ($) | | | |
| *1.BALANCE.08* | *Current Liabilities ($)* | *99.74* | *101.53* | |
| 1.BALANCE.09 | Long-Term Liabilities ($) | 198.95 | 176.41 | |
| 1.BALANCE.10 | TOTAL LIABILITIES ($) | 298.69 | 277.94 | |

| | | | DIAGNOSTICS |
|---|---|---|---|
| Data | PER | Test | Name |
| 1.BALANCE.08 | Sep 93 | 5 DEBT- | The debt ratio is too low (lower than 0.25) |
| 1.BALANCE.08 | Sep 93 | 5 LIABI- | Liabilities have gone up two consecutive per |

```
                              DIAGNOSTICS
  Data         | PER      | Test  | Name
  -------------+----------+-------+----------------------------------------
 •1.FRATIOS.11 | Sep 93   | 5|ARECDN| Accounts receivables turnover is going dow
  1.BALANCE.04 | Sep 93   | 5|ASSET-| Assets have gone down two consecutive periods
  1.BALANCE.08 | Sep 93   | 5|DEBT~ | The debt ratio is too low (lower than 0.25)
  1.BALANCE.09 | Sep 93   | 5|DEBT~ | The debt ratio is too low (lower than 0.25)
  1.BALANCE.10 | Sep 93   | 5|DEBT~ | The debt ratio is too low (lower than 0.25)
  1.FRATIOS.02 | Sep 93   | 5|DEBT~ | The debt ratio is too low (lower than 0.25)
  1.FRATIOS.14 | Sep 93   | 5|EAR3UP| The net earnings / equity ratio is going up
  1.FRATIOS.10 | Sep 93   | 5|FRATI-| Efficiency ratios have gone down two consecu
  1.FRATIOS.10 | Sep 93   | 5|INVEDN| Inventory efficiency (i.e. turnover) is going
  1.BALANCE.08 | Sep 93   | 5|LIABI-| Liabilities have gone up two consecutive per DATA TABLE
  Data         | Name                         | C1=Aug'93 | C2=Sep'93
  -------------+------------------------------+-----------+----------
  1.FRATIOS.11 | Accts. Receivable Turnover   |   19.720  |   19.480
```

FIGURE 17

```
                          ACTION CATEGORIES
  # | Action | Name
  --+--------+------------------------------
 •5 | ALARM1 | Weakness - Low priority
  1 | ALARM2 | Menace - Low priority
  1 | GOOD1  | Strength - Low priority DIAGNOSTICS
  Data         | Test  | Class1 | Class2 | Class3 | Period | Description
  -------------+-------+--------+--------+--------+--------+-----------------------
  1.FRATIOS.11 | ARECDN| ALARM1 | FRED   | CALL   | Sep 93 | 5|Accounts receivables turn
  1.FRATIOS.10 | INVEDN| ALARM1 | ROBERT | CALL   | Sep 93 | 5|Inventory efficiency (i.e
  1.BALANCE.04 | ASSET-| ALARM1 | PETER  | CALL   | Sep 93 | 5|Assets have gone down two
  1.FRATIOS.10 | FRATI-| ALARM1 | PETER  | CALL   | Sep 93 | 5|Efficiency ratios have g
  1.BALANCE.08 | LIABI-| ALARM1 | FRED   | CALL   | Sep 93 | 5|Liabilities have gone up
```

FIGURE 18

```
┌──────────────────────────────────────────────────────────────────────────────┐
│                            EXPERT DIAGNOSTICS                                │
│  PER        DIAG     Name                                                    │
│  ─────────────────────────────────────────────────────────────────────────── │
│ •Nov 93    7 DANGER   Downturn:  sales, income, profits, inventory           │
│  Dec 93    8 GOOD     Upturn:    sales, income, profits, inventory           │
│  Jan 94    9 GOOD     Upturn:    sales, income, profits, inventory           │
│                                                                              │
│                                                                              │
│           DANGER    -   Downturn:  There has been a                          │
│           consistent downward trend for three months.  This                  │
│           involves sales, income, profits and inventory.                     │
│           TAKE EMERGENCY MEASURES                                            │
│                                                                              │
│                              DIAGNOSTICS                                     │
│  DIAG     Test    Action1 Action2  Action3  Name                             │
│  ─────────────────────────────────────────────────────────────────────────── │
│  DANGER   DEBT-   URGNT2  LOUIS    MEET     The debt ratio is too high (higher th
│  DANGER   EAR1UP  GOOD1   ERNIE    CALL     The net earnings / sales ratio is goi
│  DANGER   ARECDN  ALARM1  FRED     CALL     Accounts receivables turnover is goin
│  DANGER   EAR3DN  ALARM1  FRANK    CALL     The net earnings / equity ratio is go
│  DANGER   INVEDN  ALARM1  ROBERT   CALL     Inventory efficiency (i.e. turnover) │
└──────────────────────────────────────────────────────────────────────────────┘
```

FIGURE 19

```
┌──────────────────────────────────────────────────────────────────────────────┐
│                              DATA TABLE                                      │
│  Data          Name                        │ C1=Aug'93   │ C2=Sep'93         │
│  ─────────────────────────────────────────────────────────────────────────── │
│  1.BALANCE.08  Current Liabilities ($)           99.74       101.53          │
│  1.BALANCE.09  Long-Term Liabilities ($)        198.95       176.41          │
│  1.BALANCE.10  TOTAL LIABILITIES ($)            298.69       277.94          │
│  1.BALANCE.11  EQUITY ($)                                                    │
│  1.BALANCE.12  Capital Stock ($)           -    500.00  -    500.00          │
│  1.BALANCE.13  Capital Reserves ($)              52.45        58.55          │
│  1.BALANCE.14  Retained Earnings ($)            635.54       741.62          │
│  1.BALANCE.15  TOTAL EQUITY ($)               1,187.99     1,300.16          │
│  1.BALANCE.16  TOTAL LIABILITIES & EQUITY ($) 1,486.68     1,578.10          │
│  1.FRATIOS.00  FINANCIAL RATIOS (%)                                          │
│  1.FRATIOS.02  Debt Ratio                  -     20.0 % -     20.0 %         │
│                                                                              │
│  ┌───────────────────────────────────────────┐                               │
│  │               DIAGNOSTICS                 │                               │
│  │ Data         │ PER    │Test │Action1│Action2                              │
│  │──────────────────────────────────────────│   RDEB+-   The debt ratio is too -│
│  │•1.BALANCE.08 │ Sep 93 │5 DEBT-│ALARM2│FRED          low (lower than 0.25). You may│
│  │ 1.BALANCE.08 │ Sep 93 │5 LIABI-│ALARM1│FRED          be losing business    │
│  │              │        │       │      │               opportunities, or your│
│  │              │        │       │      │               company's accounting practices│
│  │              │        │       │      │               mix several businesses in one│
│  │              │        │       │      │               accounting practice. │
│  └───────────────────────────────────────────┘                               │
└──────────────────────────────────────────────────────────────────────────────┘
```

```
File
○  New Application...
○  Open Application...        Ctrl+F12

○  Import...
○  Export...

○  Print Report...            →
    ○  Diagnostics
    ○  Data

○  Groups
    ○  Tests
    ○  Ranks
○  Expert Print               Ctrl+R

○  Small Menu...

○  Exit                       Alt-F4
```

FIGURE 23

```
Edit
○  Applications Picklist

○  Executive Information      →
    ○  Screens
    ○  Objects

○  Data                       →
    ○  Items
    ○  Outline
    ○  Formulas
○  Categories Picklist        →
    ○  Set Categories
        ○  Categories 1
        ○  Categories 2
        ...
        ○  Categories 5
○  Groups
○  Tests...                   →
    ○  Data Tests
    ○  Expert Tests ○  Database Files...          →
    ○  Data
    ○  Data Tests ○  Expert Tests 1
    ○  Expert Tests 2

○  Groups A
    ○  Groups B
```

FIGURE 27

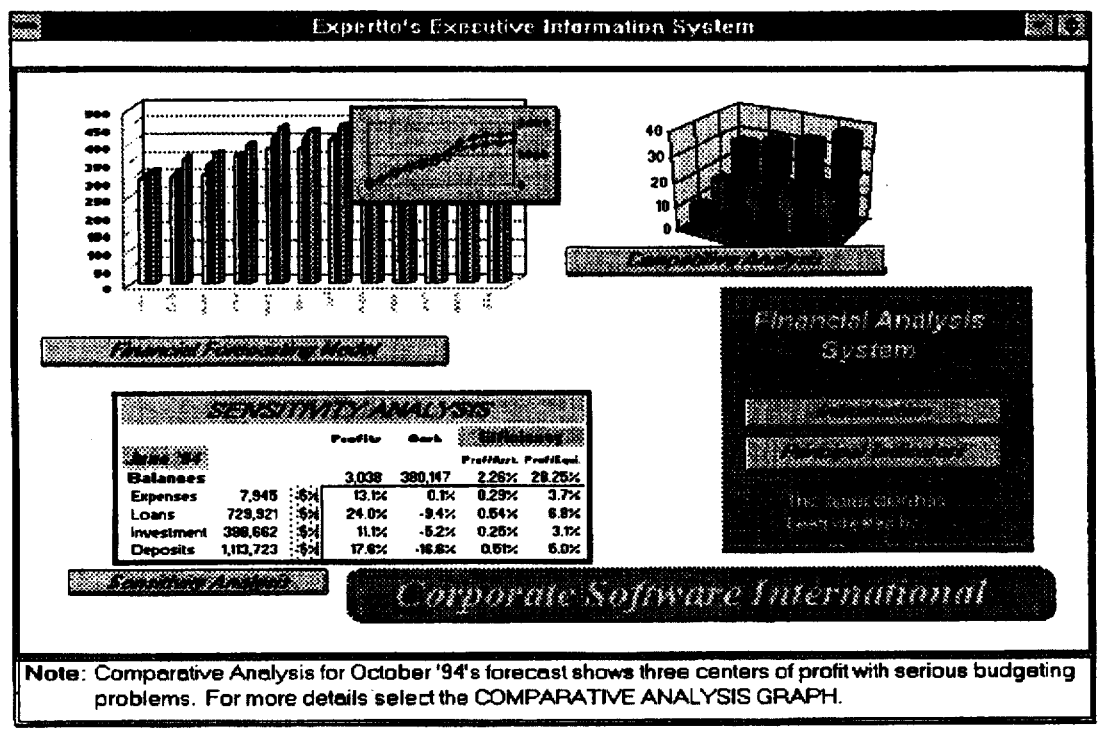

Note: Comparative Analysis for October '94's forecast shows three centers of profit with serious budgeting problems. For more details select the COMPARATIVE ANALYSIS GRAPH.

FIGURE 28

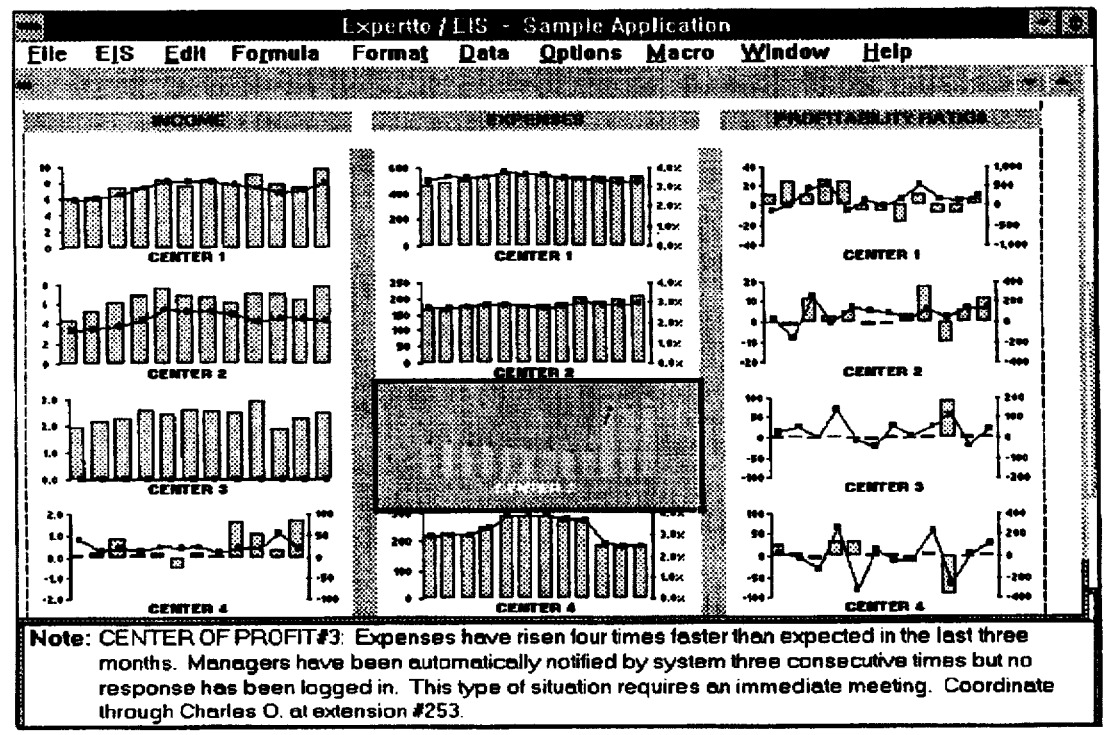

Note: CENTER OF PROFIT #3: Expenses have risen four times faster than expected in the last three months. Managers have been automatically notified by system three consecutive times but no response has been logged in. This type of situation requires an immediate meeting. Coordinate through Charles O. at extension #253.

FIGURE 34

| | | sheet | | | |
|---|---|---|---|---|---|
| | | Name | Example | Format | Factor |
| | | | | | 0.000 |
| | | | | @Z ##,###,###.## | 1.000 |
| | | ROL OF THE TOTAL QUALITY P | | @Z ##,###,###.## | 1.000 |
| | | | | @Z ##,###,###.## | 1.000 |
| | | | | @Z ##,###,###.## | 1.000 |
| 6 | 1.QUAL.0030 | Applied to: | | @Z ##,###,###.## | 1.000 |
| 7 | 1.QUAL.0035 | - Sales and customer service | | @Z ##,###,###.## | 1.000 |
| 8 | 1.QUAL.0040 | - Financial operations and pro | | @Z ##,###,###.## | 1.000 |
| 9 | 1.QUAL.0045 | - Manufacturing | | @Z ##,###,###.## | 1.000 |
| 10 | 1.QUAL.0050 | | | @Z ##,###,###.## | 1.000 |
| 11 | 1.QUAL.0055 | | | @Z ##,###,###.## | 1.000 |
| 12 | 1.QUAL.0060 | ==== | | @Z ##,###,###.## | 1.000 |
| 13 | 1.QUAL.0065 | SALES | | @Z ##,###,###.## | 1.000 |
| 14 | 1.QUAL.0070 | ==== | | @Z ##,###,###.## | 1.000 |
| 15 | 1.QUAL.0075 | | | @Z ##,###,###.## | 1.000 |
| 16 | 1.QUAL.0080 | REAL NUMBERS (US$ AND UNITS) | | @Z ##,###,###.## | 1.000 |
| 17 | 1.QUAL.0085 | | | @Z ##,###,###.## | 1.000 |
| 18 | | | | | 0.000 |
| 19 | 1.QUAL.0095 | Sales | | @Z ##,###,###.## | 1.000 |
| 20 | 1.QUAL.0100 | Northeast | 2,532.00 | @Z ##,###,###.## | 1.000 |
| 21 | 1.QUAL.0105 | Midwest | 1,323.00 | @Z ##,###,###.## | 1.000 |
| 22 | 1.QUAL.0110 | West | 3,753.00 | @Z ##,###,###.## | 1.000 |
| 23 | 1.QUAL.0115 | | | | 1.000 |
| 24 | 1.QUAL.0120 | TOTAL | 7,608.00 | @Z ##,###,###.## | 1.000 |

Edit menu:
- Copy columns    Ctrl+C
- Clear columns   Ctrl+E
- Erase rows      Ctrl+Del
- Insert rows     Ctrl+Ins
- Formats Picklist
- Goto            F5

FIGURE 35

Group

| Code | Name |
|---|---|
| CALLS1 | Customer Calls (abs. values) 1 |
| CALLS2 | Customer Calls 2 (percentages) |
| CALLS3 | Customer Complaints (abs. values) |
| CALLS4 | Customer Complaints 2 (percentages) |
| DEF1 | Number of Defects 1 |
| EXPE1 | Expenses Control 1 |
| OPER1 | Operations Lags 1 |
| PROF1 | Profits by Division 1 |
| REPO1 | Reporting Lag 1 |
| SALES1 | Absolute Sales 1 |
| SALES2 | Relative sales 1 (percentage terms) |
| WRKC1 | Working Capital Z 1 |

Control Panel

[ Add ]  [ Modify ]  [ Activate/Deactivate ]  [ Help ]  [ Escape ]

FIGURE 48

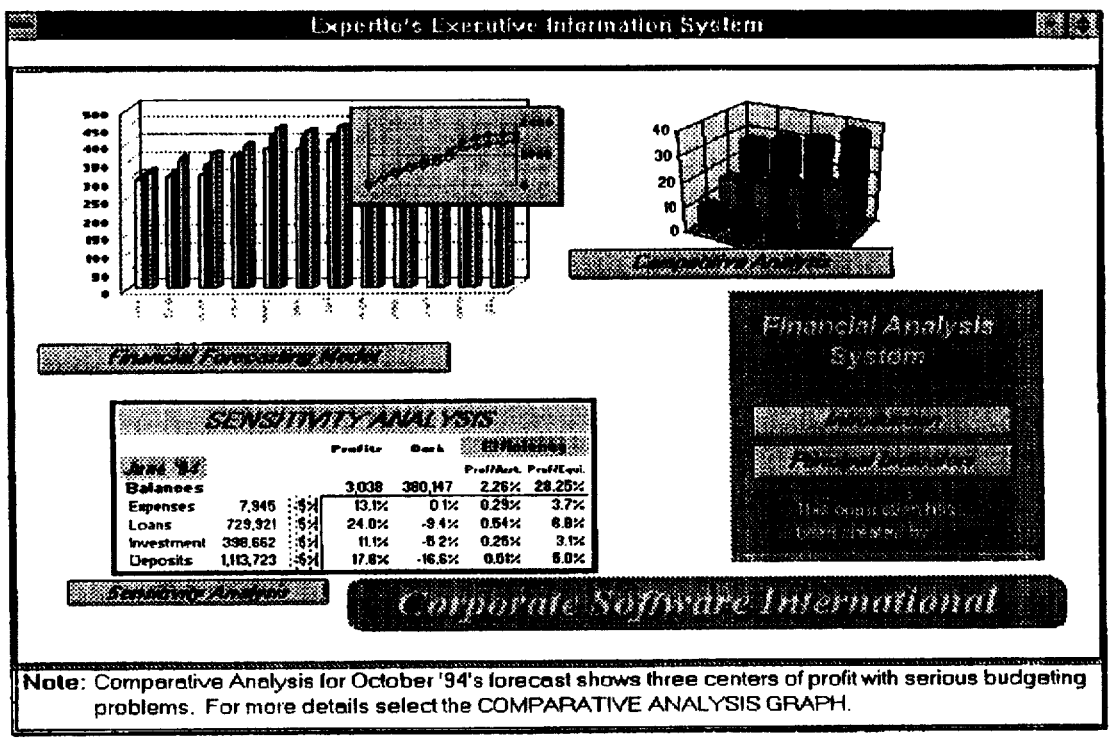

Note: Comparative Analysis for October '94's forecast shows three centers of profit with serious budgeting problems. For more details select the COMPARATIVE ANALYSIS GRAPH.

FIGURE 49

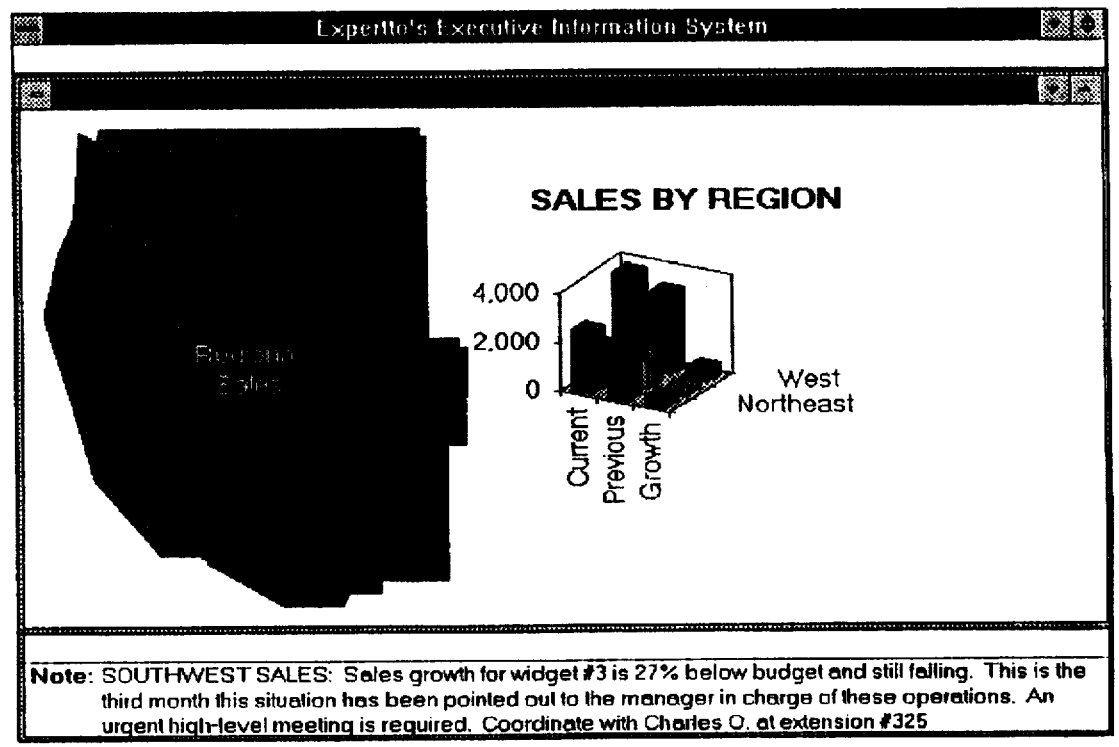

Note: SOUTHWEST SALES: Sales growth for widget #3 is 27% below budget and still falling. This is the third month this situation has been pointed out to the manager in charge of these operations. An urgent high-level meeting is required. Coordinate with Charles O. at extension #325

FIGURE 65

DATA
- data DBF file *(tabla.dbf)*
- group descriptions DBF file *(grupos.dbf)*
- group elements DBF file *(detalle.dbf)*

TESTS
- tests DBF file *(prueba.dbf)*
- action1 DBF file *(clase1.dbf)*
- action2 DBF file (clase2.dbf)
- action3 DBF file *(clase3.dbf)*
- expert test DBF file *(presumen.dbf)*
- expert formulas file *(dresumen.dbf)*

DIAGNOSTICS
- diagnostics DBF file *(result.dbf)*
- expert diagnostics DBF file *(prresult.dbf)*
- expert diagnostics elements DBF file *(drresult.dbf)*

FIGURE 66

| DATA | | |
|---|---|---|
| ° DATA.DBF | Quantitative database | *(tabla.dbf)* |
| ° GROUP.DBF | Information of all data groups, that is, the name of each group | *(grupos.dbf)* |
| ° DETAIL.DBF | Information on the data groups definition | *(detalle.dbf)* |

| TESTS | |
|---|---|
| ° TEST.DBF | Formulas and memos to process the Data Tests -- *prueba.dbf* |
| ° ACTION?.DBF | Action categories codes and descriptions -- *clase1.dbf ... clase3.dbf* |
| ° DIAG.DBF | Information to process Expert Tests (table file) -- *presumen.dbf, dresumen.dbf* |
| ° DIAG.FPT | Information to process Expert Tests (memo file) -- *presumen.dbf, dresumen.dbf* |

| DIAGNOSTICS | |
|---|---|
| ° RESULT.DBF | Information (codes and memos) of all data diagnostics -- *result.dbf* |
| ° PRRESULT.DBF | Information of all expert diagnostics -- *prresult.dbf* |
| ° DRRESULT.DBF | List of diagnostics related to each Expert Diagnostic -- *drresult.dbf* |

FIGURE 67

| QUANTITATIVE DATA | |
|---|---|
| ○ DATA.DBF | Quantitative database |
| ○ GROUP.DBF | Information of all data groups, that is, the name of each group |
| ○ DETAIL.DBF | Information on the data groups definition |

| DATA TESTS, DIAGNOSTICS AND ACTION CATEGORIES | |
|---|---|
| ○ ACTION?.DBF | Action categories codes and descriptions |
| ○ RESNOTE.DBF | Personal notes for data diagnostics stored in RESULT.DBF (table file) |
| ○ RESNOTE.FPT | Personal notes for data diagnostics stored in RESULT.DBF (memo file) |
| ○ RESULT.DBF | Information (codes and memos) of all data diagnostics |
| ○ TEMP1.DBF | Number of diagnostics for each action category |
| ○ TEST.DBF | Formulas and memos to process the Data Tests (table file) |
| ○ TEST.FPT | Formulas and memos to process the Data Tests (memo file) |

| EXPERT TESTS AND DIAGNOSTICS | |
|---|---|
| ○ DIAG.DBF | Formulas and memos to process the Expert Tests (table file) |
| ○ DIAG.FPT | Formulas and memos to process the Expert Tests (memo file) |
| ○ PRRESULT.DBF | Information of all expert diagnostics |
| ○ DRRESULT.DBF | List of diagnostics related to each Expert Diagnostic |
| ○ DRNOTE..DBF | Personal notes for expert diagnostics stored in DRRESULT.DBF (table file) |
| ○ DRNOTE.FPT | Personal notes for expert diagnostics stored in DRRESULT.DBF (memo file) |

| MEMORANDUMS | |
|---|---|
| ○ MEMOS.DBF | Full information and contents of each memo created by the user (table file) |
| ○ MEMOS.FPT | Full information and contents of each memo created by the user (memo file) |
| ○ MEMODET.DBF | Bidirectional pointers between memorandums and associated diagnostics |

| EXECUTIVE INFORMATION SYSTEM (EIS) | |
|---|---|
| ○ DEFAGRAPH.DBF | Chart types information for the EIS option (table file) |
| ○ DEFAGRAPH.FPT | Chart types information for the EISoption (memo file) |
| ○ SCRNDEF.DBF | Definition of object types in the EIS |
| ○ SCRNTYPE.DBF | Information of screen types in the EIS |
| ○ SCREEN.DBF | Information of each screen in the EIS |
| ○ OBJECT.DBF | Information for each object in the EIS (table file) |
| ○ OBJECT.FPT | Information for each object in the EIS (memo file) |

FIGURE 68

```
File:    ACTION1.DBF
  Name         Type       Width Dec  Description
---------------------------------+
ACTION1      Character    14       | Action type identifier -code- (61)
NAME         Character    35       | User description (62)
```

FIGURE 69

```
File:    ACTION1.DBF
  ACTION1      NAME
  ----------+----------------------------
  Sales       Sales Dept., Management
  Servic      Customer Service
  Financ      Financial Operations
  Mgmt        CEO, Management
  Manuf       Manufacturing
```

FIGURE 70

```
File:    CODES.DBF
  Name         Type       Width Dec  Description
---------------------------------
FORMAT       Character    40        Format code
```

FIGURE 71

```
File:    CODES.DBF
  FORMAT
  -------------------------
  @Z ##,###,###.##
  @Z ##########.##
  -------------------------
  =========================
```

FIGURE 72

| File: DATA.DBF | | | | |
|---|---|---|---|---|
| Name | Type | Width | Dec | Description |
| ORDER | Numeric | 10 | 0 | For sorting purposes |
| DATA | Character | 14 | | Line or record identifier -code- (49) |
| NAME | Character | 40 | | Long description for data row (50) |
| C1 | Numeric | 14 | 3 | Data column (51) |
| C2 | Numeric | 14 | 3 | Data column (51) |
| C3 | Numeric | 14 | 3 | Data column (51) |
| ... | | | | |
| C58 | Numeric | 14 | 3 | Data column (51) |
| C59 | Numeric | 14 | 3 | Data column (51) |
| C60 | Numeric | 14 | 3 | Data column (51) |
| VALUE | Numeric | 14 | 3 | Temporary data column for various purposes (68) |
| FORMAT | Character | 17 | | FoxPro format definition for presentation of data (69) |
| FACTOR | Numeric | 14 | 3 | Multiplication factor for data row (70) |
| MARK | Character | 1 | | User-activated mark for browse views, printing and memos |
| LEVEL | Numeric | 1 | 0 | For outlining purposes |
| MARK1 | Character | 1 | | User-activated mark for browse views, printing and memos |

FIGURE 73

```
File:    DATA.DBF
ORDER DATA         NAME                             C1           C2
-----+-------------+--------------------------------+------------+------------
  3  1.QUAL.0015   CONTROL OF TOTAL QUALITY PROCESS    0.000         0.000
  4  1.QUAL.0020                                       0.000         0.000
 18  1.QUAL.0095   Sales                               0.000         0.000
 19  1.QUAL.0100   Northeast                        2532.000      2179.000
 20  1.QUAL.0105   Midwest                          1323.000      1152.000
 21  1.QUAL.0110   West                             3753.000      3256.000
 23  1.QUAL.0120   TOTAL                            7608.000      6587.000
 24  1.QUAL.0125                                       0.000         0.000
 31  1.QUAL.0160   Customer Calls Attended             0.000         0.000
 32  1.QUAL.0165   Northeast                       16259.000     17257.000
 33  1.QUAL.0170   Midwest                         27892.000     24795.000
 34  1.QUAL.0175   West                            35879.000     33973.000
 36  1.QUAL.0185   TOTAL                           80030.000     76025.000
 37  1.QUAL.0190                                       0.000         0.000
 38  1.QUAL.0195   Customer Complaints (West)          0.000         0.000
 39  1.QUAL.0200   Calls                            9687.330      9172.710
 40  1.QUAL.0205   Letters                         12557.650     11890.550
 41  1.QUAL.0210   Solved                          13634.020     12909.740
```

FIGURE 74

```
File:   DATAFORM.DBF
Name        Type        Width  Dec   Description
-----------------------------------------------
CODE        Character     6          Identifier code for this data formula
GROUP       Character     6          Data group to which this data formula will be applied
FORMULA     Memo         10          Data formula
ORDER       Numeric       4    0     Order of evaluation for this data formula
```

FIGURE 75

```
File:   DATANAME.DBF
Name        Type        Width  Dec   Description
-----------------------------------------------+
DATA        Character    14          ! Record identifier for GOTO (= field DATA in DATA.DBF)
NAME        Character    40          ! Long description
```

FIGURE 76

```
File:   DATANAME.DBF
DATA            NAME
-------------+--------------------------------
1.QUAL.0080    Sales (US$ and Units)
1.QUAL.0160    Customer Calls and Complaints (freq.)
1.QUAL.0010    ---------------
2.QUAL.0095    Sales (ratio analysis, percentages)
2.QUAL.0160    Customer calls and complaints (%)
1.QUAL.0010    ---------------
2.QUAL.0260    Financial Operations & Projects:  Lag Ti
2.QUAL.0315    Financial Operations & Projects:  Centers
1.QUAL.0010    ---------------
2.QUAL.0410    Manufacturing (Toys Division)
1.QUAL.0010    ---------------
1.QUAL.0010    (Go to top of file)
```

FIGURE 77

```
File:   DETAIL.DBF
Name        Type        Width  Dec   Description
-----------------------------------------------
GROUP       Character     6          Code for group being defined here (58)
DATA        Character    14          Data record in this group (49)
```

FIGURE 78

```
File:  DETAIL.DBF
  GROUP      DATA
  ---------+---------------
  SALES1    1.QUAL.0100
  SALES1    1.QUAL.0105
  SALES1    1.QUAL.0110
  SALES2    1.QUAL.0140
  OPER1     2.QUAL.0275
  OPER1     2.QUAL.0280
  OPER1     2.QUAL.0285
  CALLS2    2.QUAL.0165
  CALLS2    2.QUAL.0170
```

FIGURE 79

File: DETEIS.DBF

| Name | Type | Width | Dec | Description |
|---|---|---|---|---|
| EIS | Numeric | 4 | 0 | EIS identifier |
| COL | Character | 3 | | Data column in this EIS |

FIGURE 80

File: DIAG.DBF

| Name | Type | Width | Dec | Description |
|---|---|---|---|---|
| DIAG | Character | 6 | | Expert test code (63) |
| NAME | Character | 50 | | Short message associated to expert test (64) |
| NOTE | Memo | 10 | | Long message associated to expert test (65) |
| CMIN | Numeric | 5 | 0 | Points associated to this expert test |
| MARK | Character | 1 | | General purpose mark |
| FORMULA | Memo | 10 | | If this expression turns TRUE a diagnostic is generated |
| GENERAL | Gen | 10 | | Graph, sound, video associated to this test |
| FORMULA1 | Memo | 10 | | Weighting value formula |
| FORMULA2 | Memo | 10 | | Weighting value formula |
| FORMULA3 | Memo | 10 | | Weighting value formula |

FIGURE 81

```
File: DIAG.DBF
   Diag      CUS8-
   Name      Problems with customer service
   Note      (Memo field) Memo contents:  Customer service is a critical area for
             this business.  Complaints are getting higher and the customer service
             department is falling behing.  Review immediately this situation.
   Cmin      10
   Mark
   Formula   (Memo field) Memo contents:  O("CALLS2") AND O("CCALL2")
   General   (Graph)
   Formula1
   Formula2
   Formula3
   ----------------------------------------------------------------------------
   Diag      SAL8+
   Name      Sales situation is improving
   Note      (Memo field) Memo contents:  Sales are rising.  Approximately 50% of
             them are above goals, and 50% are below goals.  Coordinate a marketing
             and sales strategy meeting for this week.
   Cmin      10
   Mark
   Formula   (Memo field) Memo contents:  O("SALES1") OR O("SALES3")
   General   (Graph)
   Formula1
   Formula2
   Formula3
```

FIGURE 82

```
File:    DRNOTE.DBF
  Name         Type      Width  Dec   Description
-------------------------------------
DIAG         Character    6           Pointer to diagnostic DIAG in DRRESULT
PER          Numeric      2     0     Pointer to period PER in DRRESULT
TEST         Character    6           Pointer to TEST test code in DRRESULT
NOTE         Memo        10           Memo contents
```

FIGURE 83

```
File:    DRRESULT.DBF
  Name         Type      Width  Dec   Description
-------------------------------------+
MARK         Character    1           General purpose data mark
DIAG         Character    6           Identifier for expert diagnostic defined here (63)
PER          Numeric      2     0     Period for expert diagnostic DIAG (52)
TEST         Character    6           Data diagnostic related to this expert diagnostic (53)
PLUS         Character    1           Contains character "P" if TEST is found in tables
                                      RESULT or PRRESULT for period PER
POINTS       Numeric      5     0     Points for this diagnostic, corresponding to field CMIN
                                      in DIAG
```

FIGURE 84

```
File:    DRRESULT.DBF

MARK  DIAG    PER TEST    PLUS   POINTS
  ----------+---+-------+-------+--------
        CUS8-   1   CALLS2  P       5
        CUS8-   1   CCALL2  P       5
        SAL8+   1   SALES1  P       5
        SAL8+   1   SALES3  P       5
```

FIGURE 85

```
File:    EIS.DBF
  Name         Type      Width  Dec   Description
-------------------------------------
EIS          Numeric      4     0     EIS identifier
NAME         Character   40           Descriptive name for the EIS
PATH         Character   12           Name of the spreadsheet file containing the EIS
GROUP        Character    6           Data group to be exported to the spreadsheet program
```

FIGURE 86

```
File:    GROUP.DBF
  Name         Type      Width  Dec   Description
-------------------------------------
GROUP        Character    6           Group code identifier (59)
NAME         Character   35           Group name (60)
ORDEN        Numeric      3     0     Positional ordering
NOGROUP      Numeric      4     0     Number of elements in the group
```

FIGURE 87

| File: | GROUP.DBF | | |
|---|---|---|---|
| GROUP | NAME | ORDEN | NOGROUP |
| SALES1 | Absolute Sales 1 | 0 | 5 |
| SALES2 | Relative sales 1 (percentage terms) | 0 | 5 |
| CALLS1 | Customer Calls (abs. values) 1 | 0 | 3 |
| CALLS2 | Customer Calls 2 (percentages) | 0 | 3 |
| CALLS3 | Customer Complaints (abs. values) | 0 | 3 |
| CALLS4 | Customer Complaints 2 (percentages) | 0 | 3 |
| OPER1 | Operations Lags 1 | 0 | 3 |
| REPO1 | Reporting Lag 1 | 0 | 2 |
| WRKC1 | Working Capital Z 1 | 0 | 3 |
| EXPE1 | Expenses Control 1 | 0 | 3 |
| PROF1 | Profits by Division 1 | 0 | 3 |
| DEF1 | Number of Defects 1 | 0 | 3 |

FIGURE 88

| File: | MEMODET.DBF | | | |
|---|---|---|---|---|
| Name | Type | Width | Dec | Description |
| CODE | Numeric | 7 | 0 | Memo code identifier |
| LONG6 | Character | 6 | | Stores 6 character codes for related (tagged) components |
| PER | Numeric | 2 | 0 | Period code identifier |
| LONG14 | Character | 14 | | Stores 14 character codes for related (tagged) components |
| FOR_TABLE | Numeric | 1 | 0 | Identifies the table to which this tag belongs |

FIGURE 89

| File: | MEMOS.DBF | | | |
|---|---|---|---|---|
| Name | Type | Width | Dec | Description |
| CODE | Numeric | 7 | 0 | Memo code identifier |
| NAME | Character | 20 | | Memo description |
| MEMO | Memo | 10 | | Memo contents |
| DIAG | Character | 6 | | Expert test that turns the memo ON |
| ACTIVATED | Logical | 1 | | Flag indicating if the expert diagnostic exists |

FIGURE 90

| File: | OBJECT.DBF | | | |
|---|---|---|---|---|
| Name | Type | Width | Dec | Description |
| TYPESCRN | Character | 14 | | Screen type (initial, graphics) |
| SCRNNAME | Character | 14 | | Screen code |
| CODEOBJ | Character | 14 | | Object code within the identified screen |
| ALPHA | Character | 80 | | If the object is a title its text is contained here |
| DATA | Character | 14 | | Data code identifying an associated data series (only for series or graphic charts) |
| OLEGRAPH | Gen | 10 | | Graph |
| CALL_TO | Character | 14 | | Screen to be called if this object is selected |
| SERIE2 | Character | 14 | | Second data series for graphic objects (charts) |
| FACTOR | Numeric | 14 | 6 | Multiplier (factor) for data series in graphs |
| GRAPH_TYPE | Numeric | 2 | 0 | Graph type stored in OLEGRAPH |
| LEFT_BY | Numeric | 10 | 4 | Multiplier (factor) for data series 1 in graph |
| RIGHT_BY | Numeric | 10 | 4 | Multiplier (factor) for data series 2 in graph |

FIGURE 91

| File: | PRRESULT.DBF | | | |
|---|---|---|---|---|
| Name | Type | Width | Dec | Description |
| MARK | Character | 1 | | General purpose tag or mark |
| DIAG | Character | 6 | | Identifier of the expert diagnostic (63) |
| PER | Numeric | 2 | 0 | Period for diagnostic DIAG (52) |
| SCORE | Numeric | 6 | 0 | Cumulative points |
| VALUE1 | Numeric | 14 | 3 | Result of evaluating formula1 in DIAG |
| VALUE2 | Numeric | 14 | 3 | Result of evaluating formula2 in DIAG |
| VALUE3 | Numeric | 14 | 3 | Result of evaluating formula3 in DIAG |

FIGURE 92

File: PRRESULT.DBF

| MARK | DIAG | PER | SCORE | VALUE1 | VALUE2 | VALUE3 |
|---|---|---|---|---|---|---|
| | CUS8- | 1 | 10 | 0.000 | 0.000 | 0.000 |
| | SAL8+ | 1 | 10 | 0.000 | 0.000 | 0.000 |

FIGURE 93

| File: | RESNOTE.DBF | | | |
|---|---|---|---|---|
| Name | Type | Width | Dec | Description |
| DATA | Character | 14 | | Pointer to field DATA in RESULT |
| PER | Numeric | 2 | 0 | Pointer to field PER in RESULT |
| TEST | Character | 6 | | Pointer to field TEST in RESULT |
| NOTE | Memo | 10 | | Note or memorandum associated to the related diagnostic |

FIGURE 94

| File: | RESULT.DBF | | | |
|---|---|---|---|---|
| Name | Type | Width | Dec | Description |
| MARK | Character | 1 | | General purpose mark |
| DATA | Character | 14 | | Pointer to the data table (49) |
| PER | Numeric | 2 | 0 | Period where TEST turned TRUE (52) |
| TEST | Character | 6 | | Code identifier for the test that turned true (53) |
| ACTION1 | Character | 14 | | Action1 associated to test TEST (61) |
| ACTION2 | Character | 14 | | Action2 associated to test TEST (61) |
| ACTION3 | Character | 14 | | Action3 associated to test TEST (61) |
| ACTION4 | Character | 14 | | Action4 associated to test TEST (61) |
| ACTION5 | Character | 14 | | Action5 associated to test TEST (61) |
| ORDER | Numeric | 7 | 0 | |
| VALUE1 | Numeric | 14 | 3 | Numeric result of evaluating field FORMULA1 in TEST |
| VALUE2 | Numeric | 14 | 3 | Numeric result of evaluating field FORMULA2 in TEST |
| VALUE3 | Numeric | 14 | 3 | Numeric result of evaluating field FORMULA3 in TEST |

FIGURE 95

```
File:    RESULT.DBF
 MARK  DATA           PER TEST    ACTION1 ACTION2
-----------------------------------------------
       1.QUAL.0170    1   CALLS1  Servic  Wait
       1.QUAL.0175    1   CALLS1  Servic  Wait
       1.QUAL.0165    1   CALLS2  Servic  Urgent
       2.QUAL.0200    1   CCALL2  Servic  Urgent
       2.QUAL.0205    1   CCALL2  Servic  Urgent
       2.QUAL.0210    1   CCALL2  Servic  Urgent
       1.QUAL.0110    1   SALES1  Sales   Wait
       1.QUAL.0135    1   SALES1  Sales   Wait
       1.QUAL.0100    1   SALES3  Sales   Wait
       1.QUAL.0105    1   SALES3  Sales   Wait
       1.QUAL.0140    1   SALES3  Sales   Wait
```

FIGURE 96

File:    SHEET.DBF

| Name | Type | Width | Dec | Description |
|---|---|---|---|---|
| MARK | Character | 1 | | General purpose mark or tag |
| ORDER | Numeric | 10 | 0 | |
| DATA | Character | 14 | | Identifier code for each data record |
| NAME | Character | 40 | | Long description for each data record |
| EXAMPLE | Numeric | 14 | 3 | Temporary value |
| FORMAT | Character | 17 | | Format for each data line |
| FACTOR | Numeric | 14 | 3 | Multiplicative factor for each data line |
| DATA_ANT | Character | 14 | | Previous identifier code for the data record (when changed) |
| ORDER1 | Numeric | 10 | 0 | |

FIGURE 97

File:    TEMP1.DBF

| Name | Type | Width | Dec | Description |
|---|---|---|---|---|
| MARK | Character | 1 | | General purpose mark |
| NUMBER | Numeric | 10 | 0 | Number of times a specific category action code has appeared in RESULT |
| SUMA | Numeric | 16 | 0 | Cumulative points for all tests with the specified action code in RESULT |
| ACTION2 | Character | 14 | | Pointer to the specified category action |

FIGURE 98

```
File:   TEMP1.DBF
MARK NUMBER  SUMA    ACTION2
-------------------------------
   4    20           Urgent
   2    10           Wait
```

FIGURE 99

| File: TEST.DBF | | | | |
|---|---|---|---|---|
| Name | Type | Width | Dec | Description |
| MARK | Character | 1 | | General purpose mark |
| TEST | Character | 6 | | Identifier code for this data test (54) |
| NAME | Character | 50 | | Short message associated to this test (55) |
| DATA | Character | 14 | | This code was only used in previous versions (49) |
| GROUP | Character | 6 | | Group specifying data items to which this test will be applied (58) |
| FORMULA | Memo | 10 | | Formula expression (57) |
| NOTE | Memo | 10 | | Longer message associated to this test (56) |
| ACTION1 | Character | 14 | | Pointer to Action1 associated to this test (61) |
| ACTION2 | Character | 14 | | Pointer to Action2 associated to this test (61) |
| ACTION3 | Character | 14 | | Pointer to Action3 associated to this test (61) |
| ACTION4 | Character | 14 | | Pointer to Action4 associated to this test (61) |
| ACTION5 | Character | 14 | | Pointer to Action5 associated to this test (61) |
| POINTS | Numeric | 5 | 0 | Points for this test |
| ORDER | Numeric | 7 | 0 | Positional order |
| FORMULA1 | Memo | 10 | | Formula expression for weighting factor1 |
| FORMULA2 | Memo | 10 | | Formula expression for weighting factor2 |
| FORMULA3 | Memo | 10 | | Formula expression for weighting factor3 |
| GENERAL | Gen | 10 | | General field for graphs, videos, sounds associated to this test |

FIGURE 100

```
File:   TEST.DBF
MARK TEST   NAME                                                      DATA  GROUP   ...
-----------------------------------------------------------------------------------
     SALES1 Sales are lower than goals but we're getting close              SALES1  ...
     SALES2 Sales are getting worse and farther from our goal!              SALES1  ...
     SALES3 Sales are rising.  We're above our goals!  Good!                SALES1  ...
     SALES4 We're higher than our goal, but sales are falling               SALES1  ...

SALES5 Sales deficit here is higher than 20%.  Shape up!               SALES2  ...
     SALES6 Sales are higher than 20% over our goals                        SALES2  ...

CALLS1 Customer calls attended are too low but rising                  CALLS1  ...
     CALLS2 The customer service dept. is falling behind!                   CALLS1  ...
     CALLS3 Customer service is good and improving.  OK!                    CALLS1  ...
     CALLS4 Customer service is OK but falling  -- review                   CALLS1  ...

CALLS5 Customer service efficiency is too low by over 20%              CALLS2  ...
     CALLS6 Customer sales attended are MUCH higher than goals              CALLS2  ...

CCALL1 Customer complaints are high but getting better                 CALLS4  ...
     CCALL2 Customer complaints are high and getting worse!                 CALLS4  ...
     CCALL3 Very few customer complaints -- better than goals               CALLS4  ...
     CCALL4 Few customer complaints but rised over 10% / check              CALLS4  ...
```

FIGURE 101

```
File:    TEST.DBF
  ...    GROUP  FORMULA   NOTE    ACTION1   ACTION2    ACTION3
  ---------------------------------------------------------------
  ...    SALES1 Memo      Memo    Sales     Wait       John
  ...    SALES1 Memo      Memo    Sales     Urgent     John
  ...    SALES1 Memo      Memo    Sales     Wait       John
  ...    SALES1 Memo      Memo    Sales     Wait       John ...    SALES2 Memo      Memo    Sales     Urgent     John
  ...    SALES2 Memo      Memo    Sales     Wait       John ...    CALLS1 Memo      Memo    Servic    Wait       Mark
  ...    CALLS1 Memo      Memo    Servic    Urgent     Mark
  ...    CALLS1 Memo      Memo    Servic    Wait       Mark
  ...    CALLS1 Memo      Memo    Servic    Wait       Mark ...    CALLS2 Memo      Memo    Servic    Urgent     Mark
  ...    CALLS2 Memo      Memo    Servic    Wait       Mark ...    CALLS4 Memo      Memo    Servic    Wait       Mark
  ...    CALLS4 Memo      Memo    Servic    Urgent     Mark
  ...    CALLS4 Memo      Memo    Servic    Wait       Mark
  ...    CALLS4 Memo      Memo    Servic    Wait       Mark
```

FIGURE 102

```
File:    TEST.DBF
GROUP    ...  FORMULA (memo field)                                              NOTE (memo field)
---------------------------------------------------------------------------------------------------
SALES1   ...  G("current")<G("goal") .AND. G("current")>G("previous")           Getting close   ...
SALES1   ...  G("current")<G("goal") .AND. G("current")<G("previous")           Getting worse   ...
SALES1   ...  G("current")>G("goal") .AND. G("current")>G("previous")           Above our goals ..
SALES1   ...  G("current")>G("goal") .AND. G("current")<G("previous")           Sales are falling SALES2   ...  (G("current")-G("goal"))<-20%                                     Deficit higher tha
SALES2   ...  (G("current")-G("goal"))>20%                                      Sales are higher .

CALLS1   ...  G("current")<0 .AND. G("current")>G("previous")                   Customer calls low
CALLS1   ...  G("current")<0 .AND. G("current")<G("previous")                   Falling behind ...
CALLS1   ...  G("current")>0 .AND. G("current")>G("previous")                   Good and improving
CALLS1   ...  G("current")>0 .AND. G("current")<G("previous")                   OK but falling ...

CALLS2   ...  (G("current")-G("goal"))<-20%                                     Efficiency too low
CALLS2   ...  (G("current")-G("goal"))>20%                                      Higher than goals CALLS4   ...  G("current")>0 .AND. G("current")<G("previous")                   Complaints high bu
CALLS4   ...  G("current")>0 .AND. G("current")>G("previous")                   High,getting worse
CALLS4   ...  G("current")<0 .AND. G("current")<G("previous")                   Better than goals
CALLS4   ...  G("current")<0 .AND. G("current")>(G("previous")+10%)             Complaints rised
```

FIGURE 103

```
File:    TEST.DBF    (a different sample application: Financial Analysis)
Test     GEFFIC
Name     Efficiency ratios are appropriate for this company
Data
Group    EFFICIENCY
Formula  G(0) >2.5
Note     Efficiency ratios are appropriate for this company. No correction
         action is necessary.
Action1  GOOD
Action2  JOHN
Action3  NONE
---------------------------------------------------------------------------------
Test     DEBT-
Name     The debt ratio is too low (lower than 0.25)
Data     1.FRATIOS.02
Group
Formula  F("1.FRATIOS.02",0) <0.25
Note     RDEB+-    The debt ratio is too low (lower than 0.25). You may be lo
Action1  ALARM2
Action2  FRED
Action3  BANKS
---------------------------------------------------------------------------------
Test     DEBT+
Name     The debt ratio is adequate (between 0.25 and 0.40)
Data     1.FRATIOS.02
Group
Formula  F("1.FRATIOS.02",0) >0.25 AND F("1.FRATIOS.02",0) <0.40
Note     RDEB+     The debt ratio is adequate (between 0.25 and 0.40). This me
Action1  GOOD1
Action   ARNIE
Action3  BANKS
---------------------------------------------------------------------------------
Test     DEBT-
Name     The debt ratio is too high (higher than 0.40)
```

FIGURE 104

| File: | APLICAT.DBF | | | |
|---|---|---|---|---|
| Name | Type | Width | Dec | Description |
| APLICAT | Numeric | 2 | 0 | Code identifier for this application |
| NAME | Character | 50 | | Descriptive name for this application |
| DIRECT | Character | 76 | | Directory containing this application |

FIGURE 105

```
File:   APLICAT.DBF
 APLICAT  NAME
---------+------------------------------------------
 16       Executive Summary 1
 17       Executive Summary 2
 18       Financial Analysis
 19       ----------------------
 20       Management of the Sales Process 1
 22       Management of the Total Quality Process 1
 24       Projects Control
 26       National Economic Accounts
```

FIGURE 106

| File: CONFIG.DBF | | | | |
|---|---|---|---|---|
| Name | Type | Width | Dec | Description |
| TYPE | Character | 12 | | Configuration type |
| ID | Character | 12 | | Identifier code |
| NAME | Character | 24 | | To what element does this configuration apply (a field, browse screen, etc) |
| READONLY | Logical | 1 | | Indicates if this configuration can be changed |
| CKVAL | Numeric | 6 | 0 | Checking value (FoxPro reserved use only) |
| DATA | Memo | 10 | | FoxPro reserved use only |
| UPDATED | Date | 8 | | Date for last configuration update |

FIGURE 107

| File: DEFAGRPH.DBF | | | | |
|---|---|---|---|---|
| Name | Type | Width | Dec | Description |
| GRAPHNAME | Character | 30 | | Name for this graph |
| GRAPHID | Numeric | 2 | 0 | Code identifier for this graph |
| GRAPHTITLE | Character | 80 | | Title for this graph |
| XAXIS | Character | 12 | | |
| FLIST | Memo | 10 | | List of fields |
| OLEGRAPH | Gen | 10 | | Graphic object |

FIGURE 108

| File: MEMORY.DBF | | | | |
|---|---|---|---|---|
| Name | Type | Width | Dec | Description |
| GRAPH_TYPE | Numeric | 2 | 0 | Graphic type (Code) |
| OLEGRAPH | Gen | 10 | | Graphic object |
| DETAIL screen | Character | 80 | | Description for this graph |

FIGURE 109

| File: SCREEN.DBF | | | | |
|---|---|---|---|---|
| Name | Type | Width | Dec | Description |
| TYPESCRN | Character | 14 | | Screen type |
| SCRNNAME | Character | 14 | | Name for this screen |
| STARTSCRN | Logical | 1 | | Indicates if this is the initial screen |

FIGURE 110

```
File:    SCRNDEF.DBF
  Name          Type       Width Dec  Description
---------------------------------------
TYPESCRN       Character    14        Screen type
CODEOBJ        Character    14        Object code
TYPEOBJ        Character     1        Object type (graph, series, title or call)
```

FIGURE 111

```
File:    SCRNTYPE.DBF
  Name          Type       Width Dec  Description
---------------------------------------
TYPESCRN       Character    14        Screen type
FILENAME       Character    12        Screen driver name (.PRG or .SPR file)
MODIFILE       Character    12        Name of the file to be modified to change the screen type
                                      (only for program developers)
```

FIGURE 112

```
File:    WINDOWS.DBF
  Name          Type       Width Dec  Description
---------------------------------------
USER           Character     3        Stores the configuration for each user
OPERATION      Character     3        Stores the configuration fr each operation (1..4)
READONLY       Logical       1        If contains "T" indicates that windows configurations
                                      can be changed
SCREEN         Numeric       2    0   Only for DOS program version. This indicates if
                                      the screen is in 25 or 50 lines mode
WINDOWS        Memo         10        Stores the whole windows configuration
```

Flow Diagram for Procedure CalExp

Relations diagram

Browses structure
Situation Analysis

| PRRESULT.diag | PRRESULT.per | DIAG.name |
|---|---|---|
|  |  |  |

Diagnostics

| DRRESULT.diag | DRRESULT.test | TEST.name | DRRESULT.plus | TEST.action1...TEST.action5 |
|---|---|---|---|---|
|  |  |  |  |  |

Data

| DATA.name | DATA.data | DATA.c1..c12 |
|---|---|---|
|  |  |  |

Test object

| TEST.general |
|---|
|  |

Diagnostic object

| DIAG.general |
|---|
|  |

Diagnostic notes

| TEST.note |
|---|
|  |

Situation notes

| DIAG.note |
|---|
|  |

Personal notes

| DRNOTE.note |
|---|
|  |

Relations diagram

Browses structure
Categories

| TEMP1.number | ACTION1.description |
|---|---|
|  |  |

Diagnostics

| TEST.name | RESULT.data | RESULT.per | RESULT.test | TEST.action1...TEST.action5 |
|---|---|---|---|---|
|  |  |  |  |  |

Data

| DATA.name | DATA.data | DATA.c1..c12 |
|---|---|---|
|  |  |  |

Test object

| TEST.general |
|---|
|  |

Diagnostic notes

| TEST.note |
|---|
|  |

Personal notes

| RESNOTE.note |
|---|
|  |

Relations diagram

Browses structure

Data

| DATA.name | DATA.data | DATA.c1..c12 |
|---|---|---|
|  |  |  |

Diagnostics

| TEST.name | RESULT.data | RESULT.per | RESULT.test | TEST.action1...TEST.action5 |
|---|---|---|---|---|
|  |  |  |  |  |

Test object

| TEST.general |
|---|
|  |

Diagnostic notes

| TEST.note |
|---|
|  |

Personal notes

| RESNOTE.note |
|---|
|  |

| Corrective management system | | | |
|---|---|---|---|
| *- By business divisions -* | | | |
| | Previous | Current | Increment |
| Profits div.1 | 718.2 | 1,433.3 | 715.4 |
| Profits div.2 | 1,549.1 | 2,942.5 | 1,393.0 |
| Profits div.3 | 1,467.2 | 2,948.4 | 1,481.2 |
| Profits div.4 | 2,997.1 | 2,361.5 | (635.6) |
| Defects div.1 | 293.4 | 589.7 | 296.3 |
| Defects div.2 | 599.4 | 278.3 | (321.1) |
| Defects div.3 | 125.4 | 344.3 | 218.9 |
| Defects div.4 | 211.0 | 31.5 | (179.5) |

FIGURE 128

Corrective management system
*- By business divisions -*

| Defects increment | | Priority |
|---|---|---|
| From | To | of action |
| (500) | (417) | 0.00 |
| (417) | (333) | 0.00 |
| (333) | (250) | 0.00 |
| (250) | (167) | 0.00 |
| (167) | (83) | 0.00 |
| (83) | 0 | 0.15 |
| 0 | 83 | 0.30 |
| 83 | 167 | 0.50 |
| 167 | 250 | 0.75 |
| 250 | 333 | 0.80 |
| 333 | 417 | 0.75 |
| 417 | 500 | 0.50 |
| 500 | 583 | 0.30 |
| 583 | 667 | 0.15 |
| 667 | 750 | 0.00 |

FIGURE 129

Corrective management system
*- By business divisions -*

| Profits increment | | Priority |
|---|---|---|
| From | To | of action |
| (1,850) | (1,542) | 0.15 |
| (1,542) | (1,233) | 0.30 |
| (1,233) | (925) | 0.50 |
| (925) | (617) | 0.75 |
| (617) | (308) | 0.80 |
| (308) | 0 | 0.75 |
| 0 | 308 | 0.50 |
| 308 | 617 | 0.30 |
| 617 | 925 | 0.15 |
| 925 | 1,233 | 0.00 |
| 1,233 | 1,542 | 0.00 |
| 1,542 | 1,850 | 0.00 |
| 1,850 | 2,158 | 0.00 |
| 2,158 | 2,467 | 0.00 |
| 2,467 | 2,775 | 0.00 |

FIGURE 130

| | Corrective management system | | | |
|---|---|---|---|---|
| | *- By business divisions -* | | | |
| | Previous | Current | Increment | Fuzzy value |
| Profits div.1 | 205.2 | 409.5 | 204.4 | 0.15 |
| Profits div.2 | 442.6 | 840.7 | 398.0 | 0.00 |
| Profits div.3 | 419.2 | 842.4 | 423.2 | 0.00 |
| Profits div.4 | 856.3 | 674.7 | (181.6) | 0.75 |
| Defects div.1 | 293.4 | 589.7 | 296.3 | 0.80 |
| Defects div.2 | 599.4 | 278.3 | (321.1) | 0.00 |
| Defects div.3 | 125.4 | 344.3 | 218.9 | 0.75 |
| Defects div.4 | 211.0 | 31.5 | (179.5) | 0.00 |

FIGURE 131

| | Corrective management system | |
|---|---|---|
| | *- By business divisions -* | |
| Decision to act | Corrective need | |
| | Maximum | Minimum |
| | (OR) | (AND) |
| Division 1 | 0.80 | 0.15 |
| Division 2 | 0.00 | 0.00 |
| Division 3 | 0.75 | 0.00 |
| Division 4 | 0.75 | 0.00 |

FIGURE 132

If *test1* then *diagnostic1*
If *test2* then *diagnostic2*
If *test3* then *diagnostic3*
If *test4* then *diagnostic4*

Where *test4* includes: *diagnostic2* and *diagnostic3* in its premise

FIGURE 133

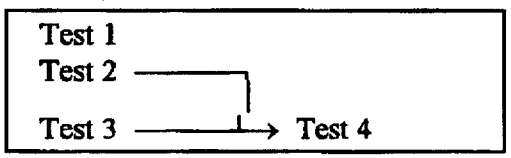

FIGURE 137

Program structure

The invention is a *program* comprising one or more *data tables* (5, 37), *tests* in one or more *lists of tests* (9, 17, 39), *diagnostics* in one or more *lists of diagnostics* (7, 27, 38), and *pointers* (21) in one or more *lists of pointers* (17, 25).

- Each data table contains *numbers* (12), and their *row headings* (49) and *column headings* (52).

- Each test in each list of tests contains:

- a *conditional formula* (57) of the form *IF(condition)* that evaluates to TRUE or FALSE

- where *conditional formula* may contain

- *number references* (21) to one or more *numbers* (12) in any one of the data tables,

- *test references* (52, 53) to one or more tests in the list of tests and

- *user-definable functions* containing calls to *neural network programs*, *genetic algorithm programs*, and other artificial intelligence programs

- a set of *messages* (9, 39) containing a *short message* (55), a *long message* (56) and a *packaged object*

- the packaged object may be a *graph*, a *sound note* or a *video clip*.

- an *algebraic formula* containing a *fuzzy logic expression* with references to specific numbers in the data table or diagnostics in the list of diagnostics

- *test pointers* to other items such as

- specific numbers in the data table

- *memorandums* containing a *recipient's address*, a *text message* and a *set of labels*.

- *action labels* in a *list of action labels* (42, 43, 44), where each action label conveys an additional user-definable meaning such as an associated action, a priority level, or the name of the person responsible for a task

- Each diagnostic in each list of diagnostics contains *bi-directional diagnostic pointers* (53, 54) to other items such as

- one test in the list of tests

- specific numbers in any one of the data tables

- one or more diagnostics in any one or more lists of diagnostics

- The program's structure also contains one or more lists of pointers containing *bi-directional expert tests pointers* (53, 54) between any two or more tests in any one or more lists of tests.

METHOD AND APPARATUS FOR APPLYING IF-THEN-ELSE RULES TO DATA SETS IN A RELATIONAL DATA BASE AND GENERATING FROM THE RESULTS OF APPLICATION OF SAID RULES A DATABASE OF DIAGNOSTICS LINKED TO SAID DATA SETS TO AID EXECUTIVE ANALYSIS OF FINANCIAL DATA

BACKGROUND OF THE INVENTION

The invention as a whole relates to the fields of artificial intelligence, decision-support software and expert systems.

More specifically, the invention relates to computer software based on artificial intelligence and rule-based systems for the development of an executive information system.

The invention can perform information analysis via captured expertise and the generation of diagnostics using a combination of artificial intelligence techniques such as expert systems, neural nets, fuzzy logic and others.

Current software implementations do not address directly the need for a system integrating (a) report analysis via an EIS system incorporating the generation of diagnostics using a combination of artificial intelligence techniques, (b) storage of said diagnostics in a database related to the original information in the reports, and (c) a query system, empowering the user to search for any information in both reports and diagnostics in a coordinated manner.

Heretofore, no instruments have been involved in a similar idea as that dealt with in the invention. However, its individual elements respond to prior art in the following areas: decision-support software and executive information systems, expert systems and expert system building tools, fuzzy systems, weighting schemes in expert systems, neural networks, tools integrating expert systems and neural networks, genetic algorithms and classifier systems, tools integrating expert systems and databases, intelligent databases and object-oriented databases, intelligent user interfaces, and knowledge acquisition and automatic discovery tools such as database miners.

1. Referring to DECISION-SUPPORT SOFTWARE, existing tools do not address the specific functionality of this invention. These systems allow managers to see very simple summary reports from huge amounts of information stored in databases. In other words, EIS are tools allowing programmers to build simple reporting applications for managers. A few tools will be now discussed as good examples of the current state of prior art.

The DECISION PAD (V.2.0)™ decision-support tool, by Apian Software of Menlo Park, Calif.; the DECISION-MAKER™ and the MAXCIM DECISION SUPPORT SYSTEMS II™ decision-support tool, by ASK Computer Systems, Inc. of Mountain View, Calif.; the EIS™ (Executive Information Services™) decision-support tool, by Boeing Computer Services of Seattle, Wash.; the Business Insight™ decision-support tool, by Business Resource Software of Austin, Tex.; the Decision Support System™ (DSS™) decision-support tool, by Definitive Software Inc. of Bloomington, Ind.; the EIS Tool Kit™ decision-support tool, by Executive Performance Systems of Glendale, Ariz.; the EIS Toolkit™ decision-support tool, by Ferox Microsystems, Inc. of Alexandria, Va.; the Executive Information System™ decision-support tool, by Global Software, Inc. of Raleigh, N.C., the Forest & Trees™ decision-support tool, by Channel Computing Inc. of Newmarket, N.H.; the LightShip™ decision-support tool, by Pilot Executive Software, of Boston, Mass., all of these described in patent pending No. 08/102,581.

The KEE Knowledge Engineering Environment™ decision support tool by IntelliCorp Inc. of Mountain View Calif. builds knowledge-based end-user systems from prototype through finished product. Provides environment that helps user understand how system uses its knowledge to solve problems and make decisions.

The EISPak™ executive information system building tool distributed by Microsoft Corporation of Redmond Wash. is a set of macro routines developed under Microsoft Excel™.

The Corporate Vision™ decision support tool by IntelligenceWare Inc. of Los Angeles Calif. is a spreadsheet program that helps user visually analyze facts and graphically see corporate data. Merges data from several sources, filters and extracts facts and provides user with key information on demand. Displays information in 3D graphics, tables and hypertext in exchangeable format.

The Iconic Query™ decision support tool by IntelligenceWare Inc. of Los Angeles Calif. is a graphical query tool which allows users to visually create queries on-screen. Supports graphics, reporting features and query capabilities. Replaces query language used by developers with icons to get information from databases. Includes Paradox and dBase drivers. Provides support for hypertext help and ability to incorporate 3D graphics into applications. Includes WYSIWYG reporting and label generation.

The Intellect™ decision support system by AICorp Inc. (now Trinzic) of Waltham Mass. is an AI-based natural language system allowing management access to production databases for English language query, ad hoc analysis, report formatting and database updates. Generates presentation-quality graphs or downloads data to PC. Intellect 400 provides simultaneous multiple database access and supports IBM mainframe databases and 4GL systems including DB2, SQL/DS, IMS, IDMS, ADABAS and Focus. Operates standalone or integrates with AICorp's KBMS.

The Spreadbase™ decision support tool by Objective Software Inc. of Redwood City Calif. is a category-based modeling software. Designed to complement existing spreadsheets. Enables users to perform data analysis. Handles items with similar characteristics as categories and establishes one-to-one correlation between data contained in cells and underlying data record. Allows for multiple views of same data. Enables user to generate what-if scenarios.

Of all executive information systems and decision support tools examined, none provides the specific functionality of this invention.

2. Referring to EXPERT SYSTEMS and expert systems building tools,

Expert Systems are computer programs that capture human expertise in problem solving in a small area, to provide automatic solutions to similar problems. Usually, these are written in a set of if/then rules, called a rule base or knowledge base. Expert systems building tools typically consist of (a) an interpretive language where the user may write his or her program statements and the conditions associated with those statements, (b) an inference engine, which provides the mechanism through which the expert rules are interpreted and fired, and (c) an executive front-end or expert shell, that helps users write application programs using the language, and that helps them run the expert applications developed, and that also helps them develop and query reports or the generated diagnostics.

The following paragraphs have been adapted from the Interim Final "Practice Paper" on Expert Systems for Life Cycle Management in EPA's Office of Solid Waste and Emergency Response (OSWER), November, 1988. This document was publicly circulated in the U.S.

Expert systems are a specialized subset of DSSs (decision-support-systems) that employ symbolic reasoning to manipulate data and produce reports. If the judgment employed by the users is procedural in nature (i.e., requires a set number of steps to reach a predetermined conclusion), then a conventional DSS should be developed. However, if the user reaches a conclusion based on a variety of factors that cannot be captured using an algorithm, then an expert system could be developed.

The ability of expert systems to reason about rules as well as input data makes them particularly adept at handling many different types of problems, such as diagnosis and classification, data analysis and interpretation, design and synthesis, prediction and simulation, monitoring, instruction, planning, control and repair.

(i) Diagnosis and classification expert systems select an answer from a fixed set of alternatives on the basis of information input to the system while it is reasoning. For example, the MYCIN™ expert system by Stanford University of Stanford, Calif. diagnoses bacterial infections in humans. Another diagnosis and classification expert system, the MUDMAN™ expert system diagnoses problems with "mud" used in NL Baroid's oil well drilling and recommends new compositions.

(ii) Data analysis and interpretation systems select a hypothesis based on measurement data and corollary information. They infer situation descriptions from accumulated sensor data. For example, the DENDRAL™ expert system by Stanford University analyzes molecular structures based on mass spectrogram data. The PROSPECTOR™, developed at Stanford Research Institute, is used to interpret data about ore-grade deposit sites. Expert systems can deal with incomplete or contradictory data. Expert systems are often good at assisting managers in managing complex and incompatible data sources in order to consistently reach a known range of conclusions.

(iii) Design and synthesis expert systems configure objects such as computer systems on the basis of a set of alternate possibilities. The expert system incorporates constraints that the system must meet as well as guidance for steps the system must take to meet the user's objectives. Design expert systems are used in configuring large mainframe computers, in designing circuit boards, and in preparing large annual budgets. Expert systems permit the exploration of the consequences of proposed design changes prior to implementing them. They also facilitate the subdivision of large problems into smaller ones and simplify coordination among the subsets.

(iv) Prediction and simulation expert systems forecast what will happen on the basis of current information by depending on experience or employing models or simulation. Situations involving prediction are well suited to expert systems. Crop management and weather forecasting are two areas of current interest. Predictor systems must be able to model the ways actions change over time and to manipulate events that are ordered in time. They must also be able to deal with incomplete information, generate multiple scenarios, and use diverse data sources. For example, the COMAX™ expert system by the U.S. Department of Agriculture advises farmers on irrigation, fertilization, and when to harvest. The GRAIN MARKET ADVISOR™ expert system by Purdue University helps farmers determine the best way to market the grain they produce.

(v) Monitoring expert systems obtain data on an ongoing situation following its predicted or intended progress and alerting the user or system if there is a departure from the expected or usual. Expert systems capable of monitoring their environments compare observations to desired outcomes and report discrepancies. They must recognize alarm conditions in real time and avoid false reports of problems or emergencies. Note that "real time" expert systems are significantly different than those which allow the luxury of reflection. Because of varying environmental factors, monitoring systems must vary their anticipation of alarm conditions with time and situation. Air traffic control and nuclear power plant management are two current fields of application. Additionally, NASA's NAVEX monitors controls on space shuttle flights.

(vi) Instruction expert systems are built depending on user needs to give advice, furnish information, or perform various subtasks. Expert systems that can serve as an on-line tutorial aid to students and diagnose areas of deficiency involve the automation of instruction. These systems construct a hypothetical description of a student's knowledge in order to interpret the student's behavior. They identify remedial courses of action and develop tutorial modes of communicating the remedial action to the student. They can be used to tutor novices and to advance the development of human experts. For example, the DOPPLER DIAGNOSIS™ expert system, by Dr. Evlin Kinney, helps train doctors in the use of non-invasive echo effect equipment. The CBT ADVISOR™ expert system, by Courseware, helps determine the suitability of instructional units for computer based training.

(vii) Planning expert systems select a series of actions from a complex set of alternatives to meet a user's goals. Priorities must be established in order to resolve conflicts among goals and subgoals may need to be established to simplify complex interactions. The UNIT COMMITMENT ADVISOR™ expert system by IBM Corporation assists in the shut down of power plants.

(viii) Control is a combination of monitoring a system and taking appropriate actions. Control systems interpret, predict, repair, and monitor system behavior. Problems addressed by control systems include business management.

(ix) Debugging and repair systems specify remedial plans and apply them in limited areas. Computer programming is the most obvious area of application, but medical diagnostic systems also have debugging aspects.

Many expert system building tools are available to the public, such as the VP-EXPERT™ expert shell by Paperback Software, the CLIPS™ expert system development tool and language by NASA, Nexpert Object™ expert system development tools by Neuron Data, and the KnowledgeMaker™ development system by Knowledge Garden. A few tools will be now discussed as good examples of the current state of prior art.

The Kappa-PC™ expert system building tool by IntelliCorp Inc. of Mountain View Calif. develops problem-solving, knowledge-based systems for business, scientific and engineering applications. Combines techniques for knowledge representation and reasoning including functional programming, object-oriented programming, rule-based reasoning and graphical representation. Creates GUI components including list boxes, radio buttons and check boxes. Interfaces to numerous application and in-house programs.

The KEELINK™ expert systems building tool by IntelliCorp Inc. of Mountain View Calif. allows user to build connection between knowledge-based application and one or more databases. Allows KEE applications developers to build applications that communicate with databases on mainframes, read data from tables and translate data into KEE unit structures and write data from KEE unit structures to update database tables.

The GBB for Windows™ expert system building tool by Blackboard Technology Group Inc. of Amherst Mass. provides a generic Blackboard-Based development framework for AI applications. Provides blackboard database facility, modular, independent knowledge sources, control capabilities and graphics system for developing applications that allow multi-level problem representation and incremental solution development. Applications uses include scheduling, planning, and simulation and command. This is a Windows-compatible toolkit for developing blackboard-based AI applications. It consists of a blackboard data base facility, knowledge-source representation languages, control shells and an interactive blackboard-examination graphics tool. Operates as an extension of Common Lisp and CLOS and inherits the programming environment and development tools provided by the host implementation. A blackboard data base facility provides a blackboard representation that supports hierarchical nesting to any depth. Blackboard objects reside in spaces that make up the blackboards. Each space can be defined as a highly structured, multidimensional volume, with blackboard objects that occupy some multidimensional extent within the space. Utilizes objects called units that are structured CLOS objects and fully support CLOS class inheritance and the use of generic functions and methods.

The M.4™ expert systems building tool by Cimflex Teknowledge Corp. of Palo Alto Calif. is an expert system tool for embeddable applications. Allows inference services to be requested on demand and output and be channeled through I/O or user interface code. Includes kernel library that consists of more than 90 callable subroutines and 110 built-in function modules. Allows user to link kernel library into C-language application. Enables user to remove and modify individual commands and built-in functions.

The Nexpert Object™ for Windows expert system building tool by Neuron Data Inc. of Palo Alto Calif. is a graphics-based expert system tool. Provides AI functions including knowledge acquisition, interviewing and elicitation, multi-dimensional scaling, repertory grids and hierarchical clustering. Includes open architecture that allows for integration of expert systems with conventional programs, databases, networks/and languages. Run-time version available.

It would be very complicated to program to do a function equivalent to the claimed invention (automatically creating an integral database of diagnostics that can be queried simultaneously and in a synchronized manner with the original data) using any of the expert systems, expert system building tools or neural network building tools in the prior art. The same could be said of existing languages that are particularly oriented to the development of expert systems other artificial intelligence products and technologies, such as LISP, PROLOG and others.

3. Referring to FUZZY SYSTEMS,

"Fuzzy Systems—A Tutorial", by James F. Brule, 1985, contains a formal definition of fuzzy systems. The following paragraphs contain an adaptation of this definition.

Fuzzy systems is an alternative to traditional notions of set membership and logic that has applications for Artificial Intelligence. The notion central to fuzzy systems is that truth values (in fuzzy logic) or membership values (in fuzzy sets) are indicated by a value on the range [0.0, 1.0], with 0.0 representing absolute Falseness and 1.0 representing absolute Truth.

Fuzzy systems are different from probability. There is a distinction to be made between the two statements: The probabilistic approach yields the natural-language statement, "There is an 80% chance that this car is old," while the fuzzy terminology corresponds to "This car's degree of membership within the set of old cars is 0.80." Fuzzy terminology supposes that the car is "more or less" old.

The next step in establishing a complete system of fuzzy logic is to define the operations of EMPTY, EQUAL, COMPLEMENT (NOT), CONTAINMENT, UNION (OR), and INTERSECTION (AND).

Definition 1: Let X be some set of objects, with elements noted as x. Thus, X={x}.

Definition 2: A fuzzy set A in X is characterized by a membership function mA(x) which maps each point in X onto the real interval [0.0, 1.0]. As mA(x) approaches 1.0, the "grade of membership" of x in A increases.

Definition 3: A is EMPTY iff for all x, mA(x)=0.0.

Definition 4: A=B iff for all x: mA(x)=mB(x) [or, mA=mB].

Definition 5: mA'=1−mA.

Definition 6: A is CONTAINED in B iff mA←mB.

Definition 7: C=A UNION B, where: mC(x)=MAX(mA(x), mB(x)).

Definition 8: C=A INTERSECTION B where: mC(x)=MIN (mA(x), mB(x)).

Expert systems have been the most obvious recipients of the benefits of fuzzy logic, since their domain is often inherently fuzzy. Examples of expert systems with fuzzy logic central to their control are decision-support systems, financial planners. Another area of application, akin to expert systems, is that of information retrieval. There are already many products in the market implementing fuzzy logic techniques.

4. Referring to WEIGHTING SCHEMES IN EXPERT SYSTEMS,

In the Interim Final "Practice Paper" on Expert Systems for Life Cycle Management in EPA's Office of Solid Waste and Emergency Response (OSWER), November, 1988, it is stated that expert systems accommodate uncertainty through weighting schemes. These weighting schemes calculate certainty levels by determining if a piece of information is correct or valid and increment the level of certainty accordingly. The inability to process uncertain data confines the power of conventional systems to linear programming tasks, that is, tasks where steps are performed in sequence regardless of the inputs, and which are number- or text-intensive.

In the documentation of the Neuroshell™ neural network tool, by Ward Systems Group of Woodside, N.Y., it is stated that NeuroShell includes two versions of the main program, called Binary and Analog. Analog requires the use of CONFIDENCE FACTORS along a scale. For example, zero might mean "NO", ten might mean "YES", five might mean "MAYBE", and nine might be interpreted as "ALMOST DEFINITELY".

5. Referring to NEURAL NETWORKS,

Neural nets are tools that attempt to mimic the human brain by "learning" different sets of stimulus patterns (such as medical symptoms) and their associated responses (diagnoses). In order for a neural network to learn, it must first receive a lot of sets of input and output variables so as to discover the relationship between them. A few tools will be now discussed as good examples of the current state of prior art.

The Brainmaker Professional™ neural network tool by California Scientific Software of Nevada City Calif. is a neural network development system which includes suite of automatic and semi-automatic development tools for network optimization. Supports over 25,000 independent variables, graphics output and training.

The Neuralyst for Windows™ neural network tool by Epic Systems Corp of Sierra Madre Calif. is a general-purpose neural network engine with Microsoft Excel integration. Provides serf-programming neural network. Allows user to act as coach by providing data and setting goals for program to learn. Reports continuously on performance. Allows user to develop expert systems, pattern recognizers, outcome predictors and risk evaluators. Uses Excel macros.

The NeuralWorks Professional II/Plus™ neural network development tool by NeuralWare Inc. of Pittsburgh Pa. includes 25 network types plus ability to define own network, 14 learning rules, 10 transfer functions and 11 summation functions. Incorporates iconic user interface, supports 31 network types and several variations and interfaces with standard ASCII files produced by Lotus 1-2-3, dBase III and Excel.

The NeuroShell™ neural network tool by Ward Systems Group Inc of Frederick Md. is a shell program for applying neural networks to decision making, problem diagnosis, data classification and other applications where previously only rule-based expert systems were considered. Mimics biological learning process.

The Braincel for Excel™ neural network tool by Promised Land Technologies Inc of New Haven Conn. is an Add-in for MS Excel. Neural network add-on package for Microsoft Excel. Studies historical data until it produces reliable forecasts for various areas.

The AUTONET™ neural network by Peak Software Corporation of Denver, Colo. is a neural network software program that automatically constructs neural networks from training data sets of input variables and expected results. Autonet determines the most appropriate network architecture for calculating the expected result. The constructed network can then be used to calculate new results from user entered input variables. Autonet is based on close to 30 years of research into adaptive modeling procedures. One of the earliest researchers in this area was A. G. Ivakhnenko, a Ukrainian cyberneticist who examined what he called a Group Method of Data Handling, or GMDH. Autonet is based on some of these ideas and incorporates many improvements which allow construction of networks for problems with a wider variety of data types.

The NASA/COSMIC NETS™ neural net software is available from NASA COSMIC. This is a general-purpose expert system building shell, developed in portable C code.

Other examples of popular and easily accessible neural networks are the NEURAL NETWORK APPLICATION PROGRAMMING LANGUAGE (NNAPL)™, and TANN™ (The Artificial Neural Network), both by Tom Bensky of Sepulveda, Calif.

It would be very complicated to program to do a function equivalent to the claimed invention (automatically creating an integral database of diagnostics that can be queried simultaneously and in a synchronized manner with the original data) using any of the expert systems, expert system building tools or neural network building tools in the prior art. The same could be said of existing languages that are particularly oriented to the development of expert systems other artificial intelligence products and technologies, such as LISP, PROLOG and others.

6. Referring to TOOLS INTEGRATING EXPERT SYSTEMS AND NEURAL NETWORKS, several products have implemented such integration, since this neural nets can learn and they can even generate new rules from existing data. This allows expert systems to grow automatically.

In the documentation of the AUTONET™ neural network tool, by Peak Software Corporation of Denver, Colo., it is stated that neural networks have been constructed for a variety of purposes, including economic modeling and forecasting, marketing research, pattern and character recognition, language processing, RULE DEVELOPMENT IN EXPERT SYSTEMS, and many other areas.

In the documentation of the Neuroshell™ neural network tool, by Ward Systems Group of Woodside, N.Y., it's stated that NeuroShell includes two versions of the main program, called Binary and Analog. Binary is USEFUL FOR "YES/NO" EXPERT SYSTEMS.

7. Referring to GENETIC ALGORITHMS AND CLASSIFIER SYSTEMS,

Genetic Algorithms (GAs) represent, in general, a method for developing algorithms that perform optimally. These are called "genetic" because other basic ideas closely parallel the principles of biological genetics: reproduction, crossover of genes, mutation, and survival of the fittest.

In the documentation for "The Portable AI Lab", developed under Swiss National Research Programme PNR 23 on AI and Robotics by IDSIA Lugano in collaboration with IFI, University of Zurich and the Laboratoire d'IA at the EPFL, Lausanne, it is stated that the best-known example of evolutionary teaming is Genetic Algorithms (GA's). GA's are powerful search algorithms based on the mechanics of natural selection and natural genetics. They evolve a good point in the search space through a 'survival of the fittest' process, which selects among a population of strings, and an exploration of the search space through random mutation and recombination of the search strings. These algorithms are computationally simple yet powerful in their search for improvement. Furthermore, they are not fundamentally limited by restrictive assumptions about the search space (assumptions concerning continuity, existence of derivatives, unimodality and other matters). GA's are theoretically and empirically proven to provide robust search in complex spaces.

Theoretical considerations show that genetic techniques provide a highly efficient heuristic for information gathering in complex search spaces. A number of experimental studies have shown that GA's exhibit impressive efficiency in practice. While classical gradient search techniques are more efficient for problems which satisfy tight constraints (e.g., continuity, low dimensionality, unimodality, etc.), GA's consistently outperform both gradient techniques and various forms of random search on more difficult (and more common) problems, such as optimizations involving discontinuous, noisy, high dimensional, and multimodal objective functions. GA's have been applied to various domains, including numerical function optimization, adaptive control system design, and artificial intelligence task domains.

Classifier systems are a kind of rule-based systems with general mechanisms for processing rules in parallel, for adaptive generation of new rules, and for testing the effectiveness of existing rules. Classifier systems provide a framework in which a population of rules encoded as bit strings evolves on the basis of intermittently given stimuli and reinforcement from its environment. The system "learns" which responses are appropriate when a stimulus is presented. A classifier system consists of the following components: detector and effect, message system, role system, apportionment of credit system, and genetic procedure.

A few tools will be now discussed as good examples of the current state of prior art.

The Genesis™ GA system is a generational GA system written by John Grefenstette. As the first widely available GA program GENESIS has been very influential in stimulating the use of GAs, and several other GA packages are based on it.

The Evolver™ GA system by Axcelis, Inc of Seattle Wash. is a spreadsheet add-in which incorporates the first commercially available genetic algorithm to search for solutions. Evolver can be customized through the macro language, and is available for the Microsoft Excel™ spreadsheet program by Microsoft Corporation of Redmond, Wash., the WingZ™ spreadsheet program by Informix Software, Inc. of Menlo Park, Calif. and other spreadsheet programs.

The Omega™ Predictive Modeling System, marketed by KiQ Limited, is a powerful approach to developing predictive models. It exploits advanced GA techniques to create a tool which is "flexible, powerful, informative and straight-forward to use". Omega is geared to the financial domain, with applications in Direct Marketing, Insurance, Investigations and Credit Management. The environment offers facilities for automatic handling of data; business, statistical or custom measures of performance, simple and complex profit modeling, validation sample tests, advanced confidence tests, real time graphics, and optional control over the internal GA.

8. Referring to TOOLS INTEGRATING EXPERT SYSTEMS AND DATABASES, in "Nothing artificial about expert systems (MIS)", by John Soat, Information Week, Aug. 21, 1989 n233 p33(2), it is stated that there are four expert system processing categories:

1. Systems that run on microcomputers, intended for sales support, product diagnosis and customer service
2. Midsized standalone systems run on workstations and appropriate for manufacturing applications
3. Expert systems run on mainframes, particularly suited to MIS. These systems involve a large central data base and are developed from expert shells
4. The high-end category consists of 'strategic' expert systems developed using LISP, custom written for long-range planning and complex scheduling problems for specific applications In "EXPERT SYSTEMS AND DATABASES: how using a knowledge base and an inference engine adds intelligence to a database application", by P. L. Olympia, DBMS, October 1992 v5 n11 p100(3), it is stated that Expert systems have been predicted to become a major application area for several years, but it has not happened yet. This is doubly curious considering the benefits expert systems could provide organizations, particularly in the area of database development.

In "The End of The Beginning," AI EXPERT February 1990, pp. 65–67, Harvey Newquist mentioned the trend toward incorporating AI technology more directly into mainline data-processing products). This trend will increase dramatically in the database area, among others, in the near future. Ingres Corp. has already announced its version of the smart database supporting very right integration of rules and objects. IBM's TIRS release places a knowledge-based system squarely in the heart of its SAA AD/Cycle framework, meaning IBM will support a closer link than ever before between knowledge bases, databases, and application-development strategies.

In "KADBASE: interfacing expert systems with databases", IEEE Expert, Fall 1989 v4 n3 p65(12), H. Craig Howard and Daniel R. Rehak describe the KADBASE™ expert tool, an instrument consisting of a knowledge base that includes procedures for processing requests and specific declarative knowledge regarding data spaces of components to be integrated. The prototype is a network database interface for data base management systems (DBMS) and knowledge based systems in the computer-aided engineering (CAE) environment.

In "KADS tool: too cool!", AI Expert, October 1993 v8 n10 p44(1), a product announcement by Ilog Inc. of Mountain View, Calif., this company describes the KADS Tool™ software tool. KADS Tool is a software tool that models cycles of complex activities and automatically generates the specifications of applications for decision-making systems, diagnosis, planning, design, and process control. KADS (knowledge acquisition and design support) Tool is a high-end CASE tool implementation of the Common KADS™ by Ilog Inc. methodology that standardizes modeling techniques and expertise and generates reusable models in a language-independent manner. With KADS Tool, users can analyze complex activities using Common KADS's model-directed analysis. Once a task is modeled, it is stored as a library element, or knowledge database, and customized for plug-and-play reuse by knowledge workers on an enterprise-wide level within the organization. Features of KADS Tool include an application manager and a protocol manager, expert interviews transcripts, dictionaries, expertise model editors, libraries, hypertext facilities, a documentation generator, and model variation.

In "Implementing KADS expertise models with Model-K (the Knowledge Acquisition and Design Structuring system)", IEEE Expert, August 1993 v8 n4 p74(8), Angi VoB and Werner Karbach briefly describe the Knowledge Acquisition and Design Structuring (KADS) system™, a complete knowledge-engineering methodology. KADS™ guides knowledge engineers through use of a series of models, each of which has its own structure and vocabulary: organizational models, task models, expertise models, cooperation models, and design models. The four-layer expertise model is used by many European researchers to describe expert systems. The Model-K™ Knowledge Acquisition and Design Structuring software system follows the modeling spirit of KADS but joins the expertise model and its implementation more closely without prescribing any fixed development sequence. Model-K represents a system's dynamic states explicitly during problem solving by using an agenda with the stack of pending tasks, as well as metaclasses that have the variable data manipulated by the knowledge sources.

In "Intelligent databases and object-oriented languages," Computer Language, October 1989 v6 n10 p67(8), Mark H. Chignell discusses the integration of expert systems and databases within an object-oriented framework. Such integration is appealing because the user can directly manipulate the database's semantics. In such an intelligent database system, expert rules dealing with data can be programmed in the same environment without using any external expert system tool. Ordinary database applications (such as data entry and report and application generation) and intelligent processing of data can be mixed.

The key to integrating expert systems and databases is a knowledge-based approach to relations; access to relational databases should occur as an integral part of inference processes. Expert system shells and relational databases may be closely integrated using relational predicates and objects. The method and notation described here are implemented in the Intelligence/Compiler expert system shell (IntelligenceWare, Los Angeles, Calif.). The basis of the implementation is a transformation of relational constructs into objects and predicates that can be embedded within a knowledge base.

In "Merging expert systems and databases," AI Expert, February 1989 v4 n2 p22(8) Benjamin Cohen states that in a logic database application, derived values may also be computed using the full power of a backward- and forward-chaining logical inference engine with access to both the knowledge base and database.

The overall architecture of a logic database application includes at least the following components: logic database application program, data model stored in an active data dictionary, database access and storage, rule base (and knowledge network) access and storage, inference engine, user dialogue input, database transactions, and screens and reports.

Access to the inference engine and knowledge base from inside a database application can be explicit, using a procedure call interface, or implicit, through an active data dictionary. An explicit call to the credit authorization inference engine might look like this:

```
Amount=QueryRule-BasedSystem(CREDITAMTAPPROVAL,
Custno#, RequestedAmount, CreditCard# ... )
```

In the implicit approach, the application itself does not explicitly call the rule-based system. Instead, all access to the inference engine is through the same query interface used to access data. Behind the scenes, an active repository triggers the knowledge base. Thus, given an innocent-looking query such as: select amount, recommendation from credit approval where custid#=10 the repository knows that amount and recommendation are derived and triggers the knowledge base. If the knowledge base uses an object-oriented representation scheme, the values of amount and recommendation would be determined by triggering rules and compiled procedures attached to (corresponding) objects in the knowledge base. One advantage of the implicit approach is a form of data independence: users and applications need not know which values are determined by the rule-based system and which are stored.

Most logic database applications will likely be developed on top of relational database technology. The declarative access offered by relational systems is a major advantage for them. Without it, database access would require much more programming, and dynamic queries would be virtually excluded. In the future, object-oriented databases (for example, the Vbase™ object-oriented database by Ontologic) will also likely be used, particularly in the CAD, CASE, and engineering fields. Even here, SQL will be available as the standard interface language.

9. Referring to INTELLIGENT DATABASES AND OBJECT-ORIENTED DATABASES,

A practical definition of the concept of INTELLIGENT DATABASES may be found in "Intelligent databases," AI Expert, March 1990 v5 n3 p38(10) by Kamran Parsaye, Mark Chignell, Setrag Khoshafian and Harry Wong.

It is stated that Intelligent Databases handle information rather than simple data. Intelligent databases consist of high-level tools, a high-level user interface (hypertext, with multiple linked nodes), and an intelligent database engine.

The three main categories of intelligent database tools are automatic discovery programs, which approximate the scientific method of inquiry and use statistical techniques; automatic error detection via rules that find anomalous data items and enforce constraints; and flexible query processing, which can solve queries involving inexact values.

The intelligent database engine supports object orientation and features global query optimization while closely integrating data access and inference.

Thus, it can be seen that intelligent databases represent the evolution and merger of several technologies, including automatic discovery, hypermedia, object orientation, expert systems, and traditional databases.

Thus, it can be concluded that intelligent databases represent a collection of tools that altogether help users better understand and visualize their data. These tools are usually knowledge extraction tools as described elsewhere in this document, graphic query systems, and embedded executive information and reporting systems. Object-oriented databases development tools employ object-oriented techniques to substitute the fields, records and pointers scheme of relational databases with a far more flexible approach of definable classes of objects with inheritance. Where database dictionaries in relational databases show a regular structure, those dictionaries of object-oriented databases closely follow the object database structure. This allows the development of expert and artificial intelligent systems within object databases, simply associating expert rules and specific algorithms to particular elements in the dictionaries. Intelligent databases can help us make discoveries automatically.

A few tools will be now discussed as good examples of the current state of prior art.

The Intelligence Compiler™ object-oriented database by IntelligenceWare Inc. of Los Angeles Calif. is a powerful tool, allowing the development of expert systems and artificial intelligence systems embedded in object database applications.

The XShell™ object-oriented database system by Expersoft of San Diego Calif. is a distributed object-oriented system development environment. Allows user to construct large-scale systems of cooperating programs distributed across networks of computers. Encapsulates software programs as software objects with abstract interface. Allows systems architects to handle programs as extensible building blocks with standard interfaces.

The XFuzzy™ object-oriented database system add-on by Expersoft of San Diego Calif. is an XShell add-on module. Allows user to create rule-based systems using fuzzy logic and applied fuzzy set theory. Combines evidence from several rules. Allows continuously graded levels of certainty to be considered. Supports machine teaming, allowing sets of rules to be learned from training data and simulated problem models.

The XGenetic™ object-oriented database system add-on by Expersoft of San Diego Calif. is an XShell add-on module. Programming toolkit that supports genetic algorithms. Automatically organizes modules for parallel evaluation of objective functions.

The Smart Elements for Windows™ object-oriented tool by Neuron Data Inc. of Palo Alto Calif. is an object-oriented development environment for creating strategic knowledge-based applications with GUIs. Integrates object and Me-oriented elements of Neuron Data's Nexpert Object V.3.0 with cross-platform GUI design element of Neuron Data Open Interface. Integrates elements using extensible Script language that lets developers define behavior of application interface and link screen elements to application objects. Provides a superset of interface objects, called widgets, available across all native windowing environments.

10. Referring to INTELLIGENT USER INTERFACES, the user interface is critical to any application or environment. The human mind is inherently associative. Associative structuring is provided to users by hypertext. Hypertext can be defined as the creation and representation of links between discrete pieces of information. When this information can be in the medium of graphics or sound as well as text or numbers, the resulting structure is referred to as hypermedia. For intelligent databases, hypertext serves two purposes. First, it is an information-structuring technique supplementing traditional text and record-oriented databases. Second, it structures the interface that adds associative links to the hierarchical ones found in menus.

Links are between nodes. Some link types that provide the basic functionality required for intelligent databases are: (ii) Pan links move to a related node. They allow one to move around or navigate through hypermedia. (ii) Zoom-in links expand the current node into a more detailed account of the information. Zoom-out links return to a higher-level view of the current object. (These links are particularly useful in browsing facilities.) (iii) Hierarchy links allow the user to view any hierarchies in which the current object is embedded. If more than one hierarchy is involved, the user chooses the appropriate context. (iv) Broaden links display the parents of the current object for the hierarchies it is embedded within. Specialize links display the children of the current object as defined by the hierarchies in which it is embedded. (v) Conditional links. The availability or activation of these links depends on the stated interests or purposes of the user. Conditional links are hidden unless of interest or a particular user has access to them. (vi) Index links move the user from an indexed node to the corresponding index entry for that node. The index can be used to enter the relational database or to find documents sharing a particular index term. Indexing hypertext is a good way of controlling the proliferation of links between nodes.

Links are important in hypertext, but nodes are also needed for storing and displaying information. Basic node types include: (i) Text nodes, which consist of text fragments. The text itself may be a document, define the object represented by the node, or represent base-level information, such as that provided in a document. (ii) Picture nodes. Pictures may be embedded within text nodes, or they may be nodes in their own right. A picture and text may be mutually documenting, as when you use a painting to illustrate a biography of Leonardo da Vinci or pursue biographic details of the artist after viewing a picture. (iii) Sound nodes. Like pictures, sounds may be embedded within text or exist as nodes in their own right. Sounds may be treated in a way similar to pictures but are less likely to be zoomed. Sounds represent uninterpreted information as well. (iv) Mixed-media nodes. These nodes contain some combination of text, pictures, and sounds. In many cases the same information may be represented in a combination of linked nodes or as a single mixed-media node. (v) Buttoned text or mixed-media. The distinction between buttons and links is that a link connects a pair of nodes, whereas a button executes a procedure.

11. Referring to KNOWLEDGE ACQUISITION AND AUTOMATIC DISCOVERY TOOLS SUCH AS DATABASE MINERS, knowledge acquisition tools, also called knowledge extraction tools and, sometimes, database miners, perform various forms of statistical, mathematical and probabilistic analysis on whole databases. These tools first find general correlations between data in the database, then they generate a set of rules representing those correlations, and then, in some cases they find all numbers that prove to be exceptions to the set of rules. Some of these tools also include query, graphic and presentation tools to allow easier observation of their results.

It has been published that, in most businesses, workstations are usually switched off for about 16 hours a day-nearly 70% of its lifetime. Thus, most professionals possess two commodities in excess: data that requires analysis and unused processing power. And the risk-benefit ratio for automatic discovery is very attractive. A discovery system has to discover just a few unexpected relationships to pay for itself.

A query language can handle queries but it can't automatically form hypotheses since it doesn't know what to ask for. To discover knowledge we must: (i) form hypotheses, (ii) make some queries, (iii) view the results and perhaps modify the hypotheses, (iv) repeat this cycle until a pattern emerges.

The technology for extracting knowledge from large databases may be viewed as a merger of statistics and AI. However, although discovery programs utilize statistics heavily, their output is not in purely statistical form. They produce rules rather than equations. Users (and expert systems) may be unfamiliar with statistics but can read through a set of rules easily.

In "KNOWLEDGE ACQUISITION WITH NETS", by Rodger Knaus, AI Expert, September 1992 v7 n9 p17(5), it is stated that extensions of neural networks can be used to encode expert knowledge. The results can then be implemented as a rule-based system. A neural network is a dataflow diagram that informs users about data that is being used and sent from each part of the computation. The high-connectedness of neural networks indicates to the expert that some of the outputs and intermediate results are influenced by a variety of inputs. When using a neural net system for this application: (i) Expert knowledge determines the architecture of the network. (ii) Each node corresponds to a variable or statement the expert told us about. (iii) Edges in the network represent data flows the expert has told us about. (iv) The network generally has more than three layers, usually N+1 if the expert breaks the computation into N stages.

If we loosen the definition of neural net a bit, we can incorporate this information of a dataflow diagram into it: Instead of putting numerical weights on the edges, let's put on the edge from node[underscore]i to node[underscore]j a description of how node[underscore]i influences node [underscore]j:

Implies (or causes): set the output of node[underscore]j to at least the output of node[underscore]i, at least when node[underscore]i is near the value true Necessary for: set the output of node[underscore]j to no more than the output of node[underscore]i Evidence for: increment node[underscore]j slightly when node[underscore]i is turned on Evidence against: decrement node[underscore]j slightly when node[underscore]i is turned on Formula input: the output of node[underscore]i is used as input to a numerical computation performed at node [underscore]j; for example, if node[underscore]j computes speed, distance and time are formula inputs Summand input: an input to a weighed sum, as found in standard neural networks.

In "Intelligent databases", AI Expert, March 1990 v5 n3 p5(2), Philip Chapnick stated that Hecht-Nielsen Neurocomputers Inc. of San Diego, Calif.—one of the premier neural-network companies trademarked the term "database mining" and is working to move their R&D technology that uses neural networks to explore hidden relationships in large data sets into commercial products.

Several tools and techniques have been developed to deal with knowledge acquisition in databases. One good example is Rough Sets. In "Rough sets: working with imperfect data," AI Expert, July 1993 v8 n7 p36(6) by Adam Szladow and Wojciech Ziarko, founders of Reduct Systems Inc., a software company in Regina, Saakatchewan, Canada, which specializes in development of products in knowledge acquisition and decision support, the concept and applications of rough sets are described.

Rough sets provide a series of tools for data analysis and knowledge discovery from imprecise and ambiguous data. The rough sets methodology is based on the premise that lowering the degree of precision in data makes data patterns more visible. Rough sets have been successfully applied for knowledge acquisition, forecasting and predictive modeling, decision support, EXPERT SYSTEM BUILDING, and more recently, "mining" of knowledge in databases.

The primary issues addressed by rough sets are the discovery, representation, and analysis of data regularities. In the rough sets approach, knowledge is defined as the ability to classify objects belonging to the domain of interest into two or more categories. Such a classification process generally involves two steps: query (for example, reading the values of attributes of the objects) and decision (for example, classifying objects into categories based on the information expressed in the attributes).

Rough sets-based computational techniques address the acquisition of explicit classification knowledge from data. The knowledge acquired from data can then be used as the basis for an experience-based decision support system or to understand a phenomenon or relationship in question better.

The end product of a rough sets analysis is a set of classification rules for classifying objects into two or more categories. The rules form a description of each category, typically in terms of an open formula of predicate calculus, combining simple relational conditions expressing some observable properties of objects.

As it has been already said, the rough sets methodology is based on the premise that lowering the degree of precision in data makes data patterns more visible. However, since decreasing precision too much may lead to a loss of information and the reduction of our ability to differentiate between objects, the theory of rough sets has developed rigorous mathematical methods to analyze and evaluate the effect of data representation on our ability to discern patterns in data.

A few tools will be now discussed as good examples of the current state of prior art.

The Acquire™ knowledge extraction tool by Acquired Intelligence Inc. of Victoria BC, Canada, is a Knowledge-based system. It provides a structured approach to knowledge acquisition. It helps the user to scope the problem, decompose the problem, elicit and structure expertise, identify meaningful patterns in the knowledge, identify the consequences of those patterns, and deal with uncertainty and ensure completeness. Using this system, people with domain knowledge can build significant knowledge-based systems. Guides knowledge acquisition throughout the development of a knowledge-based system including the critical, upfront task of acquiring and structuring the knowledge. The person is led through the task of eliciting and structuring the expertise, then through the development of an operational model of that expertise implemented in the program's representation, ready for testing and refinement. The person with the domain knowledge is given complete control over the development of the system. This program handles knowledge engineering. Implements a model of knowledge acquisition based on pattern recognition. Handles uncertainty by qualitative, non-numerical procedures. Provides the structure of the knowledge in graphic displays for browsing. Incorporates machine learning techniques. Represents knowledge as objects, production rules and decision tables. Provides an explanation and an exploration of what the system is doing and why. Provides reports for a wide variety of uses, from working messages to detailed reports informal documents.

The Discover-it!™ knowledge extraction tool by Sourcecode Inc. of Chicago Ill., reads large databases and produces understandable "rules".

The Esteem™ knowledge extraction tool by Esteem Software Inc. of Cambridge City, Ind. is a development tool for building decision making and problem solving applications which use reasoning on prior experience. Provides guidance in Case-Based Reasoning application development. Includes variety of similarity assessment and case retrieval facilities. Provides DDE interface functions for calls to/from other Windows applications. Includes hypertext help and guide facilities, import/export facilities for ASCII case files and CBR application templates to assist developers.

The Database Mining Workstation™ (DMW™) knowledge extraction tool by HNC Inc. of San Diego Calif. is a decision modeling system that solves complex operational problems. Consists of seven modules including Relationship Discovery, Modeling, Explanation, Automatic Variable Selection, Performance Evaluation, Sensitivity Analysis and Data Manipulation.

The ExploreNet 3000™ knowledge extraction tool by HNC Inc. of San Diego Calif. provides development and delivery of neural network applications. Includes data transformation, file, pipe, display and network modules.

The Auto-Intelligence™ knowledge acquisition tool by IntelligenceWare Inc. of Los Angeles Calif. generates expert systems for heuristic decision-making tasks by interactively interviewing human expert. Generates rules which can be embedded in LISP, Prolog, Guru, TI and Intelligence/Compiler. Interviews make process of capturing knowledge in structured decision-making areas systematic. Includes diagnosis, financial investments, loan approval and risk analysis.

The Database Supervisor™ (DBS™) knowledge extraction tool by IntelligenceWare Inc. of Los Angeles Calif. analyzes databases and identifies suspicious data items and patterns which are out of sync. Detects errors which violate statistical or logical integrity constraints. Integrated with intelligenceWare's IXL, Neural/Query and Intelligence Compiler.

Database Visualization Tool™ (DVT™) knowledge extraction tool by IntelligenceWare Inc. of Los Angeles Calif. contains algorithm that evaluates data and suggests graph types that best illustrate database. Offers variety of graph and chart types including 2D line graphs, histograms, pie charts, bar charts, box plots and surface diagrams. Allows user to display numeric and non-numeric information. Includes 3D box graph which illustrates all of company's ongoing projects.

The Information Discovery System™ (IDIS™) knowledge extraction tool by IntelligenceWare Inc. of Los Angeles Calif. analyzes databases, automatically generates hypotheses, discovers hidden and unexpected patterns, rules of knowledge, graphs and anomalies. Displays results within hypermedia environment. Combines automated data analysis, graphics, statistics, induction and hypermedia. Analyzes data without requiring user to formulate and test hypotheses. Formulates questions, executes them and collects data.

The IXL™ (also called Discovery Machine™ or Induction on Extremely Large Databases™) knowledge extraction tool by IntelligenceWare Inc. of Los Angeles Calif. uses statistical and AI techniques to analyze and discover knowledge hidden in large databases. Discovers rules, patterns and correlations that help user to analyze database without knowing specific search parameters. Interfaces to ASCII, dBase, Lotus and DB2.

The DataLogic/R™ knowledge extraction tool by REDUCT Systems Inc. of Regina, SK, Canada, is a tool to reason from data, a professional tool for knowledge acquisition, classification, predictive modeling, expert systems building, and database "mining". This product is a decision support and database mining software that provides data analysis and knowledge discovery based on the methodology of rough sets. It analyzes logical patterns in data, including theories of knowledge representation, inductive logic and rough sets. It provides forecasting and decision making from imprecise, incomplete and ambiguous data. It discovers simple knowledge rules from data and provides full auditability of rules and decisions. With the Missing Data Module, the program can also process incomplete databases without filling in missing values. It generates rules at different levels of knowledge representation and rule precision. It provides several reports. The Rule Report describes significant logical patterns/rules in the database. The Rule Support Report describes pattern strength, and data which support the patterns. The Validation Report describes accuracy of the uncovered patterns and rules. The Expert Report describes recommended decisions for new cases, and the Decision Report describes how decisions were made.

The DataQuest™ knowledge extraction tool by REDUCT Systems Inc. of Regina, SK, Canada, data analysis software package based on the theory of rough sets and is used as an introductory learning tool for this methodology. Designed for business, industry and research, this product assists user in learning and understanding basic concepts of rough sets. This product uncovers logical patterns in data and predicts outcomes of new cases. It performs logical analyses of user's databases and provides user with expert rules for decision making. It uses logic to recognize patterns in data and can discover knowledge which is inaccessible to statistical methods. The analysis does not require information on data distribution and can be performed on incomplete and/or limited data. It measures data dependencies and significance of variables. It provides selection of data fields for analysis, elimination of irrelevant information, and prediction of outcomes for new cases. Its results can be saved in a report, including rules generated from the data, list of variable subsets and the quality of these subsets for data analysis, and measures of data dependencies and attribute significance.

LIMITATIONS OF PRIOR ART AND DIFFERENCES WITH THE INVENTION

In the following paragraphs I will discuss the LIMITATIONS OF PRIOR ART AND DIFFERENCES WITH THE INVENTION described hereof.

As it has already been said, using any and all the prior art tools described in sections it would be very complicated to program to do a function equivalent to the claimed invention. To do such a thing would require a fair degree of sophistication in the user, and to do what the claimed invention does is not at all suggested by these tools in the prior art. The teachings of the prior art's instruments are very general. Only with the benefit of hindsight and a great deal of programming skill would one skilled in the art appreciate that what is done by the claimed invention could be done with the existing programming tools.

The following paragraphs have been adapted from the Interim Final "Practice Paper" on Expert Systems for Life Cycle Management in EPA's Office of Solid Waste and Emergency Response (OSWER), November, 1988. This document was publicly circulated in the US.

Management information systems do not typically have symbolic reasoning capabilities. The graphic displays are static in the sense that there is no [explanation] or interpretation facility. The user must know how to format queries; the system cannot reformat queries if the user is not sufficiently specific. Vague or uncertain information contained in a management information system query may result in computer resource intensive processing caused by extensive database [searches]).

Expert systems provide valuable new capabilities, but they also have dear limitations. Because expert systems emulate human performance in decision making, they may be incorrectly thought of as having the capacity to make independent judgments. Expert systems are capable of communicating advice that has been coded into them. They are not capable of producing independent decisions. Their application is limited to strictly defined domains (i.e., areas of expertise where boundaries on what expertise should be included in the system can be defined); their performance degrades dramatically when dealing with information that is beyond those boundaries.

OBJECTS AND ADVANTAGES OF THE INVENTION

Accordingly, the following paragraphs describe several OBJECTS AND ADVANTAGES of the invention.

In "Intelligent databases," AI Expert, March 1990 v5 n3 p5(2), Philip Chapnick stated that there is a major area of commercial opportunity for AI technology in this decade: the information contained in corporate databases is viewed more and more often as a corporate asset and will ultimately be managed like one.

In "Merging expert systems and databases," AI Expert, February 1989 v4 n2 p22(8) Benjamin Cohen states that 'when asked why he robbed banks, Willie Sutton said, "Because that's where the money is!" The same reply can explain why rule-based expert systems are merging with database and information systems: that's where the money is.' Combining the technologies of rule-based expert systems with relational database applications can enable people to build smarter, more powerful applications. For expert system people, management information systems (MIS) departments are a large, untapped market. From the MIS person's point of view, building smarter information systems means the right information will get to the right people at the right time.

Merging rule-based expert systems or logic data base applications relational data base systems allows programmers to develop smarter, more powerful applications. A logic data base application is distinguished from an ordinary data base application by its inference engine and rule base. The advantages of these new applications include reduction of expenses, increased competitive strength, increased productivity and higher profits.

In "Principles for applying intelligent databases", by Mark H. Chignell and Karoran Parsaye, AI Expert, October 1991 v6 n10 p34(6), it is stated that if we are to master information and survive in today's world of information glut and systemic complexity, we need to access and use information and develop intelligent database applications that provide more people with better access to needed information. In most situations, people want information quality rather than quantity. They need to know which resources are available for a task, or why products are faulty. Information quality can be attained by making specific types of information systems for different kinds of applications. Thus, we need to replace information quantity with information quality, selecting what people need and showing it to them in a form that they can easily assimilate. Intelligent databases let people control and exploit information, rather than passively react to it.

Better information access requires systems that: (i) Provide high-level intelligent tools such as automated discovery that give new insights into the contents of a database by extracting knowledge from data. (ii) Improve the decision-making process involved in using information after it has been retrieved by involving higher-level information models. From this perspective, intelligent databases serve as decision or executive support systems.

The current information glut and the growth of new markets and investment opportunities has created enormous management challenges. U.S. business managers dedicate a large share of their time to meetings and reviewing reports. They need information quality rather than quantity. Thus, we need to replace information quantity with information quality, selecting what people need and showing it to them in a form that they can easily assimilate.

Huge capital investments are now being funneled to Latin American countries, but the resulting economic growth has generated an additional shortfall of skilled managers. Thus, many business and development opportunities are lost at the recipient countries because of inappropriate and uninformed managerial and strategic decisions.

In response to these needs, the invention represents a new AI technology allowing managers to control and exploit information, rather than passively react to it. Executives using the invention may also immediately share their experience with other managers.

The invention would let any manager turning on a powerful graphic AI-enhanced EIS system to see what actions, reviews and priority assignments the software suggests based on learned experiences, and on the manager's own criteria and that of other consultants and managers in similar positions. With the invention it's also very easy to develop an application showing a menu with the following customizable options incorporated in most standard executive information systems: priorities, memorandums, people responsible in the organization, interpretation of data exceptions and trends. When the user chooses any one of these options, the system will then show relevant data, full interpretations, suggested actions, and memorandums that could be sent immediately to the corresponding people.

The invention may run as a stand-alone product, or integrated and embedded into other EIS-executive information systems.

To offer the best possible interpretations of the data, the invention's user-definable functions in the tests language may easily incorporate different Artificial Intelligence technologies such as fuzzy logic, expert systems role-processing, neural nets, genetic algorithms and classifier systems.

Experienced managers receive a continual stream of information and analyze it almost by instinct. They wade through standardized reports, select relevant information, compare numbers from different sources, estimate a number of indexes and finally generate conclusions.

Other spreadsheets or executive information systems produce financial ratios and reports, and some provide simple interpretations of these indexes. The invention adds extra power and agility because it offers sophisticated advice in very flexible formats and lets you easily adjust the criteria for making these recommendations. The invention gives users the tools to create and analyze specific expert diagnostics in a straightforward manner.

Currently, decisions are defined in terms of data. With the invention, decisions will be defined in terms of structured databases of diagnostics. The invention maps all data into a new, qualitative dimension.

The invention can process data and expert tests and generate in just seconds large structured databases of diagnostics to be queried immediately. The invention allows data organization by function, action and end-user preferences, rather than by type of data.

The invention is ideal for managers, and it should not be compared to other products that simply show a note or a red flag when a number reaches a certain value. The invention learns and its knowledge base grows as the organization's database and their experience base grow, too. No other product can do this. The invention will be used to collect and distribute knowledge and expertise within the firm.

The invention lets managers concentrate in action and strategy, that is, in their final goals and results. It executes all repetitive report analysis, ratios and number comparisons, signals for dangers, menaces, strengths and opportunities. With other state-of-the-art technologies, data integration has meant easy access to all data. All this translates to data accumulation and proliferation, and makes data handling ever more complicated. The invention immediately shows priorities according to the managers' own needs, preferences and criteria. The invention enhances current executive information systems (EIS) and data analysis technologies, helping managers determine which information they should review.

Consulting expertise, managerial expertise and technical expertise in many fields is often lost as soon as the person responsible leaves the firm and the organization. The invention is able to store that knowledge and expertise and grow with it. The invention can also be applied to strategic planning, organizational analysis, decision-analysis, manufacturing control, quality control, and many other fields.

In the long term, the invention could incorporate a parallel, interactive diagnostics database into every database application.

The invention is a simple tool to use. It incorporates downdrilling techniques to navigate through the data. It is flexible and customizable: it lets the user develop tailored Expert System applications easily. Analytical criteria may be added or modified instantly and it does not require expert programmers because it incorporates a 4GL interface. The user can easily browse through the data and develop menus, reports, graphs and help screens.

Applications developed with the invention can offer advice in areas such as inventory management, debt structuring, marketing penetration, financial or organizational analysis and project control.

The invention can be used for: (1) Auditing daily operations at companies with pre-defined measurable goals for each business unit. Examples: (i) total quality control and reengineering processes, (ii) organizational and financial auditing. (2) Decision-making and operational guidance where management by exception, reengineering or total quality programs are in process. (3) Continuously generating management guidelines for subsidiary institutions such as newly created business branches or institutions dependent on external funding. Examples: (i) management of individual fast-food branches or gas stations, (ii) smaller rural institutions dependent on funds from USAID agencies. (4) Routine labor auditing and coaching at institutions with deficient labor performance. Examples: public institutions, large manufacturing firms. (5) On-the-job instruction at institutions where managerial continuity and training is a problem. Examples: public institutions, firms with high labor mover ratios. (6) Those who need to review lengthy reports in less time, or follow on a large number of projects. Examples: public institutions, stock trading. (7) Analysis of extremely complex bodies of knowledge, such as monetary policy, social development, economic analysis. (8) Tutoring tool at educational institutions such as management schools.

First Sample Application: Sales and inventories control for a pharmaceutical products manufacturer. Over two hundred products, seven line managers in charge of fifteen product groups, four hundred pages of weekly reports to be analyzed by management. With the invention, management can follow all sales, inventory stocks and problem cases for each manager, product and market. With other systems, the manager must "manually" review all information, or be satisfied with aggregate totals and averages for the whole operation. The invention unmasks situations where apparently appropriate averages are hiding specific efficiency, inventory or sales problems.

Second Sample Application: Financial analysis and client account follow-up for a financial institution. Expertto identifies dangers and opportunities in the financial condition of the firm and each of its clients, and classifies these by priority and responsible individual. In less than a week, users may implement customized expert systems capable of analyzing the balance sheet, results, and cost controls for each division and client.

Third Sample Application: Quality control at a Consulting Firm. Supervision at a consulting services division with more than a thousand clients and specialized attention to two hundred clients on a daily basis. Expertto is capable of generating detailed and annotated quality control reports for each case and client, by condition and type of problem, responsible person, department or service.

Finally, it's important to state that THE INVENTION CAN LEARN AND IT CAN BE AUTONOMOUS. The invention is an extensible system that can be configured in many ways so as to fulfill all requirements of an intelligent system.

The general requirements of an intelligent system have been described in many publications. However, there is a good "working definition" of intelligence in the Internet message posted by Philip Nettleton of the University of New England, Armidale, Australia, on Jun. 24, 1991. According to this working definition, there are four basic requirements to intelligence: (1) The system MUST be able to learn. (2) It SHOULD be able to learn by instruction. (3) The system MUST be autonomous. (4) The system MUST be able to reason. In more detail:

(1) The system MUST be able to learn. This implies that the system MUST have a memory for learning to be maintained. Also learning comes in a number of varieties: (a) It MUST be able to learn from its own experiences. These can be broken down into further groupings: learning through trial and error, learning through observation, learning through active reasoning. (b) It SHOULD be able to learn by instruction, but this is not necessary. At the very least the system MUST have preprogrammed instincts. This is a boot strap for the developing intelligence. Without a starting point, the system cannot progress.

(2) The system MUST be autonomous. That is to say, it MUST be able to do things by itself (however may choose to accept aid). This can be dissected as: (a) The system MUST be able to affect its environment based on its own independent conclusions. (b) The system MUST be its own master first and foremost, and therefore not require operator intervention to function. This does not necessarily rule out the taking of orders from another system, but the choice to obey MUST be made by the system itself. (c) The system MUST be motivated. It must have needs and requirements that can be satisfied by its own actions.

(3) The system MUST be able to reason. That is to say, it must use some form of reasoning, based on known facts and capable of producing insights which later become known facts. It should be noted that the degree of certainty about the truth of a known fact is also an important concept and some way of dealing with uncertainty MUST be provided.

(4) The system MUST be able to develop self awareness. This is related to autonomy, reasoning and learning, but also embodies the need for internal and external senses. Without these senses there is no way of appreciating the difference between "me" and "outside of me". Sensations of pain and pleasure can provide motivation.

The invention's unique combination of neural network technology and usage, expert systems and database intelligence makes it into an extensible system capable of fulfilling all requirements of an intelligent system as previously described.

ORIGIN OF THE INVENTION'S CONCEPT: PROVIDING CONTINUITY TO GOVERNANCE IN DEVELOPING COUNTRIES. In a completely different note, it's important to mention now that the invention's original concept sprang from needs clearly identified in governments in Latin America. Democracy is supposed to be very important for freedom, justice and development. But, in less developing countries—a case in example: Latin America—, pronounced differences in power invariably reduce democracy to a facade. The solution lies elsewhere. Education is the first basic step. Then comes institutional development. It will take many years, but developing countries need to start developing more and more institutions capable of uniformly representing all their peoples interests. The public and private sectors could be respectively compared to the skeleton and the muscles of every nation. Every country needs a capable steering government providing strong direction to the changes that come, otherwise the motions initiated from the private sector will only benefit a few and will disrupt everything else.

The invention is capable of providing continuity in governments. Ministers and managers change so frequently, they often come with no previous similar experiences, and have no-one to train them. Expertto will store previous management experience, and call upon it as situations demand.

The invention is capable of providing cross-learning from other countries and other institutions with similar experiences. Expertto will also store these experiences for all to share, and it will show them when appropriate.

The invention is capable of providing appropriate information for real government managers and policy makers. More than everybody else, governments produce enormous mounts of information, and this information is processed by lots of people without really knowing its purpose. The information finally provided to decision-makers is usually skimpy, badly processed and difficult to interpret. Expertto will allow top-level managers to have access to masses of pre-interpreted information, classified by degree of urgency, the people responsible, and supplemented by suggestions and references to similar experiences and situations in the past or elsewhere.

The invention is capable of aiding institutional development. Institutional development requires management skills. Usually, salaries are low and qualified and experienced managers are in a short-fall in this area, where tasks are the most difficult of all. Expertto will present strategic alternatives and criteria based on the work of coordinating institutions (based on international organizations) and thus empower young managers to do the task.

And, of course, the invention is also useful to other business purposes and to the private sector. For example, the invention has already been applied to auditing, quality control, inventory control, inter-company coordination, project follow-up, and brand management.

As described in "Brainmakers", a book by David H. Freedman, published by Simon & Schuster in 1994, Marvin Minsky, one of the fathers of the Artificial Intelligence movement, spent ten years developing and refining a theory published in 1986 in a carefully but oddly constructed book—each page holds a self-contained minichapter that is broadly linked, neuron-style, to those around it—called the Society of Mind: many programs incorporating several ways for doing each thing.

The reasoning for such a book is that only the "intelligent" and collaborative integration of several AI technologies will be able to solve today's and tomorrow's practical problems. By themselves, even the best AI reasoning programs are idiot savants. Though they may be crammed with highly specialized knowledge, they know virtually none of the things that even a child knows about the real world: what a chair is, that an object cannot be in two places at the same time, etc. This deprives reasoning systems of two of the key techniques humans use to think their way out of new situations: turning them from specialized to general knowledge, and analogizing to seemingly unrelated situations.

A TOOLKIT OF AI TECHNOLOGIES. The invention may also be interpreted as a toolkit of AI technologies, where users may integrate the use of logical tests, expert systems, neural nets, fuzzy logic, genetic algorithms, classifier systems and many other AI technologies and applications to analyze the contents and meaning of whole databases of information. It takes two concepts that users are totally comfortable with: those of spreadsheets and databases, and works with the information contained in both formats developing by small steps, sets of diagnostics that may reach higher and higher levels of knowledge as the system grows. The similarity of learning the building of these applications with the way we all learn (first the simple concepts, then higher and higher level thinking until we reach synthetic thinking processes), brings great ease of operation to all users. The invention could open up a whole new class of AI instruments, applications and the intelligent integration between different tools to solve specific problems.

Further objects and advantages of the invention will become apparent in the consideration of the drawings and ensuing description.

SUMMARY OF THE INVENTION

Definition

The following paragraphs describe the SUMMARY DEFINITION of the invention.

The invention is a computer program that applies intelligence to interpret all data stored in whole relational databases: it extracts the meaning of the data, effectively translating data to their associated interpretations and actions.

The invention combines an EIS building tool and expert system building tools with database management instruments (a) applying expert knowledge to any information contained in databases and reports, (b) linking the expert system results, hereby called diagnostics, with selected related data on the databases and reports, as defined by the user, and (c) presenting a query interface capable of structuring and showing the resulting diagnostics and the original linked data according to user preferences such as actions and priorities.

The invention applies tests (rules) to generate interpretations, and then it organizes all interpretations by user-definable categories and stores them in a relational database.

Categories may represent persons responsible in the organization, regions, types of products, or priorities. Specific categories of interpretations usually suggest actions such as: "urgent call", "high priority", "customer problem", "responsibilities of the CEO", etc.

The invention also generates bi-directional pointers between the diagnostics database and the original data. Thus, users may query any data and see all the related diagnostics, or they may query any diagnostics and see the related data.

The invention also incorporates a fast-development graphical EIS with downdrilling tools. This is really an AI/Enhanced EIS, because these graphical reports may simultaneously show diagnostics and data.

The Invention as an Information Compiler

The invention could be described as an INFORMATION COMPILER. As far as the prior art research for this application has shown, this term hasn't been used in the industry yet. If so, a definition for an INFORMATION COMPILER should be attempted here. An INFORMATION COMPILER is a software tool applying logic tests and AI technologies such as inference engines, neural nets, fuzzy logic and genetic algorithms to data resident in a first database in order to build a second database containing diagnostics, and developing and maintaining a set of bi-directional links between selected data items in the first database and the corresponding diagnostics in the second database. In this way, an INFORMATION COMPILER develops a map of the raw data dimension into the structured dimension of intelligent interpretation of the information.

The invention's preferred embodiment also adds three concepts to that of the Information Compiler: (a) the ability to allow VISUAL development of MULTIPLE applications, (b) intelligent QUERY systems appropriate for rapid development of decision support systems for business managers, and (a) the ability to identify and even execute specific actions as soon as particular diagnostics are generated or activated.

And, finally, the invention clearly indicates the way the Information Compiler may be integrated with other programs and applications such as decision-support tools, completely reconfiguring their interfaces according to the intelligence conveyed by the underlying data.

The following paragraphs explain the previous ideas in more detail.

An INFORMATION COMPILER develops a map of the raw data dimension into the structured dimension of intelligent interpretation of the information.—The invention incorporates an expert applications development system. Thus, any capable user can very quickly develop sets of linked and even recursive logical tests and associated messages, in essence knowledge or expert systems, using the development tools provided in the invention. The invention, with the appropriate knowledge logic, can be used to operate on the data stored in all existing databases (databases in businesses, in governments, etc.), in order to generate new databases of structured diagnostics. These diagnostics represent the intelligence stored in existing databases. In essence, a rigorous mathematical mapping process may be performed, where a complicated function (the invention's logical processes) is applied on existing data to generate a corresponding set of diagnostics.

Developing and maintaining a set of bi-directional links between selected data items in the first database and the corresponding diagnostics in the second database.—After generating the diagnostics, the user will need the bi-directional links in order to reap the benefits of the mapping process. Selecting any specific diagnostics should immediately direct the user to the underlying data associated to them, and selecting any specific data items should immediately activate the corresponding diagnostics.

Applying logic tests and AI technologies such as inference engines, neural nets, fuzzy logic and genetic algorithms.—AI techniques work best when used in combination. Binary neural nets, genetic algorithms and even classifier systems may be applied on the data in order to generate specific diagnostics. Fuzzy logic can be used in the development of a weighting system for the resulting diagnostics.

The ability to identify and even execute specific actions as soon as particular diagnostics are generated or activated.—Each diagnostic may have an associated set of actions. Suggested actions are generated the very same instant the diagnostics are generated. Suggested actions are presented to the user whenever he queries the resulting diagnostics. An additional example of executable actions is the memorandums option in the preferred embodiment. Whenever particular diagnostics are generated, their associated memorandums may be automatically printed or even sent by E-Mail to the people responsible, those who must take action.

Intelligent QUERY systems appropriate for rapid development of decision support systems for business managers.—An Information Compiler doesn't need a query system: after the diagnostics database is generated, any existing query system (even those particularly designed as visual and easy to use such as the Iconic Query™ query system by IntelligenceWare, of Los Angeles, Calif.) may be used. However, the preferred embodiment of the invention also incorporates its own query system. This system is user configurable but it has already been prepared to concurrently show the data and the diagnostics, in numerical graphical and even iconic form.

VISUAL development of MULTIPLE applications—The user should be able to easily build intelligent applications by visually linking the data to develop key diagnostics. To further facilitate use and ease the analysis metaphor, the preferred embodiment's interface has been designed to be as similar as possible to the concept of spreadsheet programs. Also, the preferred embodiment's interface incorporates a long and a short menu. When a password is activated, only the short (and easier) menu is activated, and this doesn't allow the modification of existing applications.

Integration with other programs and applications such as decision-support tools, completely reconfiguring their interfaces according to the intelligence conveyed by the underlying data.—Existing decision support systems show a predefined set of screens and graphics. They sometimes incorporate downdrilling, so that users may point at specific graphs and immediately get more information on the desired topics. The invention substitutes that concept with that of automatically-configurable decision support systems. In these systems, the information is conveyed by order of importance. Unnecessary information, graphics, etc., are automatically deleted.

The invention's preferred embodiment described in this document has been built using MS FoxPro (both MS DOS and MS Windows versions), a relational database development tool. A full expert system has been emulated using these tools and storing the knowledgebase (all rules in the rulebase, data and diagnostics) in several relational tables.

Multidimensionality and Flexibility in the Structure of Data

The following sections and paragraphs deal with MULTIDIMENSIONALITY AND FLEXIBILITY IN THE STRUCTURE OF DATA.

REAL TIME RESPONSE AND DATA UPDATING

The invention is different from existing diagnostic EIS tools. Typical prior art EIS diagnostics tools such as the Analyst™ decision-support software by Information Resources Inc. of Walthan Mass. displaying output contain "hyperlinked" slide shows of ordinary presentation screens containing graphic reports of the data (numbers and graphics). However, the user may associate particular logic tests to certain data items. If a logical test rams TRUE, then a message shows next to the corresponding data item. These systems perform all logical tests "on the fly". That is, whenever a particular screen is called, the information is first read, then interpreted, then the logical test or tests are run and the screen is built altogether. There are no databases for storing any diagnostics, there are no links, and there is no mapping process. Each diagnostic is generated one-at-a-time.

With the invention, the underlying information needs to be "compiled". That is, the invention takes a certain mount of time to process all logical tests and generate the diagnostics. After that, it runs more tests on the existing diagnostics, generating more diagnostics.

The main advantages of existing EIS systems providing very few diagnostics "on the fly" is that these systems can work with existing databases and provide all information and diagnostics instantly. No intermediate steps need to be taken. Information is always live. Even if all data changed, users would get the whole new data set immediately, maybe a fraction of a second later. The invention most probably will require a few years to reach that level of integration with ever-changing data. The invention's larger applications usually require five to fifteen minutes to query the database, select a data view, select the data to be integrated into the querying system, replicate the data into the invention's own data database (the data.dbf file), run all tests, write all diagnostics and then query the new resulting information set. Thus, existing systems prove to be easier to implement in a totally integrated form with current databases and, the selling point usually is the ease of integration with all live data in the database: they act as "enhanced" query tools of the information stored in current databases.

If the invention were only used on very fast computers such as upper-level workstations, then it could work just as a query system, generating all data and diagnostics every time the system is queried, just like other existing systems do today. However, since it frequently will operate on slower computers, it should either generate its own extract and copy of the data database, and a new diagnostics database, so that these may be queried many times.

Users may also develop hybrid systems, where part of the information doesn't change and another part changes all the time. The implementation of these solutions is straightforward: First, data items that change should be marked as "changed". Then, all diagnostics associated to these data items (and all those diagnostics that refer to these data items in their logical test formulas) will be deleted. Finally, all tests associated to these diagnostics will be run again. In a similar way, a selected number of higher level diagnostics such as expert diagnostics should be deleted, and their associated expert tests should be run again. All those expert diagnostics associated to deleted diagnostics should also be deleted. All those expert diagnostics referring to any deleted diagnostics in their logical test formulas should also be deleted.

In this way, users can even get fast response for real-time applications.

HANDLING DATA MULTIDIMENSIONALITY

The invention should also follow the multidimensionality of any data set. For example, all relational databases present lots of dimension in their data. By contrast, the invention's preferred embodiment seems to only present two dimensions, since the data database (data.dbf) file is a flat table.

There are several alternative solutions to this situation. For a practical example, we will consider a relational database. Specifically, let's consider a complete Management Information System with accounting, inventory, manufacturing, accounts payable and receivable, and sales modules.

The first alternative solution would be to develop a database of diagnostics effectively replicating the whole structure of the Management Information System's relational database. However, this alternative solution would be too complicated to program: let's just say that each change in the relational database's structure would need to be coded twice, and most coding would be specific to each particular application. One more limitation is that most tests and diagnostics would read from more than one relational database's table at a time. One such table might contain products' codes. Another database, clients' codes. Yet another database would contain invoicing information, another, sales by volume, yet another, sales by value, and finally another, products' inventory levels. Very few, not very interesting tests might be run on each one of these particular data tables. Most tests would require a combination of data items from at least two of these tables.

DATABASE VIEWS

The relational database model introduced the concept of database views precisely to solve that problem. All data needs to be presented in ways that allow users to easily visualize information, and where all relevant information is simultaneously present. Thus, it's easy to understand that tests should primarily be run on data items contained in relational database views. That's precisely why the data database (data.dbf) file in the invention's preferred embodiment is just a permanent copy of a database view. The user first queries his database using any desired tools, in effect generating the desired database view. This database view is then exported to the invention. For this, the Microsoft Windows™ environment by Microsoft Corporation in Redmond Washington incorporates alternative tools such as the DDE™ dynamic data exchange tool and the (optional) ODBC™ translation protocols. The invention is ready for the incorporation of these tools. Besides that, it already has the ability to import information from more than twenty different file formats (most relational database systems can easily save any database view as a database file).

The most flexible, easy to implement, configurable and practical implementation of multidimensionality in the invention is then the usage of database views, and the conversion of these views to database files.

MORE THAN ONE DATA VIEW

Also, most practical applications such as sales analysis require more than one data view. A sales application could show one view by product (product sales over time) and another view by customer (customer sales over time). A third view could show current sales by product and customer. The invention's sales analysis application set should then be developed as three interdependent applications. (Here, each application contains one data.dbf database file and one diagnostics database.) These applications can interact in a very simple way: the invention's logical tests allow comparing data items from different applications. For example, sales application #1 can incorporate tests comparing data items from sales application #2 to its own data items. In order to do this, it's only necessary to specify the full path (disk and directory) containing the corresponding applications (since each application is a group of files stored in one separate directory).

In a similar way, the invention's expert tests allow evaluating the existence of diagnostics in different applications. For example, sales application #1 can incorporate expert tests evaluating if certain diagnostics are already present in any other application.

MORE THAN ONE DATA CODE

As it has been described in this document, the invention uses only one pointer (code) field in the data database (data.dbf) file. This field is now named DATA. This code field should really be interpreted as more than one field. Matter of fact, our products' current implementations—at the time of filing this application—still have the same structure for all application's files, but they have just been upgraded to three or more codes in the data.dbf files. This brings much more flexibility to application development, and all functions and operations remain the same. Only very few changes need to be done to groups definitions, tests and functions in those tests.

For example, using only one code, the F function has the syntax F(datacode,period) where datacode is the contents of field DATA (the identifier to the desired data record) and period is the relative or absolute period identifier (0 for current, −1 for previous in the case of a relative scheme). However, a call to the same F function with three code fields would look like F(datacode1,datacode2,datacode3,period). When calling this function, any one or two of the datacodes could me missing from the definition. In that case, they should be interpreted as wildcards. For example, if anyone specified F(,1900,,0), that would mean "read all data items in the current period (period 0) whose second data code equals 1900". As we can see, logical tests may be defined by defining either one, two or three of the data codes.

Now let's try this and see how powerful it is. For example, we tried to develop an application to supervise the operation of eight hundred business centers (bank agencies), where for each one of these there are (let's say) twenty data records each containing data for the last twelve months of operations plus a forecast for the next twelve months plus the budget numbers for those same twelve numbers. Each business center contains exactly the same twenty records (1: total assets, 2: total liabilities, 3: equity, 4: cash available, etc., ... 19: net profits, 20: other). Using the data groups concept described elsewhere in this same document it's possible to define very powerful group tests that will run on lots of data items. However, specifying each group line by line would be very painful: the first group should contain line 1 (total assets) for each and every business center, the second group should contain line 2 for each, etc. So complicated! But, there's an easier way to do it: just use two data codes (only two are necessary in this example). The first data code would be the particular code for each business center. The second data code would be the particular code for each data record in all business centers (for example, 100 for total assets, 200 for total liabilities, etc.). Now, define the logical tests using only one of the data codes. For example, we will try to generate a logical test to see where profits are not growing, testing line 19 of each and every business center. We only need to specify this:

F(,1900,,0)<F(,1900,,-1).

Notice the first and third datacodes are missing. The first one represents each business center, but since it's empty, we will run this test for every value of that datacode (for each and every business center). The third datacode isn't used or defined, so it's simply ignored. The test reads as follows: "if the current value for line 19 for every center is smaller than its previous value, then tell me."

A COLLECTION OF TOOLS

The previous paragraphs describe how the invention can handle different structures of data, greatly increasing its flexibility.

The preferred embodiment of the invention is a self-contained stand-alone tool capable of importing data, allowing the user to define applications including data and structured logical tests on the data, processing all diagnostics, querying the information and even automatically executing predefined actions. This implementation is already very flexible, since users may add new screen formats and designs to the EIS system, they may define the way the diagnostics browse system looks and works just by moving and resizing the corresponding windows, modifying the message fonts, and using the diagnostics as an automatically self configuring menu system as described elsewhere in this document.

However, to facilitate the invention's application in certain institutions, an even more flexible scheme might be necessary. The invention can also be configured as a programming environment where users may design the look of any screen, the operation of the query system. For that purpose, the invention's tools and services should be separated in at least three modules: (a) database views capturing module, (b) diagnostics processing module, and (c) intelligent querying module. The database views capturing module would allow any user to develop transparent interfases between external database tools and the invention, where even no files need to be generated. The diagnostics processing module would allow the use of a wide array of AI technologies to process the data from several data views and generate a database of diagnostics. The querying module could be entirely defined and implemented by the user, giving him complete control over its structure and operation.

In an intermediate level, the invention is being used as a starting point for the development of specific applications. Integrating the invention into accounting systems, MIS systems, financial analysis systems, auditing systems for banks, etc., the invention can be customized to the needs of individual users. In some cases, it's only necessary to relax certain constraints in the coding, such as allowing different numbers of data periods in the data.dbf file, or allowing more data fields, more data codes, textual data items together with numeric data items, etc.

Situatioin Analysis and Memos for Dissemination of Knowledge and Knowledge Acquisition As it has already been indicated elsewhere in this same document, each diagnostic may have an associated set of actions (fields ACTION# in file test.dbf).

Those actions associated to each test and the corresponding diagnostic are defined by the user. Suggested actions are presented to the user whenever he queries the resulting diagnostics.

An additional example of executable actions is the memorandums option in the preferred embodiment. Whenever particular diagnostics are generated, their associated memorandums may be automatically printed or even sent by E-Mail to the people responsible, those who must take action.

The particular technical implementation of this option is described in a later section, identified as Detailed Operation of Memorandums.

Briefly, it's enough to note that memorandums are implemented as a text editor. Codeword "TO:" indicates the recipient and may (optionally) contain a full Email address. Memorandums are stored in their own database file and are linked to diagnostics and expert diagnostics in the invention. When memorandums are operated manually, users should activate and send a memorandum directly. When memorandums are operated automatically, then each memorandum is activated as soon as the corresponding diagnostics (those diagnostics these memorandums are linked to) are generated. Every activated memorandum is immediately sent to the corresponding Email address or printed (when the "TO:" field is not defined or it doesn't contain a valid Email address). All links between specific diagnostics and user-created memorandums are also defined by the user.

Structure

The following paragraphs describe the SUMMARY STRUCTURE of the invention.

The invention's components are, as shown in FIG. 2, and also in FIG. 1 and FIGS. 3 to 8: data database (5), tests database (9), test-processing engine (10), diagnostics database (7), querying engine and EIS system (8) and inference engine (6).

Referring to FIG. 2, the best mode implementation's entire program storage area is divided in the data database (5), the tests database (9), the test-processing engine (10), the inference engine and expert system (6), the diagnostics database (7) and the querying and EIS engine (8). Inference engines and expert systems (6) typically contain a tests database and test-processing engine, but in the best-embodiment implementation, an additional set of these components is provided.

The data database (5), as shown in FIG. 3, may contain one or more of the following: (A) data tables (13) and related index files (16) for identifying each individual data item (12), (B) group elements data tables (15) that state which data items correspond to each group, so as to perform a common test on all these data items, and (C) group descriptions data tables (14).

The tests database (9), as shown in FIG. 4, may contain one or more of the following: (A) tests descriptions (17) and associated formulas data tables (20), (B) data items identifiers (21) or group identifiers identifying the set of items to which the test will be applied (22), and (C) triggers data table (23), where each test is associated to a particular set of triggers, and one or more triggers may produce an action (24), where an action is any activity defined by the user.

The tests-processing engine (10), as shown in FIG. 5, is capable of interpreting each if-then-else test (18 and 20), group (22) and data item identifiers (21) and triggers (23), so as to produce the diagnostics (7) corresponding to the data database (5).

The diagnostics database (7), as shown in FIG. 6, may contain one or more diagnostics data tables (27). Each record in these data tables will contain two sets of fields. One set of fields contains identifiers (18) of those tests that produced the TRUE condition, and the other set of fields contains data item identifiers (21) for the particular data items where the tests produced the TRUE condition. Triggers (23) and their associated actions (24) may be reached immediately in the test database (9), through the associated index files (16).

The querying engine (8), as shown in FIG. 8, is capable of sorting (33), filtering (34), linking (35) and showing synchronized database browse views (36) of the previous three databases, according to the user selections and preferences.

The expert system and its associated inference engine (6), as shown in FIG. 7, comprise a knowledge database (28), sets of rules (29), a rules processing language (30), inference logic procedures (31), and interface modules (32).

The invention also includes user-definable routines within the test-processing engine. These routines may call other programs such as neural nets and genetic algorithms. An example where a user-definable routine calls a neural net is provided in this document. In this way, users may develop intelligent systems where data is analyzed and diagnostics are generated using a combination of Artificial Intelligence tools.

The invention's best embodiment implementation has been designed to run as a stand-alone system, or in an integrated manner with an expert system and its associated inference engine. As stated previously, researchers define expert systems in the following way: Intelligent computer programs that use knowledge and inference procedures to solve problems that are hard enough as to require in their solution, significant expertise. The expert system and its associated inference engine (6), as shown in FIG. 7, comprise a knowledge database (28), sets of rules (29), a rules processing language (30), inference logic procedures (31), and interface modules (32).

In General to Operate, this Invention Proceeds Through Three Logical Steps (1) In the first step, it creates a database with information retrieved from different computer sources. (2) In the second step, the invention performs logical tests, if-then-else tests and other mathematical transformations on the information. The resulting values of these logical and mathematical operations are called diagnostics and stored in diagnostics databases. The logical tests described hereof are usually performed by test processing procedures such as expert system building tools. Other artificial intelligence tools such as neural net and genetic algorithms may also be used to generate diagnostics stored in the diagnostics databases. (3) In the third and final step, the invention presents an array of tools so that users can query, in a coordinated manner, the diagnostics databases and the information from which these diagnostics have been generated.

The preferred embodiment of the invention is particularly useful for the development of executive information systems. If, for example, the databases contain financial information and financial ratios, the logical tests at the second step described before will generate the diagnostics associated to those financial ratios. If the company's debt ratio is too high, the expert system could generate a diagnostic database entry stating that "the company's debt is too large". This diagnostic statement could later be analyzed in subsequent passes of the role system, together with all other diagnostic statements generated from the firm's financial statements, so as to suggest strategies and priorities for management.

Every diagnostic stored in the diagnostics database may be linked to the data items it originated from. These linkings may be defined by the user, or they may also be created automatically. In a bi-directional linking scheme, it's possible to go from every particular data item to the diagnostics that are linked to it, and it's also possible to go each diagnostic to the corresponding data item(s) this diagnostic has originated from. In this way, the user only needs to point the cursor at any data item, and he'll simultaneously see the key diagnostics associated with it in a separate window in the screen. The user may also point the cursor at any diagnostic in the diagnostics database, and he'll simultaneously see the key data items associated with it in another window in the screen. Also, since, the invention stores the diagnostics in a parallel database which allows the user to sort and organize all the diagnostics information in any way he likes.

This invention will also work if instead of the of an expert system, a simpler language with a simpler set of if-then logical condition statements is used. For the preferred embodiment, such a language has already been developed. However, this language is extensible, so that the user may easily add his own processes and extend it even beyond most expert system's analysis capabilities.

The invention may be used to develop graphical, AI-enhanced EIS applications—where AI stands for Artificial Intelligence, and EIS stands for Executive Information System—.

The first computer program screen of a sample application developed with the invention may contain a set of graphics, each one of which could be selected by the user by clicking on it with the mouse. When a particular graphic or chart is selected, it executes a specific action, such as calling another screen showing more detailed information of related data. FIG. 27 shows an example of such an initial screen. This screen also shows a diagnostic originated from its knowledge database: "Comparative Analysis for February 94's forecast shows three centers of profit with serious budgeting problems. For more details select the COMPARATIVE ANALYSIS GRAPH." In order to see any information required, the user just needs to select the corresponding graph.

After the previous selection, the particular application developed by the user may show another graphical screen such as that shown in FIG. 28. Notice that in this sample figure one of the graphs is selected and the message—also from the invention—reads: "CENTER OF PROFIT#3: Expenses have risen four times faster than expected in the last seven months. Managers have been automatically notified by system three consecutive times but no response has been logged in. This type of situation requires an immediate meeting. Coordinate through Charles O. at extension #253."

After seeing the message on the previous figure (FIG. 28), the user may decide to switch over to any of the customized diagnostics screens showing categories of information, diagnostics and messages. In the example shown in FIG. 29, the user will now look at a quality control application related to this business center. In this example, the user first selects Mark Zablinsky, to see how he is doing. Then, he looks at the message: "The customer service department is falling behind" and the user will also look at the associated note(s) close to the numbers at the bottom of the screen. Also notice the support information at the bottom of the screen, in this case, the customer service numbers related to this problem. These show that this problem is limited to the Northwestern operation.

After looking at the previous messages, the user may decide to write a new memo (as shown in FIG. 30) and send it by E-mail together with the supporting numbers and diagnostics. The invention stores all memos, so any of these may be automatically resent if similar situations arise. Users may also reuse and modify existing memos.

The invention is flexible and easy to use. It may be used for repetitive analyses of business information. The user can use the invention to develop a wide variety of applications in areas as diverse as financial analysis, organizational evaluation, and project control. As shown in FIG. 31, to select an existing application, the user only needs to execute the File-Application (or File-Open) menu option. FIG. 32 shows a sample listing of a few possible applications that could be developed with the invention.

The invention has been implemented under different operating system environments. In the Microsoft Windows™ implementation, developed using the Microsoft FoxPro™ program development tool by Microsoft Corporation of Redmond, Wash., it easily integrates with Microsoft Windows™ Spreadsheets like the Microsoft Excel™ spreadsheet by Microsoft Corporation of Redmond, Wash. Toolbars such as the one shown in FIG. 33 allow users to easily operate the system menus, graphical action buttons (EIS), activate help options, user notes, summary reports, graphics, etc.

BUILDING AN APPLICATION. Data Outline Definition. FIG. 34 shows the invention's data outline definition facility. The invention's user interface helps the user to tailor any application's data structure to the user's needs. The invention automatically builds a database containing the diagnostics related to their corresponding financial concepts and time periods. Modify the data outline and add any other pieces of information to the database as needed.

FIG. 35 shows a screen containing a sample listing of data row groups in a particular application developed with the invention. This screen is used to add, modify or delete a data group.

Group Editing (step 1). The appropriate definition of data groups allows development of powerful applications using only a few formulas and rules. For example, a single formula may be applied to a group representing all Consumer Complaints indicators. In this way, any expert rule may automatically be applied to all data in a particular group.

FIG. 36 shows one of the invention's dialog boxes for the definition of data groups in a particular application. The look of these dialog boxes may vary somewhat in different versions of the preferred embodiment implementation, but the functionality is all the same.

Group Editing (step 2). The invention's interface has been tailored for rapid application development. To add, define or modify a group, simply point at the corresponding numbers or rows in the database.

FIG. 37 shows a screen containing a sample listing of data row groups in a particular application developed with the invention. This screen is used to select a data group to apply a data formula on.

Data Formulas (step 1). The invention is a database-based program. However, its commands replicate some of the flexibility of a spreadsheet. The user may create data row formulas and data column formulas. For example, data row formulas may be applied to calculate totals or to estimate percentages, and data column formulas may be used for forecasting applications.

FIG. 38 shows one of the invention's dialog boxes for the definition of data formulas in a particular application.

Data Formulas (step 2). A number of Dialog Boxes have been designed for the easy creation of data formulas. For example, to create a simple group formula with two operands, the user only needs to point at the corresponding groups and select an operator.

FIG. 39 shows a screen where the user may enter several text descriptions for a graphical EIS screen in a particular application developed with the invention.

Creating the EIS Screens (step 1). To facilitate the creation of a powerful, useful and elegant graphical user interface in any final application, The invention presents a menu of predefined and customizable screen types. To create a new screen, simply select a screen type and fill in the blanks. To define the downdrilling scheme, just indicate the name of the screen to be called when the user presses any particular graph.

Creating the EIS Screens (step 2). To define any graphic chart in a EIS screen, the user must only point at the corresponding data series, as shown in FIG. 40.

Editing Data Tests (step 1). To add, modify, duplicate or delete a data test (also called a data rule), select the edit command. The invention will show a listing of all existing tests and a control panel showing the available programming options, as shown in FIG. 41.

Editing Data Tests (step 2). Data tests may contain associated messages, charts, graphics or even video clips. If the test proves to be TRUE, these will be shown together with the data to which the test has been applied, as shown in FIG. 42.

Editing Data Tests (step 3). Each data test may be classified according to action categories. These categories may represent priorities, departments, actions (like a call or meeting) or the people responsible of these projects, as in the case illustrated by the screen shown in FIG. 43.

Editing Data Tests (step 4). Data tests are based on a logical formula of the form IF(condition). When condition proves to be TRUE, then the associated messages will be shown during the query phase. To facilitate the creation of complicated expressions—which might even contain calls to neural nets and genetic algorithms—, the invention incorporates an integrated formula definition tool. Just point at the data and select the appropriate operands, as shown in FIG. 44.

Expert Tests. Expert tests are effectively Expert System rules of the form IF(condition), where condition is only based on the results generated by other rules. This means that, after data tests translate data into diagnostics, expert tests build a logic chain of ever-higher intelligence based on those diagnostics.

Tests Evaluation. After defining the data structure and tests, the invention runs all tests and it automatically builds a database containing the diagnostics. The invention can process data and expert tests and generate in just seconds large structured databases of diagnostics to be queried immediately. FIG. 46 shows the dialog box to control this option, and FIG. 47 shows the general principle of the whole process behind the invention.

After this, the user may simply query the data and the associated diagnostics in any particular way he wants to.

BRIEF DESCRIPTION OF THE DRAWINGS

Please note that, throughout this document, pointer, code and identifier should generally be interpreted as synonyms. In xbase languages such as the MS FoxPro for Windows™ database programming language by Microsoft Corporation of Redmond, Wash., these instruments are used to effectively implement linking between data tables.

Also note that in this document, tests and diagnostics are also called data tests and data diagnostics. Sometimes tests are called logical tests. Expert tests are always called expert tests. However, expert diagnostics could also be called super diagnostics. Logic expressions and logic statements are synonyms and have exactly the same meaning throughout the document. Analysis rules are the logical test expressions and are just a part of the definition of data tests and expert tests. (Tests and expert tests both contain analysis rules. The end result of any analysis role in the invention is either TRUE or FALSE.) However, in this document, analysis rules are also sometimes just called tests. Finally, in this document, diagnostic messages may also be called diagnostic statements.

An effort has been made so that specific terms like variable and program names will appear in a consistent manner throughout this document. However, upper and lowercase handling haven't been totally consistent, so that variable and file names might appear sometimes expressed in uppercase characters, sometimes in mixed lower and uppercase, and sometimes simply in lowercase. However, the language used to develop the invention's coding doesn't recognize letter casing, so that Abcd and aBCd represent one and the same variable name. So, it is suggested that, to follow and interpret correctly this document, character casing should be ignored, and all names should be identified only by the sequence of characters.

GENERAL CONCEPT

FIGS. 1 to 8 show the GENERAL CONCEPT of the invention.

Figure 1:
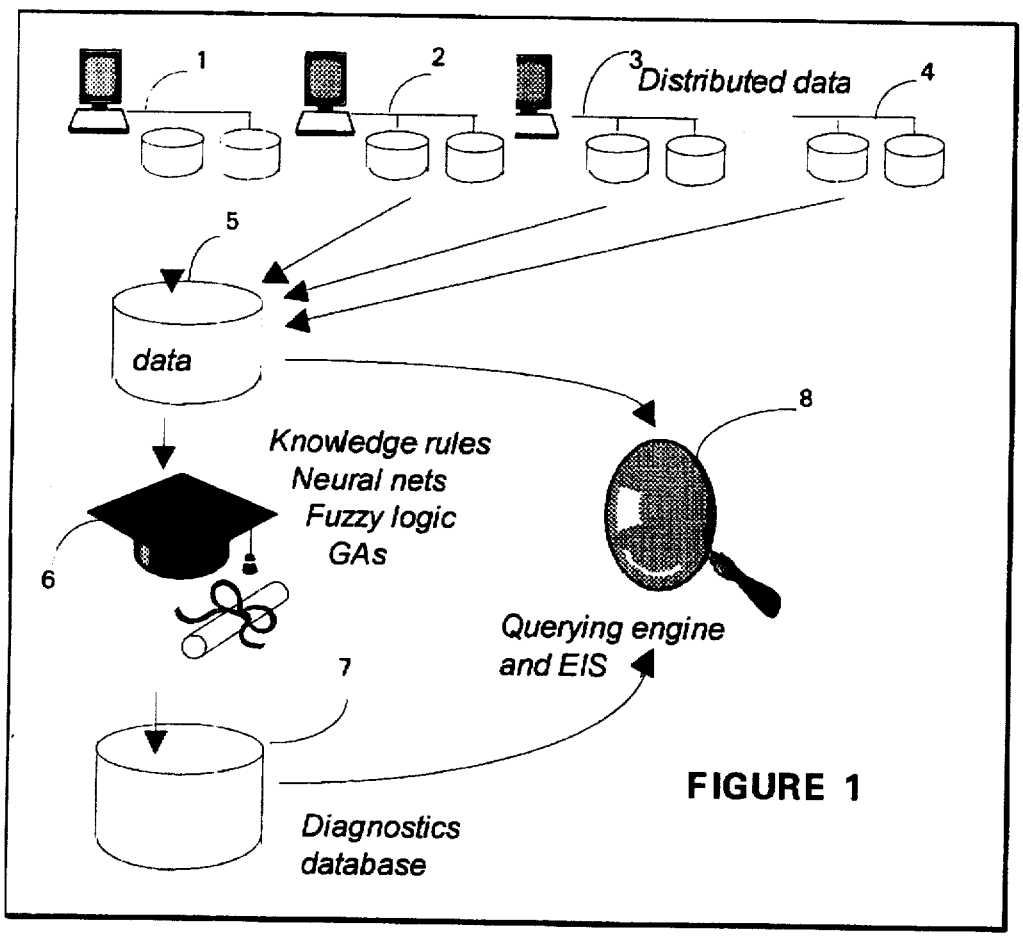

FIG. 1 represents a general but simplified view of the invention's components: the organization's—i.e., firm or institution—distributed computers and databases (1 to 4), the invention's data database (5), the expert system with its inference engine (6), the diagnostics database (7) and the querying and EIS engine (8). The invention proceeds through three logical stages: First, it creates a data database (5) with information retrieved from different computer sources (1 to 4). Second, through use of an expert system building tool (6), it generates a diagnostics database (7). Third, the querying and EIS engine (8) allows users to query these diagnostics databases.

Figure 2:
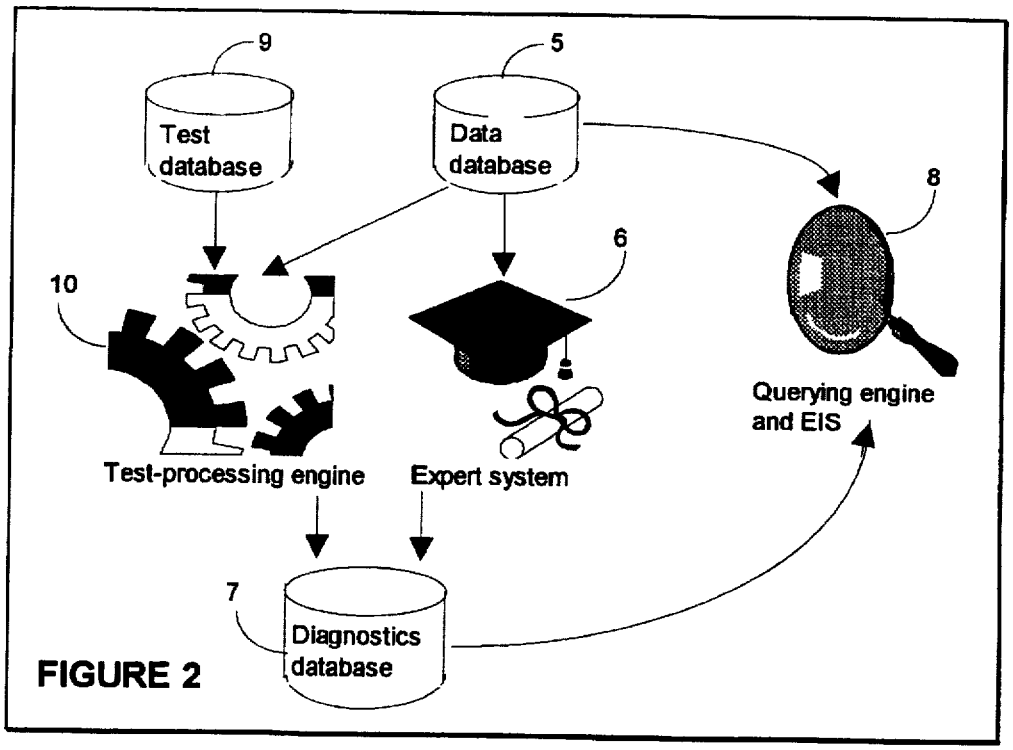

FIG. 2 shows the general components in the best embodiment implementation: The invention's data database (5) which is built from the information on the organization's databases, the tests database (9), the test-processing engine (10), the expert system with its inference engine (6), the diagnostics database (7) and the querying engine (8). Notice the differences when compared with the structure in FIG. 1: The organization's databases (1 to 4) aren't shown, since these are non-essential to the invention's operation and the invention's data table contains all their information. Two components are added: the tests database (9) and the test-processing engine (10). Inference engines and expert systems (6) typically contain a tests database and test-processing engine, but in the best-embodiment implementation, an additional set of these components is provided.

Figure 3:
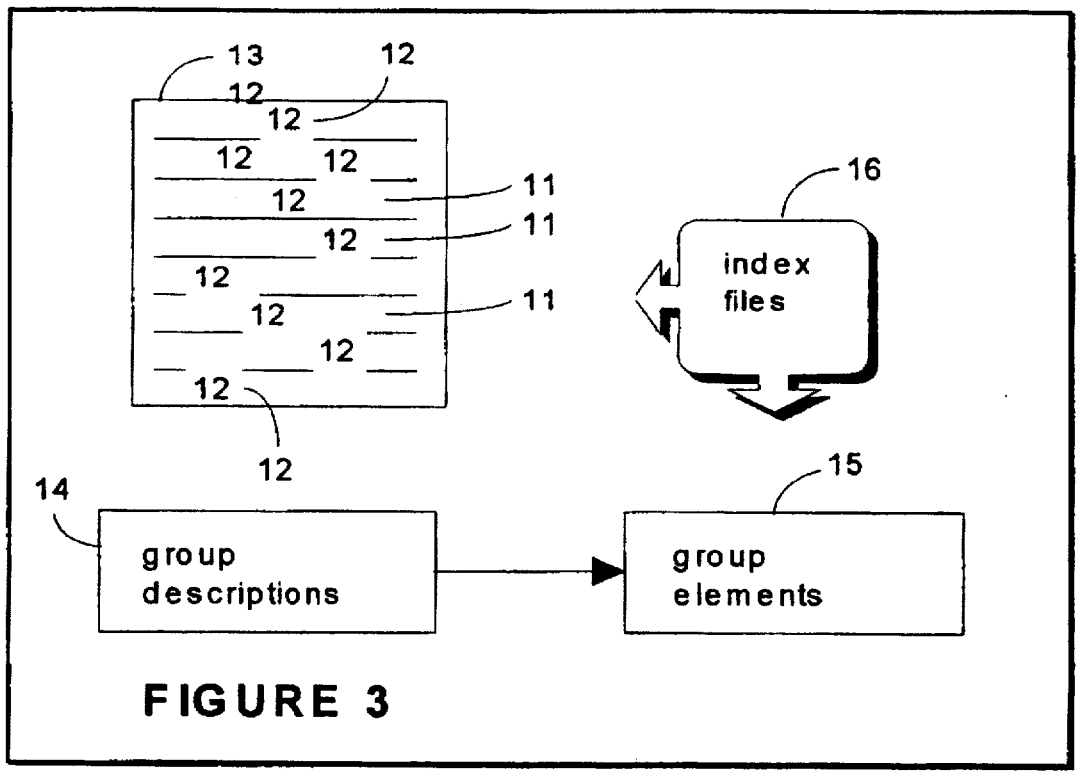

FIG. 3 shows the data database's (5) basic components: one or more database tables containing lines or records (11) containing individual data items (12) of the data to be analyzed (13), group descriptions data tables (14), group elements data tables (15) listing the individual data items (12), and/or lines or records (11) of the data that comprise each group, and related index files (15).

Figure 4:
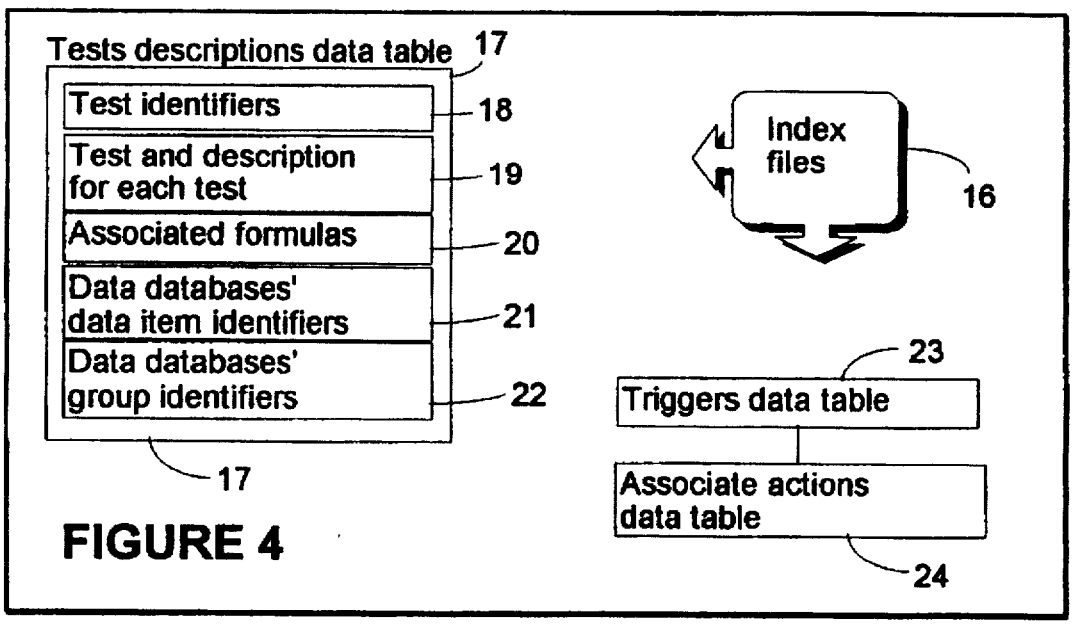

FIG. 4 shows the tests database's (9) components: the tests descriptions table (17) coming the test identifier (18), name and description for each test (19), the associated formula for each test (20), identifiers for individual data items in the data database (21) on which the tests will be applied; group identifiers (22) of the data items in the data database on which the tests will be applied; the triggers data table (23) and their associated actions database (24) and related index files (25).

Figure 5:
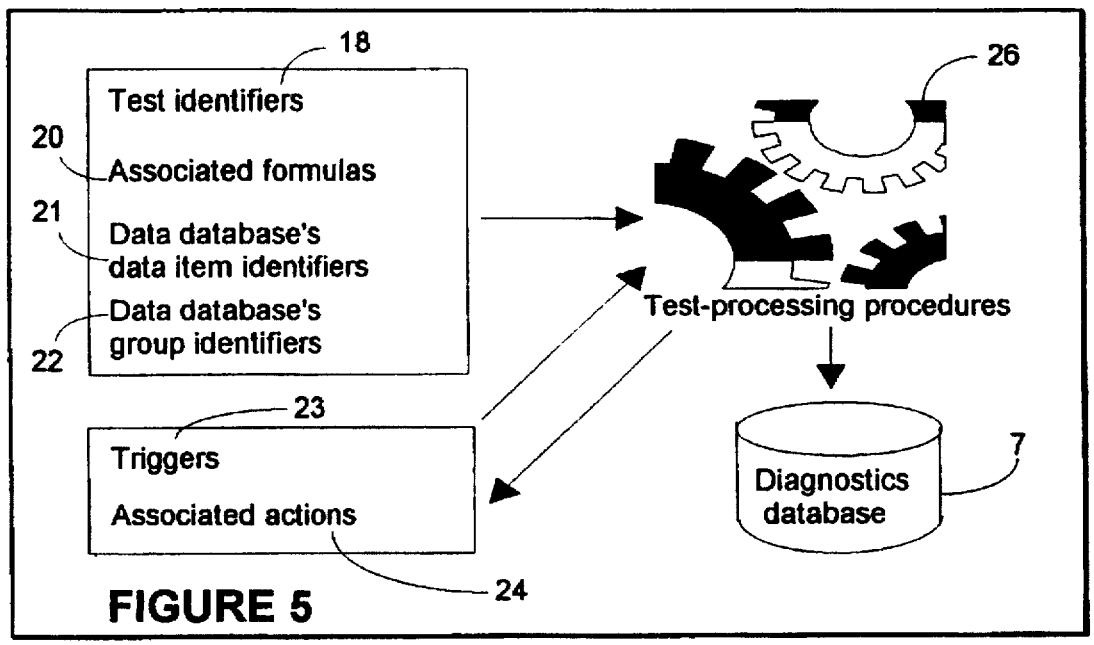

FIG. 5 shows a simplified outline of the tests-processing engine's (10) operation: Each test's formula (20) is read from the test database (9). The test-processing procedures (26) apply this formula to the corresponding data database's (5) data items, according to the data database's data item identifiers (21) and the group identifiers (22) associated to each test. When the result of any of these test's formulas (20) is TRUE, some information associated to that particular test is written to the diagnostics database (7). The TRUE test's—i.e., the diagnostic's—information includes: the test identifier (18), the data item identifiers (21) associated to the particular formula mined TRUE, and the associated triggers (23) and actions (24).

Figure 6:
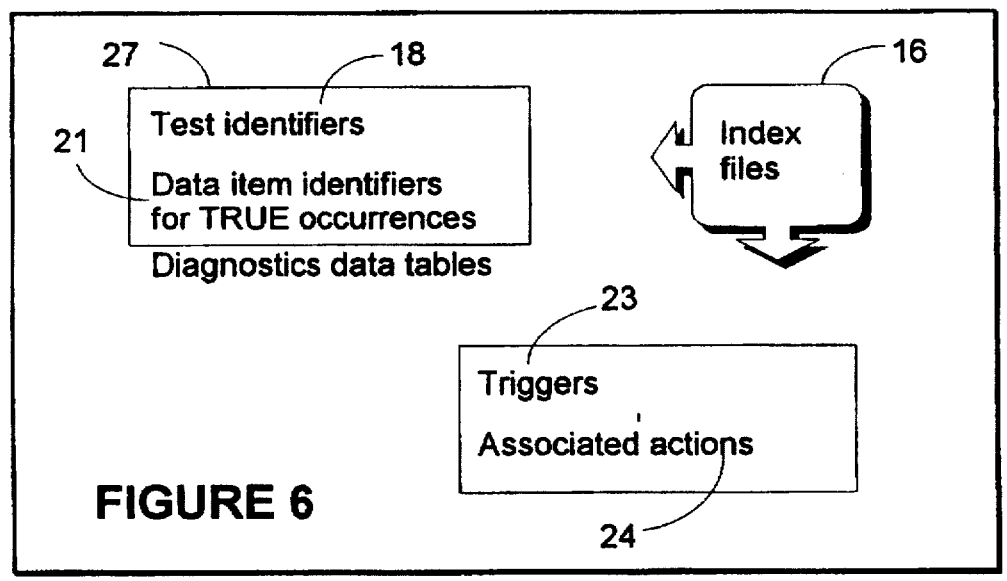

FIG. 6 shows the diagnostics database's (7) contents: diagnostics data tables (27) coming, for each test that turned TRUE—i.e. for each diagnostic—, the test identifier (18), the data item identifiers (21), the associated triggers (23) and actions (24).

Figure 7:
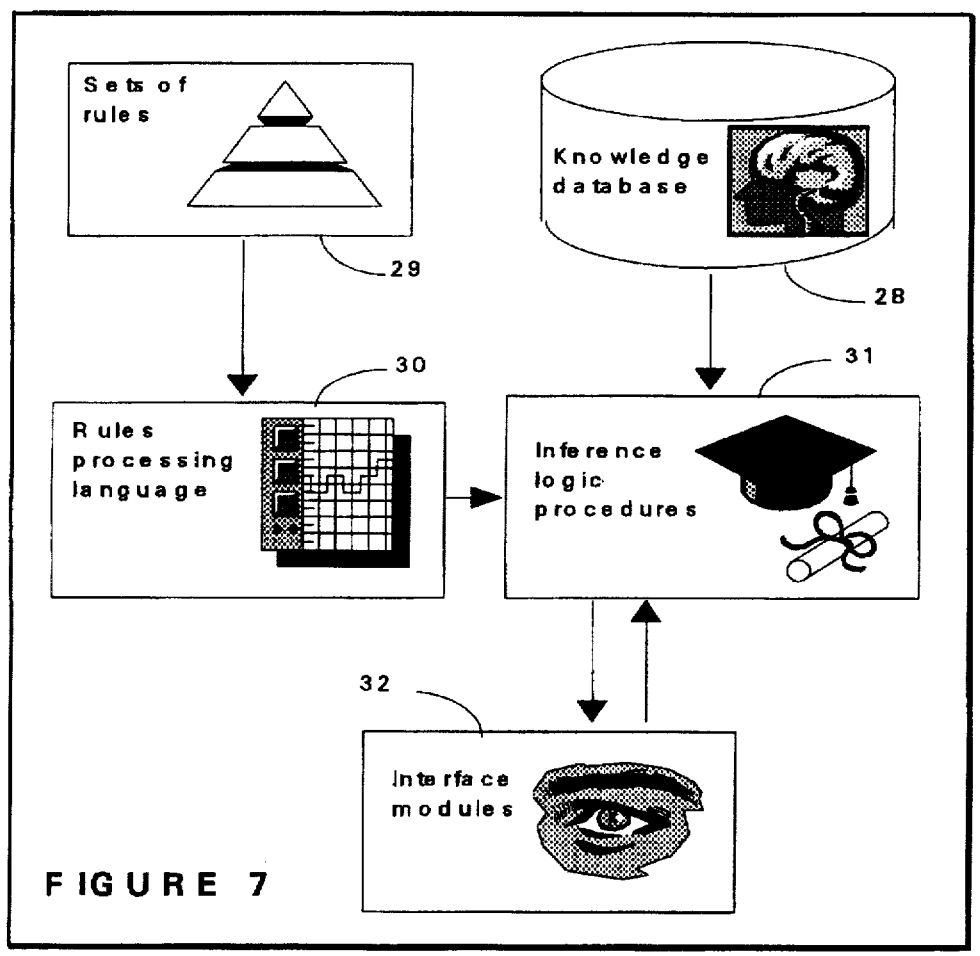

FIG. 7 shows the expert system and associated inference engine (6). This instrument contains a knowledge database (28), one or more sets of rules (29), a rules processing language (30), inference logic procedures (31) so as to develop a heuristic sequence of steps to achieve the stated goals, and several interface modules (32) for the user to input his data, new rules, or to respond to the expert system's questions. These elements don't need to be described more thoroughly here, since expert systems have been, for the past ten years, a widely known type of artificial intelligence application system in the computer science community.

Figure 8:
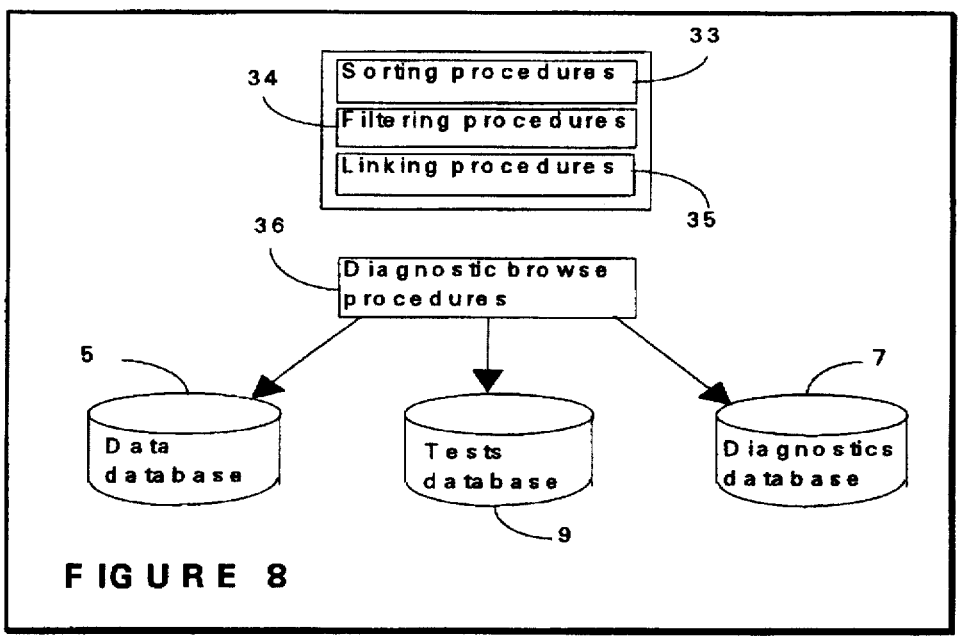

FIG. 8 shows the querying and EIS engine (8), a set of procedures for sorting (33), filtering (34), linking index tables (35) associated to data database (5), the tests database (9), and the diagnostics database (7), and showing synchronized database browse views (36) of the data database (5), tests database (9), and diagnostics database (7).

Operative Flow Diagrams

FIGS. 9 to 14 show a few OPERATIVE FLOW DIAGRAMS of the invention. These indicate the steps a user should follow in order to operate the invention, and the general steps the invention follows when working with the data.

Figure 9:
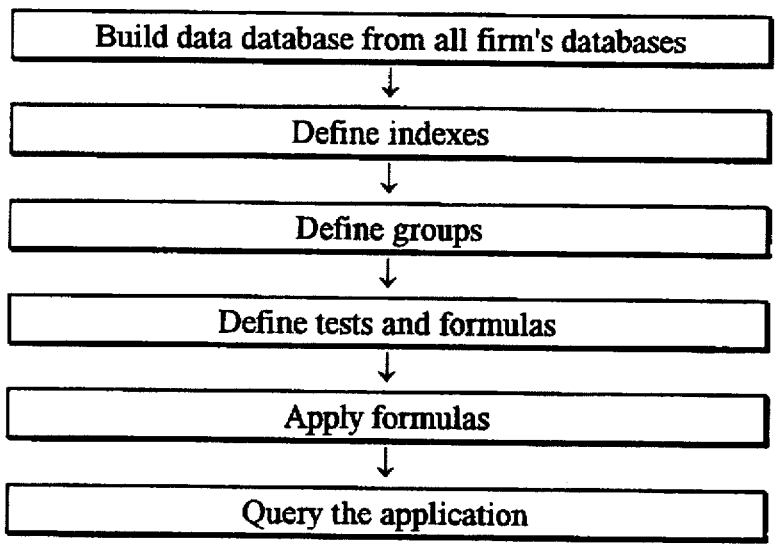

FIG. 9 shows the overall flow diagram of the best embodiment's implementation: FIRST, the invention must access all the firm's databases (see 1 to 4 in FIG. 1) to build the data database (5). SECOND, the invention generates a complete database structure and related index files (16). The just-generated test and diagnostic database files (7) are empty, but ready to receive information. The detailed database structure, index files contents and relations between the files will be made evident in the next Figures of this application. THIRD, define any groups (14, 15) of data items (12). THIS IS OPTIONAL. These groups are useful for the application of common tests to all data items in any particular group, for the definition of reports and queries, and for the definition of the associated triggers and actions (23, 24). FOURTH, define tests (17, 18, 19) and formulas (20, 21, 22). Formulas can be as simple as IF-THEN tests applied to one or more data items or data groups, or as sophisticated as expert system clauses and rules, neural networks and genetic algorithms can be. FIFTH, apply formulas. The test-processing engine (10) then interprets and executes all formulas, reading and comparing all relevant data items, and whenever a test's conditions turn TRUE, generating one or more diagnostic records in the diagnostics database (7). Any diagnostic reference stored in the diagnostic database will also contain an associated reference to one or more data items (12). These data items will be defined by the user, or they will simply be the data items examined when the test condition turned true and the ensuing diagnostic was generated. SIXTH, query the application. The user may query the diagnostics database and the data database simultaneously in two or more separate windows, linked through several index files (16).

Figure 10:
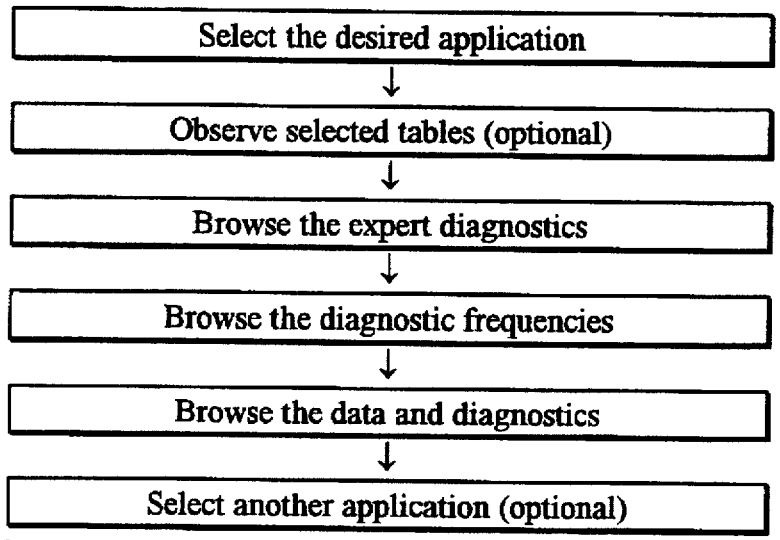

FIG. 10 shows the steps required to use and query an application: (a) Select the desired application. Use command File—Open Application. (b) Observe selected tables (optional). Observe selected tables from the application's database (5+7+9). This is optional. The user will do it only if he/she wants to. (c) Browse the expert diagnostics. Use command View—Diagnostics. Observe or browse the expert diagnostics, for example, to understand the general condition of the firm. (d) Browse the action categories. Use command View—Action Categories. Observe or browse the diagnostic frequencies classified by appropriate triggers and actions, according to the user preferences. Observe or browse the diagnostics trying different trigger and action combinations (action1, action2, action3, action4, action5) to identify the original data related to key diagnostics. (e) Browse the data and diagnostics. Use command View—Data. Observe or browse the original data for a final review, since this is the option closest to traditional report-analysis methods. (g) Select another application (optional). Use command File—Open Application. The view steps outlined above may be executed in any order, together with View EIS, to look at the data and diagnostic in the typical graphical mode of an Executive Information System.

Figure 11:
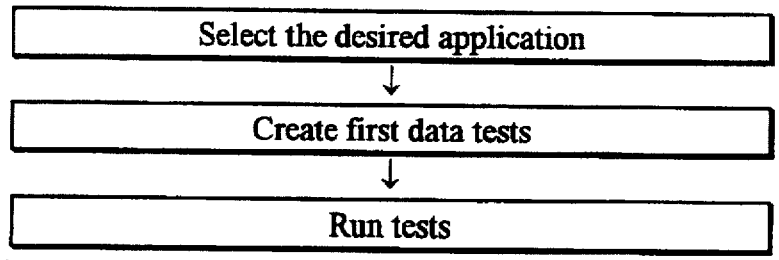

FIG. 11 shows the steps required to create an application: (a) Select the desired application. Use command File—Open Application. (b) Create first line tests. Use command Edit—Tests—Data Tests. Create the first data tests for a simple application. (c) Run tests. Use command Tools—Generate Diagnostics. Run all tests for the set of periods desired.

Figure 12:
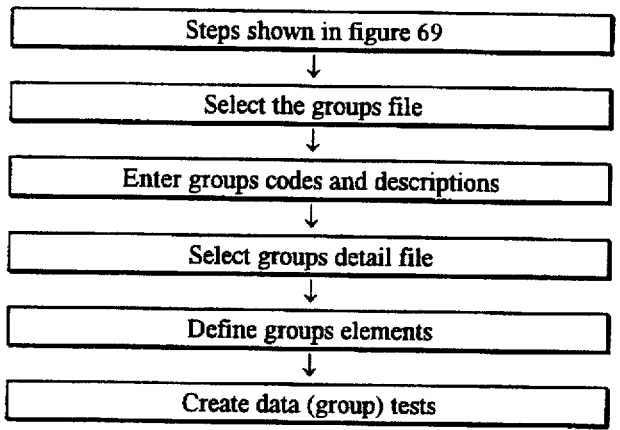

FIG. 12 shows the steps required to create an application with group tests. In practice, the user may simply execute command Edit—Groups and this simple command will do all required steps automatically. However, all the detailed steps, if done by hand, are: (a) Follow steps shown in FIG. 11: steps to create an application. (b) Select the groups file. Use command Edit—Database Files—Groups A. Select the groups database file, group.dbf. (c) Add records to enter groups codes and descriptions. Enter the codes and descriptions for all lines and data items groups the user wishes to create to later operate with group formulas. (d) Select groups detail file. Use command Use command Edit—Database Files—Groups B (this selects file detail.dbf). (e) Define groups elements. Enter the identifiers for all data database's lines and data items belonging to each group recently defined. (f) Create data tests with groups. Use command Edit—Tests—Data Tests—these tests also act like group tests—. Create any group tests desired.

Figure 13:
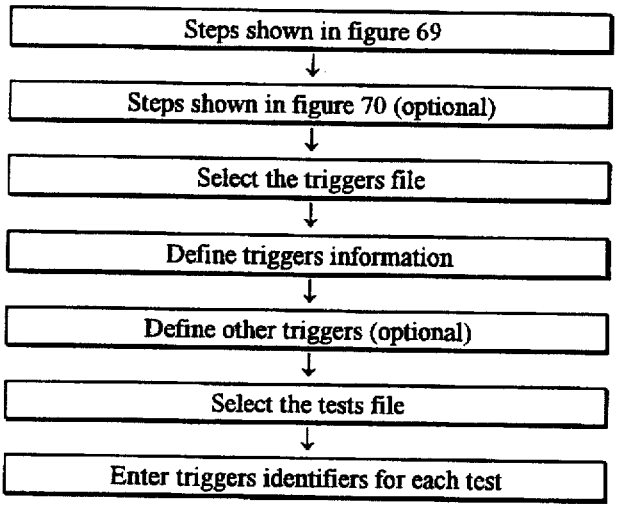

FIG. 13 shows the steps required to create an application with group tests and triggers: (a) Follow steps shown in FIG. 11: steps to create an application. (b) Now, follow steps shown in FIG. 12. optional steps to create an application with group tests. (c) Select the triggers file. The final user shouldn't bother with this, since the invention incorporates a command that allows him to automatically define triggers and actions in just one step. This is command Edit—Categories Picklist. However, if anyone wanted to do this by hand, and in order to make the whole process more clear, these are the detailed manual steps using an xbase database programming language: Use command File—Open database and select the triggers and actions database file, for example, file action1.dbf. (d) Define triggers information adding new records in file action1.dbf. Define all codes and descriptions for the triggers and actions (action1) that you will use in the application (for example, strengths and weaknesses, high and low priorities, departments, responsible persons). (e) Define other triggers and actions (optional). Replicate the procedure followed for file action1, with action2 (file action2.dbf), action3, action4, and action5 (file action5.dbf). (f) Select the tests file. Use command File—Open database (test.dbf). (g) Enter triggers identifiers for each test. Add records to file test.dbf and enter all codes (identifiers) for those triggers and actions that were defined (action1, action2, action3, action4, action5), and for each test created.

Figure 14:
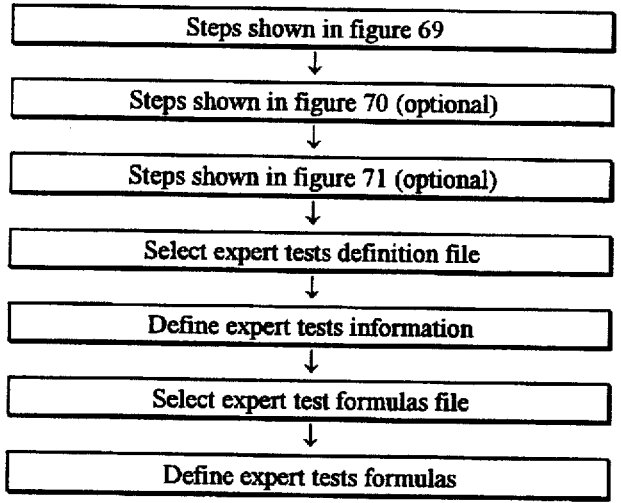

FIG. 14 shows the steps required to create an application with expert tests and diagnostics: (a) Follow steps shown in FIG. 11: steps to create an application. (b) Now, follow steps shown in FIG. 12: optional steps to create an application with group tests. (c) Then, follow steps shown in FIG. 13: optional steps to create an application with group tests and triggers. (d) Select expert tests definition file. Use command File—Open database. Select the expert tests definition database file (diag.dbf). (e) Define expert tests information. Add records and define codes and descriptions for all expert tests in file diag.dbf. (f) Select expert test formulas file. Use command File—Open database (diag.fpt) and define the expert test formulas. All these steps and even more (defining a whole group of applications and defining an executive information system) may be easily executed by a user by simply following the invention's available menu options under main menu's command "Edit". These commands are: Edit—Applications Picklist, Executive Information, Data, Categories Picklists, Groups, Tests, Database files. The last command isn't necessary, this is just for advanced users who want to edit or modify their data manually, with total control of information.

Simplified Screens and Their Components

FIGS. 15 to 20 show the invention's SIMPLIFIED SCREENS AND THEIR COMPONENTS.

FIG. 15 shows a screen where four simultaneous browse views are shown. Here each browse view is the result of a particular BROWSE command from the Microsoft Fox-Pro™ development language by Microsoft Corporation of Redmond Wash. Each browse view is shown in a window in the screen. The four browse views mentioned are identified in the figure by the rifles: "1 expert window" (68), "2 actions window" (69), "3 diagnostics window" (70), "4 data window" (71). There are also two more screen elements, called "filter dialog box" (73) and "text window" (72). In order not to be forced to navigate through all diagnostics or all through data in each browse view, the user may activate the filter dialog box (73) and select which particular records he will limit the search to. The program filters data using an AND combination of all selected fields.

FIG. 16 shows how the screen shown in FIG. 15 would work when controlling all operations from the data browse. First, the user may resize and position any particular window or windows anywhere in the screen shown in FIG. 15. Any particular window or windows may even be moved out of the screen so they will not show in it. For example, if the user selects the "4 data window" window (71) by use of some pointing mechanism in FIG. 15, and if he moves out of the screen all windows except for windows "3 diagnostics window" (70) and "4 data window" (71), the program will then operate in the manner shown in FIG. 16. That is, the user may scroll through the data and the associated diagnostics will appear on window "3. diagnostics window" (70). FIG. 16 shows the data table in the upper half of the screen. By moving with the cursor, the user can move over the data table's contents. The lower half of the screen shows a listing of those diagnostics associated to the data item selected by the cursor at any time. This is the most convenient browse option to use when the user prefers to look at his original firm's data, and looking at the associated diagnostics at the same time. In FIG. 16, the cursor is positioned on '101.53', a data item (12) representing the value of 'Current Liabilities ($)' for September, 1993. As shown, the user may select, with the cursor, any individual data item in the data database (5). The cursor's current position is signaled on the screen by the underline and highlight. Two diagnostics that correspond to that particular data item are shown on the lower part of the screen.

FIG. 17 shows how the screen shown in FIG. 15 would work when controlling all operations from the diagnostics browse. If the user selects the "3 diagnostics window" (70) window by use of some pointing mechanism in FIG. 15, and if he moves out of the screen all windows except for windows "3 diagnostics window" (70) and "4 data window" (71), the program will operate in the manner shown in FIG. 17. FIG. 17 shows the diagnostics in the upper half of the screen. By moving with the cursor, the user can move over the diagnostics. The lower half of the screen shows the data item associated to the diagnostic selected by the cursor at any time. This is the most convenient browse option to use when the user prefers to look at the diagnostics, but when it's also important to know where these diagnostics have come from. Also, this browse view is appropriate when there are lots of data and not too many diagnostics to look at.

FIG. 18 shows how the screen shown in FIG. 15 would work when controlling all operations from the actions browse window. If the user selects the "2 actions window" window (69) by use of some pointing mechanism in FIG. 15, and if he moves out of the screen all windows except for windows "2 actions window" (69) and "3 diagnostics window" (70), the program will operate in a manner similar to that described in FIG. 18.

FIG. 18 shows, in the upper half of the screen, the main diagnostics actions. These correspond to the summary description's triggers and associated actions data tables (23, 24). The lower half of the screen shows the diagnostics corresponding to the action selected by the cursor at any time. This is the most convenient browse option to use when the user prefers to define priorities, actions, individual persons' responsibilities, or any other classification of diagnostics according to actions categories as defined by the user.

FIG. 19 shows how the screen shown in FIG. 15 would work when controlling all operations from the expert diagnostics browse window. If the user selects the "3 expert window" window (70) by use of some pointing mechanism in FIG. 93, and if he moves out of the screen all windows except for windows "1 expert window" (68, which may also be called "expert diagnostics window") and "3 diagnostics window" (70), the program will operate in a manner similar to that described in FIG. 19. FIG. 19 shows a sample screen of the best embodiment's summary browse view. By definition, in the invention an expert diagnostic is written into the diagnostics database only when a logical test performed on the condition of individual diagnostics turns out to be TRUE. For example, an expert test may verify that sales and profits have gone down and costs have gone up for five different products, and would tell the manager that there's a crisis with the financial margins' of the firm. This browse view shows, in the upper half of the screen, those expert tests that turned TRUE. By moving with the cursor, the user can move over the expert diagnostics. The lower half of the screen shows the individual diagnostics corresponding to the expert diagnostic selected by the cursor at any time. This is the most convenient browse option to use for looking at the overall picture according to the diagnostics.

FIG. 20 shows a slightly different arrangement. The text window is the same window shown at the lower right corner of FIG. 20. This last window shows the full text of the description of a particular selected diagnostic. Browse screens may optionally show a more detailed description corresponding to the diagnostic selected by the cursor, as shown in FIG. 20. In this figure, the screen shows a longer description of the diagnostic selected by the cursor at any time.

Menu Structure

In general, FIGS. 21 to 26 show the preferred embodiment's implementation MENU STRUCTURE.

Figure 21:
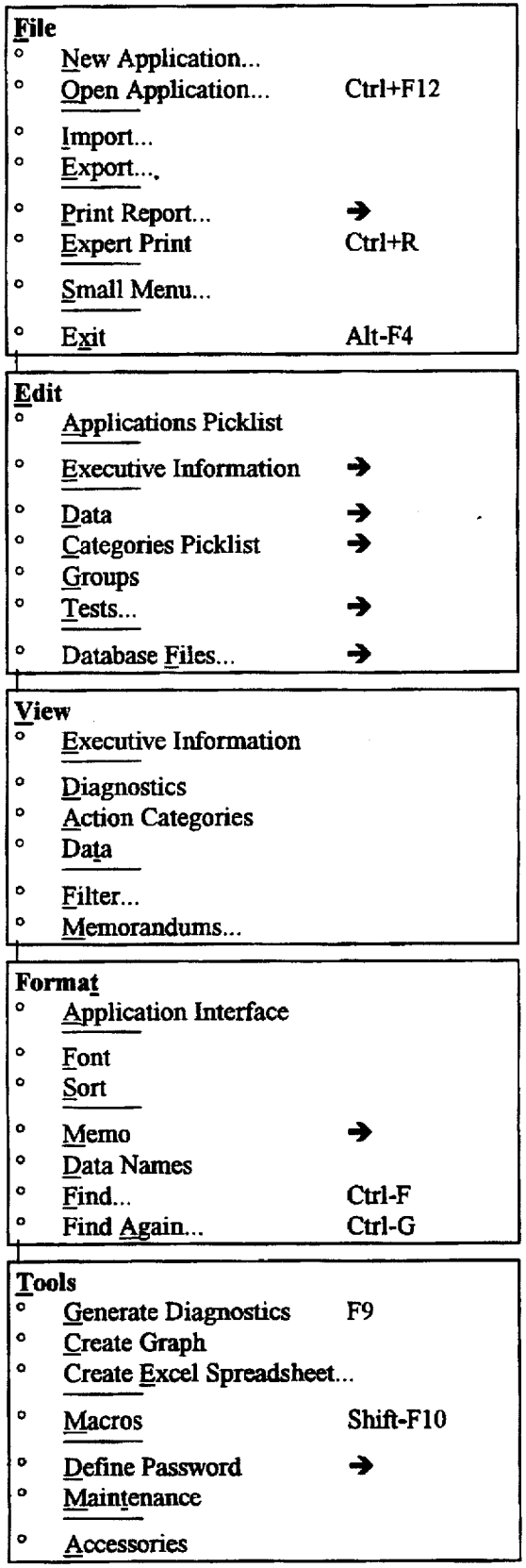

FIG. 21 shows the preferred embodiment's implementation menu structure for the most important options, and only to the first level of the menu. The File menu contains options to select an application and which files he will operate on, importing data from other applications and exporting it back to them, and printing options. The Edit menu contains options to observe, modify and add information in the EIS, the tests and diagnostics, or any other individual database. The View menu contains options to execute any previously defined EIS application and for querying the diagnostics database and the data database in a coordinated manner. The Format menu contains options to modify any displayed elements in the screen. The Tools menu contains options for the generation of all diagnostics, generation of the EIS screens, index files, other maintenance operations, password and security options, options for the selection of the initial period.

FIG. 22 shows the preferred embodiment's implementation menu structure for all levels of the File Menu.

FIG. 23 shows the preferred embodiment's implementation menu structure for all levels of the Edit Menu.

Figure 24:
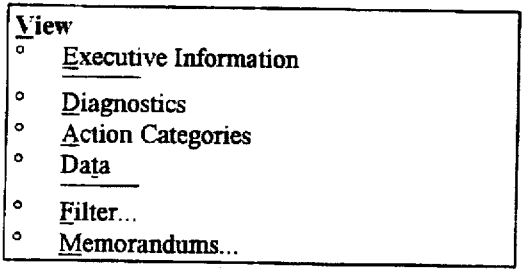

FIG. 24 shows the preferred embodiment's implementation menu structure for all levels of the View Menu.

Figure 25:
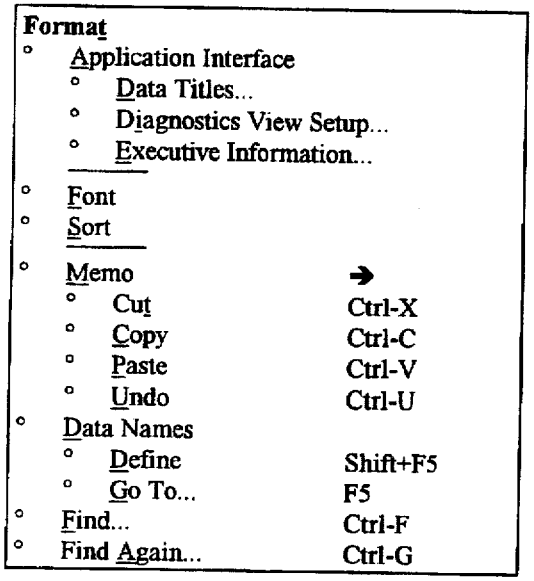

FIG. 25 shows the preferred embodiment's implementation menu structure for all levels of the Format Menu.

Figure 26:
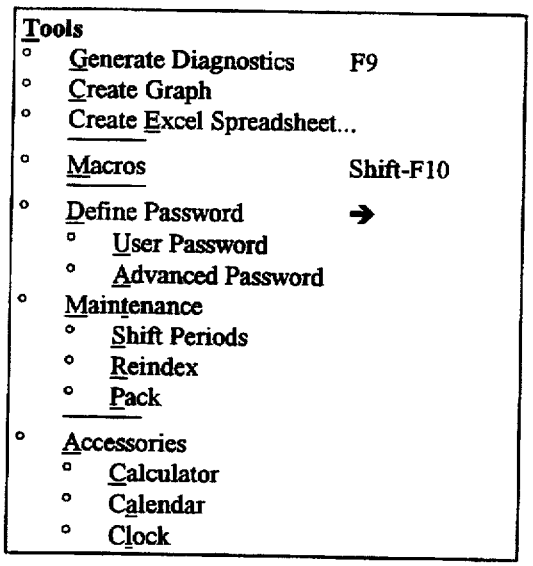

FIG. 26 shows the preferred embodiment's implementation menu structure for all levels of the Tools Menu.

Selected Screen Snapshots of a Finished Sample Application

In general, FIGS. 27 to 64 30 and 48 to 64 show SELECTED SCREEN SNAPSHOTS OF A FINISHED SAMPLE APPLICATION execution under the invention. FIGS. 27 to 30 and 48 to 64 show the way the application looks like when it's already finished and the data and diagnostics are being queried by the user. FIGS. 31 to 47 show how the user may work with the invention in order to create or modify an application, selecting, creating, defining and modifying any data, tests or diagnostics.

Figure 29:
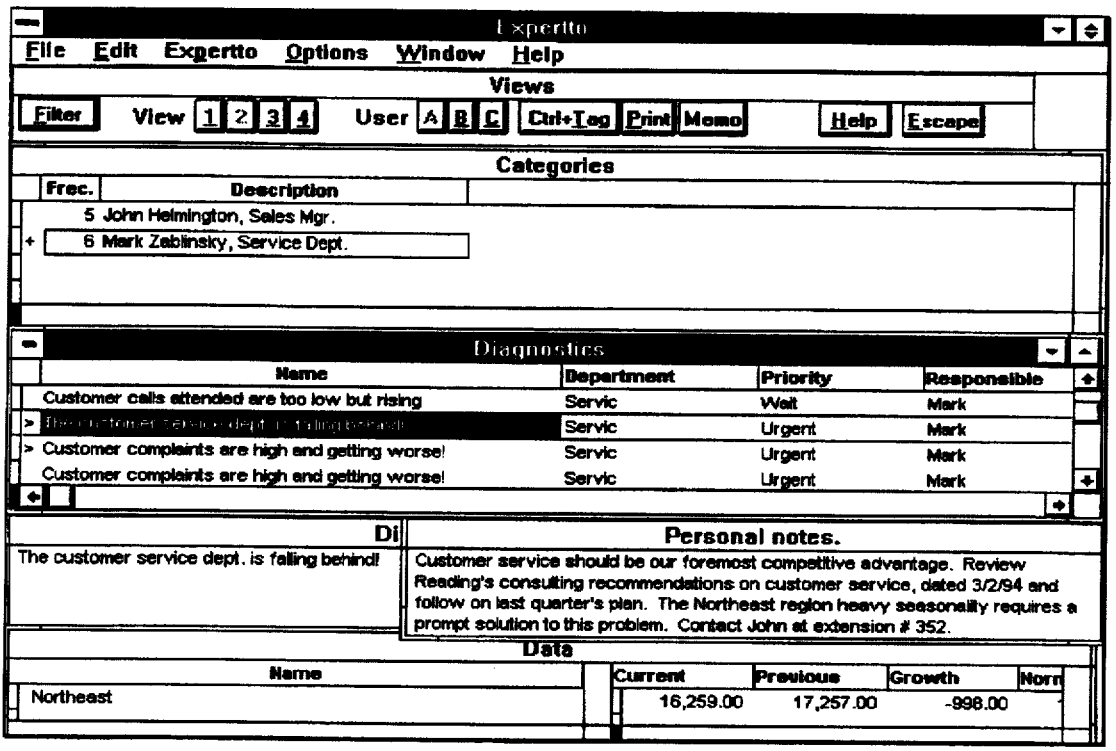

FIGS. 27 to 29 show what could be a few computer program screens in a sample application developed with the invention: a graphical, AI-enhanced EIS—where AI stands for Artificial Intelligence, and EIS stands for Executive Information System.

Figure 30:
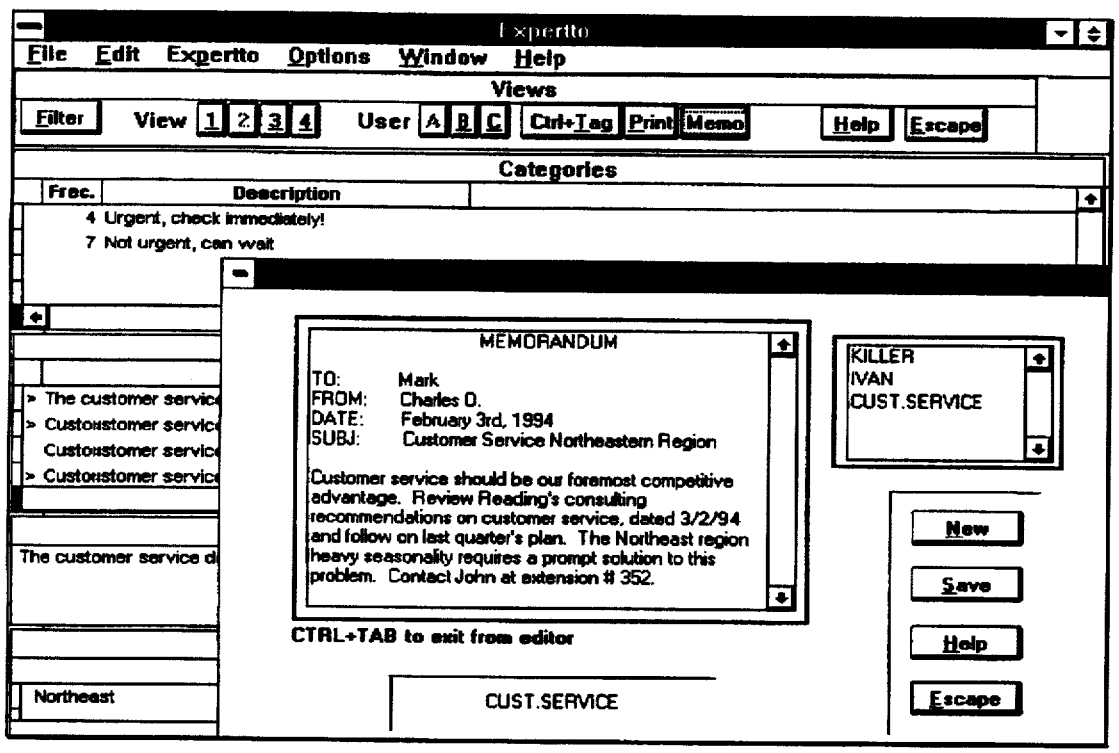

FIG. 30 shows a screen with the memorandums-editing and administrative facilities in the invention.

Figure 31:
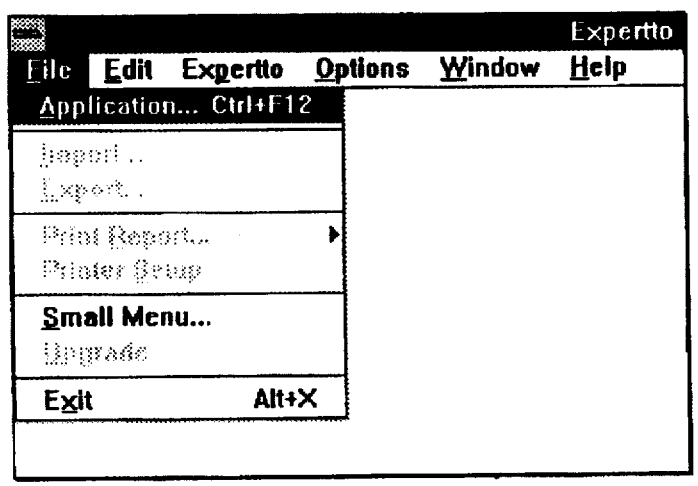

FIG. 31 shows the application menu selection option in the invention.

Figure 32:
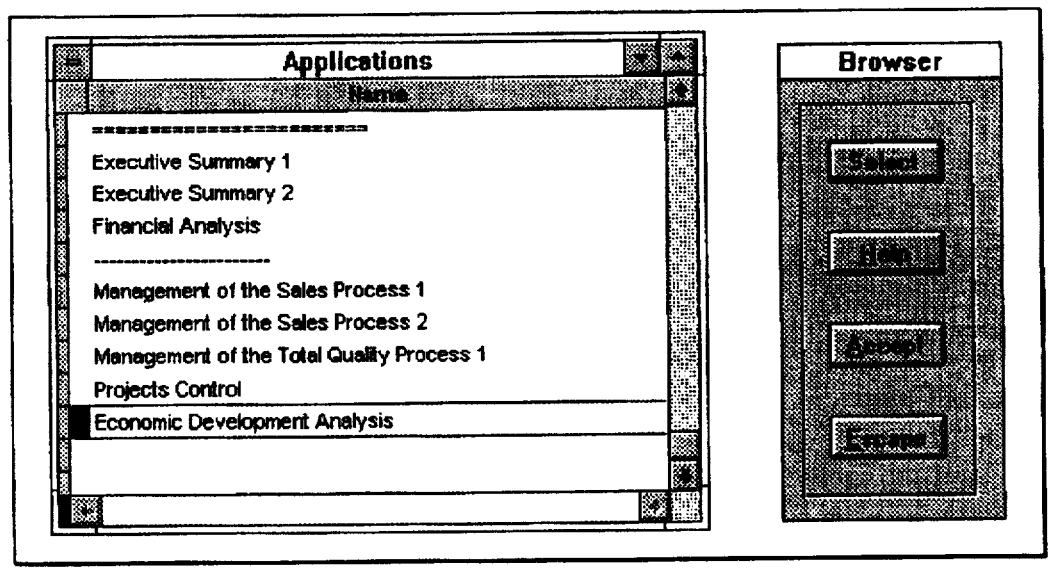

FIG. 32 shows a sample listing of a few possible applications that could be developed with the invention.

Figure 33:

FIG. 33 shows a custom toolbar for easy operation of applications developed with the invention.

FIG. 34 shows the invention's data outline definition facility.

FIG. 35 shows a screen containing a sample listing of data row groups in a particular application developed with the invention. This screen is used to add, modify or delete a data group.

Figure 36:
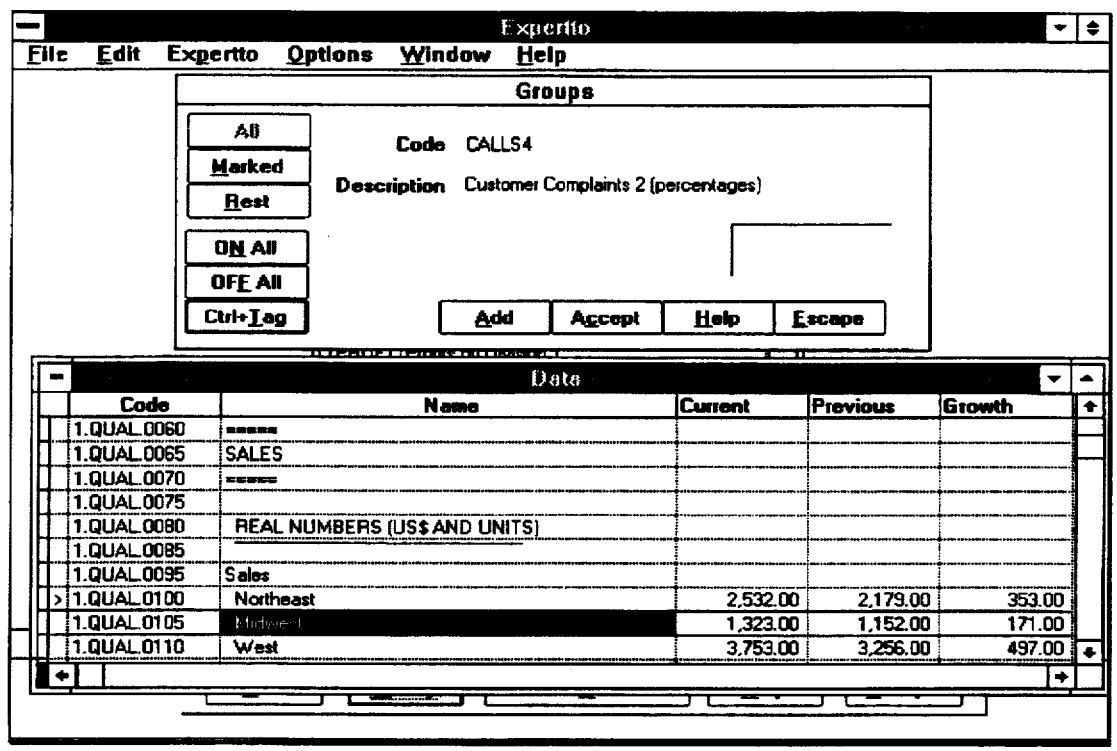

FIG. 36 shows one of the invention's dialog boxes for the definition of data groups in a particular application.

Figure 37:
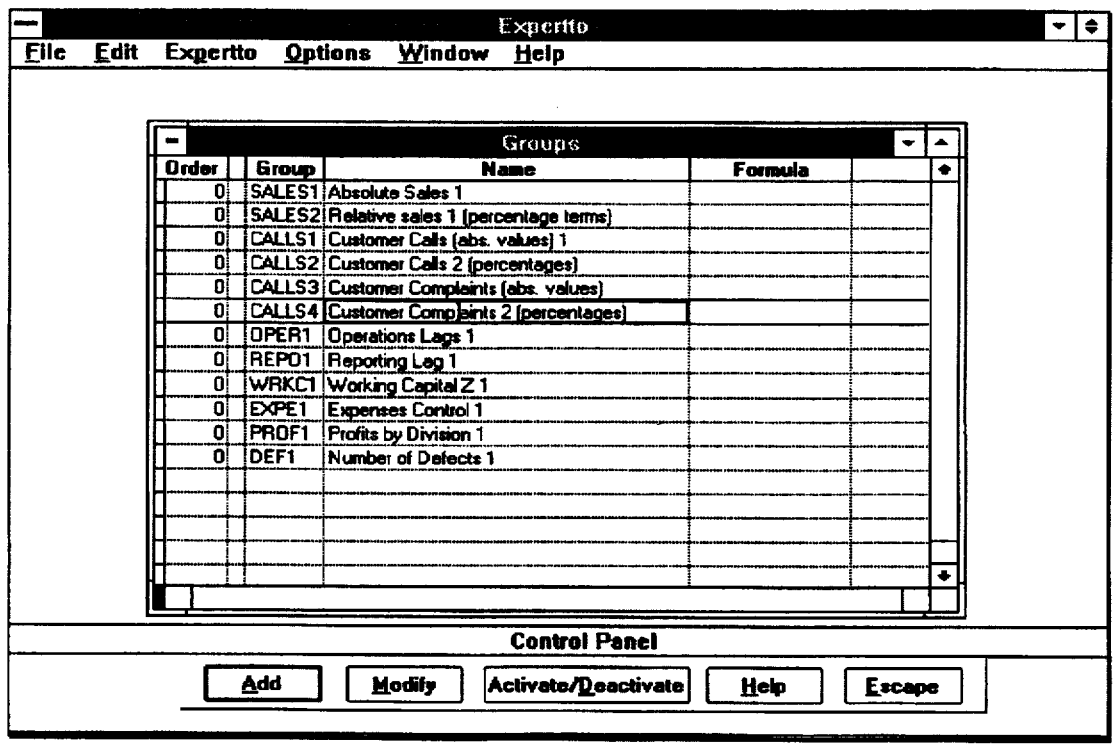

FIG. 37 shows a screen containing a sample listing of data row groups in a particular application developed with the invention. This screen is used to select a data group to apply a data formula on.

Figure 38:
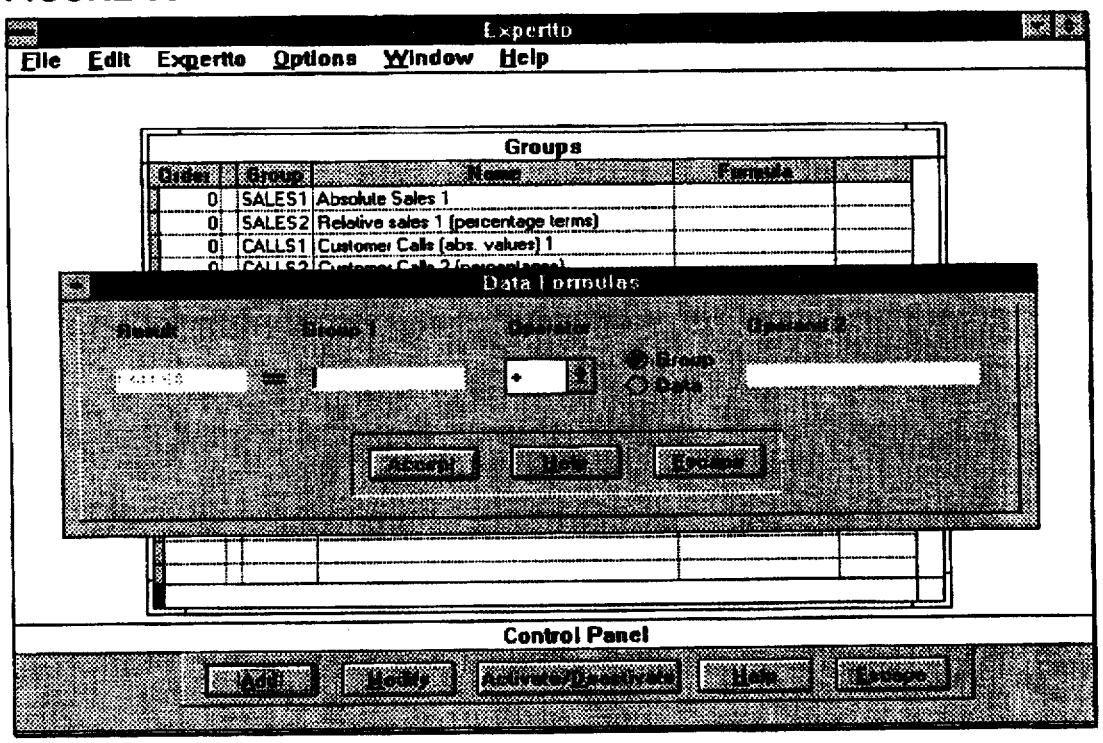

FIG. 38 shows one of the invention's dialog boxes for the definition of data formulas in a particular application.

Figure 39:
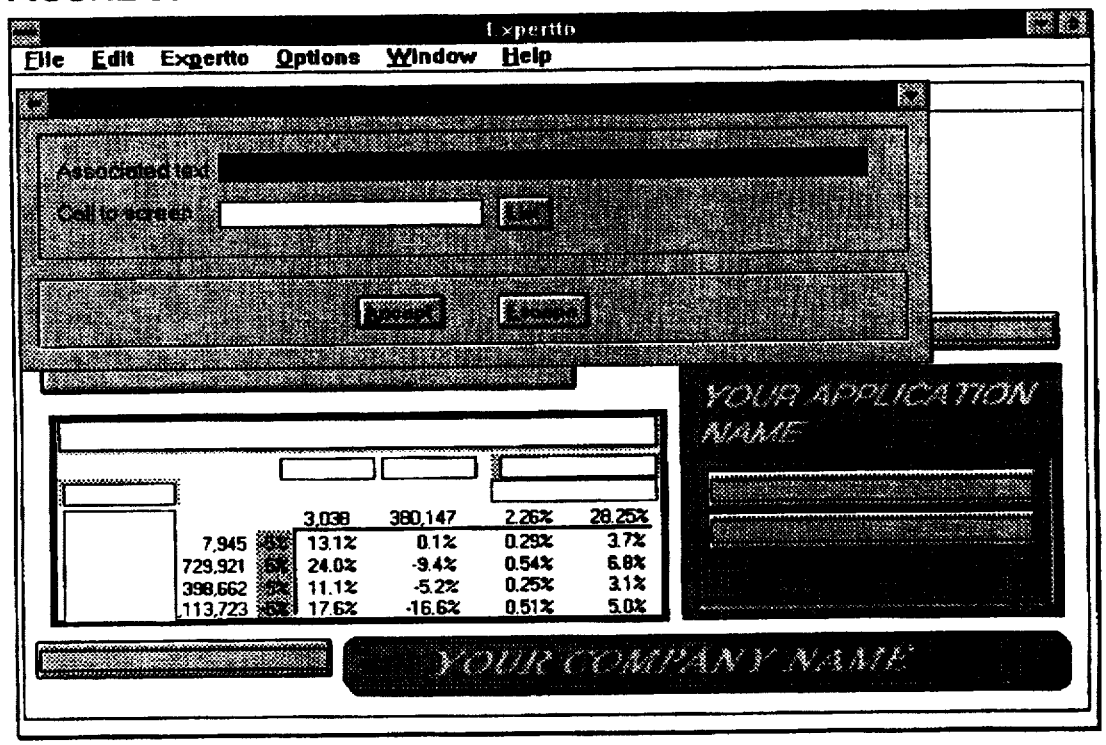

FIG. 39 shows a screen where the user may enter several text descriptions for a graphical EIS screen in a particular application developed with the invention.

Figure 40:
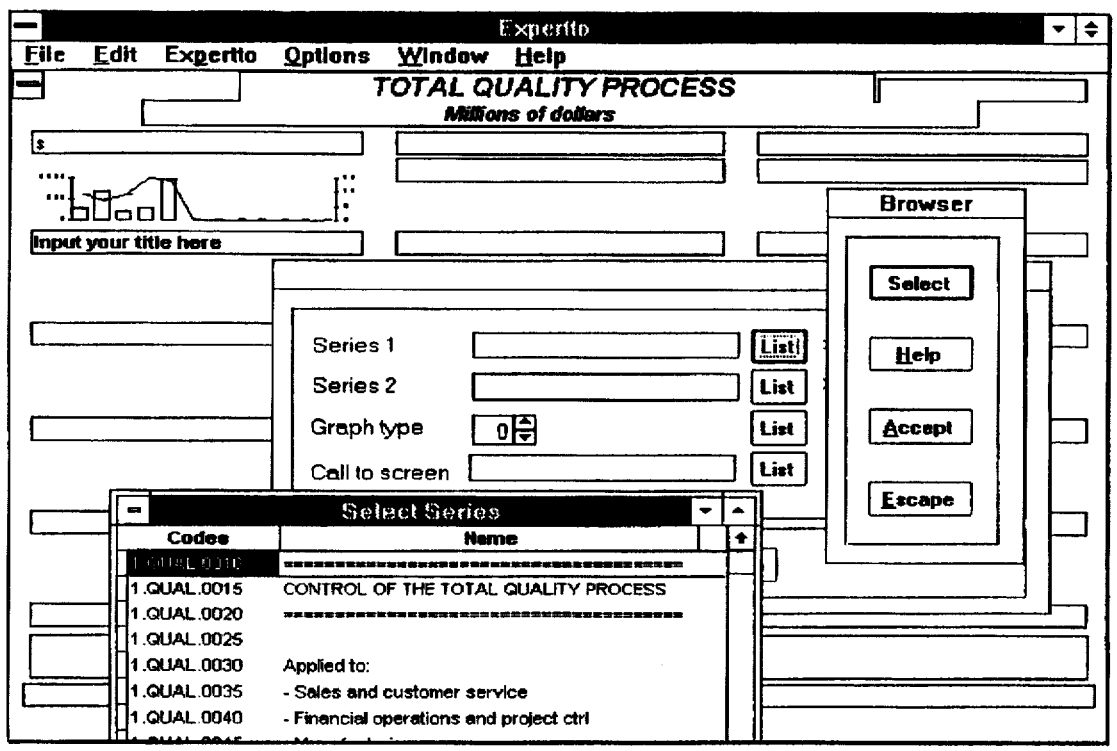

FIG. 40 shows a screen where the user may enter the data and descriptions in order to activate particular graphic charts in a graphical EIS screen in a particular application developed with the invention.

Figure 41:
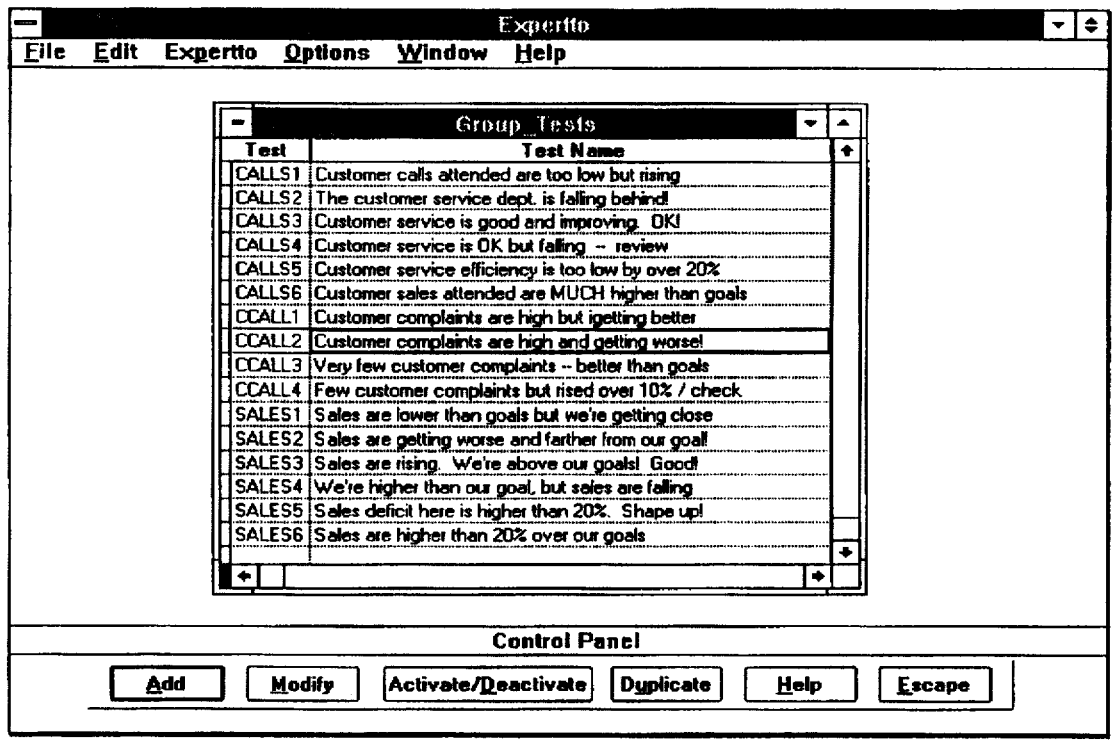

FIG. 41 shows a screen containing a sample listing of data tests (also called data rules) in a particular application developed with the invention. This screen is used to add, modify or delete a data test.

Figure 42:
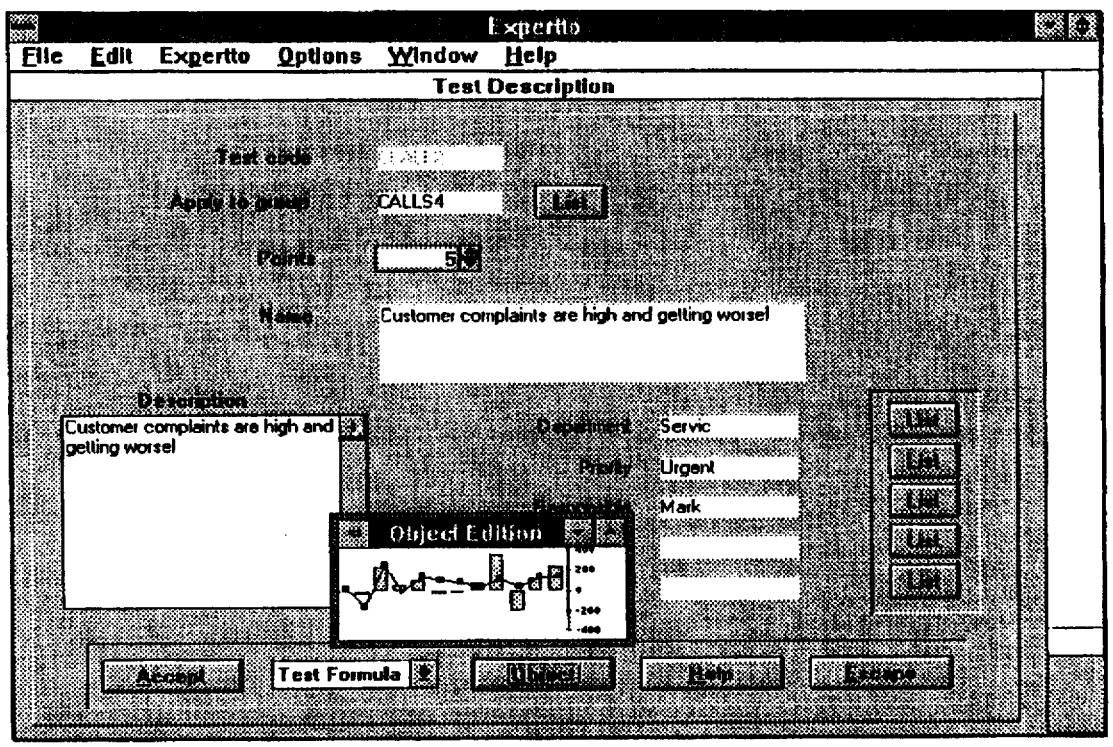

FIG. 42 shows one of the invention's dialog boxes for the definition or modification of data tests in a particular application, where the user may add or modify the messages or packaged objects (graphics, charts, video clips or sound notes) associated to the data test.

Figure 43:
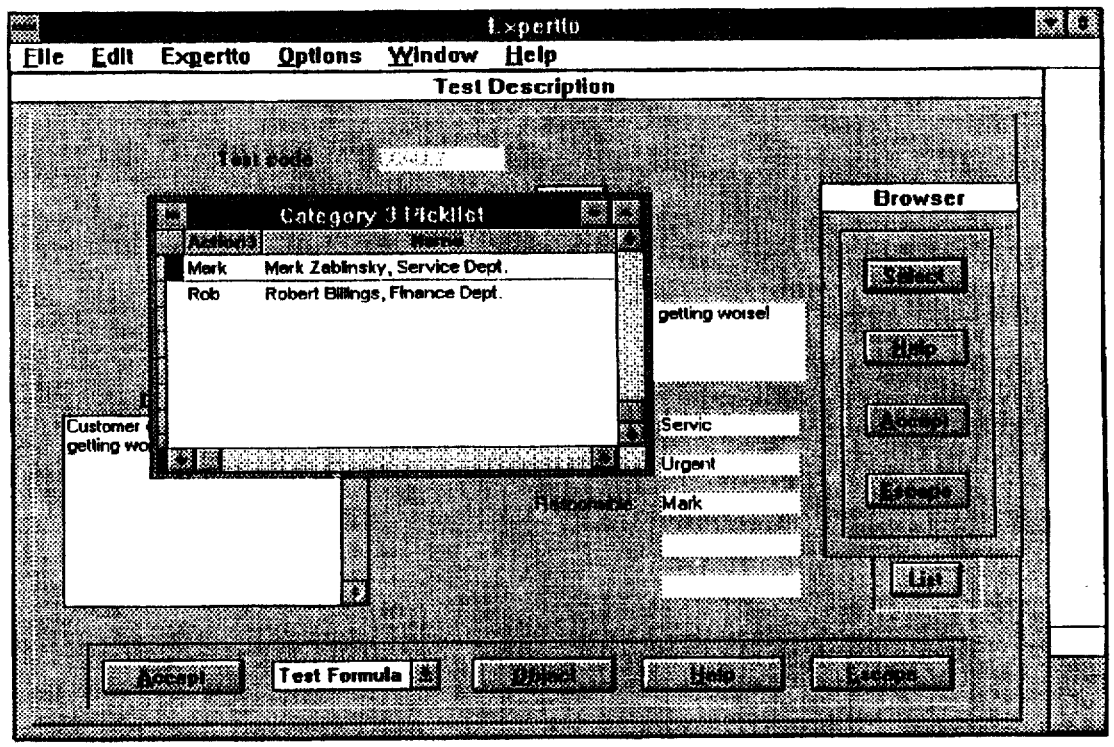

FIG. 43 shows one of the invention's dialog boxes for the definition or modification of data tests in a particular application, where the user may add or modify action categories associated to the data test.

Figure 44:
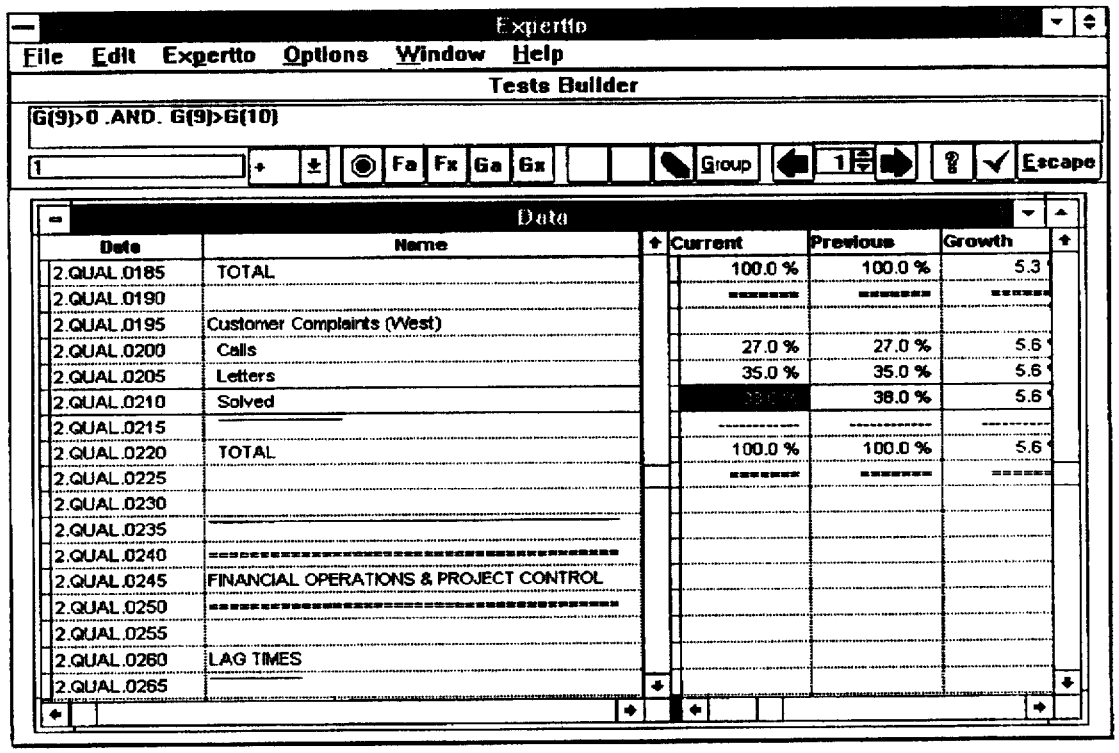

FIG. 44 shows the formula definition screen, where the user may add or modify the expression for each logical condition associated to a particular data test.

Figure 45:
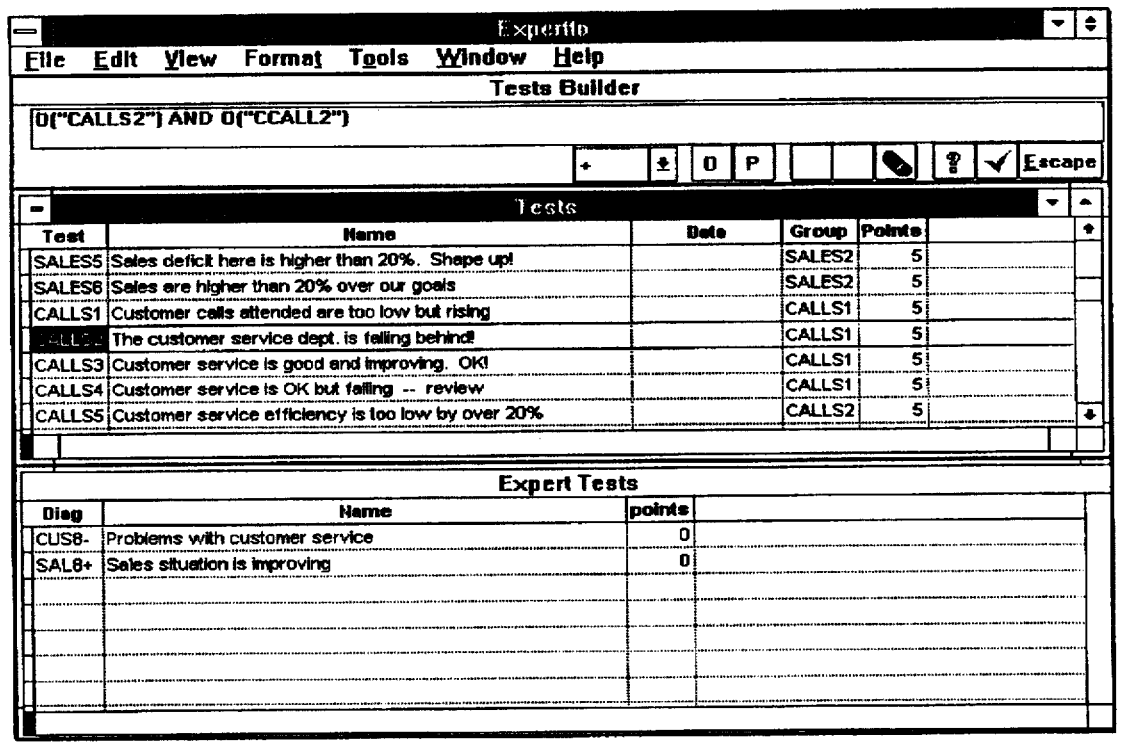
Figure 46:
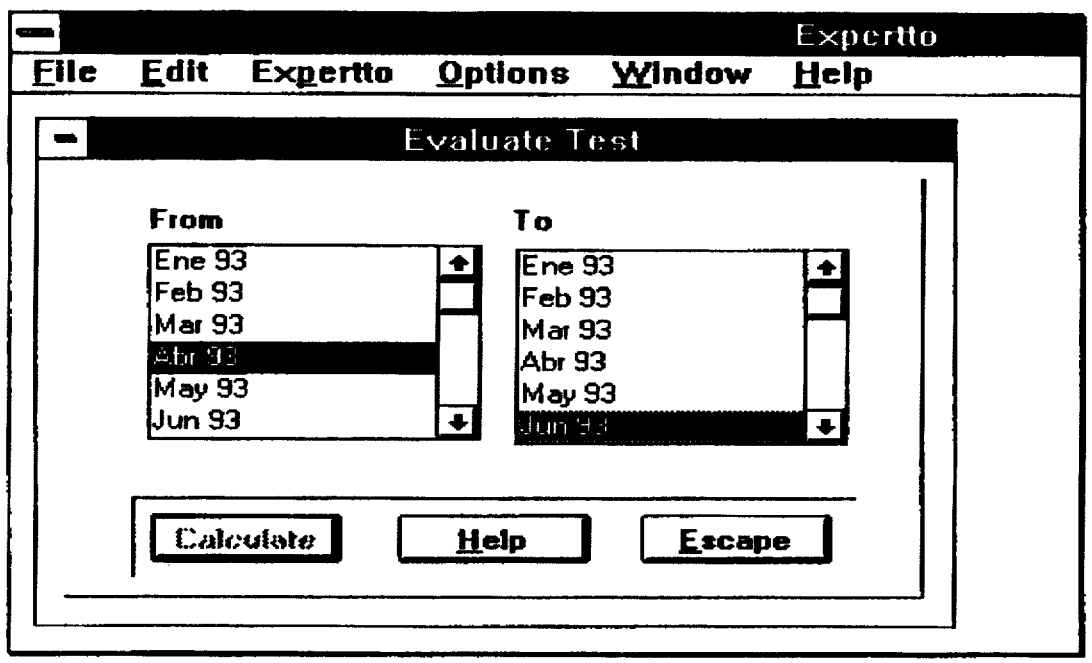

FIG. 45 shows one of the invention's dialog boxes for the definition or modification of expert tests in a particular application FIG. 46 shows one of the invention's dialog boxes for executing the data formulas, data tests and expert tests in a particular application developed with the invention.

Figure 47:
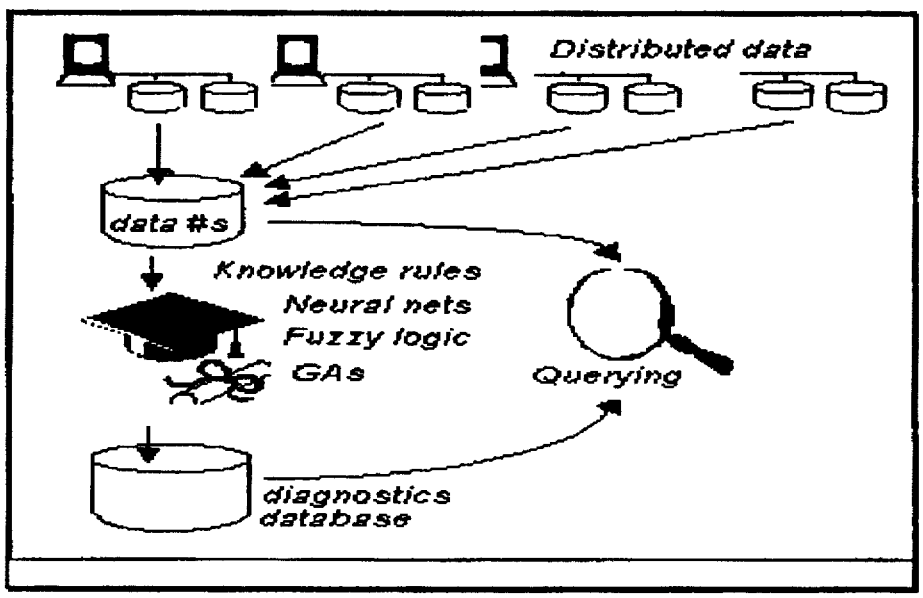

FIG. 47 shows a simplified diagram of the invention's structure and operation: the organization's—i.e., firm or institution—distributed computers and databases, the invention's data database, the expert system with its inference engine, the diagnostics database and the querying and EIS engine. The invention proceeds through three logical stages: First, it creates a data database with information retrieved from different computer sources. Second, through use of an expert system building tool, it generates a diagnostics database. Third, the querying and EIS engine allows users to query these diagnostics databases.

When querying an application, as shown in FIG. 48, the invention includes a user-friendly EIS interface which allows the user to generate reports, create eye-catching graphics, and develop customized help screens so that others in the organization can use and understand these applications. FIG. 48 shows the initial screen for a sample EIS application.

FIG. 49 shows a sample screen of the EIS querying tool enhanced by the diagnostics in the diagnostics database.

Figure 50:
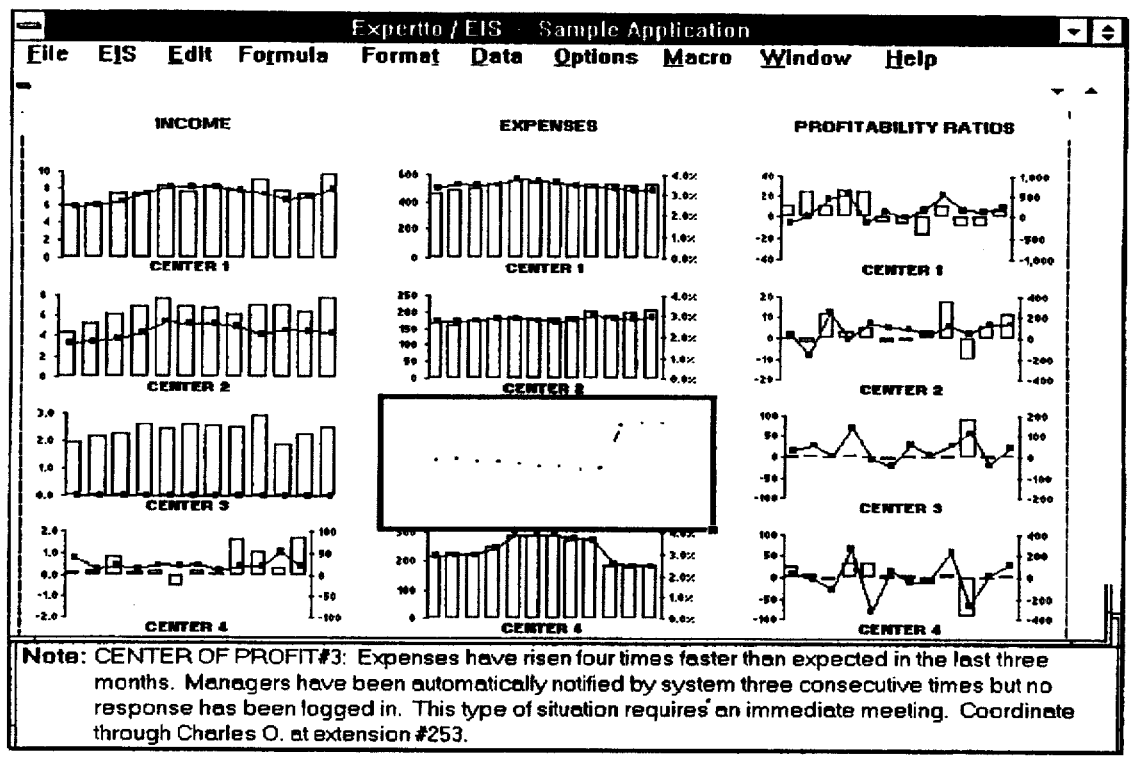

FIG. 50 shows another sample screen of the EIS querying tool enhanced by the diagnostics in the diagnostics database. This also shows a highlighted graph. If the user double-clicks at any particular graph, the invention will show another screen, containing more information related to that particular graph. The invention incorporates downdrilling techniques to navigate through the user's data. While looking at any screen, simply point at the desired graph and a more detailed report relating to the corresponding data will instantly appear on the monitor.

Figure 51:
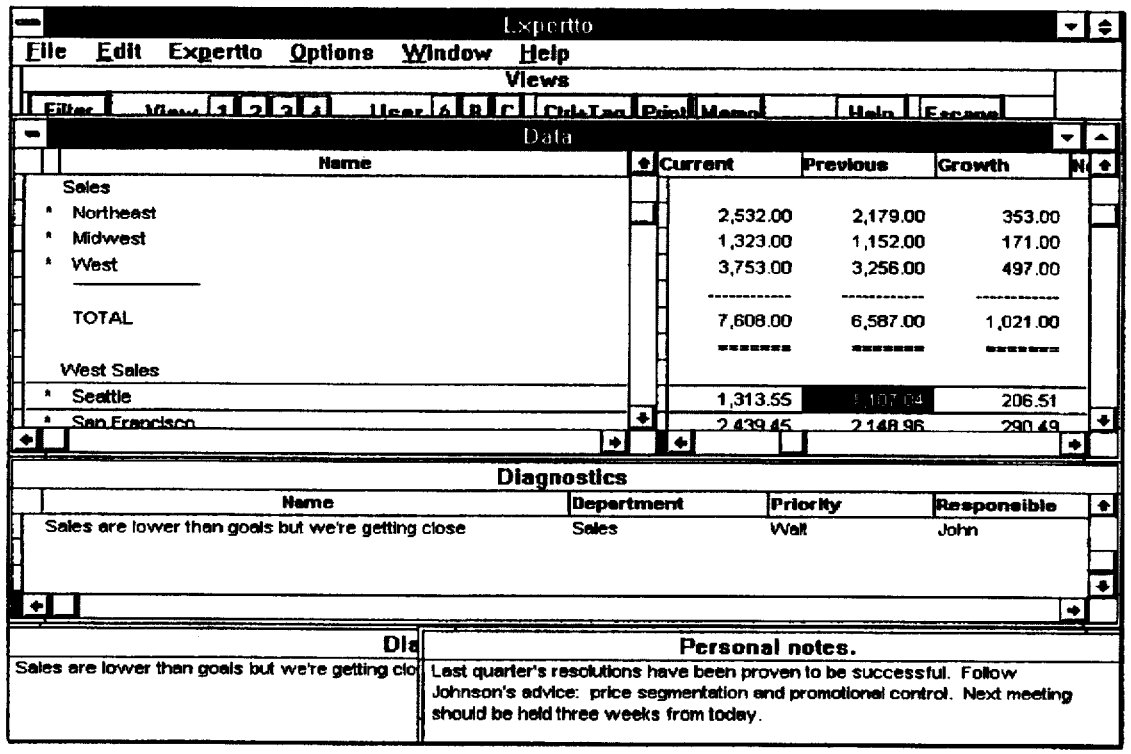

FIG. 51 shows another screen of the querying tool. This screen shows selected data items in the data database, their associated diagnostics, and personal notes by different users.

Figure 52:
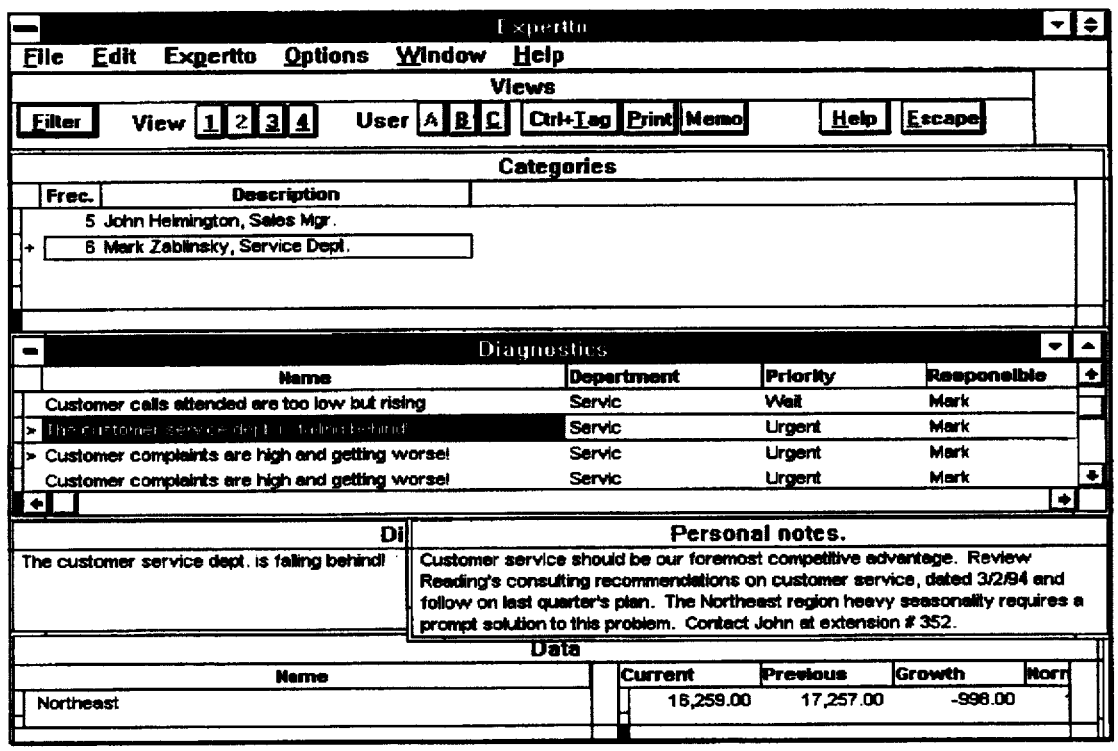

As shown in FIG. 52, the invention gives the user the tools to create, analyze and query specific expert diagnostics in a straightforward manner. To check on Mark Zablinsky's performance, select his name on the list and then, if necessary, prepare and send a memorandum. This is the Action Categories Screen.

Figure 53:
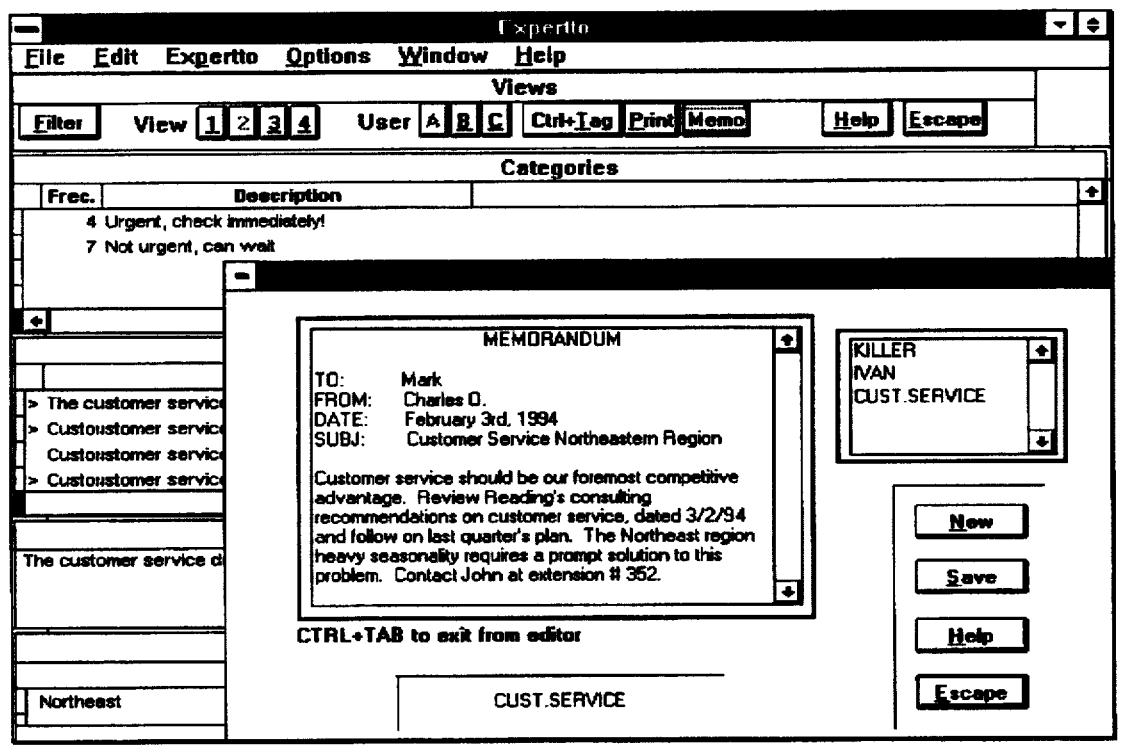

As shown in FIG. 53, users may also write memorandums, and associate them to any particular tests and diagnostics. Whenever any of those particular tests and diagnostics evaluate TRUE, their diagnostics are written into the database and, the invention also prints out the associated memorandums. When using electronic mail services, the memorandums are automatically mailed to the right people in the organization.

Figure 54:
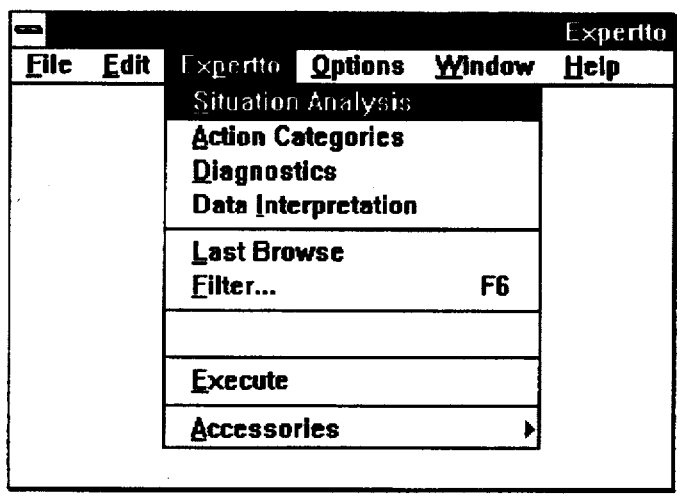

FIG. 54 shows the view menu. This menu presents four alternate ways to look at the data and its associated diagnostics. One of them is the customized EIS interface, which has been already discussed. The other three options let the user easily find any diagnostics associated to the original data. Option DIAGNOSTICS shows diagnostics classified by their higher-level significance (their associated expert diagnostics). Option ACTION CATEGORIES shows diagnostics classified by priorities, departments, persons responsible within the firm, etc. Option DATA shows the original numbers with their associated diagnostics, when applicable.

Figure 55:
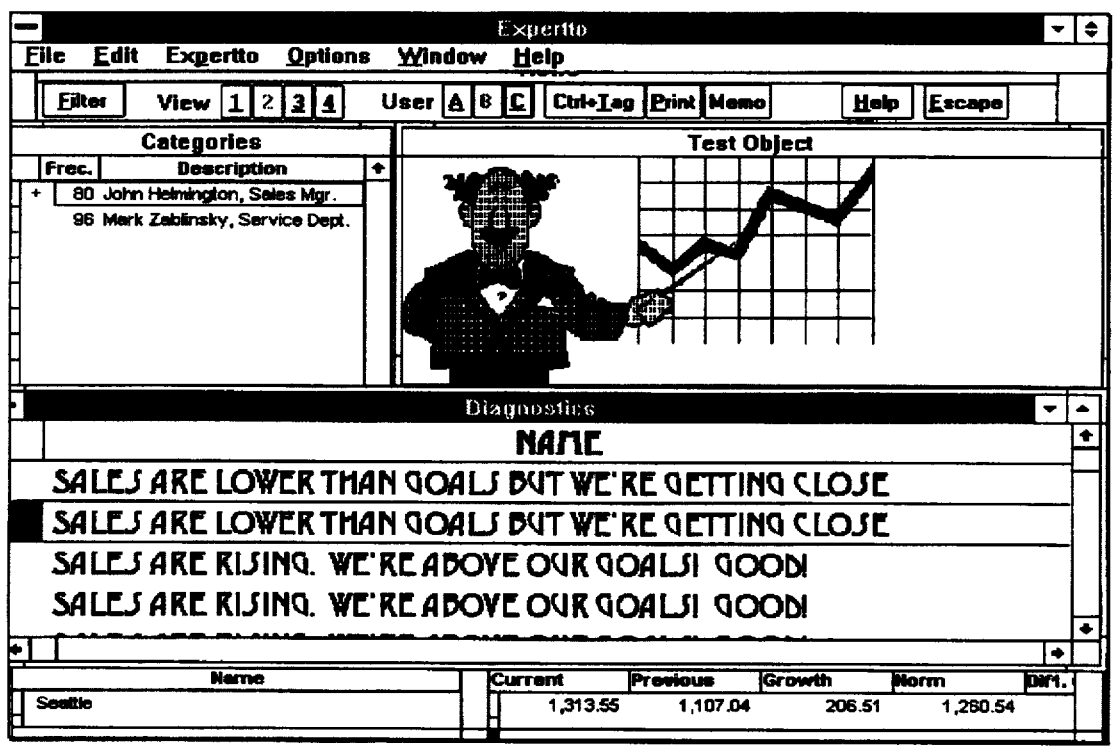

FIG. 55 shows that action categories views are highly customizable. The invention's user interface lets any executive tailor an application to his/her needs. This executive may define customized screens instantly, with specific graphs, messages, personal notes . . . even video clips and sound notes.

Figure 56:
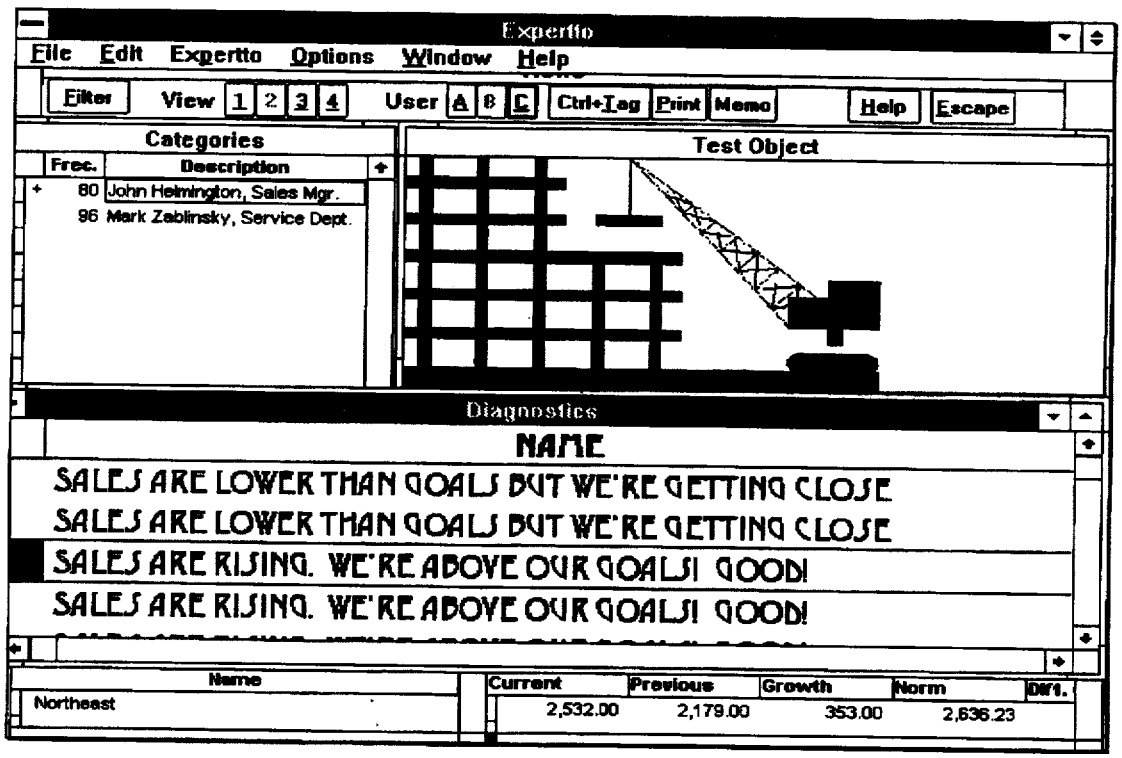

FIG. 56 shows another way to display the user's information. The user may keep creating continuously new ways to look at the user's data and their associated diagnostics.

Figure 57:
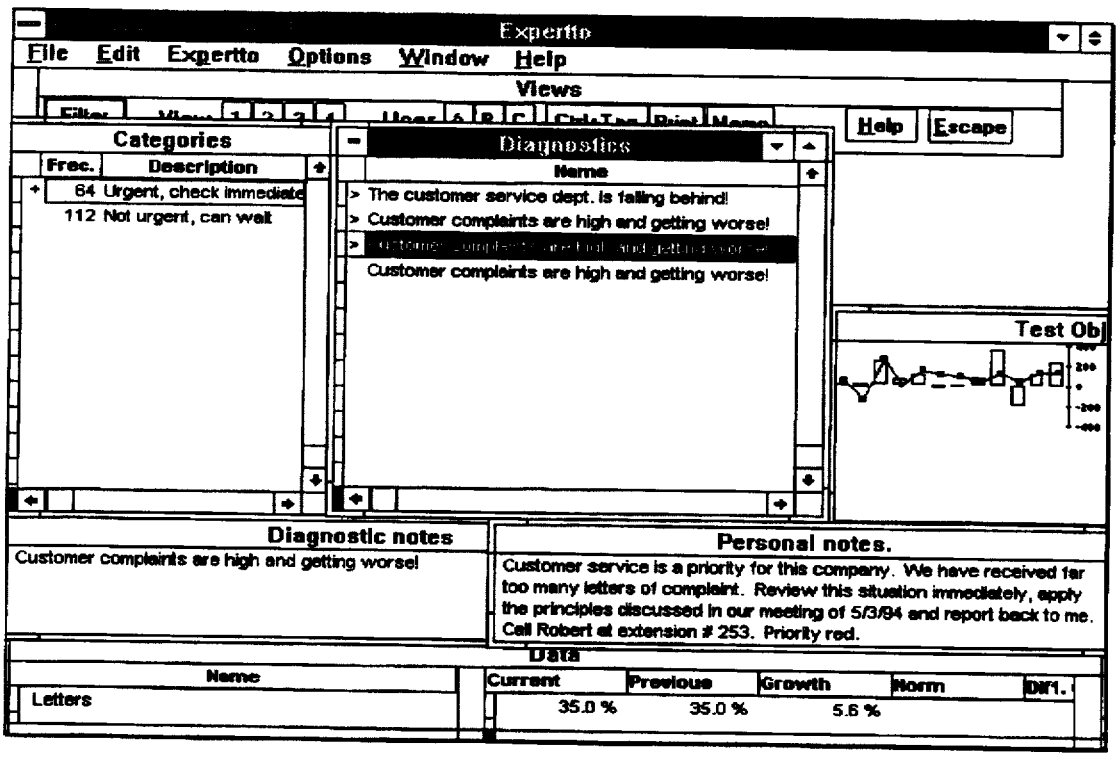

FIG. 57 shows the Action Categories screen where actions represent priority levels. Categories shown at the upper-left corner of this screen represent priorities (urgent, not urgent). When the user points at any user-definable category of his interest, the invention will show the diagnostics and data corresponding to that particular category.

Figure 58:
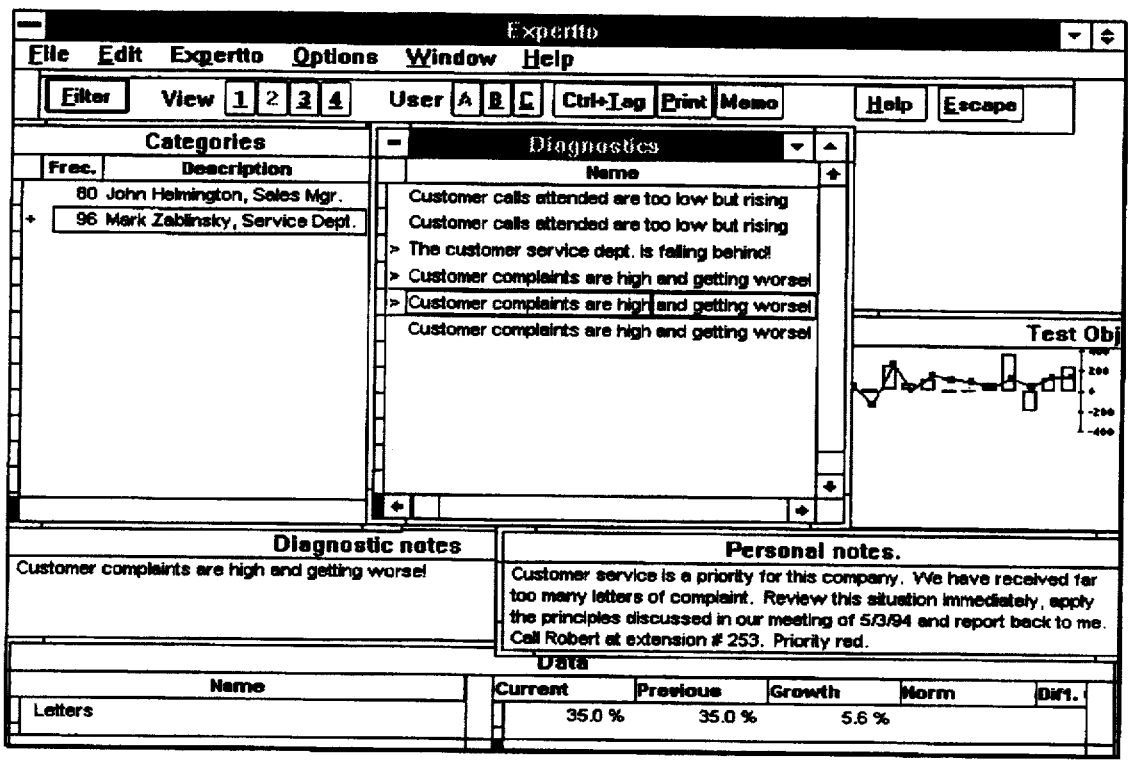

FIG. 58 shows the Action Categories where actions represent persons responsible. In this example, categories shown at the upper-left corner of this screen represent managers, executives, or persons responsible in the firm (John Helmington, Mark Zablinsky).

Figure 59:
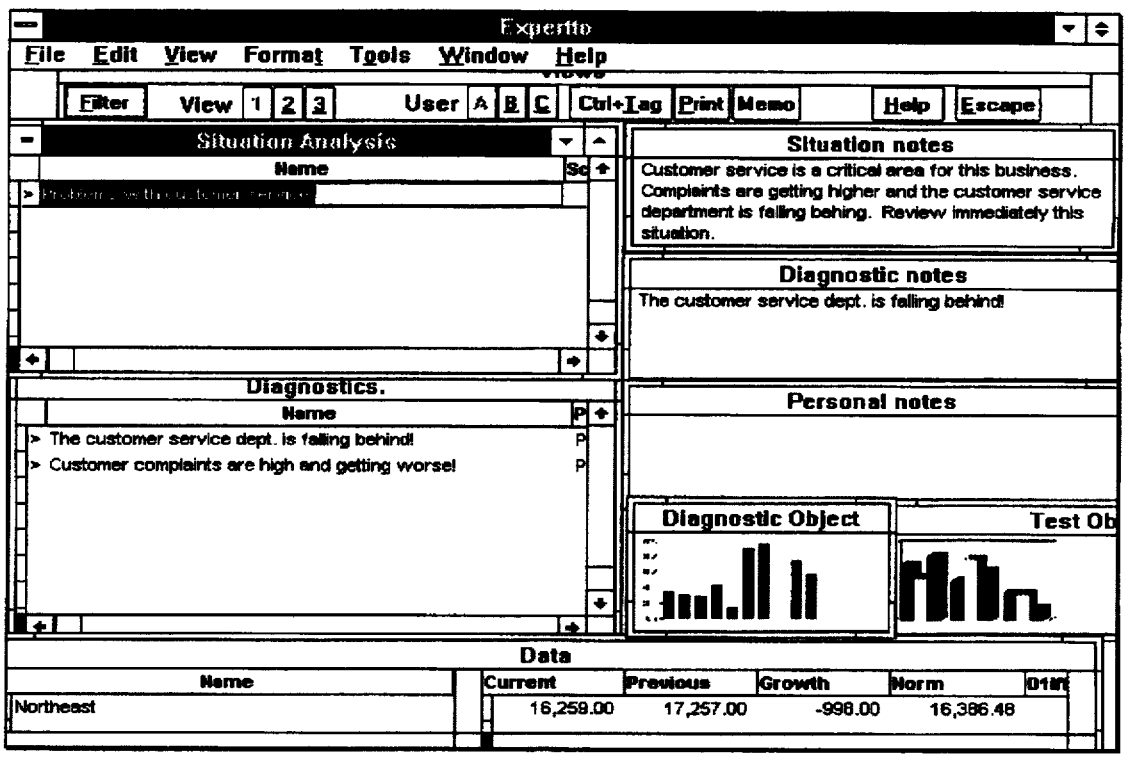

FIG. 59 shows the Diagnostics View. An expert diagnostic turns TRUE when other diagnostics fill a particular condition. For example, an expert diagnostic may signal a simultaneous downturn in sales and profits for five products. The diagnostics view shows a listing of all expert diagnostics with their related diagnostics, data and graphics.

Figure 60:
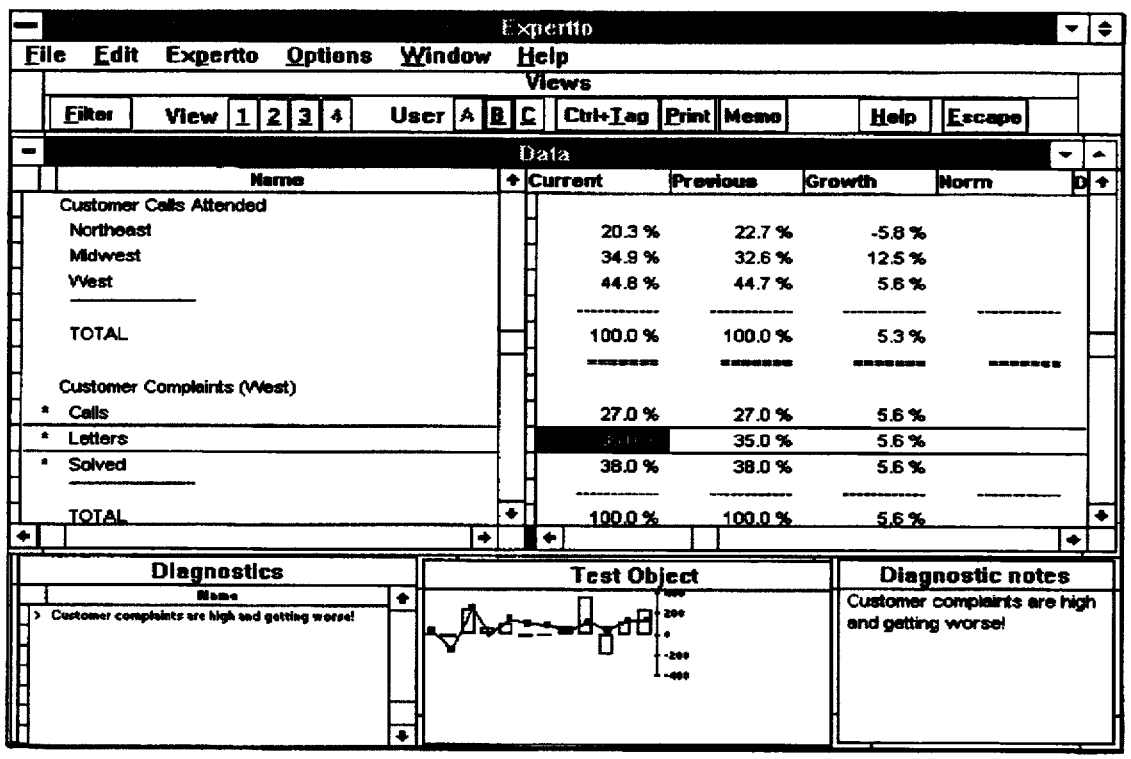

FIG. 60 shows the Data View. The data view lets the user review the original data in the database. When any particular data item is selected, the invention also shows its associated diagnostics, if available, and the corresponding messages, charts and graphics.

Figure 61:
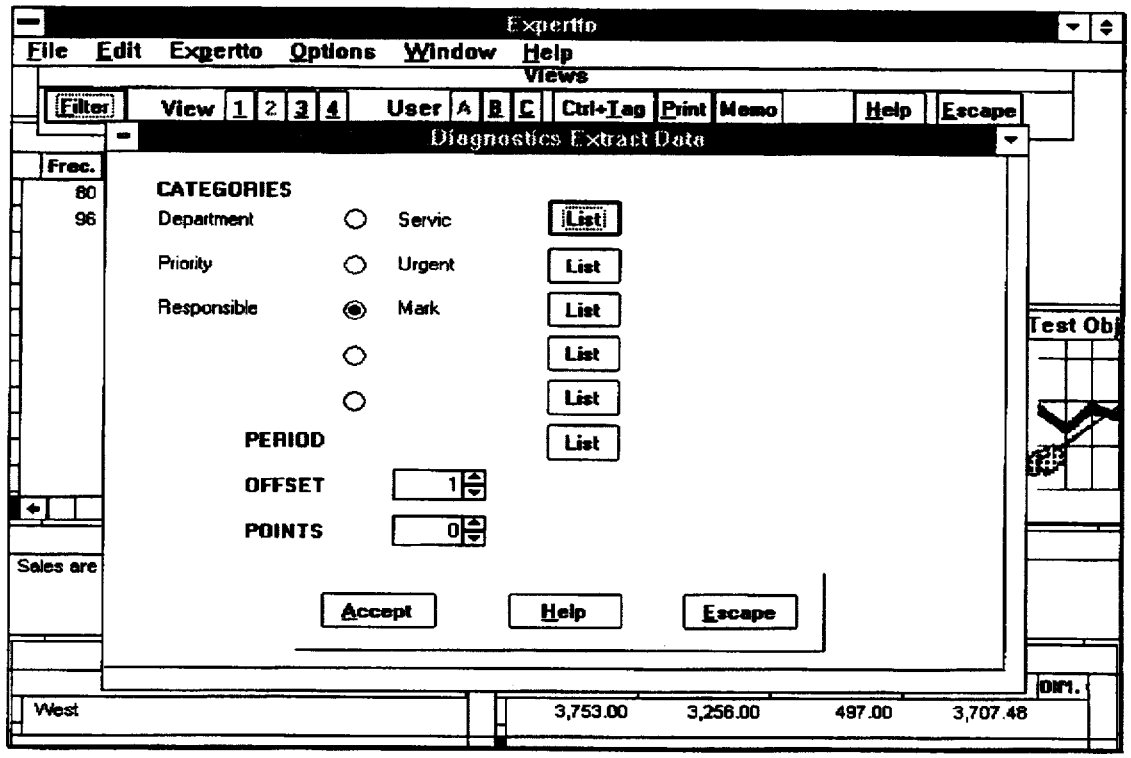

FIG. 61 shows the Query Options dialog box, also called Filter dialog box throughout this document. This option should be used to: (a) generate selected EIS screens for a particular time period or set of products and companies, (b) select a particular action category to review—such as a particular person in the organization—, (c) review those diagnostics whose fuzzy value is larger than a preset value, according to user preferences and responsibilities.

Figure 62:
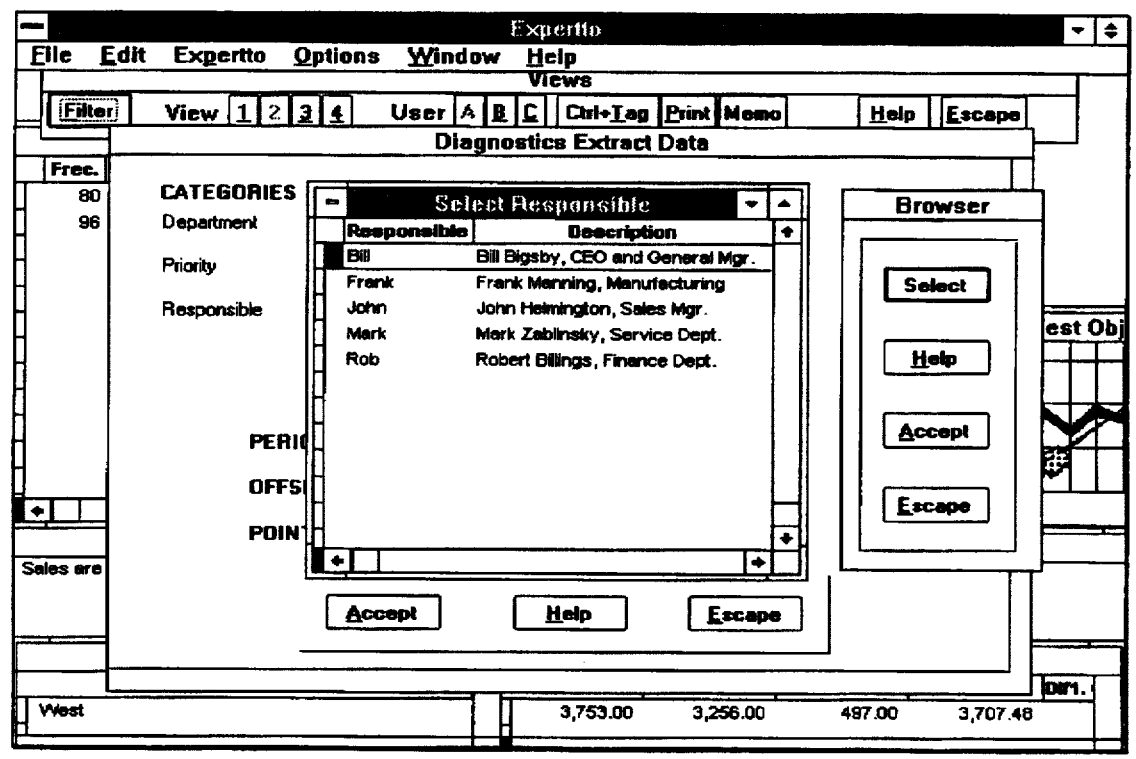

As shown in FIG. 62, when using the Filter dialog box, the user may select the categories he wants to learn about. If he wants to know everything about the projects in charge of a particular person in the organization, he should only click at his name in the Filter dialog box. Then, all other screens and windows will only show information about that person's projects.

Figure 63:
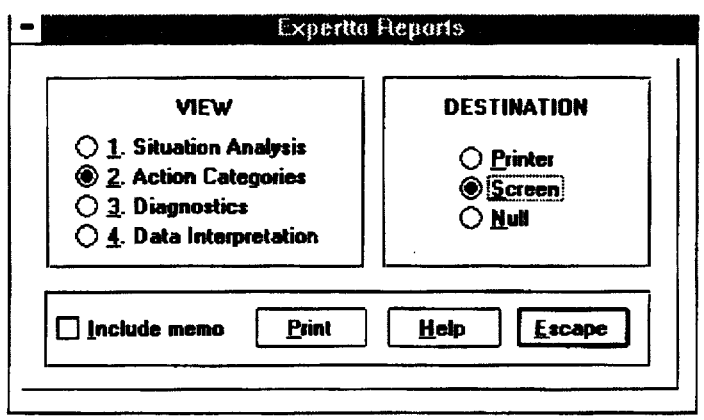

As shown in FIG. 63, users may print or Email any information extracted from a screen, a window or a combination of windows from the previously discussed views: data, diagnostics, expert diagnostics, action categories and actions.

Figure 64:
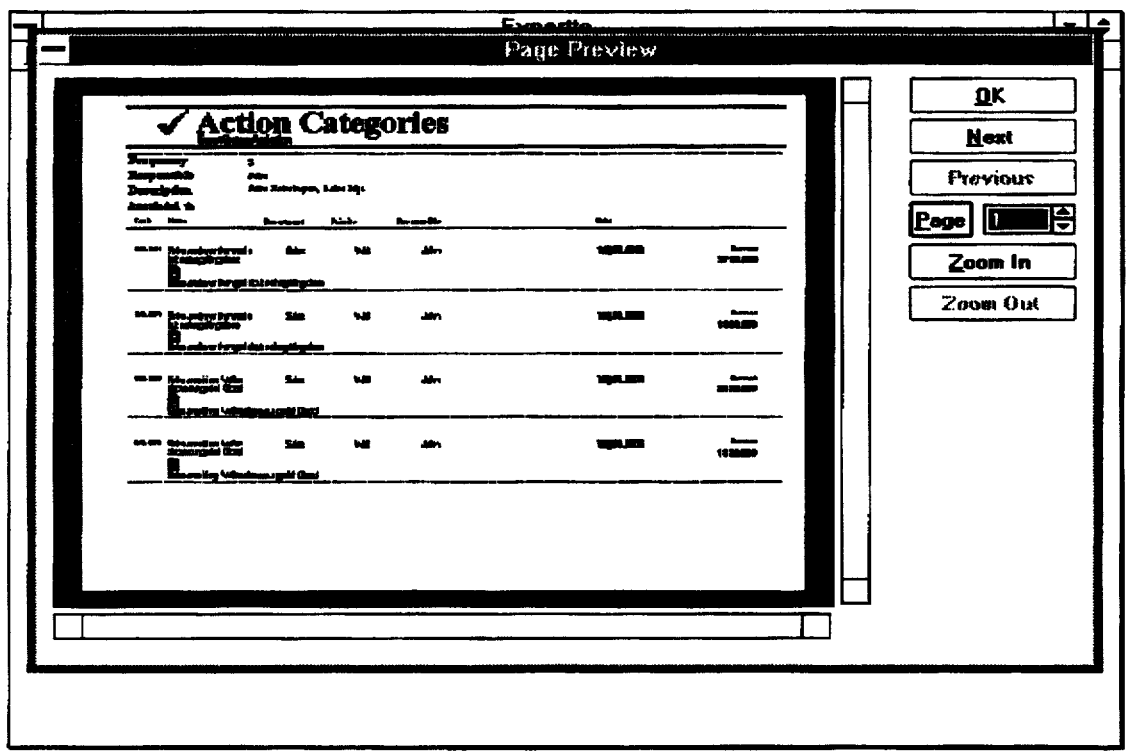

FIG. 64 shows a sample printout of action categories and their associated diagnostics and data.

General File Structure

FIGS. 65 to 67 show the GENERAL FILE STRUCTURE of the invention.

FIG. 65 shows the general structure of the best embodiment's file structure for older and simpler versions of this invention, as described in a previous patent document by the same author. There are twelve essential DBF files for each application. Conceptually, these files may be organized in three groups: data files (table.dbf, which contains the data to be analyzed; group.dbf and detail.dbf, which contains the data items grouping definitions), test files and diagnostic files (for simple diagnostics and for expert diagnostics).

FIG. 66 shows the names and descriptions of the application files in this invention that correspond to the general file structure in older and simpler versions of this invention, as described in a previous patent document by the same author. Files data.dbf, group.dbf and detail.dbf in FIG. 66 correspond to files tabla.dbf, grupos.dbf and detalle.dbf in FIG. 65, respectively. Files test.dbf, action?.dbf and diag.dbf/diag.fpt in FIG. 66 correspond to files prueba.dbf, clase?.dbf and presumen.dbf/dresumen.dbf in FIG. 65, respectively. Files result.dbf, prresult.dbf and drresult.dbf in FIG. 66 correspond to files with the same names in FIG. 65.

FIG. 67 shows the names and descriptions of the most important files for the best embodiment's file structure. Conceptually, these files may be organized in five groups: (i) quantitative data files, (ii) data tests, diagnostics and action categories, (iii) expert tests and diagnostics, (iv) memorandums, and (v) executive information systems.

Elements, Structure and Contents of Application Files

FIGS. 68 to 108 show the ELEMENTS, STRUCTURE AND CONTENTS OF APPLICATION FILES.

FIG. 68 shows the structure of the action database file (42, 43, 44) and its contents in the best embodiment's implementation. This database file is called ACTION1.DBF, and the fields contained in each record are called: ACTION1 (61) and NAME (62). ACTION1 (61) contains the action type identifier -code- and NAME (62) contains the user description for each action. Files action2.dbf, action3.dbf, action4.dbf and action5.dbf are similar to file action1.dbf in concept and operation. These files correspond to the triggers and actions data tables (23, 24)

FIG. 69 shows a partial browse view of database file ACTION1.DBF, as described in FIG. 68.

FIG. 70 shows the structure of the codes database file and its contents in the best embodiment's implementation. This database file is called CODES.DBF, and the only field contained in each record is called FORMAT. Field FORMAT contains the format code.

FIG. 71 shows a partial browse view of database file CODES.DBF, as described in FIG. 70.

FIG. 72 shows the structure of the data database file and its contents (13) in the best embodiment's implementation. This database file is called DATA.DBF (37), and the fields contained in each record are called: ORDER, DATA (49), NAME (50), c1 to c60 (51), VALUE (68), FORMAT (69), FACTOR (70), MARK, LEVEL, MARK1. ORDER contains numbers for line sorting purposes, DATA (49) contains the line or record identifier -code-, NAME (50) contains a long description for each dataline or record, c1 to c60 (51) contains the data numbers, VALUE (68) contains temporary data for various purposes, FORMAT (69) contains FoxPro format definition for presentation of data, FACTOR (70) contains multiplication factor for data row, MARK contains a user-activated mark for browse views, printing and memos, LEVEL contains numbers for outlining purposes, MARK1 contains a user-activated mark for browse views, printing and memos.

FIG. 73 shows a partial browse view of database file DATA.DBF, as described in FIG. 72.

FIG. 74 shows the structure of the formats database file and its contents in the best embodiment's implementation. This database file is called DATAFORM.DBF, and the fields contained in each record are called: CODE, GROUP, FOR-MULA and ORDER. CODE contains the identifier code for this data formula, GROUP contains the identifier for the data group to which this data formula will be applied, FOR-MULA contains the data formula, and ORDER contains the order of evaluation for this data formula.

FIG. 75 shows the structure of the data names database file and its contents in the best embodiment's implementation. This database file is called DATANAME.DBF, and the fields contained in each record are called: DATA and NAME. DATA contains the record identifier for each GOTO option (it's equal to field DATA in DATA.DBF), and NAME contains the long description for each GOTO option.

FIG. 76 shows a partial browse view of database file DATANAME.DBF, as described in FIG. 75.

FIG. 77 shows the structure of the group elements database file (41) and its contents in the best embodiment's implementation. This database file is called DETAIL.DBF, and the fields contained in each record are called: GROUP (58) and DATA*(49). GROUP (58) contains the code for each group being defined here, and DATA (49) contains the code for the data record in this group.

FIG. 78 shows a partial browse view of database file DETAIL.DBF, as described in FIG. 77.

FIG. 79 shows the structure of the spreadsheet export EIS definition database file and its contents in the best embodiment's implementation. This database file is called DETEIS-.DBF. This file contains the information required to export any information from the data.dbf file and associated diagnostics in other related files in the invention to outside independent spreadsheet programs.

FIG. 80 shows the structure of the expert tests database file (45) and its contents in the best embodiment's implementation. This database file is called DIAG.DBF, and the fields contained in each record are called: DIAG (63), NAME (64), NOTE (65), CMIN, FORMULA, GENERAL, FORMULA1, FORMULA2 and FORMULA3. DIAG (63) contains the expert test code, NAME (64) contains the short message associated to expert test, NOTE (65) contains the long message associated to expert test, CMIN contains the number of points associated to this expert test, MARK contains a general purpose mark, FORMULA contains a logical value (if this expression turns TRUE a diagnostic is generated), GENERAL contains a graph or sound or video associated to this test, FORMULA1, FORMULA2 and FORMULA3 contain weighting value formulas.

FIG. 81 shows a partial list view of database file DIAG. DBF, as described in FIG. 80.

FIG. 82 shows the structure of the diagnostic long messages database file and its contents in the best embodiment's implementation. This database file is called DRNOTE.DBF, and the fields contained in each record are called: MARY, DIAG (63), PER (52), TEST (53), PLUS and POINTS-.MARK contains a general purpose data mark, DIAG (63) contains an identifier for the expert diagnostic defined here. PER (52) contains the period for expert diagnostic DIAG, TEST (53) contains the data diagnostic related to this expert diagnostic, PLUS contains character "P" if TEST is found in tables RESULT or PRRESULT for period PER, POINTS contains the number of points for this diagnostic (and it corresponds to field CMIN in DIAG).

FIG. 83 shows the structure of the diagnostics database file (48) and its contents in the best embodiment's implementation. This database file is called DRRESULT. DBF.

FIG. 84 shows a partial browse view of database file DRRESULT.DBF, as described in FIG. 83.

FIG. 85 shows the structure of the second spreadsheet export EIS database file and its contents in the best embodiment's implementation. This database file is called EIS-.DBF. This file contains some additional information required to export any information from the data.dbf file and associated diagnostics in other related files in the invention to outside independent spreadsheet programs.

FIG. 86 shows the structure of the group descriptions database file (40) and its contents in the best embodiment's implementation. This database file is called GROUP.DBF, and the fields contained in each record are called: GROUP (59), NAME (60), ORDEN and NOGROUP. GROUP (59) contains the group code identifier, NAME (60) contains the group name, ORDEN contains a positional ordering number, and NOGROUP contains a number equal to the number of elements in the group.

FIG. 87 shows a partial browse view of database file GROUP.DBF, as described in FIG. 86.

FIG. 88 shows the structure of the memorandum definitions database file and its contents in the best embodiment's implementation. This database file is called MEMODET-.DBF.

FIG. 89 shows the structure of the memorandums database file and its contents in the best embodiment's implementation. This database file is called MEMOS.DBF.

FIG. 90 shows the structure of the first EIS definition database file and its contents in the best embodiment's implementation. This file contains information about information contained in each object in a particular screen.

FIG. 91 shows the structure of the expert diagnostics database file (47) and its contents in the best embodiment's implementation. This database file is called PRRESULT-.DBF.

FIG. 92 shows a partial browse view of database file PRRESULT.DBF, as described in FIG. 91.

FIG. 93 shows the structure of the diagnostics messages database file and its contents in the best embodiment's implementation. This database file is called RESNOT-E.DBF.

FIG. 94 shows the structure of the diagnostics database file (38) and its contents in the best embodiment's implementation. This database file is called RESULT.DBF.

FIG. 95 shows a partial browse view of database file RESULT.DBF, as described in FIG. 93.

FIG. 96 shows the structure of the temporary data definition database file and its contents in the best embodiment's implementation. This database file is called SHEET.DBF.

FIG. 97 shows the structure of the temporary action calculations database file and its contents in the best embodiment's implementation. This database file is called TEMP1.DBF.

FIG. 98 shows a partial browse view of database file TEMP1.DBF, as described in FIG. 97.

FIG. 99 shows the structure of the tests database file (39) and its contents in the best embodiment's implementation. This database file is called TEST.DBF.

FIGS. 100 to 102 show partial browse views of the contents of the tests database file (39) TEST.DBF, as described in FIG. 99.

FIG. 103 shows the contents of the tests database file for a different application: a simple, particular financial analysis system.

FIG. 104 shows the structure of the applications database file and its contents in the best embodiment's implementation. This database file is called APLICAT.DBF.

FIG. 105 shows a partial browse view of database file APLICAT.DBF, as described in FIG. 104.

FIG. 106 shows the structure of the overall configuration database file and its contents in the best embodiment's implementation. This database file is called CONFIG.DBF.

FIG. 107 shows the structure of the EIS graphs definition database file and its contents in the best embodiment's implementation. This database file is called DEFAGRPH.DBF.

FIG. 108 shows the structure of the third EIS definition database file and its contents in the best embodiment's implementation. This database file is called MEMORY.DBF. This file contains information about allowable graphs' types in a particular EIS presentation.

FIG. 109 shows the structure of the second EIS definition database file and its contents in the best embodiment's implementation. This database file is called SCREEN.DBF. This file contains a listing of screens in the EIS presentation.

FIG. 110 shows the structure of the fourth EIS definition database file and its contents in the best embodiment's implementation. This database file is called SCRNDEF.DBF.

FIG. 111 shows the structure of the fifth EIS definition database file and its contents in the best embodiment's implementation. This database file is called SCRNTYPE.DBF.

FIG. 112 shows the structure of the windows definitions database file and its contents in the best embodiment's implementation. This database file is called WINDOWS.DBF.

Program Procedures

FIGS. 113 to 122 show flow diagrams for a few selected PROGRAM PROCEDURES in the invention.

Figure 113:
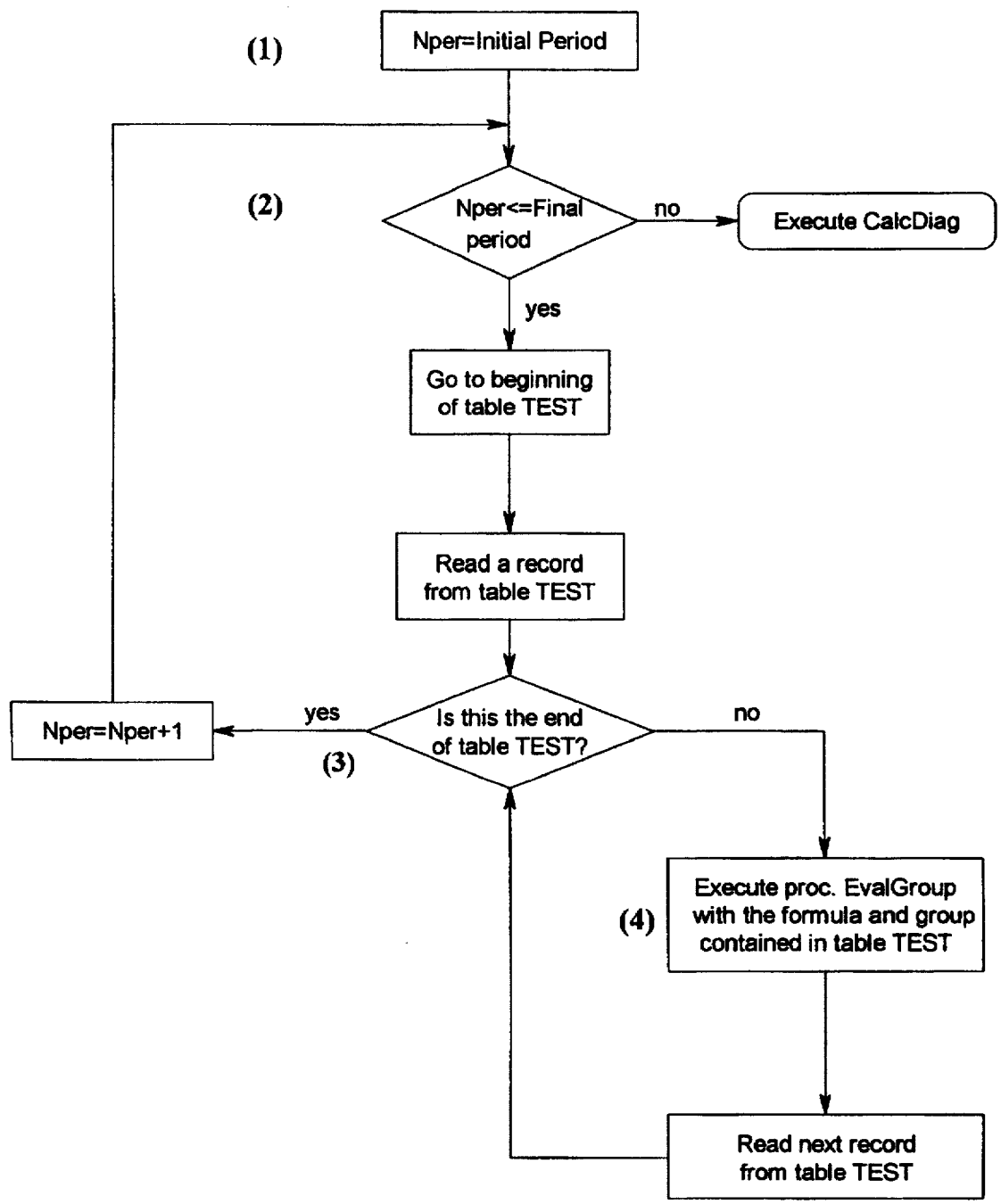

FIG. 113 shows the flow diagram for procedure CalExp. Procedure CalExp contains the main loop for generating all diagnostics.

Figure 114:
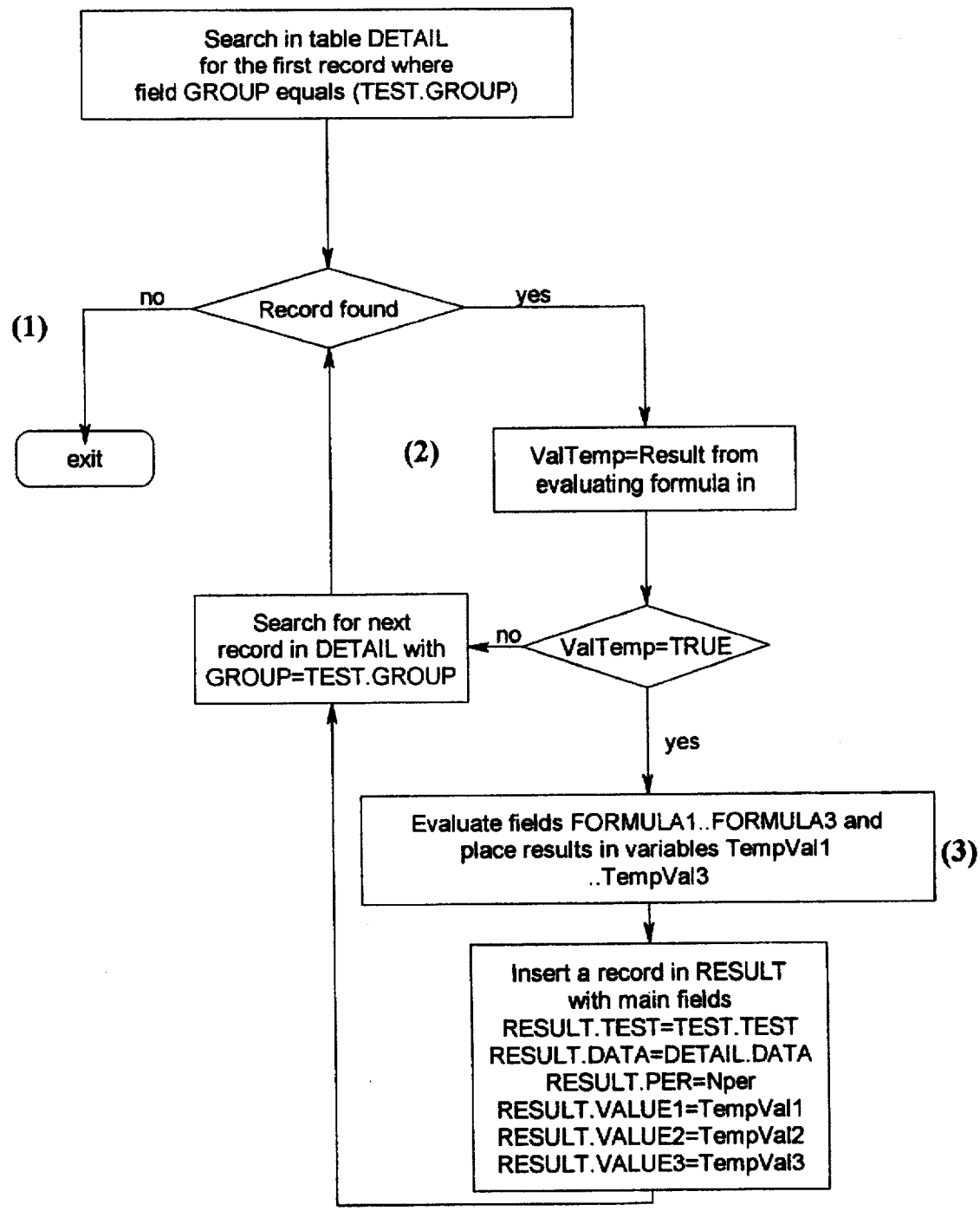

FIG. 114 shows the flow diagram for Procedure EvalGroup. Procedure EvalGroup evaluates the formula contained in the current record of file TEST.DBF for each element of the group in the current record of file TEST.DBF.

Figure 115:
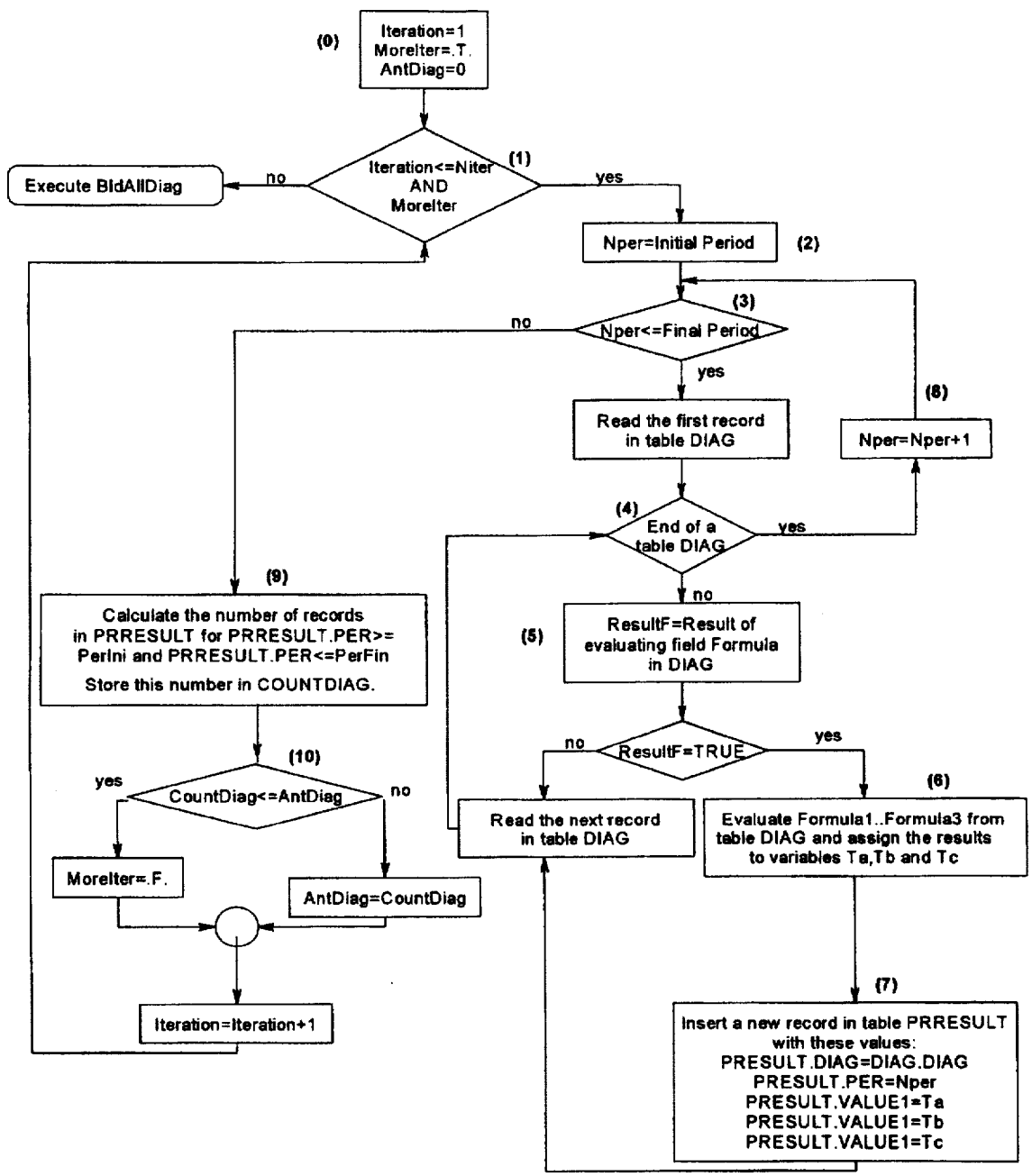

FIG. 115 shows the flow diagram for Procedure CalcDiag. Procedure CalcDiag is executed after generating all diagnostics with procedure CalExp. Procedure CalcDiag contains the main loop for generating all expert diagnostics, and writes all its output in file PRRESULT.DBF.

Figure 116:
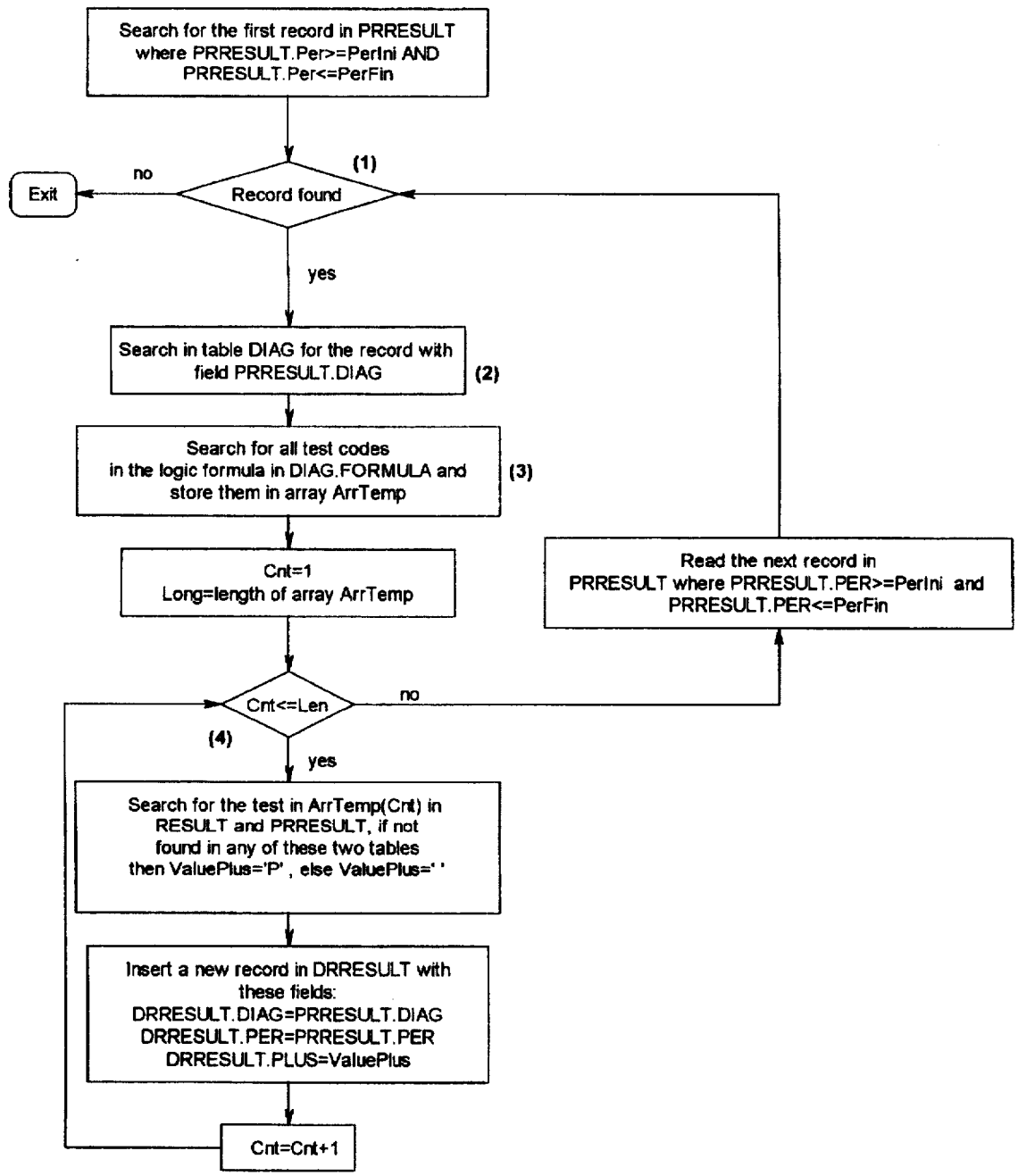

FIG. 116 shows the flow diagram for Procedure BldAllDiag. Procedure BldAllDiag generates the links between diagnostics and expert diagnostics. To do this, procedure BldAllDiag parses all expert tests formulas in file DIAG, it identifies all component diagnostics for each formula, finds out if those component diagnostics are TRUE or FALSE (that is, if they are in file RESET) and writes all its output in file DRRESULT.

Figures 117, 118:
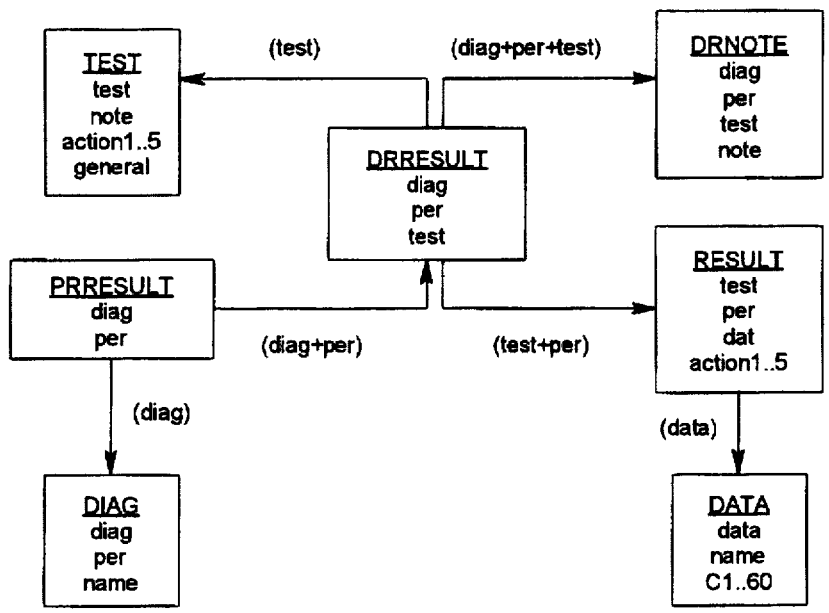

FIG. 117 shows the relations diagram for the diagnostics browse view, the same browse view displayed in FIG. 59 (the diagnostics view) and simplified in FIG. 11. This relations diagram shows hierarchical dependencies between browsing files during this view.

FIG. 118 shows the browses structure for the diagnostics browse view. This figure shows the particular fields shown for each browse file in this view.

Figures 119, 120:
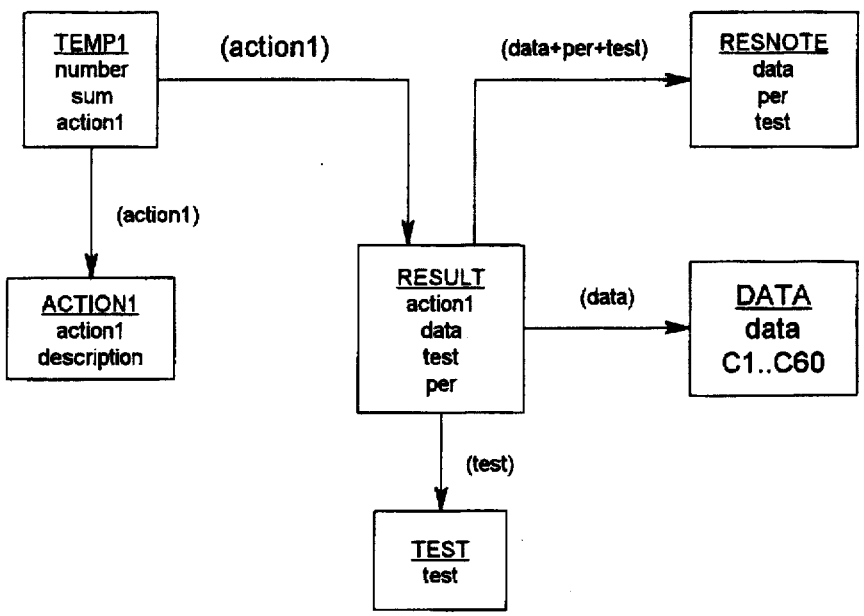

FIG. 119 shows the relations diagram for the action categories view (actions view), the same browse view displayed in FIG. 58 (the actions view) and simplified in FIG. 12. This relations diagram shows hierarchical dependencies between browsing files during this view.

FIG. 120 shows the browses structure for the action categories view (actions view). This figure shows the particular fields shown for each browse file in this view.

Figures 121, 122:
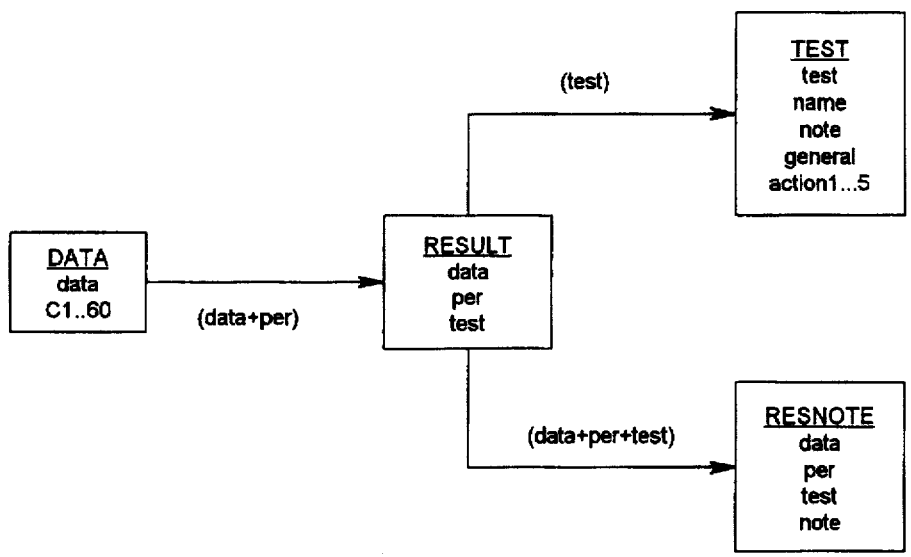

FIG. 121 shows the relations diagram for the data view, the same browse view displayed in FIG. 60 (the data view) and simplified in FIG. 10. This relations diagram shows hierarchical dependencies between browsing files during this view.

FIG. 122 shows the browses structure for the data view. This figure shows the particular fields shown for each browse file in this view.

Fuzzy Logic Weighting Logic

FIGS. 123 to 131 describe how the FUZZY LOGIC WEIGHTING LOGIC works in the invention.

Figure 123:
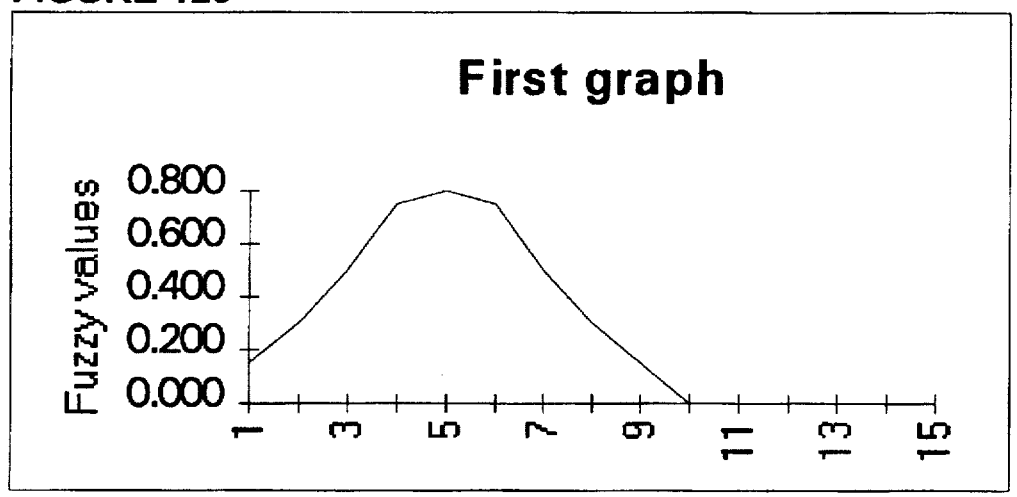
Figure 124:
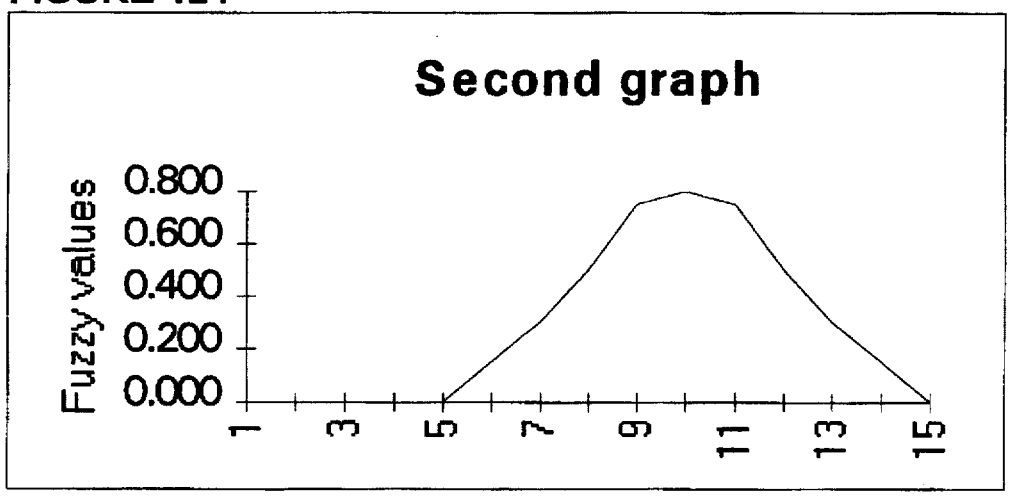

FIGS. 123 and 124 show two typical fuzzyfier graphs for a sample application using the invention as a fuzzy logic system: a corrective management system. The manager in charge has very specific ideas about what is to be called good and what is going to be called bad. Using a non-biased graphic measuring device, a map has been developed generating the manager's personal preferences in terms of profit variations. Another map represents the manager's preferences in terms of monthly changes in the number of defects per division. These maps are represented in FIGS. 123 and 124. These are examples of what the fuzzy logic literature commonly identifies as "fuzzyfiers."

Figure 125:
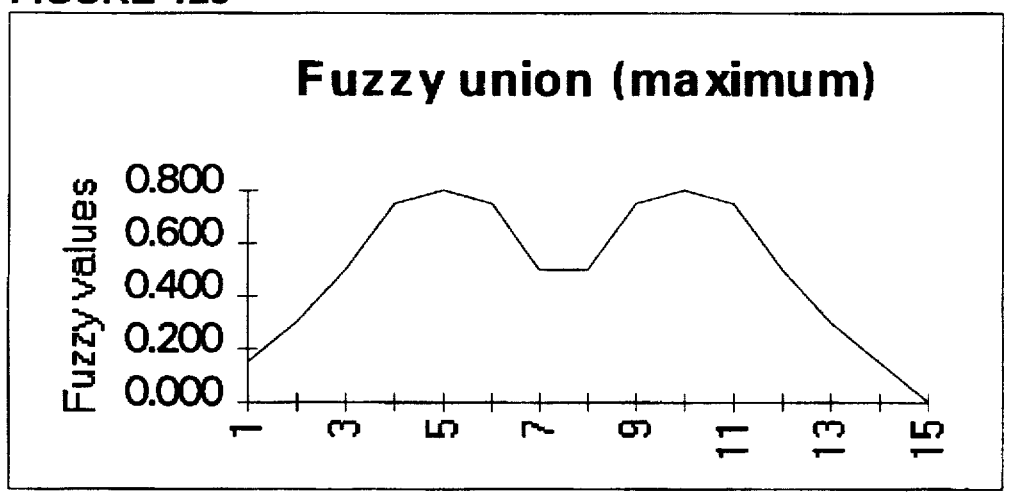
Figures 126, 127:
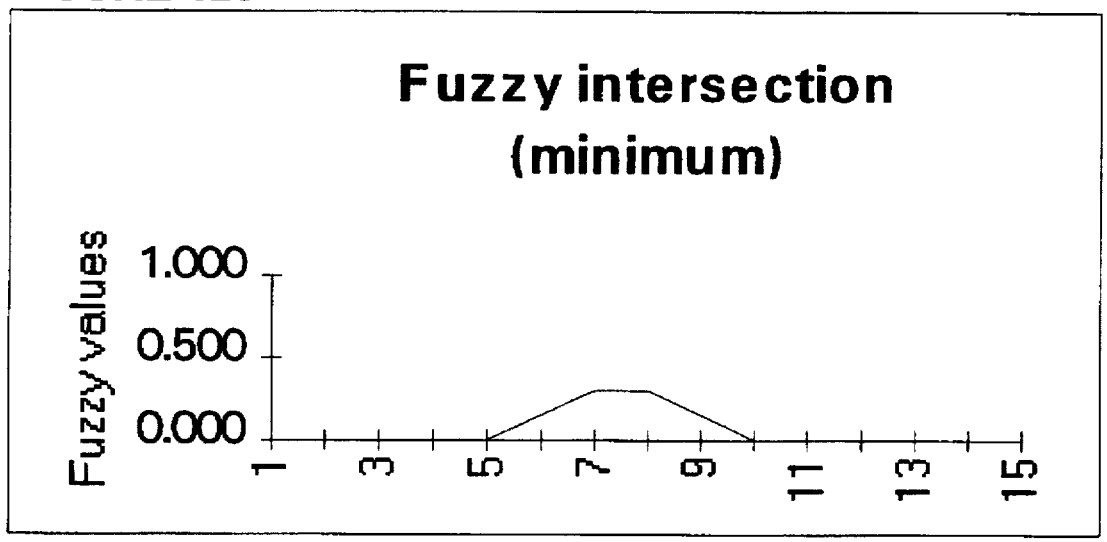

FIGS. 125 and 126 show two more "fuzzyfiers." These correspond to statements A AND B and A OR B where A and B are represented by the graphs in FIGS. 123 and 124. In fuzzy logic, the fuzzy value associated to logical expression A AND B is simply the minimum of the fuzzy values of A and B. Similarly, A OR B corresponds to the maximum of these fuzzy values.

FIG. 127 shows a typical report generated by a "corrective management system": profits and number of defects for four business divisions for the previous and current periods, and the increment (decrement) in these numbers.

The increments (decrements) of profits and defects are mapped into a set of fuzzy values with the aid of two conversion tables, as shown in FIGS. 128 and 129. The graphics shown in FIGS. 123 to 126 refer to this same set of numbers.

FIG. 130 shows the same numbers as in FIG. 127, plus the fuzzy values generated through the two conversion tables.

The table shown in FIG. 131 shows the minimum and maximum fuzzy values for each division.

Forward and Backward Chaining

FIGS. 132 and 133 show specific concepts of FORWARD AND BACKWARD CHAINING schemes implemented in the invention.

Forward and backward chaining algorithms first need to create a hierarchical tree of all tests in the knowledge base. FIG. 132 shows a simplified set of tests. If these were all the tests in an expert system, then test1 doesn't lead to any diagnostics more than diagnostic1, its own conclusion. However, test2 and test3 may produce diagnostic2 and diaguostic3, and since these are part of the premise of test4, then they may lead to diagnostic4.

For the set of tests in FIG. 132, a forward chaining algorithm would generate a set of links and software pointers similar to those shown as arrows in FIG. 133.

Final Selected Concepts

Figure 134:
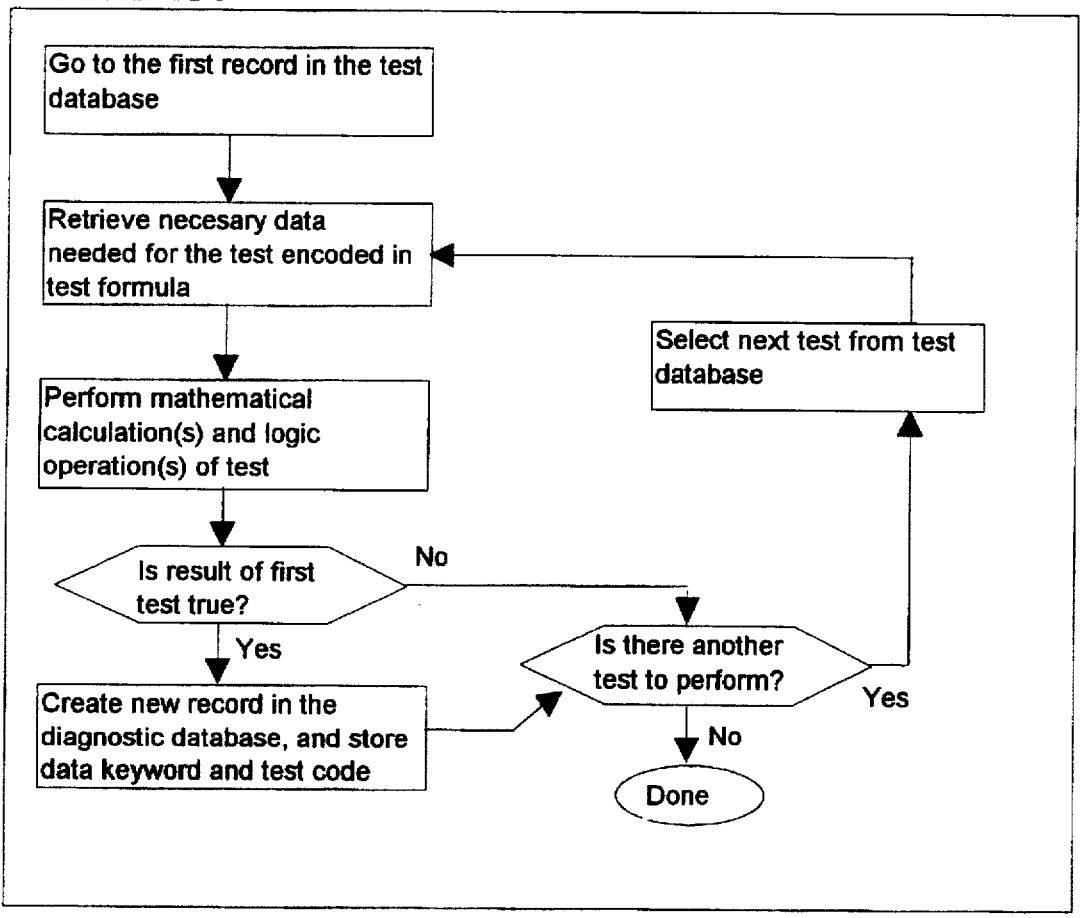
Figure 135:
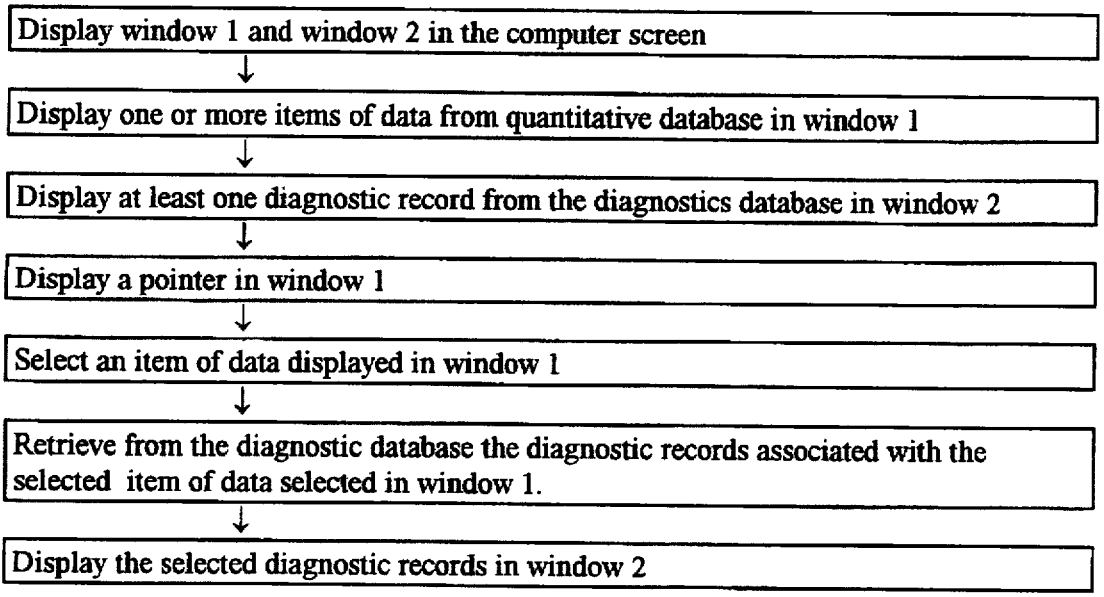
Figure 136:
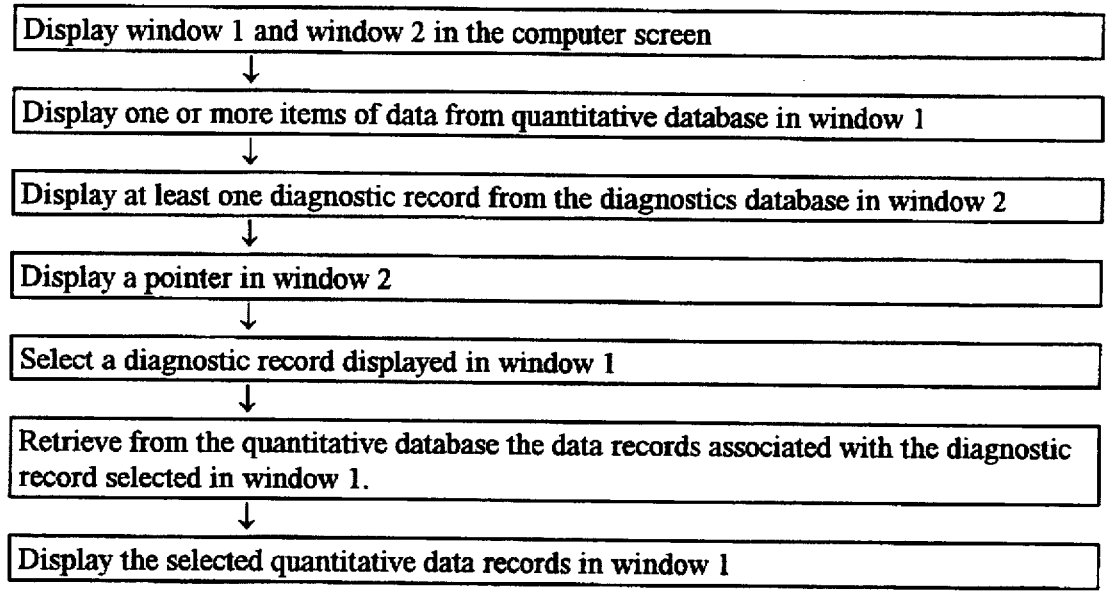

FIGS. 134 to 136 show a few FINAL SELECTED CONCEPTS in the invention.

FIG. 134 shows the basic operation of the invention, which involves the selection of an item or items of quantitative data and the application of the corresponding analysis role(s) to generate diagnostic records. The linking pointers are added to the new diagnostic records and this information is stored in the diagnostic database. In the best embodiment implementation, all these operations are performed in the following manner, as exemplified in FIG. 119: First, the program makes the first record in the test database the current test record. It must be noted that each test record contains a test code unique to this particular test record, and a description of the mathematical calculation(s) and logic operation(s) to be performed. The program now retrieves the necessary data needed for the test encoded in the test formula in the current test record. Then the mathematical calculation(s) and logic operation(s) in the first test are performed. After these operations, if the result of the test just applied is true, a new record in the diagnostic database is created, and the following information is written into this new diagnostic record: the keyword identifying the particular data item and a test code identifying the test record. Finally, if this is not the last test record in the test database, that is, if there are more tests to perform, then the next test is selected, and the procedure is repeated again starting at step, retrieving the necessary data needed for the corresponding test just selected.

FIG. 135 shows, in a simplified manner, the procedure followed to display and select a particular data item and to see browse through the diagnostics related to the particular data item selected. The sequence of steps is: (a) display window 1 and window 2 in the computer screen; (b) display one or more items of data from quantitative database in window 1; (c) display at least one diagnostic record from the diagnostics database in window 2; (d) display a pointer in window 1; (e) select an item of data displayed in window 1; (f) retrieve from the diagnostic database the diagnostic records associated with the selected item of data selected in window 1, and (g) display the selected diagnostic records in window 2.

FIG. 136 shows, in a simplified manner, the procedure followed to display and select a particular data item and to see browse through the diagnostics related to the particular data item selected. The sequence of steps is: (a) display window 1 and window 2 in the computer screen; (b) display one or more items of data from quantitative database in window 1; (c) display at least one diagnostic record from the diagnostics database in window 2; (d) display a pointer in window 2; (e) select a diagnostic record displayed in window 1; (f) retrieve from the quantitative database the data records associated with the diagnostic record selected in window 1, and (g) display the selected quantitative data records in window 1.

FIG. 137 shows a structured outline describing the invention's simplified program structure. This indicates that the invention is a program comprising one or more data tables (5, 37), tests in one or more lists of tests (9, 17, 39), diagnostics in one or more lists of diagnostics (7, 27, 38), and pointers (21) in one or more lists of pointers (17, 25). Each data table contains numbers (12), and their row headings (49) and column headings (52). Each test in each list of tests contains: (A) a conditional formula (57) of the form IF(condition) that evaluates to TRUE or FALSE, (B) a set of messages (9, 39) containing a short message (55), a long message (56) and a packaged object, where the packaged object may be a graph, a sound note or a video clip, (C) an algebraic formula containing a fuzzy logic expression with references to specific numbers in the data table or diagnostics in the list of diagnostics, (D) test pointers to other items such as specific numbers in the data table, memorandums containing a recipient's address, a text message and a set of labels, and action labels in a list of action labels (42, 43, 44), where each action label conveys an additional user-definable meaning such as an associated action, a priority level, or the name of the person responsible for a task. Each conditional formula (57) may contain (A) number references (21) to one or more numbers (12) in any one of the data tables, (B) test references (52, 53) to one or more tests in the list of tests and (C) user-definable functions containing calls to neural network programs, genetic algorithm programs, and other artificial intelligence programs. Each diagnostic in the invention's program structure in each list of diagnostics contains bi-directional diagnostic pointers (53, 54) to other items such as one test in the list of tests, specific numbers in any one of the data tables, and one or more diagnostics in any one or more lists of diagnostics. Finally, the program's structure also contains one or more lists of pointers containing bi-directional expert tests pointers (53, 54) between any two or more tests in any one or more lists of tests.

DETAILED DESCRIPTION OF THE INVENTION

Please note that, throughout this document, pointer, code and identifier should generally be interpreted as synonyms. In xbase languages such as the MS FoxPro for Windows™ database programming language by Microsoft Corporation of Redmond, Wash., these instruments are used to effectively implement linking between data tables.

Also note that in this document, tests and diagnostics are also called data tests and data diagnostics. Sometimes tests are called logical tests. Expert tests are always called expert tests. However, expert diagnostics could also be called super diagnostics. Logic expressions and logic statements are synonyms and have exactly the same meaning throughout the document. Analysis rules are the logical test expressions and are just a part of the definition of data tests and expert tests. (Tests and expert tests both contain analysis rules. The end result of any analysis rule in the invention is either TRUE or FALSE.) However, in this document, analysis rules are also sometimes just called tests. Finally, in this document, diagnostic messages may also be called diagnostic statements.

An effort has been made so that specific terms like variable and program names will appear in a consistent manner throughout this document. However, upper and lowercase handling haven't been totally consistent, so that variable and file names might appear sometimes expressed in uppercase characters, sometimes in mixed lower and uppercase, and sometimes simply in lowercase. However, the language used to develop the invention's coding doesn't recognize letter casing, so that Abcd and aBCd represent one and the same variable name. So, it is suggested that, to follow and interpret correctly this document, character casing should be ignored, and all names should be identified only by the sequence of characters.

STRUCTURE

To initiate the description of the PREFERRED EMBODIMENT'S STRUCTURE, a list of all parts identified by reference numerals in FIGS. 1 to 136 follows:
1.to
4. business database
5. data database
6. inference engine and expert system
7. diagnostics database
8. querying engine
9. tests database
10. test-processing engine
11. lines or records containing individual data items
12. individual data items of the data to be analyzed
13. data to be analyzed
14. group descriptions data tables
15. group elements data tables
16. related index files
17. tests descriptions table
18. test identifiers
19. name and description for each test
20. associated formulas
21. data database's data item identifiers
22. group identifiers
23. triggers data table
24. associated actions database
25. related index files
26. test-processing procedures
27. diagnostics data tables
28. knowledge database
29. sets of rules
30. rules processing language
31. inference logic procedures
32. interface modules
33. sorting procedures
34. filtering procedures
35. linking procedures
36. procedures for showing synchronized database browse views
37. data DBF file (data.dbf)—this file contains the data to be analyzed (13)
38. diagnostics DBF file (result.dbf)—this file corresponds to the diagnostics data tables (27)
39. tests DBF file (test.dbf)—this file corresponds to the tests database (9) and its components
40. group descriptions DBF file (group.dbf)—this file corresponds to the group descriptions data tables (14)
41. group elements DBF file (detail.dbf)—this file corresponds to the group elements data tables (15)
42. action1 DBF file—this file corresponds to the triggers and actions data tables (23, 24)
43. action2 DBF file—this file corresponds to the triggers and actions data tables (23, 24)
44. action# DBF file—files action3.dbf, action4.dbf and action5.dbf also correspond to the triggers and actions data tables (23, 24)
45. expert tests DBF file (diag.dbf)—this file is a part of the tests database (9)
46. expert tests FPT file (diag.fpt)—this file is a part of the tests database (9)
47. expert diagnostics DBF fie (prresult.dbf)—this file corresponds to the diagnostics data tables (27)
48. expert diagnostics elements DBF file (drresult.dbf)—this file corresponds to the diagnostics data tables (27)
49. data record identifier—field: DATA—files: data.dbf, result.dbf, test.dbf, detail.dbf, drresult.dbf
50. data record description—field: NAME—files: data.dbf
51. data fields—fields: C1 to C60—files: data.dbf
52. data field identifier—field: PER—files: result.dbf, prresult.dbf, drresult.dbf
53. test identifier—field: TEST—files: test.dbf, result.dbf, diag.dbf, drresult.dbf
54. test identifier—field: TEST—files: test.dbf. Same as test identifier (53)
55. test description—field: NAME; files: test.dbf
56. long test description—field: NOTE—files: test.dbf
57. test formula—field: FORMULA—files: test.dbf
58. group identifier—field: GROUP—files: group.dbf, test.dbf, detail.dbf
59. group identifier—field: GROUP—files: group.dbf. Same as group identifier (58)
60. group description—field: NAME—files: group.dbf
61. action identifier—fields: ACTION1, ACTION2, ACTION3, ACTION4, ACTION5 files: result.dbf, test.dbf, action1.dbf, ... action5.dbf
62. action description—fields: NAME1, NAME2, NAME3, NAME4, NAME5—files: action1.dbf, action2.dbf, action3.dbf, action4.dbf, action5.dbf
63. expert test identifier—field: DIAG—files: diag.dbf, prresult.dbf, drresult.dbf
64. expert test description—field: NAME—files: diag.dbf
65. expert test long description—field: NOTE—files: diag.dbf
66. points associated to this expert test—CMIN—files: diag.dbf
67. test occurrence flag—field: PLUS—files: drresult.dbf
68. expert diagnostics window
69. action categories window
70. diagnostics window
71. data window
72. text window
73. filter dialog box

FILES AND FILE STRUCTURE AND CONTENTS

The next sections and paragraphs will describe in detail the FILES AND FILE STRUCTURE AND CONTENTS in the invention and in any one application developed with the invention.

FILE TYPES IN THE INVENTION'S DATABASE STRUCTURE

The following paragraphs describe the FILE TYPES IN THE INVENTION'S DATABASE STRUCTURE.

The invention has been developed using the Microsoft FoxPro™ development language by Microsoft Corporation for the Microsoft Windows™ environment, also by Microsoft Corporation. These are the most important file types for programs developed using the Microsoft FoxPro™ development language. In alphabetic order:
Type .CDX: index files (pointers)
Type .DBF: basic database table file Type .FPT: contains the full text for each memorandum referred to in a .DBF file, and other information about those memorandums Type .FRX: contains information of one particular report; every .FRX file follows a table structure, that is, the .DBF format, and contains several MEM (memo) fields Type .FRT: stores the contents of a particular report, such as associated coding, all stored in memo fields Type .FXP contains precompiled source code generated from corresponding PRG files Type .MEM stores the values of variables (such as windows configurations) programmed by the developer Type .MPX contains information of one particular menu bar and all its descendant menus; every .FRX file follows a table structure, that is, the .DBF format, and contains several MEM (memo) fields Type .MPT contents of a particular menu, such as associated coding, all stored in memo fields Type .MPR generated coding to operate and generate a menu Type .PRG contains the source code Type. SCX contains information of one particular screen; every. SCX file follows a table structure, that is, the .DBF format, and contains several MEM (memo) fields Type .SCT stores the contents and definition of a particular screen, including the associated code, all stored in memo fields Type .SPR stores the generated source code required to operate and generate a screen

SUMMARY DESCRIPTION OF THE OPERATION AND USE OF APPLICATION FILES IN THE INVENTION

The following paragraphs contain a SUMMARY DESCRIPTION OF THE OPERATION AND USE OF APPLICATION FILES IN THE INVENTION. In general terms:

Quantitative data (files DATA.*) is organized in a list of groups (files GROUP.*) where each group contains a set of data items (files DETAIL.*).

Data tests (files TEST.*) generate data diagnostics (files RESULT.*), users may add their own personal notes (files RESNOTE.*) and, when querying diagnostics grouped by action categories (files ACTION?.*), the number of diagnostics for each action category (files TEMP1.*) will also be shown.

Expert tests (files DIAG.*) generate a listing of expert diagnostics (files PRRESULT.*) and, for each one of these expert diagnostics, a listing of all diagnostics related to it (files DRRESULT.*). Users may add their own personal notes (files DRNOTE.*).

Memorandums are created and stored (files MEMOS.*) with bi-directional pointers to related data diagnostics and expert diagnostics (files MEMODET.*).

In order to configure and run the Executive Information System Option (EIS), first the available screen, object and chart types must be configured (files SCRNTYPE.*, SCRNDEF.* and DEFAGRAPH.*), and then users will add and define screens (files SCREEN.*) containing objects (files OBJECT.*), where each object may call another screen.

INTERPRETATION OF THE MOST IMPORTANT APPLICATION FILES IN THE INVENTION

The following paragraphs contain an INTERPRETATION OF THE MOST IMPORTANT APPLICATION FILES IN THE INVENTION.

There are twenty six essential DBF files for each application, and they may be organized in five conceptual groups, as shown in FIG. 67: (I) QUANTITATIVE DATA, (II) DATA TESTS, DIAGNOSTICS, AND ACTION CATEGORIES, (III) EXPERT TESTS AND DIAGNOSTICS, (IV) MEMORANDUMS, (V) EXECUTIVE INFORMATION SYSTEM The three files in the first conceptual group (QUANTITATIVE DATA) contain the actual data items in a simple tabular format, and information about data groups. Data groups are used to simplify operations. For example, in a profit and loss statement, all income accounts may belong to one user defined group (let's call it the income group), and all expenses accounts may belong to another user defined group (the expenses group). This will allow the user to later build an application where a single test may ran on all numbers for all accounts in the income group, and a second test will run for accounts in the expenses group. The simplest tests may go like this: "If income goes down, tell me, because that is bad." "If expenses go up, tell me, because that is bad." Thus, data groups are quite useful in order to later reduce the number of formulas (using data groups, thousands of effective tests may be run with just two or three test definitions).

The seven files in the second conceptual group (DATA TESTS, DIAGNOSTICS AND ACTION CATEGORIES) contain the logical formulas to be applied on the data and on those diagnostics already on the diagnostics database. These files also contain information on the meaning of action categories (priorities, people responsible, actions to be taken, etc.) when particular tests turn TRUE. Yet other files contain the actual messages associated to each particular test. In this way, when a test turns TRUE and an associated diagnostic is stored in the diagnostics database, and when later the associated diagnostic is queried, an intelligent query system will also show the message associated with the test associated to that particular diagnostic.

The six files in the third conceptual group (EXPERT TESTS AND DIAGNOSTICS). Expert tests may also be called super-tests and expert diagnostics may also be called super-diagnostics. The invention first performs logical tests on the data. It then writes the associated diagnostics for those tests that turn TRUE. Then, the invention performs logical super-tests (or expert tests) on those diagnostics stored in the diagnostics database. For example, if for a particular company, sales are going down, costs are going up and the manager never goes to work and if there are three diagnostics already stored in the diagnostics database telling us precisely that, then we should also have a super-test or expert tests that will tell us "if those three conditions happen, then fire the manager!" The results of expert tests are expert diagnostics, and they are stored in a separate file for expert diagnostics. Expert tests of a higher level may then be performed on pre-existing expert diagnostics. In a nutshell, expert tests are those logical tests that review the condition of, diagnostics and expert diagnostics already stored in the databases. Simple diagnostics are much simpler.

The three files in the fourth conceptual group (MEMORANDUMS) store the textual information for each memorandum, and the links between these memorandums and associated tests and diagnostics in the diagnostics database.

The seven files in the fifth conceptual group (EXECUTIVE INFORMATION SYSTEM) contain information on all screens in the EIS system and on all objects contained in those screens. These files also contain information on the particular linking between objects and other screens in the EIS system. This is necessary since, when the user clicks on particular objects in any screen in the EIS, the invention should call another predefined screen showing more detailed information.

The following paragraphs describe the content and meaning of these files in more detail. You may also examine FIGS. 68 to 112 and their descriptions in this document.

These are the names and descriptions of the most important files related to the QUANTITATIVE DATA, in alphabetic order:

DATA.DBF, DATA.CDX contain the quantitative database; this is the information usually imported from other applications.

DATAFORM.DBF, DATAFORM.CDX, DATAFORM.FPT contains the data rows formulas and data columns formulas definitions DATANAME.DBF, DATANAME.CDX contains the names and positions of the data GOTO option.

DETAIL.DBF, DETAIL.CDX contains information on the data groups definition, indicating which data elements are part of each data group.

GROUP.DBF, GROUP.CDX contains information of all data groups, that is, the name of each group.

These are the names and descriptions of the most important files related to DATA TESTS, DIAGNOSTICS AND ACTION CATEGORIES, in alphabetic order:

ACTION1.DBF ... ACTION5.DBF, ACTION1.CDX ... ACTION5.CDX describe the action categories RESNOTE.DBF, RESNOTE.CDX, RESNOTE.FPT contains a listing (in file .DBF) and the full text (in file .FPT) of all personal notes for every data diagnostic stored in RESULT.DBF. These are stored in a separate structure so that, if all diagnostics are erased, the notes taken by the user won't be destroyed and lost.

RESULT.DBF, RESULT.CDX contains information of all data diagnostics.

TEMP1.DBF, TEMP1.CDX contains the number of diagnostics for each action category.

TEST.DBF, TEST.CDX, TEST.FPT contains the definition and associated elements for each data test.

Notice that, in general terms, data tests (TEST) generate data diagnostics (RESULT), users may add their own personal notes (RESNOTE) and, when querying diagnostics grouped by action categories (ACTION?), the number of diagnostics for each action category (TEMP1) will also be shown.

These are the names and descriptions of the most important files related to EXPERT TESTS AND DIAGNOSTICS, in alphabetic order:

DIAG.DBF, DIAG.CDX, DIAG.FPT contains the formulas and memorandums needed to evaluate all Expert Tests and generate and view the corresponding Expert Diagnostics.

DRNOTE ... DBF, DRNOTE.CDX, DRNOTE.FPT contains a listing (in file .DBF) and the full text (in file .FPT) of all personal notes for every expert diagnostic stored in DRRESULT.DBF DRRESULT.DBF, DRRESULT.CDX contains information of Expert Diagnostics, indicating which other diagnostics are related to each Expert Diagnostic.

PRRESULT.DBF, PRRESULT.CDX contains information of all expert diagnostics; the names of all expert diagnostics is stored here.

Notice that, in general terms, expert tests (DIAG) generate a listing of expert diagnostics (PRRESULT) and, for each one of these expert diagnostics, a listing of all diagnostics related to it (DRRESULT). Users may add their own personal notes (DRNOTE).

These are the names and descriptions of the most important files related to the MEMORANDUMS, in alphabetic order:

MEMODET.DBF, MEMODET.CDX contains bi-directional (associative) pointers between all memorandums created by the user and all those data diagnostics and expert diagnostics associated with each particular memorandum. In the program, these are called tags. These tags point to any of the following data tables or files: PRRESULT.DBF, DRRESULT.DBF, RESULT.DBF, TEMP1.DBF, DATA.DBF.

MEMOS.DBF, MEMOS.CDX, MEMOS.FPT contains all information (such as full text) for each memo created by the user.

Notice that, in general terms, memos are created and stored (MEMOS) with bi-directional pointers to related data diagnostics and expert diagnostics (MEMODET).

These are the names and descriptions of the most important files related to the EXECUTIVE INFORMATION SYSTEM (EIS), in alphabetic order:

OBJECT.DBF, OBJECT.CDX, OBJECT.FPT contains information for each object in the Executive Information System. Note that every single text string or graphic chart in an EIS screen is called an object of that screen.

MEMORY.DBF, MEMORY.FPT—messages associated to the creation of the EIS graphs for each type of screen SCREEN.DBF contains information of each screen in the Executive .Information System (EIS)

SCRNDEF.DBF, SCRNDEF.CDX contains definition of object types in the EIS

SCRNTYPE.DBF contains information of screen types in the EIS

Notice that, in general terms, first the available screen, object and chart types must be configured (SCRNTYPE, SCRNDEF, DEFAGRAPH), and then users will add and define screens (SCREEN) containing objects (OBJECT), where each object may call another screen.

FULL LISTING OF DATA TABLES OR FILES IN THE INVENTION

A FULL LISTING OF DATA TABLES OR FILES IN THE INVENTION follows. This full listing will be separate in two groups. The first group contains all those files that should be created only once. The second group contains all those files that should be created once for each particular application created and operated with the invention.

FIRST GROUP OF FILES. This is a full listing of files that define the condition for every application. These files may be stored only once, in one single directory. They may be stored, for example, in the same directory that stores the executable program:

APLICAT.DBF, APLICAT.CDX contains a listing of all applications

CONFIG.DBF and CONFIG.FPT store general program configuration and windows settings DEFAGRAPH.DBF, DEFAGRAPH.FPT contains chart and types information for option Generate a Graph.

DIAG.MEM—coordinates for the situation analysis window shown with EIS screens

KEEP.MEM—coordinates for table edition window "A"

KEEP1.MEM—coordinates for table edition window "B"

KEEP2.MEM—coordinates for table edition window "C"

LEN.MEM—number of characters or length of the left side of the data browse window in the browse windows option MENUT.MEM—indicates which menu is in active operation (the Big Menu or the Small Menu)

NET.BAT, NET.PIF—Neural net sample files

PUTBR2.MEM—stores the browse coordinates for the formula or expression builder, type "B"

PUTBROW.MEM—stores the browse coordinates for the formula or expression builder, type "A"

SAMPLE.INP, SAMPLE.IOP, SAMPLE.OUT, SAMPLE.NET—Neural net sample files

SCRNDEF.DBF, SCRNDEF.CDX contains definition of object types in the EIS

SCRNTYPE.DBF contains information of screen types in the EIS

TABLE.ACT—temporary information

TEMPWIN.WIN—temporary information

WINDOWS.DBF, WINDOWS.CDX, WINDOWS.FPT store general program configuration and windows settings.

WORKFILE.NET—Neural net sample files

SECOND GROUP OF FILES. This is the full listing of files that conform every particular application developed with the invention, in alphabetic order:

ACTION1.DBF ... ACTION5.DBF, ACTION1.CDX ... ACTION5.CDX describe the action categories AMONTH.MEM—current month CODES.DBF contains the formats used in option Data Outline sheet CRITERIO.MEM—variables for filtering information in the data and diagnostics tables.

DATA.DBF, DATA.CDX contain the quantitative database; this is the information usually imported from other applications.

DATAFORM.DBF, DATAFORM.CDX, DATAFORM.FPT contains the data rows formulas and data columns formulas definitions DATANAME.DBF, DATANAME.CDX contains the names and positions of the data GOTO option.

DEFAGRAPH.DBF, DEFAGRAPH.FPT contains chart and types information for option Generate a Graph. This file appears both at the root directory and for every application, since it's a read/write file DETAIL.DBF, DETAIL.CDX contains information on the data groups definition, indicating which data elements are part of each data group.

DETEIS.DBF contains the codes of those fields of DATA.DBF that will be exported to a fie of the Microsoft Excel™ spreadsheet format (.XLS), using option Create Excel Spreadsheet. There is also a corresponding .CDX file.

DIAG.DBF, DIAG.CDX, DIAG.FPT contains the formulas and memorandums needed to evaluate all Expert Tests and generate and view the corresponding Expert Diagnostics.

DRNOTE ... DBF, DRNOTE.CDX, DRNOTE.FPT contains a listing (in file .DBF) and the full text (in file .FPT) of all personal notes for every expert diagnostic stored in DRRESULT.DBF DRRESULT.DBF, DRRESULT.CDX contains information of Expert Diagnostics, indicating which other diagnostics are related to each Expert Diagnostic.

EIS.DBF, EIS.CDX contains the application name and file name for each Spreadsheet file created from the invention as a Spreadsheet EIS.

GRID.MEM—setup information: browse gridlines enabled or disabled

GROUP.DBF, GROUP.CDX contains information of all data groups, that is, the name of each group.

MEMODET.DBF, MEMODET.CDX contains bi-directional (associative) pointers between all memorandums created by the user and all those data diagnostics and expert diagnostics associated with each particular memorandum. In the program, these are called tags. These tags point to any of the following data tables or files: PRRESULT.DBF, DRRESULT.DBF, RESULT.DBF, TEMP1.DBF, DATA.DBF.

MEMORY.DBF, MEMORY.FPT—messages associated to the creation of the EIS graphs for each type of screen MEMOS.DBF, MEMOS.CDX, MEMOS.FPT contains all information (such as full text) for each memo created by the user.

MONTHS.MEM—variables indicating information from which months to show in certain EIS screens.

OBJECT.DBF, OBJECT.CDX, OBJECT.FPT contains information for each object in the Executive Information System. Note that every single text string or graphic chart in an EIS screen is called an object of that screen.

PRRESULT.DBF, PRRESULT.CDX contains information of all expert diagnostics; the names of all expert diagnostics is stored here.

RESNOTE.DBF, RESNOTE.CDX, RESNOTE.FPT contains a listing (in file .DBF) and the full text (in file .FPT) of all personal notes for every data diagnostic stored in RESULT.DBF. These are stored in a separate structure so that, if all diagnostics are erased, the notes taken by the user won't be destroyed and lost.

RESULT.DBF, RESULT.CDX contains information of all data diagnostics.

SCREEN.DBF contains information of each screen in the Executive Information System (EIS)

SHEET.DBF, SHEET.CDX contains information of the data outline as operated by the menu option of the same name.

SHUTDOWN.MEM—indicates if the application terminated normally or was aborted.

TEMP1.DBF, TEMP1.CDX contains the number of diagnostics for each action category.

TEST.DBF, TEST.CDX, TEST.FPT contains the definition and associated elements for each data test.

USER.MEM—specifications for the last user entering the Browse Windows

OPERATION

The following sections and paragraphs describe the OPERATION of the invention.

OPERATION AS SHOWN BY THE FIGURES

The following paragraphs describe the invention's OPERATION AS SHOWN BY THE FIGURES.

After building the data table and the associated empty files with the structure described in the previous paragraphs, in broad terms, the user will (a) define the tests to perform on the data, either in the test database or in the associated expert system, (b) will apply these tests and generate the associated diagnostics and classes, i.e. triggers and actions, and (c) the user will finally be able to query the diagnostics and the data in a coordinated manner.

FIG. 60 shows a screen showing the contents of a typical application data table (together with other files and tables) and FIG. 72 shows excerpts of another typical application data table. FIG. 73 shows the data table's fields structure. In the best embodiment's data table, also called data DBF file (13, 37) each record represents a different concept, such as sales, costs or profits, and each field represents a different time period. In a typical case, each field will represent a different consecutive month.

The user will usually start his work with the data by defining data item groups. This is optional. These groups are useful for the application of common logical tests to all data items in any particular group, for the definition of reports and queries, and for the definition of the associated triggers and actions. (However, logical tests can also be applied to any particular data items directly, so even though group definition is very useful, it's also optional.) FIGS. 86 and 77 respectively show the structure of the group definition DBF file group.dbf (40) and the elements DBF file detail.dbf (41), and FIGS. 86 and 77 respectively show a partial browse view of these sample files. In this files, groups are defined by their codes and names, and their components and internal structure are a simple list of pairs: the group identifier GROUP and the data record identifier DATA.

Now the user will define tests and formulas.

Remember that, to completely identify a data item (in order to run a test on it, for example), only the record and field are needed, but as it may be seen in the data file's structure, data fields correspond to data periods. The invention may execute all tests in two different modes: (i) absolute mode and (ii) relative mode—more appropriate when columns represent time periods.—In absolute mode, logical tests are applied on predetermined fields (or columns) in the data database file. For example, a particular test may read "if sales in column (field) four are lower than sales in column (field) three, then . . . ". That makes sense, but it's pretty inconvenient, because different logical tests must be created to work with different time periods or data columns (fields). In relative mode, logical tests are applied on the "current" field. The same test described in the previous example would now read "if sales for the current period (column, field) are lower than those of the previous period (column, field), then . . . ". In this case, one tests can be repeatedly executed for lots of periods. Tests may also contain IF-THEN-ELSE conditions that test for the number or name of the current period (column or field in the data database). In this way, certain data items such as sales may have different tests for 1994 and for 1995, for example.

To apply logical tests in relative mode, the user must first specify which periods (columns or fields in the data database) he will test. Then, the invention sets current equal to the first of these columns or fields and runs all tests, then it increases that number by one until all specified periods have been used.

In relative mode, period 0 ("zero") is the current period, −1 (to the left in the browse view) is the previous period and +1 is the next period (to the right in the browse view).

Formulas can be as simple as IF-THEN tests applied to data items, but they may become as sophisticated as expert system rules can be. The tests DBF file test.dbf holds all tests. These tests may be applied on individual records of the data.dbf file or on whole groups of records.

The tests DBF file test.dbf holds both line tests and group tests. Line tests contain a record reference in field DATA, while group tests contain a group reference in field GROUP.

The simplest tests simply compare the value of two different data items. If any test turns TRUE, then the associated diagnostic is written to the database with the information of the test that originated it and information of the data items it should be associated with. Applying a test to a group means applying it to all data items in that group.

FIG. 99 shows the file's fields structure. FIGS. 100 to 102 show partial browse views of the contents of the tests database file. Looking at FIG. 100, it's easy to notice that each test is coded in exactly one record of the tests database file, and each test has a unique and distinct code, stored in field TEST. The first four tests are applied to all data records that are a part of group SALES1, the next two tests are applied to records in group SALES2, etc.

FIG. 101 shows the contents of fields GROUP, FORMULA, NOTE and ACTION# for the same records in FIG. 100. Fields FORMULA and NOTE are xbase memo fields. This allows for the creation of very long free-form formulas and messages. Action fields are better understood when remembering that whenever a test returns the TRUE value, that same test writes a corresponding diagnostic with the same test's code or identifier into the diagnostics database. Thus, the test's messages contained in its memo fields and the action fields are also the corresponding diagnostic's memo and action fields.

In the example shown in FIG. 101, action fields correspond to the company's departments (ACTION1), the gravity of the message (ACTION2), and the person responsible (ACTION3).

FIG. 102 shows the logical formulas for the same tests shown in FIGS. 100 and 101. The logical formulas shown are stored in memo fields, as shown in FIG. 101.

The first test's formula reads like this:

$$G(\text{``current''}){<}G(\text{``goal''}).\text{AND}. G(\text{``current''}){>}G(\text{``previous''})$$

Function G represents any data record in the group defined in the test. For this first test, the group is called SALES1. The invention runs this logical formula on each and every record in group SALES. This particular tests should be interpreted as: "if the current value is smaller than the goal for and if the current value is larger than the previous value". If the test turns TRUE then the test's code, stored in field TEST (it's value for this test is also SALES1), is written to the diagnostics database, together with the identifier for the particular data item (data record and column or field) where it turned TRUE. Since the same test will be performed on many data items (all those in group SALES1), a lot of diagnostics (or none at all!) may be written to the diagnostics database. For this reason, it's also necessary to identify the particular data items where the test is TRUE.

In the previous formula, "current", "goal" and "previous" are defined names in the data database file. This means that the user previously defined those names for specific fields in the data database (data.dbf) file. In this particular example, column 9 (field C9) is also "current", because the current value of each variable is always stored in that particular column, column 10 contains the previous value, and column 11 contains the goal. Thus, the formula could also be written like this:

$$G(9){<}G(11).\text{AND}. G(9){>}G(11)$$

As indicated previously, the invention's formulas may be run as relative or absolute formulas. These are absolute formulas because the data is always stored in the same precise columns (fields) in the data database file.

FIG. 103 shows the contents of the tests file for a different application: a simple financial analysis system. The first logical formula in this example reads like this: G(0)>2.5. This application operates with relative logical formulas. So, "0" means "current", "−1" would mean previous, etc. Any column or field can be the current period at any time. The user indicates which periods he wants the application to work on and those will be, one by one, the current period and the tests will run. The G function means this test will be run on all data records in the GEFFIC group. By contrast, the next logical formula reads like this:

F("1.FRATIOS.02",0)<0.25

This test is not a group test and it thus doesn't require any group definition, since it doesn't contain any G function, so it will run only a single time and on a single data record (code DATA="1.FRATIOS.02").

The invention also allows two operators on G functions. G functions with two operators function just like F functions, so that F("1.FRATIOS.02",0) may be substituted by G("1.FRATIOS.02",0). They operate exactly in the same way.

Finally, the invention allows for the combination off and G functions in any particular formula. In this way, it's possible to combine and operate in any way group elements with references to absolute data items in the data database.

Besides F and G functions, there are other important functions that may be used in any tests:

Users may also define their own functions. Any function may call an external program and read the values returned from that program. In one such example, a definable function may call and run one or more neural networks on a particular set of data in the data database and return the output values of that run as weighting factors and TRUE or FALSE responses thus controlling whether specific diagnostics should or should not be written in the diagnostics database.

In this way, definable functions let users define their own tests, where even complicated programming and external programs such as neural nets and genetic algorithms may be used.

The test-processing engine (10) then interprets and executes all formulas for a particular data period at a time, reading and comparing all relevant data items, and whenever a test's conditions turn TRUE, generating and writing one or more diagnostic records in the diagnostics DBF file result.dbf (38).

Remember that all the test identifier for each resulting diagnostic is field TEST in file result.dbf, which is read from field TEST in file test.dbf. In xBase notation (or FoxPro™ notation), this is written as RESULT.TEST=TEST.TEST. The data item identifier is composed of two fields: the data record identifier, which is field DATA in file data.dbf, and the CURRENT period identifier, which is stored in field NPER of file result.dbf. Remember that the CURRENT period identifier had to be determined by the user just before running all tests.

File test.dbf also holds fields ACTION1, ACTION2, etc. These fields serve several purposes: they are a means to classify all tests, and hence their derivative diagnostics; these classifications may represent anything the user fancies, such as the people responsible, whether the tests and diagnostics represent opportunities, dangers, etc., what should be done about each one of them, etc. These fields may mostly be interpreted as triggers and actions (23, 42, 43, 44), since whenever a test containing a particular code in a ACTION# field turns true, a particular action, procedure or program may be executed. The code to develop such an application should be obvious to anyone skilled in the art.

After the diagnostics have been generated, the user may query the diagnostics database and the data database simultaneously in two or more separate windows.

The way the linking between tests and diagnostics is done is simple: Each test is identified by its code TEST. Individual diagnostics ARE NOT identified by any particular code. Whenever a particular test identified by TEST turns out to be true, then a new record is added to the diagnostic database (result.dbf). The new diagnostic record will contain the test identifier TEST, which will now be stored in field TEST of file result.dbf, and it will also contain the identifier for the one particular data item the diagnostic will be linked to (fields DATA, identifying the particular record, and NPER identifying the particular field or period number in file data.dbf).

In this way, each diagnostic record will contain the test code (TEST) and the data item identifier (DATA, NPER). Thus, when looking at a particular diagnostic, it's easy to find the related (linked) test with all the messages and associated actions, and the related (linked) data item. On the other hand, when looking at a particular data item, it's easy to find all those diagnostics that are related to it by simply searching for the data item identifier (with the corresponding values for DATA and NPER) in all diagnostic records. In order to speed up the search operation, the files may be indexed following database indexing procedures.

The qualities that make this invention particularly innovative are the mapping of the data into the diagnostics combined with the coordinated query of both the data and the derivative diagnostics, all this integrated with an EIS system, and even integrated with external Artificial Intelligence programs and techniques. The fact that no other implementation generating and querying diagnostics in any way similar to this, at least in functionality, has ever appeared in the market, only underlines the uniqueness and unobviousness of the invention.

FIG. 137 summarizes the most important elements contained in the program's structure. FIG. 137 shows a structured outline describing the invention's simplified program structure. This indicates that the invention is a program comprising one or more data tables (5, 37), tests in one or more lists of tests (9, 17, 39), diagnostics in one or more lists of diagnostics (7, 27, 38), and pointers (21) in one or more lists of pointers (17, 25).

Each data table contains numbers (12), and their row headings (49) and column headings (52). Each test in each list of tests contains: (A) a conditional formula (57) of the form IF(condition) that evaluates to TRUE or FALSE, (B) a set of messages (9, 39) containing a short message (55), a long message (56) and a packaged object, where the packaged object may be a graph, a sound note or a video clip, (C) an algebraic formula containing a fuzzy logic expression with references to specific numbers in the data table or diagnostics in the list of diagnostics, (D) test pointers to other items such as specific numbers in the data table, memorandums containing a recipient's address, a text message and a set of labels, and action labels in a list of action labels (42, 43, 44), where each action label conveys an additional user-definable meaning such as an associated action, a priority level, or the name of the person responsible for a task.

Each conditional formula (57) may contain (A) number references (21) to one or more numbers (12) in any one of the data tables, (B) test references (52, 53) to one or more tests in the list of tests and (C) user-definable functions containing calls to neural network programs, genetic algorithm programs, and other artificial intelligence programs.

Each diagnostic in the invention's program structure in each list of diagnostics contains bi-directional diagnostic pointers (53, 54) to other items such as one test in the list of tests, specific numbers in any one of the data tables, and one or more diagnostics in any one or more lists of diagnostics.

Finally, the program's structure also contains one or more lists of pointers containing bi-directional expert tests pointers (53, 54) between any two or more tests in any one or more lists of tests.

Also based on the program's structure shown in FIG. 137, the invention's tests evaluation process could be described in the following way:

The program evaluates each test in each list of tests (9, 17, 39) by brute force, where all tests are evaluated repeatedly until no more diagnostics are generated, or, following the sequence of tests to evaluate by forward chaining or backward chaining, just like an expert system, where the sequence of evaluation is designed from the bi-directional expert tests pointers between tests, in the usual manner of expert system evaluation schemes.

If, for a particular test, condition formula (57) evaluates to TRUE, then the program creates a new diagnostic and adds it to a diagnostics list. The newly created diagnostic will contain a diagnostic pointer (53, 54) to the test just evaluated and one or more diagnostic pointers to one or more of the numbers pointed to by the test just evaluated, and the numeric value resulting from the evaluation of the algebraic formula.

Also based on the program's structure shown in FIG. 137, the invention's ability to let user's browse all diagnostics and information can be described in the following way:

The program shows information contained in the data table (5, 37) and the list of diagnostics (7, 27, 38) in a coordinated and simultaneous manner. The program's computer screen may show simultaneously: (A) a numbers browse window (71) showing selected numbers (12), row headings (49) and column headings (52) from the data table (5, 37), (B) a short messages browse window (70) showing short messages (55) from tests in the list of tests (9, 17, 39), (C) a long messages browse window (70) showing long messages (56) from tests in the list of tests, (D)) a packaged objects browse window showing packaged objects in tests in the list of tests, (E) an action labels browse window (69) showing action labels from the list of action labels (42, 43, 44) where all elements shown in all previous browse windows are directly linked by test pointers (53, 54) and diagnostic pointers (53, 54).

Also based on the program's structure shown in FIG. 137, other functions and operations that the invention's program also performs can be described in the following way:

(A) Following an appropriate user request, the program generates graphical data screens in the form of Executive Information Systems (EIS), each screen showing a graphical representation of the numbers (12) in the data tables (5, 37). Some elements such as individual graphics and numbers in the graphic screens may operate as user-activated buttons: when pressed, the program shows a predetermined graphical data screen linked to that particular object.

(B) Each one of the graphical data screens is linked by bi-directional links to corresponding diagnostics that can be shown simultaneously at users' requests. After selecting any particular diagnostic, the user may request the program to show those graphical data screens that are linked to this diagnostic. Similarly, after selecting any particular graphical data screen, the user may request the program to show those diagnostics that are linked to this graphical data screen.

(C) Following an appropriate user request, the program may print all those memorandums assigned to any particular diagnostics. These memorandums may also be sent to their respective addressees by electronic mail.

Selected algorithms in the program are described in more detail in the following sections.

QUERYING SYSTEMS

Coordinated Browse Windows

In the following paragraphs, the COORDINATED BROWSE WINDOWS will be discussed.

The invention's preferred embodiment has implemented a simultaneous and coordinated browse view of all relevant concepts. FIG. 9 shows the particular way the browse screens and browse view are created and shown in the preferred embodiment. It shows a four-way browse view where four simultaneous browse views are shown. Here each browse view is the result of a particular BROWSE command from the Microsoft FoxPro™ language by Microsoft Corporation. The four browse views mentioned are identified in the figure by the titles: "1 expert window", "2 actions window", "3 diagnostics window", "4 data window". There are also two more windows, called "keywords window" and "text window". Here, if the user selects the "4 data window" by use of some pointing mechanism, the program will then operate in a manner similar to that shown in FIG. 10. That is, the user may scroll through the data and the associated diagnostics will appear on window "3. diagnostics window". Similarly, if the user selects the "3 diagnostics window", the program will operate in a manner similar to that described in FIG. 11. If the user selects the "2 actions window", the program will operate in a manner similar to that described in FIG. 12, the action categories view. If the user selects the "3 expert window", the program will operate in a manner similar to that described in FIG. 13, the expert diagnostics view.

The arrangement shown in FIG. 9 is much more flexible and powerful than any other arrangement where only a few of these browse windows are activated at any particular time. In the arrangement shown in FIG. 9, the user only needs to point at a particular window to find a particular action, a particular expert diagnostic, etc. The user will be able to directly jump from the expert diagnostics to the associated quantitative data, etc. Also, it's very easy to move and resize all windows, and to even hide most of them. Any user can completely change the look and operation of the browse system just by moving, hiding and resizing, plus adding changes to the font sizes and using graphics in the Gen window (the best embodiment also provides a Gen window).

The Gen window is a very interesting option in the browse system. Every test contains an associated Gen field. Gen fields are shown in the Gen window in synchronization with their associated diagnostics. That is, for every one of the browse windows modes, whenever a particular diagnostic is activated in the diagnostics window, its associated Gen field will show in the Gen window. Gen fields are a powerful and most flexible tool. The user can look at movies, sound recordings, graphics and even run any other programs just by double clicking there). In order to integrate any of these options into any Gen window the user only needs to copy it there. However, the invention allows the copying of these options into Gen windows only during tests definition.

In typical implementations, the user must first double-click on the Gen field in order to execute the object associated to that field. However, this is not always necessary. It is possible to predefine a group of commands in such a way that whenever a particular Gen field shows in the browse window, that Gen field will automatically be activated and it will immediately activate its associated object—thus playing the movie or sound recording, or any similar action—. This is done using command "@ ... SAY fieldname VERB" in the Microsoft FoxPro 2.5 for Windows™ programming language by Microsoft Corporation, used in combination with specific coded parameters—later translated to the main verbs controlling the packaged objects execution, such as "play" for a movie—, where VERB 0 automatically executes the default and principal action associated to the object. The details of this operation may be found in the documentation of the Microsoft FoxPro 2.5 for Windows™ programming language.

The applications of the Gen field used in conjunction with these commands are almost limitless. The invention's diagnostics recommend specific actions and the invention may also execute it immediately. It may also be used to give specific speeches and recommendations when specific diagnostics are activated.

A relevant experience is described in "Braimakers", a book by David H. Freedman, published by Simon & Schuster in 1994 (quotes excerpted from pages 40 to 42):

Roger Schank was in charge at Yale's AI department, and he now got Andersen Consulting to back him in founding Northwestern University's Institute for the Learning Sciences in 1989. Schank's story-telling system comes in several versions, including one that helps children learn about animals, another that assists executives in business decision making, and a third that aids military officers in logistics planning by relating two-minute videos of any of several thousand snippets of interviews with generals involved in the Gulf War. In each case, the system accepts some form of "query" from the user and then sills through indexes to determine which few stories would be of most relevance. Then the system offers up additional stories it deems to be of related interest, forging a chain of text boxes, talking heads, nature scenes ... "Case-based reasoning". Is it really artificial intelligence? "Intelligence is understanding past experiences and reasoning from them".

Schank's approach is one incarnation of a general approach to AI that has long been the favorite of the business world: "expert systems." This approach is based not on the precise, formal world of logic but rather on "heuristics" or "rules of thumb", Schank and other researchers are taking the heuristics approach to AI to extend its usefulness beyond today's restricted applications.

The invention allows easy development of many different applications, one of which is a family of systems and applications similar to the heuristic system being developed by Mr. Schank.

EIS Operatioin in the Invention

In the following paragraphs, the EIS OPERATION IN THE INVENTION will be discussed.

For a query system, the invention presents two basic tools an a full array of additional options. The basic tools are: (a) the multiple browses window described in FIG. 9 and also shown in FIGS. 51, 52, and 55 to 60, and (b) the EIS presentation system shown in FIGS. 27 to 29 and 48 to 50.

The invention also contains a full array of additional options including some tools typically available in most database administrator systems and which the user may use to develop other automatic query options, such as querying tools with which it would even be easy to implement a QBE (query by example) system, filters (to select those fields and records to be examined), SQL statements, etc. Of the two basic tools, the multiple browses window is discussed elsewhere in this document. The EIS presentation system will be very briefly discussed here.

The EIS presentation system doesn't require a full explanation here, because this is a highly typical set of screens designed as to be of a general purpose and to convey as much information as possible to managers.

First, a minimum set of screen types was designed. Each screen type is only different from any others because of the number and positioning of the elements in the screen. An ever-growing menu of these screens will be available to users, so that whenever a user needs to do a presentation, he can choose a screen type and later fill it with values. Users may add their own screens or modify those provided with the system. In the preferred embodiment's implementation, the user must have the Microsoft FoxPro 2.5 for Windows™ database programming system. All calls and references to screens are directed via a table stored in a DBF file, accessible to everyone. This means that, just by giving users access to a couple of .SCX and .SCT files in the application, they will be able to develop their own screens.

One of the screen types designed for the EIS system is shown in FIG. 50. This screen contains 15 different graphics distributed in the page. FIG. 50 shows a highlighted graphic. If any particular graphic or object is pointed to by the user, then the invention automatically calls any other screen associated to that particular graphic or object.

Whenever any EIS screen is displayed in the computer, the invention may also show a separate movable and resizable window containing a diagnostic associated to the data shown in the EIS screen. This is a user-controlled option so it may be turned off anytime. If turned off, the diagnostics window simply disappears from the screen. If the option is turned on by the user, the screen will also show the diagnostic. The diagnostic that shows is always the diagnostic with the highest fuzzy number among those diagnostics associated to all numbers shown in the EIS screen. This makes sense only if the fuzzy numbers convey the meaning of importance or relevance to the user. In this case, the diagnostic that shows is the one that is most important according to the user's own preferences.

EIS screens may also contain a button that, when activated, immediately activates the multiple browses window. This window should automatically show those diagnostics that are related to the EIS screen that was last active. This option hasn't been implemented in the best embodiment's code included at the end of this patent document, but its implementation is fairly simple and obvious to anyone skilled in the art who has become familiar with the other elements of this invention.

For more details on the technical implementation of this system, please consult the information provided in section identified as DETAILED OPERATION OF THE EIS SYSTEM.

Drilldown Reporting

As it has been indicated in the previous section, for querying purposes, the invention also contains a full array of additional options including some tools typically available in most database administrator systems and which the user may use to develop other automatic query options, such as querying tools with which it would even be easy to implement a QBE (query by example) system, filters (to select those fields and records to be examined), SQL statements, etc. Three short examples of these tools will be briefly examined here.

FIG. 61 shows the Query Options dialog box, also called Filter dialog box throughout this document. This option should be used to: (a) generate selected EIS screens for a particular time period or set of products and companies, (b) select a particular action category to review—such as a particular person in the organization—, (c) review those diagnostics whose fuzzy value is larger than a preset value, according to user preferences and responsibilities. The Filter dialog box allows any user to effectively query the system by filtering in or filtering out any particular records according to the query criteria.

Outlining options allow users to classify information by levels and, later on, to limit information displays to any desired level or levels of information. The simplest implementation of an outlining option is to simply use any of the fields in the data database (data.dbf) file as an outlining field. This field could contain any one number from 1 to 10 (or any other ordered set of numbers). The Filter dialog box should have an option where the desired level (1 to 10) of the outlining option is set. The data window (71) in the multiple browse screen described in FIG. 9 will now only show those records whose outlining field contains a number higher than the number set in the Filter dialog box.

Sorting and goto options could also be added. One or more sorting fields could define the order in which the data records are shown. The preferred embodiment already contains a definable GoTos picklist window.

INTEGRATION OF DIFFERENT AI TECHNOLOGIES

Learning Ability and Ability to Integrate Additional AI Technologies

As it has already been said, Artificial Intelligence (AI) techniques work best when used in combination. Binary neural nets, genetic algorithms and even classifier systems may be applied on the data in order to generate specific diagnostics. Fuzzy logic can be used in the development of a weighting system for the resulting diagnostics. In this document, Other Artificial Intelligence (AI) applications such as database miners, knowledge extractors, applications developed using neural nets, expert system applications developed using popular ES shells may also be integrated with the invention. For example, database miners generate sets of rules that may provide invaluable insight when added to the logical rules operated in the invention. The integration of any existing database miner with the invention is totally straightforward: the only thing needed to automate the process is a translating program that will convert the syntax of the rules generated by the database miner into one acceptable to the invention's rule parser.

Integration with External Expert Systems

It has already been described that the invention allows users to define their own functions. These functions are executed when the corresponding tests is called. Any of these functions may contain one or more calls to external programs of any kind, like, for example, calls to expert system programs or shells.

However, it's also possible to integrate the invention with other expert systems in a different way. After the invention generates the first diagnostics, these could be exported to any other expert system via a suitable conversion program. Then, the other expert system would process those diagnostics, and write its own results back to the invention. The invention may then (optionally) generate additional diagnostics and then query all the resulting diagnostics together with the original database.

It should be noted again that the invention's best embodiment implementation includes coding to read and write with more than twenty different formats, plus together with the ODBC™ protocols option by Microsoft Corporation, it can also read and write many more.

This shows that, using today's technology, there shouldn't be any problem to find a suitable format for the invention to communicate with other expert systems (most expert systems and expert system shells contain options to import and export information to several popular database formats).

Classifier Systems

The invention can also learn using the same mechanisms as a CLASSIFIER SYSTEM (a single and simple set of rules codified in DNA-like text strings, genetic procedure to reproduce rules), but operating with databases. Classifier systems are a kind of rule-based systems with general mechanisms for processing rules in parallel, for adaptive generation of new rules, and for testing the effectiveness of existing rules. Classifier systems provide a framework in which a population of rules encoded as bit strings evolves on the basis of intermittently given stimuli and reinforcement from its environment. The system "learns" which responses are appropriate when a stimulus is presented. A classifier system consists of the following components: detector and effector, message system (input, output, and internal message lists), rule system (population of classifiers), apportionment of credit system (bucket brigade algorithm), and genetic procedure (reproduction of classifiers).

WEIGHTING FUZZY LOGIC SYSTEM

The following paragraphs will describe a sample application using a FUZZY LOGIC WEIGHTING SYSTEM IN THE INVENTION.

Any application developed in the invention transforms information at least twice: (a) logical tests transform raw data into diagnostics, and (b) expert tests generate new diagnostics from other diagnostics already generated. The first process (a) is a mapping process from data to diagnostics and the second (b) corresponds precisely to the logic operation of clauses in an expert system.

Just as logical tests (whose output is limited to TRUE or FALSE) transform data into diagnostics, it's also necessary to introduce some mechanism to give certain quantitative value measures, which are handled by fuzzy logic techniques. This first process is handled through tools called "fuzzyfiers" throughout fuzzy logic literature. In the invention, each diagnostic is accompanied by a number of fuzzy values. The three fuzzy values might represent, for example, the level of importance of different diagnostics and messages to different managers (users of the invention) throughout the firm. The three fuzzy values accompanying each diagnostic are generated by three independent and simple formulas that take the values of different data items and generate a number that may range from 0 to 1 and is stored as the fuzzy values associated to the diagnostic. Each formula will respond to the preferences of each manager.

In other words, each resulting diagnostic in the invention has a set of associated fuzzy values. Each one of these fuzzy values is calculated from a user-definable formula (a fuzzyfier), and responds to the particular requirements the application being executed.

In a parallel way, expert tests and expert diagnostics also have a set of fuzzy formulas associated with them. In the example described before, each expert test will have three fuzzy formulas, and each expert diagnostic will show three fuzzy values generated by these formulas. But these formulas aren't fuzzyfiers anymore. Fuzzyfiers convert from the realm of ordinary numbers to the fuzzy logic set. Now we're totally operating within the fuzzy logic set. That is, each one of this formulas will read and operate the fuzzy values of other diagnostics, operate on them and finally generate a fuzzy value for the resulting expert diagnostic. These formulas associated to expert tests mostly operate on basic laws of fuzzy logic. In fuzzy logic, the fuzzy value associated to logical expression A AND B is simply the minimum of the fuzzy values of A and B (see FIGS. 123, 124 and 126). Similarly, A OR B corresponds to the maximum of these fuzzy values (see FIGS. 123, 124 and 125). Following these and other basic fuzzy principles, it's usually very simple to develop a set of fuzzy mathematical formulas closely following the logic statement in each expert test.

Let's now look at a sample application using the invention as a fuzzy logic system: a corrective management system. The manager in charge is unhappy with four divisions in his company because these four have been generating wildly erratic numbers: one month they seem to be fine, and the next month everything has changed. So this manager has hired a consultant to develop a system that will set a mathematical model that will find which divisions are more stable. However, this manager doesn't want to deal with absolute numbers: increases and decreases in value should be treated differently. The manager has very specific ideas about what is to be called good and what is going to be called bad. Using a non-biased graphic measuring device, a map has been developed generating the manager's personal preferences in terms of profit variations. Another map represents the manager's preferences in terms of monthly changes in the number of defects per division. These maps are represented in FIGS. 123 and 124.

FIGS. 123 to 133 correspond to this particular example. This is only an example created to clarify the use and operation of fuzzy sets within the invention and their possible applications to business, management and decision support, and it should not be looked at as a professional application.

This management system produces reports like that shown on FIG. 127: profits and number of defects for four business divisions for the previous and current periods, and the increment (decrement) in these numbers. The increments (decrements) of profits and defects are mapped into a set of fuzzy values with the aid of two conversion tables (FIGS. 128 and 129)—the graphics shown in FIGS. 123 to 126 refer to this same set of numbers—. FIG. 130 shows the same numbers as in FIG. 127, plus the fuzzy values generated through the two conversion tables. Finally, the table shown in FIG. 131 shows the minimum and maximum fuzzy values for each division. If the manager is interested in taking care of those situations that require corrective action in profits AND in defects reduction, then he should concentrate on the highest numbers to the right, under the heading "AND" (this means, division 1, with the highest value: 0.15). If the manager is interested in taking care of those situations that require corrective action in profits OR in defects reduction, then he should concentrate on the numbers to the left (in this particular example, this would also take him to Division 1, now with the value 0.80, and then to divisions 3 and 4).

In order to implement a full-fledged fuzzy logic system in the invention . . . no new functions need to be programmed! Fuzzy logic operations are simple. Users should simply respect the rules of interpretation of fuzzy logic when they build their formulas, and in this way the fuzzy logic system will perform the right way.

According to the description in the preceding paragraphs, we have seen how, in the invention, each test and diagnostic has a set of associated weighting numbers, whose values may be between 0 and 1. These values are used for several purposes, some of which are: (a) Allowing a more intelligent and flexible system to generate expert diagnostics—some expert tests may also contain logical conditions based on the value of existing diagnostics in the database—. (b) Filtering and showing only those diagnostics whose absolute value of the weighting factor are higher than a specific value. (c) Thanks to these fuzzy value numbers, it is now possible to generate reports where the most important indexes and ratios are classified by categories of importance, it's even possible to generate comparison graphs.

Expert tests usually are based on logical tests based on the previous condition of other diagnostics. However, although this is not recommended—if this is done too many times, it may later prove confusing—, the invention also allows the development of logical tests where the weighting values of existing diagnostics are compared to other numbers. For example, it's possible to create an expert test titled "the company is in serious trouble" where the logical test evaluates whether the average crisis (weighting factor) value for four different divisions is higher than a certain predetermined value of, say, 0.80. However, at the expert tests level, it is recommended that proper logical tests be developed. The existence of an expert diagnostic should only depend on the existence of predetermined diagnostics, and not on their associated weighting values. On the other hand, the weighting value of the expert diagnostic should only depend on the weighting values of predetermined diagnostics.

The invention could lose most of its value if it just shows an enormous number of diagnostics of limited value to the user. The invention should also select and filter the information most relevant to the user. The weighting factors are an appropriate instrument for this. That's why it has been suggested that, if three weighting factors are available then, these three weighting factors could be used as levels of importance or relevance for three different users of the system. For example, if the first user operates any application developed with the invention, then he will only look at all those diagnostics whose first weighting factor is larger than any specific number. Or, the application could show those diagnostics where the absolute value of the weighting factor is larger than any specific number. This would allow for the representation of "good" and important, and of "bad" and important things.

BACKWARD AND FORWARD CHAINING IN THE INVENTION'S EXPERT LOGIC

The Invention's Current Rule Firing Algorithm

The following paragraphs describe THE INVENTION'S CURRENT TEST FIRING ALGORITHM.

The invention's diagnostic generation general algorithm offers results similar to those of a FORWARD CHAINING expert system. However, the invention currently uses a brute force approach: it fires all the tests and generates all the possible diagnostics in the diagnostics database—the knowledge base, following the equivalent language for expert system technology—.

The brute approach calculation process follows three steps: (1) Generate all diagnostics from the original data. (2) Run all expert tests in order to generate diagnostics from the existing diagnostics. (3) Run all expert tests again and try to generate more diagnostics. Stop at the end of this step if no diagnostics have been generated in this step. Otherwise, execute this third step again.

The first step described in the previous paragraph is no different from any other forward chaining expert system test-firing algorithm. However, in forward chaining systems, the third step is unnecessary, since all tests are executed in the precise order of their relative dependencies in the second step. Forward and backward chaining algorithms run faster than the brute force approach described previously. However, forward and backward chaining algorithms first need to create a hierarchical tree of all tests in the knowledge base. FIG. 132 shows a simplified set of tests. If these were all the tests in an expert system, then test1 doesn't lead to any diagnostics more than diagnostic1, its own conclusion. However, test2 and test3 may produce diagnostic2 and diagnostic3, and since these are part of the premise of test4, then they may lead to diagnostic4. Given this, a forward chaining algorithm would generate a set of links and software pointers similar to those shown as arrows in FIG. 133. Then, if all tests are fired in the order suggested by the software links and pointers, step 3 as described above would not be necessary for the invention.

A Backward Chaining Algorithm

Any BACKWARD CHAINING ALGORITHM first requires setting goals. Again following the example shown in FIGS. 132 and 133, the user might select a final goal such as proving whether test4 is true or not.

For backward chaining algorithms, the issue of missing data becomes important. In the invention, most of the time tests are only fired when exceptional conditions are met. They don't try to describe whether each and any individual condition has been met or not. An example: the data might contain information about recent sales trends, and a particular test might be fired if sales go down. However, if the test doesn't fire, that might have happened because the information was missing or because the condition wasn't met. It's very important for the user to be very careful as to build a complete set of tests (if sales don't go down, there should be a message indicating this). Otherwise, the backward chaining algorithm might later ask lots of questions about the data.

Backward chaining algorithms use a set of links and pointers very similar to that shown in FIG. 133. However, the calculation starts at test4. The system will never be interested in test1, since it doesn't lead to test4. The system will thus check on test2 and test3 first, and analyze the links that lead to them similarly to the way it analyzed test4. Thus, the next tests to check would be those that lead to test2 and test3, if there are any. As soon as the system reaches the leftmost end of the links and pointers tree, it will start evaluating the tests from the leftmost side and moving all the way to the right. The system will only evaluate those tests that it traversed after it started from test4.

Implementations in the Invention

Both backward and forward algorithms could be implemented in the invention with some work. The invention already contains all the necessary tests and data to build the links and pointers tree, which is the only element still missing from the current structure in order to implement these algorithms. After that, the code implementation should be straightforward.

However, the nature and objectives of the invention are essentially different from other expert systems using forward and backward chaining algorithms. Those expert systems are trying to solve one specific question. That is, they have one simple goal, so the chaining algorithms are extremely important in order to streamline the calculations and find the precise paths in the logic tree leading to the solution. In the invention, a full database of diagnostics needs to be implemented in order to later be able to query it. For such an application, the logic tree implementation isn't really necessary nor convenient. Calculation times might even grow and missing values might prove to be a problem. Anyway, if for any particular applications there's the need to develop those algorithms, it's possible to do it without losing any of the current features and benefits in this invention.

Finally, the invention is capable of responding to the WHY questions required by many users from their expert systems. The WHY questions are answered visually, since at the same time that any expert diagnostic shows up in the corresponding browse window, those other diagnostics that explain its reason to exist are shown in another window, as shown in the sample screen of FIG. 59.

OPERATION OF DATA FORMULAS, TESTS AND DIAGNOSTICS

Operations with Data Items

The following paragraphs describe OPERATIONS WITH DATA ITEMS in the data database file.

The invention's development efforts are geared toward presenting to the user a spreadsheet-like environment to create, edit and work with the data database file and the logical tests. So this is all part of the preferred embodiment of the invention.

As a first step to achieve that, a few services have been integrated to the invention, such as an edit data outline, a data formula operations.

The Edit-Data-Outline option in the main menu generates a temporary working database file and loads into it selected information from the data.dbf file: code, name, format and one sample value field. Now, the user may simply change the format information for any record and immediately see what the outcome will look like, copy names, formats by blocks of cells, move information around, etc. This is still a database file but the coding gives the user the ability to edit the information just like he would do it in a spreadsheet environment.

The Edit-Data-Formulas option in the main menu lets users create or modify sets of formulas that can add all data items from two or more different records in the data.dbf file and write the result into a different data record. And this option does much more than that: any number of records may be operated using any mathematical formula the user writes.

Forecasting options have already been designed and will be added to the actual coding of the invention soon, so that users may execute self-adjusting forecasting options that intelligently select the best procedures for each data series in the data.dbf file. These are also a part of the preferred embodiment of the invention.

Most data formula operations and other services operating with the data and tests in the invention also contain options so that users may add their own definable functions in small .PRG files.

Groups of fields (that is, fields in the data.dbf file) will also be added soon to the coding. These are also a part of the preferred embodiment of the invention. These groups of fields operate in a manner similar to the CURRENT operation of groups in the invention (files group.dbf, detail.dbf, and the relation of these files with other files like test.dbf, etc.). Some of these groups of fields serve specific purposes, and in many cases, there will be a relationship to the CURRENT data field. That is, the user will first have to define which data field is the CURRENT data field. A few sample field groups are: group ALL with pointers to all data fields, group HISTORY with pointers to all data fields before and up to the CURRENT data field, group FORECAST with pointers to all data fields after the current data field, group REAL containing groups history and forecast (this group refers to all real financial numbers, for example), group BUDGET pointing to a different set of fields containing the budget numbers, group DIF containing numbers with the difference between real and budget numbers.

After defining field groups, it is extremely easy for users to define tests and data formulas that are applied to only one or more than one of these groups. Certain operations might only be applicable to forecasts, or to budgets, etc.

Pre-Defined Functions That May be Used in Logical Test Expressions

In the following paragraphs, a few selected PRE-DEFINED FUNCTIONS THAT MAY BE USED IN LOGICAL TEST expressions for fields formula1, formula2, formula3 and formula4 in file test.dbf will be described.

To interpret the meaning of the functions described in the following paragraphs, it's important to remember that the user should first select the current period before the invention executes any formulas and logical tests. For example, the user may execute the invention's formulas for all periods (that is, fields in the data.dbf file) from April '94 to June '94. Then, the invention will first define April '94 as "current period" and it will execute ALL logical tests for that month; then it will in turn define May '94 and June '94 as "current period" and execute all logical tests for each one of those months. Whenever a particular period is defined as "current period" it becomes period number zero (0). If April '94 is the current period, then that is period 0, and May '94 is period 1 and February '94 is period -2 (minus two).

One more concept needs to be reviewed: any formulas or logical tests may be applied on whole groups of data records (or lines in a data table). In order to do that, when defining the formula or the logical test, the name for an existing data group should be selected for the destination for the result of the logical test, and then Specific G( ) functions should be used to specify on which groups to operate. For example if there are three data groups called Sales, Costs and Profits, where each one of them contains five data records (fines), then formula G(Sales,0)−G(Costs,0)

assigned to Profits means subtracting line 1 of Sales minus line 1 of Costs and assigning it to line 1 of Profits. The same operation should be done for lines 2 to 5.

Function G([Group],Period). The first parameter (Group) is optional. Parameter Group contains the name of a DATA.DBF data group. If parameter Group is not present, then it is assumed that it is the same as the group that the test or formula is going to be assigned to. The second parameter (Period) is the name or number identifying a particular DATA.DBF period or field. When Period is a number, then it represents the relative number in reference to the current period (number 0), and it must be any integer number between −60 and 60. If this is a character string, then it represents a specific (nonrelative) identifier for a column or period, and it should correspond to the name for a particular data title defined when executing menu option "Format— Application interface—Data Titles".

Function F(DataCode, Period). Parameter DataCode is the identifier for a particular data record in file DATA.DBF. Parameter Period is a number of character string and it should be interpreted in the same way as in Function G( ) as described above.

Function xF(Application, DataCode, Period). This function operates in a similar manner to F(DataCode, Period), but it reads all data from the DATA.DBF file of any application created with the invention, where the directory location for this application is specified in parameter Application, a character string.

Function N(Group). This function executes a neural function for all data contained in the data group specified by parameter Group. For the example shown in the preferred embodiment implementation, Group must contain exactly three data records, and Function N( ) returns a logical value (TRUE or FALSE) instead of a number, so that the N( ) function cannot be combined with any other functions when developing a logical test. In this implementation, when the returned value of the neural algorithm is greater than 0.5, it is convened to TRUE and when it is smaller than 0.5 it is converted to FALSE. In an alternative implementation this conversion would not take place, so that N( ) would return the numbers resulting from the neural algorithm. This alternative implementation would be particularly useful when determining the weighting factors.

Logical tests (Data tests) have been designed so that all functions previously defined (and more functions defined by the user) may be combined in any form. For example: G(sales,0)−G(costs,0)>300 AND N(salesrecords) would be a valid combination.

The following functions should only be used when developing a formula for the weighting system of expert tests. For example, if the invention has already found that for April '94 sales are going down (diagnostic A) and it has also found that costs are going up (diagnostic B), and if diagnostic 1 has a weight of 70% and diagnostic 2 has a weight of 40% then expert diagnostic A AND B (let's call this diagnostic C) would be TRUE and expert diagnostic A OR B (let's call it D) would also be TRUE. If the user wants the weighting system to follow the rules of fuzzy logic systems, then the weight for diagnostic C should be the minimum of A AND B (that is, 40%) and the weight for diagnostic D should be the maximum of A AND B (that is, 70%). Defining these minimum and maximum formulas should be easy except for the fact that in the example above, diagnostic A may be true for three different sales products, diagnostic B may be true for four different products, and each one of these instances may have a different weighting number, since the number should depend on the gravity of the situation for each one of these products. In this case, what should expert diagnostic A AND B mean? In the preferred embodiment we have defined it as equivalent to (first_instance_of_A OR second_instance_of_A OR third_instance_of_A, etc.) AND (first_instance_of_B OR second_instance_of_B OR third_instance_of_B, etc.). Now, we need functions to find the maximum and minimum for all the weighting values assigned to a particular diagnostic.

In the preferred embodiment, there can be any number of different weighting values associated to each diagnostic.

However, all these examples and the coding presented with this document refer to three weighting values. These three weighting values are called A, B and C (and are stored in variables VALUE1 to VALUE3) and they result from the application of formulas called Formula A to Formula C in data tests.

Functions MaxA . . . MaxC and MinA . . . MinC all have the same syntax. For example MaxA(Test,Period) where parameter Period is a number or string representing a particular period or data column, and parameter Test may represents the identifier for any data test or an expert test in the application. MaxA finds the maximum "Weight A" or VALUE1 weighting value for all diagnostics whose identifier is equal to parameter Test (that is, all diagnostics resulting from application of the particular test whose identifier is parameter Test).

Function O(Test) evaluates to TRUE if any diagnostic (either a data diagnostic or an expert diagnostic) with an identifier equal to parameter Test is present for the current period.

In order to build to build any formula and test expressions using the previous operators, the user should now follow the following rules of correctness: (1) For any data test, FORMULA is a logical expression combining functions F,G,N, xF and operators +,−,*,/,^(exponent), >,<,←,>= AND, OR, NOT. (2) For any data test, Formula1 . . . Formula3 are arithmetic expressions combining functions G,F,xF and arithmetic operators such as *,+,−,/. (3) For any expert test, FORMULA is a logical expression that may use functions O and MaxA . . . MinC and arithmetic operators +,−,*,/ and logical operators such as >,<. (4) For any expert test, Formula1 . . . Formula3 are arithmetic expressions combining MaxA . . . MinC and arithmetic operators such as −,*,/,+.

Again, the user may add new definable functions to the logic analysis system.

APPLICATIONS

Application Development

In the prior art, knowledge acquisition theories and tools have been designed to ease development of expert systems.

In the invention, applications development has been structured by levels. This also makes the user's tasks much easier, since it invites to the development of intelligence using only small steps and reaching a slightly higher level of awareness with each of these steps. At the first level, tests may perform simple comparisons between data items. Examples of these tests might include "sales are going down", "this business unit has fallen more than two places: from third to fifth place", "this is the third consecutive month with dwindling profits." Etc. Higher level tests would combine previous diagnostics with other tests on data items.

To ease development of intelligent applications in different knowledge fields, higher level analysis tools should be provided. Using the concept of a popular kids' game as a metaphor for knowledge building, these analysis blocks could be called Lego. Legos' knowledge building blocks are reusable and flexible.

A few examples of basic structural Lego knowledge building blocks are: (a) Development of ratios, indexes and parameters to measure financial operations, efficiency levels, etc. (b) Inspection—auditing—of rates of change, structural changes, balance verification and data consistency. (c) Comparisons of actual numbers vs. goals and budgets for governments, businesses, finances, quality goals, etc. (d) Statistical quality control. (e) Management of personnel by jobs, stages for each job, deadlines, budgets and outstanding accounts per job. (f) Strategic criteria and comparisons with competitors, structural changes, first competitors to define a change in a key variable, leaders and followers. (g) Efficacy by categories such as regions or market segments. (h) Levels by categories such as types of products, profit margins, time and cost, sales potential—applicable to inventory levels for manufacturing companies or to outstanding credit lines for financial institutions.—(i) Experience gathering: administrative criteria, economic analysis, monetary policy, business planning.

At the end, the invention should provide: (a) Information on prioritary activities, by level of priority—diagnostics and suggested actions—. (b) Intelligent synthesis of information. (c) Immediate communication to dynamize personnel or depending institutions.

Quality control as a business management tool is a good example of a field that can be greatly benefited by the invention. Quality control hasn't reached its full potential as a business management tool because of the huge expenses required to put it to work. Quality control requires handling a large amounts of information, following on lots of ratios and numbers, and communicating each person in the organization whenever there's anything that needs to be corrected. The management of such an effort and the handling of all that information is so expensive that sometimes the quality benefits are lost in all the extra costs. The invention can solve most of these problems, since it can handle, analyze and generate recommendations based on massive amounts of information, and even send the right information to each particular person in the organization.

Integration with Other Applications

In the following paragraphs I will now discuss integration of the invention with other programs and applications such as decision-support tools, where the invention is capable of completely reconfiguring their interfaces according to the intelligence conveyed by the underlying data.

Existing decision support systems show a predefined set of screens and graphics. They sometimes incorporate downdrilling, so that users may point at specific graphs and immediately get more information on the desired topics. The invention substitutes that concept with that of automatically-configurable decision support systems. In these systems, the information is conveyed by order of importance. Unnecessary information, graphics, etc., are automatically deleted.

Imagine any manager turning on his or her computer to see what actions, reviews and priorities the software suggests, based on learned experiences, on the manager's own criteria and that of other consultants and managers in similar positions. Also imagine adding the following options to any standard management information or EIS system:

Priorities

Memos

Data Interpretations

If the user selects "Priorities", the system will show what it has found on the data. For example:

Leading client reports exceptional situation

Cashflow forecast below minimum

Manufacturing quality program below par for product A

Inadmissible efficiency level for Division B manager

Choose any one of these options, and the system will show the relevant data, a full interpretation, suggested actions, and pre-prepared memos that could be sent immediately to the corresponding people.

The invention's preferred embodiment already integrates its own EIS system in this way. It supports downdrilling and presents a predetermined set of screens, but these screens have been integrated with the diagnostics, and the user may navigate from the EIS to the diagnostics and from the diagnostics to the EIS. We should remember that the diagnostics are automatically generated by the intelligence in the embedded applications in the invention. With a slight modification to the accompanying code in the preferred embodiment, in the invention's EIS system, diagnostics may even act as a menuing system for the EIS tool. The change would be simple: currently, each EIS screen contains bi-directional links (pointers) to the data. So, we can easily go from any data item to all the EIS screens containing a reference to that data item. The invention also provides bi-directional links between the diagnostics and data items. So, it's very easy to go from any particular diagnostic to all those EIS screens containing references to the data items associated to that diagnostic. In this way, the diagnostics act as a menuing system, and the interface is intelligent and auto-configurable.

Following the same principles described in the previous paragraphs, the invention may control more extensive changes to other programs' interfaces, according to the diagnostics and priorities identified. In this way, business programs could immediately execute showing only the options applicable to the situation at hand. Word processors could call particular document templates and present only those options applicable to the situation, etc. The programming required to control applications in this manner is frequently trivial. For example, the new generation of programs in the Microsoft Office™ software suite by Microsoft Corporation of Redmond Wash., containing a the MS Word 6.0™ word processor, the MS Excel 5.0™ spreadsheet program, a presentation software program, a database program and a mail service option, allow users to easily modify program interfaces and available menu options. These programs are so flexible, that they have been designed so as to be combined and operated together. For example, the spreadsheet program may run as a window within the word processing program using the OLE 2.0™ programming technology by Microsoft Corporation. In order to create a particular menuing environment and program interface, the user only needs to select the appropriate programming option (such as Tools-Customize in the MS Word 6.0™ word processing program) and then the user will visually select the options desired in the menu bar. Then, the recently configured menu could be associated to any particular document, sets of documents or to a document template and, whenever any of those documents or templates are opened, the new menu will also be activated. Other leading software companies have also incorporated this level of flexibility and programming ease for the user to customize the program interface. So, it is rather trivial to develop the programming necessary for the invention to control the interface, look and menu options available to the programs in use by several persons in the organization according to the diagnostics, actions and priorities identified by the invention for these persons.

INTEGRATION WITH OTHER AI APPLICATIONS

The invention will also be enormously enriched when INTEGRATED WITH OTHER AI APPLICATIONS such as: database miners, knowledge extractors, applications developed using neural nets, expert system applications developed using popular ES shells. For example, database miners generate sets of rules that may provide invaluable insight when added to the logical rules operated in the invention. The integration of any existing database miner with the invention is totally straightforward: the only thing needed to automate the process is a translating program that will convert the syntax of the rules generated by the database miner into one acceptable to the invention's rule parser.

INTEGRATION SCHEMES WITH SPREADSHEET PROGRAMS

Two different INTEGRATION SCHEMES WITH SPREADSHEET PROGRAMS and spreadsheet applications have been tried.

DDE INTEGRATION WITH SPREADSHEET PROGRAMS

The first one, the DDE INTEGRATION OF THE INVENTION WITH SPREADSHEET PROGRAMS, requires simultaneous operation of the invention and the spreadsheet program in the computer. In order to offer adequate response times, the computer should have at least 16 MB of memory. With less memory, the two programs typically take one to two seconds to respond to each keyboard press such as pressing the down arrow to move down one position in the browsing window.

The DDE integration of the invention with spreadsheet programs uses the Dynamic Data Exchange™ programming services embedded, by Microsoft Corporation of Redmond Wash. The Dynamic Data Exchange programming services are always provided in the Microsoft Windows 3.1™ software environment by Microsoft Corporation.

A prototype for spreadsheet integration using DDE has been implemented in the preferred embodiment has been implemented with the Microsoft Excel 4.0™ spreadsheet program by Microsoft Corporation. This prototype was developed mostly as an exercise and a first step to demonstrate how this integration could be developed in a full scale implementation. Both the invention and the spreadsheet program are loaded into memory and their screen displays are rearranged so as to fit simultaneously in the computer's display. For example, the spreadsheet program could take the upper half of the display and the invention could take the lower half. The invention should have a particular application loaded: that application containing the same data (or at least part of the same data) contained in the spreadsheet that is going to be used. Also, the invention should have the data browse view activated. This is the view shown in FIG. 10 and FIG. 60. The windows should be resized so as to be able to see the diagnostics browse window (70), that is, the browse window containing the diagnostics, even when both the spreadsheet program and the invention show simultaneously in the computer's display.

Then, using the spreadsheet program, a specific workbook application should be opened. This .XLW workbook application contains one macro spreadsheet with enough macro programming so as to define and initiate the DDE channel, and it also contains the programming to receive and interpret information from the invention indicating which data item is being displayed in the invention's data browse window. The .XLW workbook application also contains a first worksheet containing the same data items in the data database file in the invention (the data doesn't need to be exactly the same, but at least some data items should coincide in order for both programs to synchronize sometimes). The first worksheet may be build in any way so as to give the user enough flexibility to prepare elegant graphic presentations of any kind. The .XLW workbook application should also contain a second worksheet containing the data item codes (data code and period, that is information on fields, DATA.DATA and DATA.NPER, following standard xbase notation) for each data item in the first worksheet. Each data item code in the second worksheet should be in exactly the same position as the corresponding data item in the first worksheet. For example, if two particular data items are located in cells F11 and G14 in the first worksheet, then the corresponding data codes for those two data items should be located in cells F11 and G14 of the second worksheet.

The macro spreadsheet in the .XLW workbook application should also contains specific macros that are activated whenever the user presses any one of the four basic cursor keys (arrow down, arrow up, arrow right and arrow left). When any of these keys are pressed, the corresponding macro program starts execution. This macro program first verifies if the user is now positioned in the first worksheet of the .XLW workbook application, as described in the previous paragraph. If that is not the case, then the program stops and exits. Otherwise, if the user is now positioned in the first worksheet, then it reads the row and column identifiers for the current cell where the cursor is positioned. Then it reads the data item code stored in the second worksheet, in the cell with the same row and column identifiers read just before. By doing this, the macro program has identified the data code for the data item selected by the cursor position in the first worksheet. Now, the macro program sends the data code information to the invention via DDE and it passes program control to the invention. The invention receives the data code information via DDE and it feeds this data code to the data browse window (71, FIGS. 10 and 60). The invention looks for the particular data item with that code in the data browse window and it positions the cursor on that data item. Then, the invention operates as it usually does. Since the diagnostics window (70) is a dependent view synchronized and linked to the data window (71), then the invention shows the diagnostics associated with the data item just selected.

The final effect of all this operation is that when the user moves in the spreadsheet application using any of the four cursor (arrow) keys, he will be able to see his own spreadsheet worksheet containing the data (and maybe also some graphics, since he has designed this worksheet any way he wants). After one second or so, the invention's diagnostics window will show the diagnostics diagnostics to the data item just selected by the cursor in the spreadsheet. However, it's important to also mention that the user may program his worksheet application in order to associate any diagnostics with any worksheet cell, just the way he wants to do it. For example, he may prefer that a particular set of diagnostics appear when the cursor is positioned at a particular cell showing a transparent graphic, a transparent icon or any particular number, text or formula in his application.

This particular implementation of DDE integration between the invention and a spreadsheet program wasn't developed any further because of the large memory requirements. A one to two seconds response with a 486DX66-type computer with 8 MB of memory was considered inadequate for each keypress. Also, the programming was considered slightly cumbersome and restrictive. However, for those interested in it, a more detailed technical description of the programming, under the identifier DDE INTEGRATION OF THE INVENTION WITH SPREADSHEET PROGRAMS, is also presented further down in this same document.

As it has already been said, the DDE integration implementation was not considered the best option available, and so it was separated from the main coding. So, the full coding for the DDE integration of the invention with spreadsheet programs is not contained in the whole integrated product coding of the preferred embodiment. More than 90% of the corresponding code is presented in the enclosed code pages, but it is not currently integrated with the rest of the program. Integrating it again should be trivial since most of the corresponding program calls have only been commented out, and most of the variables and options necessary are present.

PREFERRED MODE OF INTEGRATION WITH SPREADSHEET PROGRAMS

An alternate implementation has also been tried to INTEGRATE THE INVENTION WITH SPREADSHEET PROGRAMS. The concept of this alternate implementation isn't as elegant and flexible as the previous solution, but this is considered more practical and appropriate, since it doesn't require as much memory and computer speed as the DDE solution. In this implementation, the invention simply exports its information to a format that can be read by spreadsheet programs. In the case of the Microsoft Excel 4.0™ spreadsheet program by Microsoft Corporation of Redmond, Wash., the spreadsheet program supports an option called Info Window (information window). This option may be activated by use of menu command Options-Workspace-Info Window. When the Info Window shows up and whenever it is the active window, the Info Window menu bar is also active. Now use menu command Info and check out all information except for option Note. Using this configuration, the Info Window will only show the contents of the memo note of the worksheet's active cell. Finally, it is suggested that both the worksheet and the info window be arranged so as to show up simultaneously (just use the Windows-Arrange menu command). The Info Window's contents change every time a new cell is selected in the spreadsheet. So, if the spreadsheet will show the data in one window (the worksheet window) and the other window (the info window) will show the diagnostic (the memorandum) associated to the cell where the cursor is. To make this work, all the invention's diagnostics are transferred to the spreadsheet and written into notes in the spreadsheet cells where the corresponding numbers are.

DETAILED OPERATION OF SELECTED PROCEDURES

Detailed Operation of the EIS System

The following paragraphs present a description of the DETAILED OPERATION OF THE EXECUTIVE INFORMATION SYSTEM ROUTINES.

This module must be run by selecting main menu option View—Executive Information. This main menu option calls initial procedure INI_SAG.PRG.

Procedure INI_SAG.PRG first reads table SCREEN.DBF and tries to find the initial screen, that is, the only record with value TRUE in field startscrn. If no initial screen is found, procedure INI_SAG.PRG terminates.

After any desired screen (such as the initial screen just found) is selected, the invention identifies the screen type for this screen. This is the content of field typescrn in table SCREEN.DBF. Let's assume that the type of the initial screen is called INITIALTYPE. Now the invention proceeds to table SCRNTYPE.DBF and finds the record with that same screen type INITIALTYPE. (Screen types are stored in table SCRNTYPE.DBF.) It then identifies the file name and location for the program required to run that screen (for example INITIALTYPE.SPR), contained in field filename, and the file name and location for the program required to edit and modify that screen (for example INITIALTYPEMODLSPR). Users may edit the contents of tables SCREEN.DBF and SCRNTYPE.DBF. We have already seen that the first table contains a listing of all screens in the EIS application, and the second table contains a listing of all screen types and the associated programs required to execute or modify these screens. In this way, users can create new screens and even new types of screens for the EIS system.

Table SCRNDEF.DBF contains detailed information about the inner contents of each screen listed in table SCREEN.DBF. Table SCRNDEF.DBF contains, for each screen, the identifier of each object in that screen and the type of each one of these objects. Object types may be any of the following: C (call), G (graphic or chart), S (series), T (text).

Table SCRNDEF.DBF only changes when a screen type is either created, deleted or modified. Table SCRNDEF.DBF is not modified or changed when screens are modified, since information for screens is contained in a separate table, called OBJECT.DBF. Table OBJECT.DBF is very similar to table SCRNDEF.DBF. Matter of fact, it even reads its own structure from table SCRNDEF.DBF.

Whenever the user creates a new screen, the invention identifies the type of that new screen and it reads all records in SCRNDEF.DBF associated with that type of screen. All these records are then added (appended) to table OBJECT.DBF. However, in this table, these records also contain fields that may store the particular contents of each one of the objects for that screen type (and, as it follows, these are also the objects for this screen). The particular contents for each one of the objects in a screen may be: an alpha field containing any text or title associated to the object, two or more data fields (for example, fields named data and series), field olegraph is a Gen-type field containing the look and associated actions with any packaged object such as a chart (I'll say something more about this later), field call_to specifies what other screen will be called when the user double-clicks this particular object in the screen, etc.

More about field olegraph: This is a gen field. Gen fields in the Microsoft FoxPro for Windows™ database programming language by Microsoft Corporation of Redmond Wash. may contain objects of different types, such as graphics, movies, sound recordings, documents, etc. Each gen field may either be empty or contain only one object, and no more than one object at a time. Objects are inserted into the gen field either by manually copying and pasting them into it or by running specialized programs such as the MSGraph™ charting tool by Microsoft Corporation. An object contained in a gen field usually has associated action or actions, and these actions may also be run from a specific associated program. One such example is that of movies. A movie may only be seen if the appropriate program is called to play it.

Gen fields are convenient in order to simultaneously show more than one graph or chart in a single displayable and printable screen.

Finally, table MEMORY.DBF contains a listing of all graph types (mostly chart types) used throughout an EIS application. Obviously, each graph type is contained in one record of table MEMORY.DBF. Associated to each graph type the invention also has field olegraph (a gen field) containing the formatting definition of each graphic type.

The previous paragraphs describe the way the invention can use the MSGraph™ charting tool by Microsoft Corporation to generate, display and print graphics contained, among other objects, in screens. However, there are other instruments the programmer can use to achieve this. One such example is the FLIPPER for FoxPro™ charting tool by ProWorks of Herminston Oreg. Using this tool, a separate .PRG program file has to be developed to store and execute the definition of each graphic type.

Remember INI_SAG.PRG? This is the procedure that was first described in the preceding paragraphs, and it's the first to run in this module. Procedure INI_SAG.PRG is really a loop. This is necessary because, when the user is looking at any screen with objects and he double-clicks any object, another screen needs to be called. This new screen should also be called by executing procedure INI_SAG.PRG again. We could do this by making INI_SAG.PRG call itself, but this is going to be done a lot of times, and it could end up in a stack overflow. Another solution is that the program sets up a variable containing the identifier of the screen to be called. Let's call this variable global_scrn. If procedure INI_SAG.PRG is designed as a loop, then, the loop could be suspended whenever global_scrn is found empty. When the user double-clicks any object, thus selecting another screen, then variable global_scrn is immediately set to contain the identifier of that screen and the loop is initiated again. When the user presses any button or option to exit, the procedure should simply empty variable global_scrn, and then the loop will simply stop. In this way, there can never be a stack overflow.

DETAILED OPERATION OF THE BROWSE WINDOWS

Procedural and Definition Files

The procedures controlling the operation of the browse windows described in FIGS. 9 to 13 are contained in the following PROCEDURAL AND DEFINITION FILES (files .SCX and .SCT contain definitions; files .PRG contain procedures):

Files EXPERTTO.SCX and EXPERTTO.SCT—Browse Windows toolbar for options View Diagnostics, View Action Categories and View Data.

Files CRITERIO.SCX and CRITERIO.SCT contain the definition of the dialog box used for option "View Filter". This option may be reached executing menu option "View Filter" or the button labeled "Filter" in the Browse Windows toolbar. The program code executed for this option is called FILTRAR.PRG.

Files VISTAS.SCX and VISTAS.SCT contain the definition of the dialog box used for option "Expert Print". This option may be reached executing menu option "File— Expert Print" or the button labeled "Print" in the Browse Windows toolbar. The program code executed for this option is called PRNVISTA.PRG. This program code builds the corresponding relation for the specific report to be printed, then prints the report and finally it removes those relations.

The Memorandum option is executed in code embedded in the screen definition files MEMO.SCX and MEMO.SCT.

Other program files used are: PUSH_WIN.PRG, POP_WIN.PRG, UP.PRG, DOWN.PRG, REFRESH.PRG.

Operation of Browse Views

The following paragraphs describe the OPERATION OF THE BROWSE VIEWS procedures.

First, call procedure UP.PRG. This procedure calls POP_WIN. POP_WIN first loads the screen layout of all windows in the Browse View (these positions are stored in tables WINDOWS.DBF and WINDOWS.FPT), then it creates the database relations between the active tables in the view, and finally it activates the corresponding browse views.

In order to change any browse views, first, call procedure DOWN.PRG. Procedure DOWN.PRG calls PUSH_WIN.PRG (PUSH_WIN.PRG stores the screen layout of all windows in the active Browse View; this information is stored in tables WINDOWS.DBF and WINDOWS.FPT), then it removes the database relations between the active tables in the view, and finally it de-activates the corresponding browse views. Notice that the only variables that are changed with this procedure correspond to the information stored in tables WINDOWS.DBF and WINDOWS.FPT.

In order to change the filter for all Browse Views, first call the screen definition stored in files CRITERIO.SCX and CRITERIO.SCT. If the filter has been changed, call procedure FILTRAR.PRG and then execute procedure REFRESH.PRG (this generates again all browse windows in the screen, in order to show the information according to the filtering conditions just set.

Description of Relational Table Links When
Coordinately Browsing Data and Diagnostics The following paragraphs describe the RELATIONAL TABLE LINKS WHEN COORDINATELY BROWSING DATA AND DIAGNOSTICS. As it has already been described elsewhere in this document (see FIGS. 9 to 13), there are three different browse views. Each one of these is defined by a different set of relations.

BROWSE VIEW 1.

BROWSE VIEW 1, the same browse view displayed in FIG. 59 (the diagnostics view) and simplified in FIG. 11 is controlled by the browse window titled Situation Analysis. The basic table for this browse is PRRESULT.

Table PRRESULT is related to DIAG, by means of field diag (PRRESULT.diag→DIAG.diag) in order to get the name and memo (Situation notes) for the Expert Test that originated the Expert Diagnostic being observed at the moment.

Table PRRESULT is also related to DRRESULT, by means o fields diag and per (PRRESULT.diag+PRRESULT.per→DRRESULT.diag+DRRESULT.per). This is the basic table of the Diagnostics browse.

Table DRRESULT is related to TEST, by means of field test (DRRESULT.test→TEST.test) to obtain the name, notes and general field from the Data Test that originated the Data Diagnostic being observed at the moment.

Table DRRESULT is also related to DRNOTE, by means of fields diag, per and test (DRRESULT.diag+DRRESULT.per+DRRESULT.test→DRNOTE.diag+DRNOTE.per+DRNOTE.test) in order to obtain the personal note related to the Expert Diagnostic being observed at the moment.

Table DRRESULT is also related to RESET, by means of test and per (DRRESULT.test DRRESULT.per→RESULT.test+RESULT.per) in order to obtain fields RESULT.action1 to action5 (if there aren't any records in RESULT related to DRRESULT, then fields action are taken from TEST).

Table RESULT is related to table DATA by means of field data (RESULT.data→DATA.data) in order to show the data record that turned on the current Data Diagnostic.

FIG. 117 shows the relations diagram for view 1, the situation analysis view (that is, the diagnostics browse view). This relations diagram shows hierarchical dependencies between browsing files during view 1.

FIG. 114 shows the browses structure for view 1, the situation analysis view. This figure shows the particular fields shown for each browse file in this view.

BROWSE VIEW 2.

BROWSE VIEW 2, the same browse view displayed in FIG. 58 (the action categories or actions view) and simplified in FIG. 12 is controlled by the browse window titled Categories. The basic table for this browse is called TEMP1.

Table TEMP1 is related to tables ACTION?, by means of field action?—where the '?' stands for any integer number from 1 to 5—(TEMP1.action?→ACTION?.action?) to obtain the descriptions of those actions that originated table TEMP1.

Table TEMP1 is related to table RESULT, by means of field action? (TEMP1.action?→RESULT.action?) in order to obtain the data code field, the period and the test that originated the Data Diagnostic shown in the Diagnostics browse window.

Table RESULT is related to TEST, by means of field test (RESULT.test→TEST.test) in order to obtain the name, notes (Diagnostic notes) and the general field of the Data Test originating the Data Diagnostic being observed at the moment.

Table RESULT is also related to RESNOTE, by means of fields diag, per and test (DRRESULT.diag+DRRESULT.per+DRRESULT.test→RESNOTE.diag+RESNOTE.per+RESNOTE.test) in order to obtain the personal note belonging to the Data Diagnostic being observed at the moment.

Table RESULT is also related to DATA, by means of field data (RESULT.data→DATA.data) in order to show the data record that turned on the current (or active) Data Diagnostic.

FIG. 119 shows the relations diagram for the action categories view. This relations diagram shows hierarchical dependencies between browsing files during this view.

FIG. 120 shows the browses structure for the action categories view (actions view). This figure shows the particular fields shown for each browse file in this view.

BROWSE VIEW 3.

BROWSE VIEW 3, the same browse view displayed in FIG. 60 (the data view) and simplified in FIG. 10 is controlled by the browse window titled Data. The basic table for this browse is called DATA.

Table DATA is related to RESULT by means of fields data and per (DATA.data+DATA.per→RESULT.data+RESULT.per) in order to obtain all the Data Diagnostics related to the data record being observed at the moment.

Table RESULT (basis for the browse window Diagnostics) is related to TEST by means of field test (RESULT.test→TEST.test) in order to obtain the name, notes, (Diagnostic notes) and the general field for the Data Test that originated the Data Diagnostic being observed at the moment.

Table RESULT is also related to RESNOTE by means of fields diag, per and test (DRRESULT.diag+DRRESULT.per+DRRESULT.test→RESNOTE.diag+RESNOTE.per+RESNOTE.test) in order to obtain the persona note belonging to the Data Diagnostic being observed at the moment.

FIG. 121 shows the relations diagram for the data view. This relations diagram shows hierarchical dependencies between browsing files during this view.

FIG. 122 shows the browses structure for the data view. This figure shows the particular fields shown for each browse file in this view.

It is important to mention now that these browse views are not the only views that may be created with the invention. These have only been designed to aid users when querying the information, both data and diagnostics. However, users may query this information in any way they may prefer to. These views may be altered to better serve the users needs, and general purpose tools may be provided so that users can create views to their own preferences. For example, view 1 described in previous paragraphs, the view called diagnostics view, must work in a different way when expert diagnostics have not been generated yet. In this case, the expert diagnostics window should be deleted from that view, and the new dominant browse window will be the data diagnostics window. All other relations will stay the same.

DETAILED OPERATION OF TESTS EXECUTION

The following paragraphs and sections describe the DETAILED OPERATION OF TESTS EXECUTION.

To execute all tests two PRG program files are called. These are CalExp.PRG and CalcDiag.PRG.

Prodecural File CalExp

The following paragraphs describe the operation of PROCEDURE CALEXP.

Procedure CalExp is contained in file CalExp.PRG. Procedure CalExp executes all data tests.

File CalExp.PRG also contains functions F(a,b), G(a[,b]), N(a) and F(a,b,c). As previously indicated, function G( ) may work with one or two parameters. Function N( ) calls a program containing a Neural Net algorithm. There are two different functions F( ), for two and three parameters, respectively. Function F( ) with three parameters may read any information from other applications developed using the invention—in this way, several applications may work in a coordinated manner—.

File CalExp.PRG also contains procedure DataCalc. This procedure executes (calculates) all data row formulas and data column formulas.

Procedure CalExp reads from files TEST.DBF, DETAIL.DBF, DATA.DBF, and writes to files RESULT.DBF and DATA.DBF (when data row formulas or data column formulas are executed).

Procedure CalExp and its dependent procedure EvalGroup define almost everything that is stored in file RESULT.DBF.

The following paragraphs contain a simplified description of the steps executed in Procedure CalExp. These steps must be executed for all specified fields in file DATA.DBF (remember that fields, or data columns in file DATA.DBF frequently represent data periods).

For each test in table TEST.DBF evaluate the formula's expression stored in field FORMULA in table TEST.DBF for each data element in the group associated to the particular test being tested (that is, identified by field GROUP in table TEST.DBF).

The formula evaluation process for each group is executed by procedure EVALGROUP. Remember that all elements in a particular group are stored in table DETAIL.DBF.

If the formula evaluates TRUE, then a record is added to table RESULT.DBF. The newly inserted record must contain: the test code (field TEST in table TEST.DBF), the evaluation period (variable Nper), and the data item's code (field DATA in table DETAIL). If the formula in table TEST.DBF evaluated TRUE for a particular element in the group, then other arithmetic formulas should also be evaluated. These formulas are stored in fields FORMULA1, FORMULA2 and FORMULA3 of table TEST. The evaluation result of each one of these formulas should be stored in fields VALUE1, VALUE2 and VALUE3 of table RESULT.DBF, respectively.

FIG. 113 shows the flow diagram for procedure CalExp. Procedure CalExp contains the main loop for executing all tests and generating all the corresponding diagnostics. This main loop should be executed as many times as the number of periods selected by the user when issuing the order to execute.

The user may also set up two principal variable parameters: (a) PerIni, identified as initial period in the flow diagram drawing, and (b) PerFin, identified as final period in the flow diagram drawing). Tests are executed for all periods between PerIni y PerFin.

Variable Nper contains the current period, which is the period for which all tests are executed. The current period takes different values, starting with PerIni (initial period) and ending with PerFin (final period).

So, in a few words, the steps executed by CalExp are summarized in the next four paragraphs:

Step 1. Initialize variable Nper with value PerIni.

Step 2. Execute steps 3 and 4 for each value of Nper between PerIni and PerFin.

Step 3. For each record in table TEST execute step 4.

Step 4. Execute procedure EvalGroup with the test in the corresponding record in table TEST (TEST.TEST) and with the group in the corresponding record in table TEST (TEST.GROUP)

Procedure Evalgroup

The following paragraphs describe the operation of PROCEDURE EVALGROUP.

FIG. 114 shows the flow diagram for Procedure EvalGroup. Procedure EvalGroup evaluates the formula contained in the current record of file TEST.DBF for each element of the group in the current record of file TEST.DBF.

This procedure may be described following the following three steps:

Step 1. Search for the first record in table DETAIL.DBF where the contents of field GROUP are equal to the contents of field GROUP in the current record of file TEST.DBF. If this record is found, then execute step 2 for each record for as long as there are more records in DETAIL with the group code equal to the group code in the current record of file TEST.

Step 2. Evaluate the logic formula contained in the current record of table TEST. If the result of this logic formula is true, execute step 3, otherwise execute step 1.

Step 3. Calculate the resulting values for each formula contained in fields FORMULA1 . . . FORMULA3 of the current record in table TEST.DBF, and store the resulting values in variables Ta . . . Tc. After this, insert a new, empty record in table RESULT.DBF. Now take the content of field TEST in table TEST.DBF and store it in field TEST in the record just created in table RESULT.DBF. Take the content of field NPER in table TEST.DBF and store it in field PER in the record just created in table RESULT.DBF. Take the content of field DATA in table DETAIL.DBF and store it in field DATA in the record just created in table RESULT.DBF. Take the content of variable Ta and store it in field VALUE1 of the record just created in table RESULT.DBF. Take the content of variable Tb and store it in field VALUE2 of the record just created in table RESULT.DBF. Take the content of variable Tc and store it in field VALUE3 of the record just created in table RESULT.DBF.

Now execute step number 1 again.

Procedure CalcDiag

The following paragraphs describe PROCEDURE CAL-CDIAG.

Procedure CalcDiag contains those routines that execute expert tests. Since said expert tests execute on those results generated after executing all data tests, the expert tests must be evaluated after all the data tests have been evaluated. (In this paragraph, "to execute" and "to evaluate" are equivalents.)

File CALCDIAG.PRG contains the following functions: MaxA(a,b), MaxB(a,b), MaxC(a,b), MinA(a,b), MinB(a,b), MinC(a,b), O(a), P(a).

This procedure reads from tables (files) DIAG.DBF and RESULT.DBF, and it writes to DRRESULT.DBF and PRRESULT.DBF.

The following paragraph contains a simplified description of the steps executed in Procedure CalcDiag. Note that in this description, by data column in fie DATA.DBF, I will refer to fields C1 to C60 in that same file. These fields usually represent a period such as a month, but their meaning might change, since it's defined by the user.

In general, Procedure CalcDiag has two parts, here called ONE and TWO for purposes of clarity. First, PART ONE is executed in full in order to generate all required records of file PRRESULT.DBF. Then, PART TWO is executed in full, too, to generate all records of file DRRESULT.DBF.

PART ONE. For each data column of DATA.DBF specified when executing the Tools—Generate Diagnostics (F9) menu command, and for each record in table DIAG.DBF, evaluate the expression in field FORMULA. This expression, when parsed by the Evaluate Function and & (Ampersand) Function macro substitution services in the Microsoft FoxPro™ database programming language by Microsoft Corporation, returns a logical expression that evaluates to TRUE or FALSE. If the resulting formula evaluates to TRUE, then the invention (1) first evaluates the expressions in fields FORMULA1, FORMULA2 and FORMULA3 and (2) second inserts a new record in table file PRRESULT.DBF, with the following contents: (i) the code for the test record being evaluated (field DIAG in table file DIAG.DBF), (ii) the code for the DATA.DBF field (or data column) being evaluated (that is variable Nper), (iii) field CMIN of table DIAG (this field contains the number of points, or the relative importance of that test), (iv) the results of evaluating the formulas contained in fields FORMULA1, FORMULA2 and FORMULA3.

PART TWO. After completing all the steps of PART ONE, then these other steps are executed to create table (file) DRRESULT.DBF. For each record in table PRRESULT.DBF, execute the two steps described in the following two paragraphs.

Step 1. Execute procedure BldAllDiag in file CALCDIAG.PRG. This procedure first parses the expression in field FORMULA of table (file) DIAG.DBF, thus identifying each element of the underlying formula expression and also identifying each reference to an existing data test.— Remember that a Data Test is referred to by its identifier, contained in field TEST of file TEST.DBF.—

Step 2. For each data test whose reference has been identified by procedure BldAllDiag, a new record is added to DRRESULT.DBF, with the following contents: (i) field DIAG from table (file) DIAG.DBF; (ii) the evaluated data column, that is, variable Nper (remember that a data column is the field being evaluated in file DATA.DBF); (iii) the code for the test identified by procedure BldAllDiag, a letter P or a space in field PLUS (letter P if the test identified was found in either one of tables PRRESULT.DBF and RESULT.DBF, otherwise a space).

This finishes PART TWO.

There's also an ITERATIVE option in Procedure CalcDiag.PRG. After finishing parts ONE and TWO, part ONE is executed again. If there is already a record in PRRESULT.DBF for every formula that evaluates TRUE in DIAG.DBF, the procedure finishes and it returns control to the user. On the other hand, if PART ONE of CalcDiag.PRG can generate at least one new record that wasn't already in PRRESULT, then it adds that record and then it proceeds to part TWO. After it finishes executing part TWO, then it executes part ONE again.

This ITERATIVE option could be easily enriched: when part ONE of CalcDiag evaluates the formula of each record of DIAG.DBF again, it should also check if the results of evaluating the formulas contained in fields FORMULA1, FORMULA2 and FORMULA3 of DIAG.DBF are equal to the values stored in fields FORMULA1, FORMULA2 and FORMULA3 of file PRRESULT.DBF. If any of these numbers is different, then it writes the new values and then proceeds to part TWO. After finishing the execution of that, then it should execute part ONE again. This guarantees that fields FORMULA? will store the correct values given the general condition of all other variables stored in the DBF files.

FIG. 115 shows the flow diagram for Procedure CalcDiag. When looking at this diagram, remember that procedure CalcDiag is executed after generating all diagnostics with procedure CalExp. Procedure CalcDiag contains the main loop for generating all expert diagnostics, and writes all its output in tie PRRESULT.DBF.

Procedure CalcDiag executes the eleven steps (steps 0 to 10) detailed in the following paragraphs.

Step 0. Initialize variables Iterationr=1, MoreIter=TRUE, AntDiag=0.

Step 1. If variable Iteration is smaller than the number of iterations to be executed (Niter), then execute step 2.

Step 2. Initialize variable Nper with the value of the initial period (PerIni).

Step 3. If variable Nper is smaller than the final period (PerFin) then execute steps 4 to 8

Step 4. For all records in table DIAG execute steps 5 to 7.

Step 5. Evaluate the logic formula in field FORMULA of table DIAG. If the result of this formula is TRUE then execute step 7, otherwise process the next record (that is, go to step 7).

Step 6. Evaluate formulas in fields FORMULA1 . . . FORMULA3 of table DIAG and store their results in variables Ta . . . Tc.

Step 7. Insert a new, empty record in table PRRESULT. Take the content of field DIAG of table DIAG and store it in field DIAG of the new record in table PRRESULT. Take the content of variable NPER and store it in field PER of the new record in table RESULT. Take the contents of variables Ta . . . Tc and store them in fields VALUE1 . . . VALUE3 of the new record. Now process the next record of table DIAG (go to step 4).

Step 8. Increment variable Nper by one.

Step 9. Count the number of records in PRRESULT containing field PER equal or larger than PerIni (initial period) and smaller or equal than PerFin (initial period) and then store this number (the count) in variable CountDiag.

Step 10. If variable CountDiag is smaller or equal than AntDiag assign FALSE to variable MoreIter, otherwise assign the value of CountDiag to variable AntDiag.

Procedure BldAllDiag

The following paragraphs describe PROCEDURE BLDALLDIAG.

FIG. 116 shows the flow diagram for Procedure BldAll-Diag. In a nutshell, Procedure BldAllDiag generates the links between diagnostics and expert diagnostics.

Before we discuss procedure BldAllDiag in more detail, we should remember that expert tests turn out expert diagnostics, and that expert tests evaluate TRUE only if a logical combination of diagnostics is true.

In order to generate the links between diagnostics and expert diagnostics, procedure BldAllDiag parses all expert tests formulas in file DIAG.DBF, it identifies all component diagnostics for each formula, finds out if those component diagnostics are TRUE or FALSE (that is, if they are in file RESULT.DBF) and writes all its output in file DRRESULT-.DBF. Thus, the whole procedure could be summarized in the four steps described in the following paragraphs.

Step 1. For each record in PRRESULT.DBF execute steps 2 to 4.

Step 2. Search in table DIAG.DBF for the record with the contents of field DIAG equal to field DIAG in the active (that is, current) record in PRRESULT.

Step 3. Search in field FORMULA of table DIAG for all occurrences of TEST code identifiers. Store all these in array ArrTemp.

Step 4. Search for each element in array ArrTemp in table RESULT and PRRESULT. If the element is found, insert a new record in DRRESULT with field PLUS equal to P, otherwise initialize field PLUS in table DIAG with a space character.

SAMPLE IMPLEMENTATION FOR INTEGRATION OF NEURAL NETS: PROCEDURE NEURAL

The following paragraphs describe the SAMPLE IMPLEMENTATION FOR INTEGRATION OF NEURAL NETS: PROCEDURE NEURAL. The end result of this procedure is that function N(Group,Period) has been added to the set of functions available to the user when developing a logical test expression. Other member functions of this set are G(Group,Period) and F(Datacode,Period). These two functions are widely discussed in different sections of this document and they are used to read the values of specific data items. The N(Group,Period) function is different. The user only needs to specify the group of data records or data items the N function will be applied to, and the function returns an array of TRUE and FALSE values. Each TRUE or FALSE value is applied, in sequence, to a corresponding element of the group of data items (here, the group of data items is treated as an ordered group).

This implementation is based on the NASANETS™ neural nets program implementation by NASA-JSC Software Technology Branch; and more specifically, by NETS Back Propagation Simulator Version 3.0™ by NASA-JSC Software Technology Branch for the MSDOS™ operating system by Microsoft Corporation.

The following eight files need to be present in the program's root directory in order to execute the neural net example:

File 1. NETS_INT.EXE: The executable version of the neural nets program. This particular version runs in computers without the mathematics coprocessor.

File 2. NET.PIF: Windows PIF file to run the BAT file.

File 3. NET.BAT: DOS BAT file containing command nets_int<sample.inp

File 4. SAMPLE.INP: Sequence of keys that the user should press. This file does it automatically. These are the keys, where [CR] represents the RETURN or ENTER key (there are no embedded spaces): c[CR]sample.net [CR][CR] [CR] y[CR]i[CR]sample.iop [CR]n[CR]t[CR] 0.1[CR][CR] [CR] p[CR]sample.pro [CR][CR]sample.out [CR]q[CR]

File 5. SAMPLE.IOP: File containing a set of input/ output pairs (any set of pairs) to train the neural net.

File 6. SAMPLE.NET: Description of the neural net's structure, as follows. GLOBAL-LEARN-RATE: 2.5. GLOBAL-MOMENTUM: 0.9. LAYER: 0. NODES: 3. TARGET: 2. LAYER: 1. NODES: 3. LAYER: 2. NODES: 14. TARGET: 1.

File 7. SAMPLE.OUT: Output file after propagating the input data contained in file SAMPLE.PRO.

File 8. SAMPLE.PRO: File containing the pairs of data to propagate in the neural net.

The procedure works in the way described in the following paragraphs.

The first time function N is called in any formula, the invention builds a vector of data values. This data vector contains the values to be propagated in the net, based in the data group selected by function N(Group,Per).—That is, a group of selected records in file DATA. DBF.—In this example, the group must contain exactly three elements. After this, for this example, all values to be propagated are normalized to values ranging from −1 to 1. Normalization proceeds as follows: define A as the largest number in the group of three data elements selected, define B as the smallest power of 10 number that is larger than A, divide each input data number by B. These are the normalized numbers.

After normalizing these values, SAMPLE.PRO should contain the list o data input to the net. Then, execute the neural net program.

When the neural net program returns its resulting values in file SAMPLE.OUT, these resulting values are parsed and stored in vector array aNVector.

Notice that, in order to operate in a more efficient manner when function N(Group,Per) is called, it executes the neural net program only once for all data elements contained in the specified Group. This is different to the way functions G( ) and F( ) operate. Functions G( ) and F( ) are called once for each number in the specified group.

After the neural net program returns its output values, variable CallNeural is set to FALSE so that the neural program isn't called again. When any additional results from the neural net function N( ) are required, the invention simply reads the corresponding stored values in vector aNVector.

DETAILED OPERATION OF MEMORANDUMS

The following paragraphs describe the DETAILED OPERATION OF MEMORANDUMS.

FIG. 54 shows the View menu. This menu presents four alternate ways to look at the data and its associated diagnostics. To reach the Memorandums, first execute any of the three following View menu options: Diagnostics, Action Categories, or Data. These three options are shown in FIGS. 55 to 60. These options execute similar procedures, simultaneously opening several windows, and allowing the user to browse data and their associated diagnostics. They have already been discussed elsewhere in this document.

When browsing the information in any of the three View options just described, the invention shows a toolbar in the screen. One of the toolbar's buttons is labeled MEMO. If the user presses this button, the invention shows a screen similar to that described in FIG. 30.

If the user selects "Activated Memos" at the lower left corner, the invention then only shows a picklist menu of those memos associated to at least one Expert Diagnostic. Otherwise, the invention shows a picklist menu of all Memos.

Any memo may be associated to a particular diagnostic using the button labeled "Expert Test".

Memos may also be reached when executing the Print commands. After executing the main menu option, the invention will show a Print dialog box. Activate "Select Memos". After that, available options include Preview and Print.

The program files used by the invention to execute the Memorandums services are: Files MEMO.SCX and MEMO.SCT; these store the definition of the Memos control screen (and dialog box). Files MEMO.FRX and MEMO.FRT; these store the definition of the dialog box used for executing option Print Report from Selected Memos. Files DIAG.SCX and DIAG.SCT; these store the definition of the dialog box used for executing option Associate Memos with Expert Tests. Files SAVE-MEMO.SCX and SAVEMEMO.SCT; these store the definition of the dialog box used for executing option Store Memos in the Database. Files LOADMEMO.SCX and LOADMEMO.SCT; these store the definition of the dialog box used for executing option Load Memos from the Database.

The table files used to store all information and the bi-directional pointers are: Files MEMOS.DBF, MEMOS.CDX, MEMOS.FPT; these contain all information (such as full text) for each memo created by the user. File MEMODET.DBF; this contains the bi-directional pointers to related data diagnostics and expert diagnostics

DDE INTEGRATION OF THE INVENTION WITH SPREADSHEET PROGRAMS

The invention may be used in conjunction with other programs. Business managers frequently use spreadsheet programs to analyze their numbers. A particular implementation of the invention was tried where the computer operated under the Microsoft Windows 3.1™ graphical operating environment by Microsoft Corporation, the invention ran in one window and the Microsoft Excel™ spreadsheet program by Microsoft Corporation ran in another window. A DDE channel between these two applications was enabled so that when the spreadsheet program window was the active window and the user selected any cell in that spreadsheet program, then the invention running in the other window would receive a message containing the identifier of the data cell being looked at, and the invention had one or more corresponding diagnostics for the data contained in that cell, it would immediately show them. This would allow managers to look at their data in their favorite spreadsheets and the invention would interactively show the intelligent diagnostics corresponding to the data being reviewed at any time.

However, using a 486DX66 class computer with 8 MB of RAM in a graphical environment the resulting implementation worked fine but was too slow (it took in the order to five seconds to select a new cell and show the corresponding diagnostics). This implementation will definitely be efficient very soon, given the fact that every year's leading computers usually double the speed and power of previous year's leading computers. However, at the time the original program was developed this wasn't selected as the preferred implementation. For this reason, even though the coding for the DDE implementation is included in Appendix 1, is not integrated in the general code (it was deleted).

Two program files execute these routines: DDEDATA2.PRG and ASKDATA.PRG.

DDEDATA2.PRG

The following paragraphs contain a description of the workings of procedural file DDEDATA2.PRG.

File DDEDATA2 is used when communicating by DDE with a spreadsheet (communication with the Microsoft Excel™ spreadsheet program by Microsoft Corporation of Redmond Wash. is exemplified in the accompanying code). Communications parameters are defined when entering procedure DDEDATA2.

The following lines of code define the way communication will proceed:
1)x=DDESetService("DDEData2", "define") && Define a DDEData2 as the DDE server.
2)=DDESetService("DDEData2", "poke", .T.) && Enable sending action POKE to server DDEData.
3)=DDESetService("DDEData2", "execute", .T.) && Enable sending action EXECUTE to server DDEData.
4)=DDESetTopic("DDEData2", " ", "cbDataTopic") && Generic function responding to any topic name.

Line 1 establishes that procedure DDEDATA2 is used as the DDE communication server. (This command defines the invention as the Server application in the DDE communication.)

Line 2 establishes that the client application (the spreadsheet program or a different program) may use service POKE in the DDE communication.

Line 3 establishes that the client application (the spreadsheet program or a different program) may use service EXECUTE in the DDE communication.

Line 4 establishes that procedure cbDataTopic manages DDE communication. This procedure is in file DDEDATA2, where communication parameters are also established.

After executing this series of commands, procedure cbDataTopic waits for any DDE communication required by the client program (the spreadsheet program or a different program). When the client program executes a DDE command, this procedure is activated and cbDataTopic executes the necessary actions.

Procedure CbDataTopic receives several parameters, and these are used depending on the DDE command being executed by the client application. The following paragraphs describe the different commands, parameters and actions executed by cbDataTopic.

Parameters: iChannel, sAction, sItem, sData, sFormat, iStatus.

Parameter iChannel: DDE communication channel. The sample coding enclosed with this document will only work with one communication channel. This means that for this example the application may only serve one client at a time.

Parameter sAction: When cbDataTopic is executed this variable contains the action or service required by the client application. Variable sAction controls the resulting action after executing a CASE statement with options Initiate, Execute, Poke, Terminate, etc. in cbDataTopic.

Parameter sItem: Not used.

Parameter sData: Data transmitted by the client application. Data is transmitted by the client application by means of command DDEPOKE.

Parameter sFormat: Transmitted data format. The Microsoft FoxPro™ programming language by Microsoft Corporation only accepts one data type so in the code listing in Appendix A this parameter doesn't have any significance.

Parameter iStatus: Not used.

When the client application requires a DDE service, the rain CASE statement in cbDataTopic executes at least one of the actions described in the following paragraphs.

sAction='INITIATE'. The client application requests initiating a conversation. All needed relations between tables DATA and RESULT are established in order to display the appropriate browse windows. These relations are controlled by function Seteia in file DDEDATA2.

sAction='REQUEST'. Not used.

sAction='POKE'. If the client application executes command DDEPOKE, it means the client application is now sending data to the invention. All data should be sent following the format DataCode ^ Period, where DataCode and Period are separated by character (^). DataCode represents the identifier for a particular data record (and all diagnostics related to it) and Period represents the identifier for a particular field or column in the DATA. DBF file.

sAction='EXECUTE'. Not used.

sAction='TERMINATE'. If the user selects the TERMINATE DDE service (that is, DDETerminate), then all relations between tables DATA y RESULT are disabled, and control goes back to the invention's main menu.

ASKDATA.PRG

The following paragraphs contain a description of the workings of procedural file ASKDATA.PRG.

Procedure AskData is called when the user decides to look at the coordinated server and client applications working under DDE. This procedure executes the steps detailed in the following paragraphs.

Execute program DDEDATA2. This prepares all necessary parameters enabling the invention as a DDE server.

If the client application (for example, the spreadsheet program) isn't open and available, then procedure AskData opens that application and loads a particular application (spreadsheet WorkBook) file whose name is defined in variable EisSheet. The application (spreadsheet WorkBook) file should contain the required macros to actually control (send and receive) the client's DDE messages to and from the invention. These macros should be preprogrammed in a template file beforehand. The application (spreadsheet WorkBook) file should also contain a subset of data identifiers from the DATA.DBF data table.

During execution of procedure AskData, the invention simultaneously acts as a client and server: the invention acts as a client when it requires via DDE commands that the application (spreadsheet) program open the application (spreadsheet Workbook) files. This is done in a first DDE channel. After that, the application (spreadsheet) program takes control, since the application (spreadsheet Workbook) file contains a macro called Auto Open that executes automatically and establishes a new, second DDE communication channel. Then the first DDE channel is immediately closed. Now the invention is the DDE server and the application (spreadsheet) program is the DDE client.

The following paragraphs describe communication between the invention as a DDE server and the application (spreadsheet) program as a DDE client. First, the structure of contents in the application (spreadsheet Workbook) file needs to be described. This description will be based in the particular coding shown in Appendix 1, and it discusses the particular case where the Microsoft Excel™ spreadsheet program by Microsoft Corporation is the client application.

The workbook contains three separate spreadsheet tables:

1 EIS: This spreadsheet contains the data and graphics that the user wants to look at.

2 Macros: This spreadsheet contains the preprogrammed macros that establish DDE communication between the invention and the application (spreadsheet) program, and send data to the invention when the user moves in the EIS (#1) spreadsheet in the application (spreadsheet) program.

3 REF: Contains all references or pairs DataCode^period, in listing relating these pairs to specific cells in the EIS (#1) spreadsheet. These are used to indicate which diagnostics are associated to which DataCode^period pairs. For example, if cell A1 in REF contains text 1.BALANCE.001^07, then when the user is looking at his data in the EIS (#1) spreadsheet, and when he reaches cell A1, the macro program in the application (spreadsheet) program sends an order to the invention (the DDE server) by the Excel=DDEPoke command and the invention then shows all diagnostics associated to 1.BALANCE.001 in period 7.

When the application (spreadsheet WorkBook) file is closed, Excel executes command=DDETerminate and this closes down the DDE channel.

TECHNICAL ISSUES ABOUT INTEGRATING THE INVENTION WITH SPREADSHEET PROGRAMS

The following paragraphs will discuss a few TECHNICAL ISSUES ABOUT INTEGRATING THE INVENTION WITH SPREADSHEET PROGRAMS.

The implementation suggested here is considered practical and appropriate. In this implementation, the invention simply exports its information to a format that can be read by spreadsheet programs. In the case of the Microsoft Excel 4.0™ spreadsheet program by Microsoft Corporation of Redmond, Wash., the spreadsheet program supports an option called Info Window (information window). This option may be activated by use of menu command Options-Workspace-Info Window. When the Info Window shows up and whenever it is the active window, the Info Window menu bar is also active. Now use menu command Info and check out all information except for option Note. Using this configuration, the Info Window will only show the contents of the memo note of the worksheet's active cell. Finally, it is suggested that both the worksheet and the info window be arranged so as to show up simultaneously (just use the Windows-Arrange menu command). The Info Window's contents change every time a new cell is selected in the spreadsheet. So, if the spreadsheet will show the data in one window (the worksheet window) and the other window (the info window) will show the diagnostic (the memorandum) associated to the cell where the cursor is. To make this work, all the invention's diagnostics are transferred to the spreadsheet and written into notes in the spreadsheet cells where the corresponding numbers are.

In order to make this work well, a few services have been added to the invention. First, this should be an almost transparent procedure, where the invention generates and prepares the spreadsheet files by transferring all necessary information to them. Each application is exported to one set of files, of which the final result is a spreadsheet Workbook containing five associated spreadsheets. This Workbook will contain the finished EIS/spreadsheet application. Additionally, three temporary files are created. These contain the information that should later be transferred to the Workbook. Each set of these four files will be called, from now on, a EIS/spreadsheet application.

For any new EIS/spreadsheet applications, three different files need to be created first. The first one is a spreadsheet file containing the names of all actions in the application. The second one is a database DBF file and it contains the data items values (the first column contains the data codes, the second contains the name associated to each data record, such as "Sales" or "Profits", and starting at the third columns the spreadsheet stores all the data items, where each column corresponds to one field in the data.dbf file). The third file is a spreadsheet file and it contains the resulting diagnostics associated to the data. Each row in the file corresponds to one diagnostic. The first two columns contain the data codes of the data item associated to each diagnostic, and the corresponding period. The third and four columns contain the code for each test (or diagnostic), and the message statement associated to each test (or diagnostic).

These files are used to transfer the necessary application information to the final Workbook. The final Workbook is generated by simply copying a basic Workbook file already containing all the macro programming and required structures. This basic Workbook file is kept in the program directory of the invention. The workbook is usually called EIS.XLW, and it contains five bounded spreadsheets called EIS, DR, Result, Macro and Action. These will be numbered #1A to #5A in the following description:

1A. EIS: Spreadsheet that holds the specified data selected from DATA.DBF. Usually this data is selected by specifying a particular group of data records and a set of periods (DataColumns or fields) in DATA.DBF. This spreadsheet may be customized by the users, adding graphics, etc., in order to make it very attractive and useful, since this is the spreadsheet the user will look at when reviewing his data.

2A. DR: Spreadsheet containing all references to the data.

3A. Result: Spreadsheet containing the corresponding diagnostics to all data represented in the EIS (#1A) spreadsheet.

4A. Macro: Preprogrammed macros controlling the EIS application.

5A. Action: Spreadsheet containing the action categories table. This table is defined according to the selected action categories table in the invention's filter (the button called FILTER in the multibrowse view windows display). An initial random color is initially associated to each action category. Then, the user may change any of these colors as he wishes. When any particular cell contains an associated message, then the color corresponding to the action category associated to hat message will be placed in that particular cell.

In order to generate a new Spreadsheet/EIS application, the user needs to follow a specific sequence of steps in the spreadsheet program, after creating the new set of EIS files for the Microsoft Excel™ spreadsheet program by Microsoft Corporation. These steps are described in the following paragraphs.

Step 1. Enter into the spreadsheet program and file open the workbook. The workbook will show an empty worksheet.

Step 2. Switch to the Macro spreadsheet in this workbook. Turn off option Option-Display-Formulas by pressing keys ALT-O DR.

Step 3. Run macro Alt-M R BuildReference.

Step 4. Finally, run macro NotesMacro. This will generate the data, references and cell coloring described in the previous paragraphs.

Step 5. Now, the Windows must be configured so that the Info Window and the active Spreadsheet window can be simultaneously seen.

Even though the previous paragraphs do not contain a complete description such as that given for the other procedures in the invention, these should be enough for anyone skilled in the art in order to develop a system employing these techniques. The macros referenced in these paragraphs simply import the information into the spreadsheet and copy the diagnostics message statements into the corresponding cells now containing the data items. Each message statement is copied as a note, so that the Info Window will be able to show its contents in its own separate window, and at the same time, the user will be able to look at the original data items being displayed in the spreadsheet. As the user moves from cell to cell in the spreadsheet, the associated notes containing the diagnostics will be shown in the Info Window.

RAMIFICATIONS AND SCOPE OF INVENTION

While the previous description contains many specificities, these should not be construed as limitations on the scope of the invention, but rather as an exemplification of one preferred implementation thereof. The following paragraphs explain many other alternative schemes: different numbers of elements of any type, implementations using different computers, software or programming environments, different structures of the data items database, different structures of the tests database, recursive expert analysis techniques, or different schemes for integrating the invention with expert systems and neural networks. Most of these implementations will be briefly discussed in the following paragraphs.

1. Referring to A DIFFERENT NUMBER OF ELEMENTS OF ANY TYPE, in the previous discussion, the number and data type of fields and variables should no be a constraint to the definition of the preferred embodiment. For example, in the discussion herein, all algorithmic descriptions refer to three different weighting factors. However, a different number of weighting factors could be implemented and this would still be the same invention and the same preferred embodiment of the invention. This also applies to the number of data fields in the data database file, the number of GEN fields in the test database file, etc. Even the number of data database files in each application could change. As long as the algorithms remain the same and the relative operation and mutual dependencies and relations of files and fields are essentially the same, this will still represent the best embodiment of the invention. This is so, because in fact, the best embodiment is really a basic implementation that is frequently modified as to respond in the best possible way to the particular needs of each customer and user of the system. So that is the particular way the invention's best embodiment should be interpreted.

2. Referring to IMPLEMENTATIONS USING DIFFERENT COMPUTERS, SOFTWARE OR PROGRAMMING ENVIRONMENTS, the invention's preferred embodiment described in this document has been built using MS FoxPro (both MS DOS and MS Windows versions), a relational database development tool. A full expert system has been emulated using these tools and storing the knowledgebase (all rules in the rulebase, data and diagnostics) in several relational tables.

The invention could be developed using a different programming environment. Usually, the programming environment defines a lot of the final appearance and operation of any new development. The invention could be developed in any industrial development environment, or in a workstation, or using an expert system shell, or an object database as the basic tool. If the industrial development environment or a workstation had been chosen, the invention would probably be geared toward faster response time and tighter integration with large databases in real-time applications. An expert system shell could also be first building block, and this would have meant the invention would probably operate using a backward chaining algorithm, it would have more powerful logic-building routines, the diagnostics would be stored in a hard-coded database and the querying system would probably be a separate program. If the invention had been built using an object database, the expert logic would be stored in the data objects dictionary, etc. However, in all cases, the invention would contain a diagnostics database and bi-directional links between each diagnostic and the data items associated to it, and all implementations would also contain a querying system or at least basic querying tools to look at the diagnostics in a coordinated manner with the data.

3. Referring to DIFFERENT STRUCTURES OF THE DATA ITEMS DATABASE, the invention could be developed as a database of diagnostics effectively replicating the whole structure of any application database, such as a Management Information System's relational database. However, this alternative solution would be too complicated to program.

4. Referring to DIFFERENT STRUCTURES OF TESTS DATABASE, it is important to mention now that several elements of the program's structure may change without altering the nature of the invention. For example, tests are now structured in data tests and expert tests, where the first perform logical tests on data items and the second perform logical tests on diagnostics already stored in the diagnostics database. However, tests may be structured in one single group of tests capable of performing both operations simultaneously. These tests may read data items and diagnostics and evaluate the logical condition of these. Currently, the invention has been prepared in this way so is to help users identify with the mapping process. The first step converts data into diagnostics (intelligence), and the second combines these diagnostics into ever highyer levels of intelligence. However, in the current embodiment, expert tests may also read data items and perform logical tests based on values of these data items, so expert tests may in fact also operate as data tests.

5. Referring to RECURSIVE EXPERT ANALYSIS TECHNIQUES, expert systems are capable of emulating human reasoning through learning the development of multi-layer rule based systems. However, also a simple test-processing scheme could easily emulate these artificial-intelligence techniques in the invention, even before the integration of the expert system within the invention.

In a simple implementation, whenever a particular test turns true, a diagnostic is generated, and the associated classes (and thus actions and triggers) are identified and generated, an action such as a program or program routine may be executed. This program routine may generate a new set of data within the data DBF file tabla.dbf, it may delete sets of data or even modify existing data within the application. In the same manner, tests could be modified, eliminated or added, depending on the class, action and procedure involved. Whenever this happens, the invention would immediately run the tests all over again. This implies the invention may become a self-learning mechanism with recursion, since the loop would stop only when a state of equilibrium is reached. The same procedure could be applied to the expert tests, since the apparition of a particular expert diagnostic may trigger the modification of the expert tests, the original data, or the individual diagnostics on which the expert tests depend. These operations would also, automatically, involve the associated expert system and inference engine.

In another implementation which could be developed by itself or in combination with the previously described implementation, tests could be applied on diagnostics more than once. In the best embodiment, only expert tests are based on previous diagnostics. One expert test is turned on, that is, an expert diagnostic is generated, only when a predetermined set of diagnostics exists. In a multi-layered recursive scheme for expert tests definition, the predetermined set of diagnostics may also include expert diagnostics, and procedure vaplr.prg would be applied on the diagnostics and expert diagnostics repeatedly, until no more expert diagnostics are generated. However, for this procedure to run, a small change needs to be done to vaplr.prg, as described in appendix C: before the first iteration, step 0 would erase all diagnostics for the selected periods before applying the tests; in all other subsequent iterations, no diagnostics would be erased but, instead, all duplicate diagnostics would be erased after applying the test.

In a third possible implementation, expert tests could follow the syntax of procedural logic, or even of the Lisp language and predicate calculus. In the best embodiment, an expert diagnostic is activated whenever a certain number of diagnostics in a predetermined list are true. But requiring all diagnostics to be true is equivalent to an AND list of conditions on all individual diagnostics. In an expanded version, expert diagnostics could respond to combinations of OR, AND and other logical conditioners in procedural logic or in the predicate calculus language.

Expert system building tools such as the VP-EXPERT™ expert shell by Paperback Software allow the definition of rules and sets of rules entirely in a database DBF file. These are called induction tables, and are fully documented in available literature. Integrating procedural language techniques into the expert diagnostics is equivalent to developing of an expert system's knowledge base in the invention. In order to convert the invention into a full-fledged expert system, only the inference engine procedures need to be considered. As it was stated previously, the inference engine or role interpreter has two tasks. First, it examines facts in working memory (the diagnostics that have been mined on) and rules in the rule base (the expert diagnostics), and adds new facts (diagnostics) to the database when possible. Second, it determines in what order rules (expert diagnostics) are scanned and fired. But, the goal in this expert system building tool is to build as many expert diagnostics as possible and, for that goal, the procedure already described, however crude, is an example of a simple but complete forward chaining algorithm; it's not the most efficient, but it serves its task.

These three examples show a few alternative paths that can be followed to turn the invention into a complete expert system.

6. Referring to THE INVENTION'S INTEGRATION WITH EXPERT SYSTEMS AND NEURAL NETWORKS, an expert system and inference engine, even a neural network or other kinds of artificial intelligence procedures and techniques, could be integrated with the invention through several procedures. In a simple scheme, the invention would retain its structure and operation as stated in the best embodiment implementation. The inference engine would contain a separate, additional and independent set of rules. Only the data DBF file tabla.dbf, all diagnostics and expert diagnostics and all query operations would be common to both platforms.

In such an implementation, the expert system's inference engine would read its data from the diagnostics DBF file result.dbf, and optionally also from the data DBF file tabla.dbf. It would run its sets of rules on this data, and it would finally generate a set of expert solutions. These solutions would be written as new diagnostics in the diagnostics DBF file result.dbf, using the best embodiment's scheme: a reference (or a list of reference) to the data items involved, and an identifier for the ensuing diagnostic. For compatibility with the invention's current structure, a test DBF file entry would also be generated whenever the corresponding test is missing. The test entry will contain the test's short and long description, and the associated classes, triggers and actions, as described. Thus, the user will be able to also reach the diagnostics generated by the expert system by using the querying engine and the corresponding coordinated diagnostic browse views in the same way described previously. The expert system's diagnostics could be distinguished from all others by using appropriate values for the ACTION1, ACTION2, ACTION3, ACTION4 and CLASS5 fields in file test.dbf.

One such possible example of this implementation would involve the VP-EXPERT™ expert shell by Paperback Software. In its version 2.0, VP-EXPERT™ may read and write DBF database files, accessing them with the GET clause (see sections 5.9 and 9.46 in the VP-EXPERT's user's manual), adding records to them with the APPEND clause (sections 5.19 and 9.8 in the same manual), using DBF files as information base (section 5.3 in the user's manual), etc. Even rules may be created from DBF induction tables (see sections 5.22, 8.4 in the user's manual).

Referring to the use of a DBF file as an information base, VP-EXPERT's manual states in page 5.3: "One of VP-EXPERT's most important and powerful features is its ability to interact with database files created using VP-Info, dBASE II, III, III+, or any work-alike database management system." And in page 5.4: "Expert systems frequently require a great amount of data that need period updating. (...) It's far more efficient to store the varying information in a database, and design the role base to contain a single set of invariant rules. (...) VP-EXPERT's ability to employ this type of interaction is one of its greatest powers. Using the GET clause, data can be retrieved from the fields of a database and assigned as values of knowledge base variables. The PUT and APPEND clauses allow data to be transferred in the opposite direction; they copy values from knowledge base variables to the fields of a database. The MENU clause makes it possible to display menus offering values extracted directly from specified database fields. When a database is used in this fashion, it becomes an information base, and it is considered to be part of the overall knowledge base."

Another important reference is in page 5.21 of said user's manual: "Since VP-EXPERT™ permits the user to change data or add data to the knowledge base during a consultation, it can be said that, in a limited sense, the expert system is able to learn from experience. This capacity is significant, because the ability to 'leg' is an important criterion in defining an expert system."

The benefits of integrating the invention with existing expert system building tools are: (a) improved efficiency when handling multilayered logic and complex inference procedures and links through multiple indirect addressing, chained statements, and different alternatives and optimizing procedures for the backward or forward chaining logic; (b) user interaction services ideally suited to knowledge databases management, such as the definition of goals, the use of ASK statements to handle missing information, the operation of uncertainty through confidence factors; and finally, (c) tools for facilitating the understanding of the whole logic process. As the number of rules and their complexity grow, it has been shown that it is very hard to manipulate them and it is also hard to fully understand what they do. For this reason, existing expert system building tools incorporate graphic logic trees, trace services, HOW and WHY statements to inquire how the logic proceeds, etc. All these could be eventually integrated into the invention but, given that each particular expert system developing tool in the market today is stronger for a particular set of applications, it's better to allow the integration and add the power of independent inference engines to the invention.

Another artificial intelligence technique is that of NEURAL NETWORKS. Neural networks receive a set of stimuli (diagnostics or data which are defined as the input layer) to produce specific responses (new diagnostics which are defined as the output layer). However, neural networks don't require any kind of programming to determine the relation between stimuli and responses: they learn as they receive a large number of cases where the stimuli and the responses have already been defined. The invention's best embodiment implementation may hold up to sixty periods of data and its associated diagnostics, and the user may, beside all these cases, present the system with many more cases just so it teams. However, the use of a neural network seems to be most appropriate for the alternative configuration described in (C): different data structures for the data DBF file. In the case of the toy factory, or in other quality control applications such as those related to attention to the public, it may be important to determine whether a data record in the data DBF file represent adequate quality or not. These applications are particularly well suited to neural network applications, since sometimes past experience with a large number of cases where it's already well known whether quality was adequate or not may be the best guide to determine what is adequate quality for the future.

The integration scheme of neural networks with the invention is very similar to that of expert systems with the invention: the invention would retain its structure and operation as stated in the best embodiment implementation, and the alternative implementation described in section (C): different data structures for the data DBF file. The data DBF file tabla.dbf, all diagnostics and expert diagnostics and all query operations would be common to the neural system and the invention's best embodiment implementation.

In such an implementation, the neural network would obtain its stimuli from the diagnostics DBF file result.dbf, and optionally also from the data DBF file tabla.dbf. It would run through its input layer, intermediate layer probabilities and the response layer and it would finally generate a set of responses (diagnostics). These diagnostics would be written as new diagnostics in the diagnostics DBF file result.dbf, using the best embodiment's scheme: a reference (or a list of reference) to the data items involved, and an identifier for the ensuing diagnostic. For compatibility with the invention's current structure, a test DBF file entry would also be generated whenever the corresponding test is missing. The test entry will contain the test's short and long description, and the associated classes, triggers and actions, as described. Thus, the user will be able to also reach the diagnostics generated by the neural network by using the querying engine and the corresponding coordinated diagnostic browse views in the same way described previously. The neural network's diagnostics could be distinguished from all others by using appropriate values for the ACTION1, ACTION2 and ACTION3 fields in file test.dbf.

Accordingly, the scope of the invention should be determined by the appended claims and their legal equivalents.

What is claimed:

1. An apparatus for providing an expert systems toolkit, comprising:

a memory for storing data;

a computer coupled to said memory and having a video display and an input device;

a program in execution by said computer for controlling operations thereof for receiving user input defining one or more analysis rules to be applied to user specified data from said memory, each said analysis rule being a user defined arithmetic and/or logic test to be applied to user specified items of said data and for controlling said computer to receive and store user entered data defining the alphanumeric text of a diagnostic statement associated with each true result of each said analysis rule, each said diagnostic statement comprised of a user defined alphanumeric text string which the user can program to define the significance of the true result, its relevance or any other expression which provides meaning to the user of the true result of the analysis rule, and for controlling said computer to receive user input controlling which of said analysis rules are to be applied to said data, and for applying said analysis rules so designated to the data designated by said user and returning a true or false result for each analysis rule so applied depending upon the state of the data to which each analysis rule was applied, and for each true result returned by an analysis rule, controlling said computer to store in a file in said memory the user programmed text of a diagnostic statement associated with each true result as a diagnostic in a diagnostic database, and for controlling said computer to receive and store in said memory user input defining one or more expert tests, each expert test comprising a user defined arithmetic and/or logic statement to be applied to one or more diagnostics selected by user input from the diagnostics stored in said diagnostic database, said arithmetic and/ or logic statement comprised of mathematical operators and/or logical operators from any logic set such as predicate logic or Boolean logic including at least the AND, OR and NOT functions, each said expert test returning either a true or false result, and for controlling said computer to receive user input defining the text of a super diagnostic statement in the form of an alphanumeric string associated with each true result of one of said expert tests, each said superdiagnostic being an alphanumeric string which the user can program to define the significance of the true result of the expert rule, its relevance or any other expression which provides meaning to the user of the true result of the expert rule, and for controlling said computer to receive user input defining which of said expert tests to execute on user specified diagnostics in said diagnostic database, and for controlling the computer to execute the expert tests so designated, and for controlling said computer to store as a super diagnostic in a super diagnostic file in said memory the super diagnostic statement associated with any true result returned by any said expert test.

2. The apparatus of claim 1 wherein said program also controls said computer to accept user input entered through said input device which defines bidirectional pointer data which associates each said diagnostic statement defined by user input for an analysis rule with one or more user defined items of data to which said analysis rule is to be applied, and for controlling said computer such that when an analysis rule returns a true result, the corresponding one or more items of user defined data mapped to said true result are stored along with the corresponding bidirectional pointer data.

3. The apparatus of claim 1 wherein said diagnostics, the underlying data from which said diagnostics were generated by said analysis rules, and the super diagnostics generated by said expert tests are each stored in a separate table of a relational database, and wherein said program also controls said computer to accept user input entered through said input device which defines bidirectional pointer data which associates each said diagnostic statement defined by user input for an analysis rule with one or more user defined items of data to which said analysis rule is to be applied, and for controlling said computer such that when an analysis rule returns a true result, the corresponding one or more items of user defined data mapped to said true result are stored along with the corresponding bidirectional pointer data, and wherein said program also controls said computer to accept user input entered through said input device which defines bidirectional pointer data which associates each said super-diagnostic statement defined by user input for an expert rule with one or more user defined diagnostics to which said expert rule is to be applied, and for controlling said computer such that when an expert rule returns a true result, the corresponding one or more diagnostics mapped to said true result are stored along with the corresponding bidirectional pointer data.

4. An apparatus for providing an expert systems toolkit implementing diagnostic weighting, comprising:

a memory for storing data;

a computer coupled to said memory and having a video display and an input device;

a program in execution by said computer for controlling operations thereof for receiving user input defining one or more analysis rules to be applied to user specified data from said memory, and for controlling said computer to receive and store user data defining a unique diagnostic statement associated with each true result of each said analysis rule, each said diagnostic statement comprised of a user defined alphanumeric text string, and for controlling said computer to receive user input defining a subjective mathematical statement associated with each said analysis rule, each said subjective mathematical statement being comprised of a user programmable combination of mathematical functions, and each said mathematical statement to be executed only when said associated analysis rule returns a true result, said subjective mathematical statement operating on user specified data from said memory and outputting a numeric result in the form of a weighting number, and for controlling said computer to receive user input controlling which of said analysis rules is to be applied to said data, and for applying said analysis rules so designated to the data in said memory designated by said user and returning a true or false result depending upon the state of the data to which the analysis rule was applied, and for each true result returned by an analysis rule, controlling said computer to store in a file in said memory the diagnostic statement associated with each true result as a diagnostic in a diagnostic database and the corresponding weighting number from the corresponding mathematical statement, and for controlling said computer to receive and store in said memory user input defining one or more expert tests, each expert test comprising a user defined logic statement to be applied to one or more diagnostics selected by user input from the diagnostics stored in said diagnostic database, each said expert test also including an associated user programmable subjective weighting mathematical statement, each said subjective weighting mathematical statement being comprised of a user programmable combination of mathematical functions to be applied to the weighting numbers associated with the diagnostics combined by the logic statement of said expert test, at least one said mathematical function designed to select the maximum of all the weighting numbers associated with diagnostics combined by the corresponding expert test logic statement, and at least one said mathematical function designed to select the minimum of all the weighting numbers associated with the diagnostics combined by the associated expert test logic statement, said logic statement of each said expert test comprised of logical operators from any logic set such as predicate logic or Boolean logic including at least the AND, OR and NOT functions, each said expert test returning either a true or false result, and for controlling said computer to receive user input defining a super diagnostic statement in the form of an alphanumeric string associated with each true result of one of said expert tests, and for controlling said computer to receive user input defining which of said expert tests to execute and for executing the expert tests so designated, and for controlling said computer to store as a super diagnostic in a super diagnostic file in said memory the super diagnostic statement associated with any true result returned by any said expert test in addition to the numeric result of the associated weighting mathematical statement.

5. The apparatus of claim 4 wherein said subjective weighting mathematical statements associated with each said analysis rule and each said expert test are user defined.

6. The apparatus of claim 4 wherein each said mathematical function forming part of any said subjective mathematical statement has a predetermined rule of operation for operating on the weighting numbers associated with the data or diagnostics operated on by said analysis rules or said expert tests, respectively, said rule of operation not being definable by the user.

7. The apparatus of claim 4 wherein said numeric result of each said subjective weighting mathematical statement defines the degree, expressed as a percentage, to which said user believes the diagnostic associated width said true result is or is not included in a subjective class of diagnostics believed by the user to share a similar property or meaning, and wherein the rule of operation for each said mathematical function forming a part of any said mathematical statement associated with any said expert test is predefined, and wherein all logical AND operators forming part of any user defined logic statement of any expert test are assigned the mathematical minima rule of operation which selects the minima of the weighting numbers associated with the diagnostics being combined by the logic statement of the expert test, and wherein all logical OR operators forming part of any user defined logic statement forming part of an expert test is assigned the mathematical maxima rule of operation which selects the maxima of the weighting numbers associated with the diagnostics being combined by the logic statement of the expert test, and wherein all NOT logical operators forming part of any user defined logic statement of any expert test are assigned thereto a 1–x mathematical operator where x is the weighting number of the diagnostic which is negated by the NOT logical operator, such that a logical expression of A AND NOT(B), where A had a weighting number of 40% and B had a weighting number of 70% would result in a weighting number of minima{40%: (1–70%)}=30%.

8. The apparatus of claim 4 wherein said program also controls said computer to accept user input entered through said input device which defines bi-directional pointer data which associates each said diagnostic statement defined by user input for an analysis rule with any user defined data in said memory, and for controlling said computer such that when an analysis rule returns a true result, the corresponding diagnostic mapped to said true result is stored along with the corresponding bi-directional pointer data.

9. The apparatus of claim 4 wherein said diagnostics and the associated weighting numbers, the underlying data from which said diagnostics were generated by said analysis rules, and the super diagnostics generated by said expert tests and the associated weighting numbers derived by said mathematical statement associated with each said expert test are each stored in a separate table of a relational database.

10. The apparatus of claim 9 wherein said program controls said computer to receive user input that defines first and second sets of analysis rules, said first set of analysis rules for acting upon user designated data from a first data file and said second set of analysis rules for acting upon user designated data from a second data file, and for controlling said computer to receive user input data that defines diagnostic statements and mathematical statements relating subjective weighting numbers, each of said diagnostic statements and mathematical statements associated with true results from each said analysis rule in said first and second set of analysis rules, and for controlling said computer to store diagnostics generated by said first set of analysis rules in a first diagnostic database and to store diagnostics generated by said second set of analysis rules in a second diagnostic database, and for controlling said computer such that said logical statements and subjective, user defined mathematical statement associated with each said expert test may be applied to user designated combinations of diagnostics from either or both of said first and second diagnostic databases.

11. The apparatus of claim 9 wherein said program controls said computer to receive user input that defines first and second sets of analysis rules, said first set of analysis rules for acting up on user designated data from a first data file and said second set of analysis rules for acting upon user designated data from a second data file, and for controlling said computer to receive user input data that defines diagnostic statements and mathematical statements relating subjective weighting numbers, each of said diagnostic statements and mathematical statements associated with true results from each said analysis rule in said first and second set of analysis rules, and for controlling said computer to store diagnostics generated by either said first or second set of analysis rules in a single diagnostic database.

12. An apparatus for providing an expert systems toolkit, comprising:

a memory for storing data including at least first and second database files;

a computer coupled to said memory and having a video display and an input device;

a program in execution by said computer for controlling operations thereof for receiving user input defining a first set of one or more analysis rules to be applied to user specified data from said first database file, and for controlling said computer for receiving user input defining a second set of one or more analysis rules to be applied to user specified data from said second database file, each said analysis rule in said first and second set of analysis rules returning either true or false results depending upon the state of the data to which the analysis rule was applied, and for controlling said computer to receive and store user data defining a unique diagnostic statement associated with each true result of each said analysis rule in said first and second set of analysis rules, each said diagnostic statement comprised of a user defined alphanumeric text string which the user can program to define the significance of the true result, its relevance or any other expression which provides meaning to the user of the true result of the analysis rule, and for controlling said computer to receive user input controlling which of said analysis rules in each of said first and second sets of analysis rules are to be applied to said data of said first and second database files and for applying the analysis rules so designated from said first and second sets of analysis rules, and for applying said analysis rules so designated to the data designated by said user and returning a true or false result for each analysis rule so applied, and for each true result returned by an analysis rule in said first set of analysis rules, controlling said computer to store in said memory the diagnostic statement associated with each true result as a diagnostic in a first diagnostic database, and for each true result returned by an analysis rule in said second set of analysis rules, controlling said computer to store in said memory the diagnostic statement associated with each true result as a diagnostic in a second diagnostic database, and for controlling said computer to receive and store in said memory user input defining one or more expert tests, each expert test comprising a user defined logic statement to be applied to one or more diagnostics selected by user input from the diagnostics stored in either or both of said first and second diagnostic databases, said logic statement comprised of logical operators from any logic set such as predicate logic or Boolean logic including at least the AND, OR and NOT functions, each said expert test returning either a true or false result, and for controlling said computer to receive user input defining a superdiagnostic in the form of an alphanumeric string associated with each true result of one of said expert tests each said superdiagnostic being an alphanumeric string which the user can program to define the significance of the true result of the expert rule, its relevance or any other expression which provides meaning to the user of the true result of the expert rule, and for controlling said computer to receive user input defining which of said expert tests to execute and for executing the expert tests so designated, and for controlling said computer to store as a superdiagnostic in a superdiagnostic file in said memory the superdiagnostic statement associated with any true result returned by any said expert test.

\* \* \* \* \*